US011989512B2

(12) United States Patent
Yoo

(10) Patent No.: US 11,989,512 B2
(45) Date of Patent: May 21, 2024

(54) PATENT DOCUMENT CREATING DEVICE, METHOD, COMPUTER PROGRAM, COMPUTER-READABLE RECORDING MEDIUM, SERVER AND SYSTEM

(71) Applicant: IPACTORY Inc., Seoul (KR)

(72) Inventor: Janghyun Yoo, Seongnam-Si (KR)

(73) Assignee: IPACTORY INC., Seoul (KR)

( * ) Notice: Subject to any disclaimer, the term of this patent is extended or adjusted under 35 U.S.C. 154(b) by 0 days.

(21) Appl. No.: 17/704,418

(22) Filed: Mar. 25, 2022

(65) Prior Publication Data

US 2022/0215172 A1 Jul. 7, 2022

Related U.S. Application Data

(63) Continuation of application No. 17/528,326, filed on Nov. 17, 2021, now abandoned, which is a (Continued)

(30) Foreign Application Priority Data

Aug. 29, 2018 (KR) ........................ 10-2018-0101783
Sep. 9, 2018 (KR) ........................ 10-2018-0107455
Jul. 29, 2019 (KR) ........................ 10-2019-0091949

(51) Int. Cl.
*G06F 40/58* (2020.01)
*G06F 3/0482* (2013.01)

(Continued)

(52) U.S. Cl.
CPC .......... *G06F 40/274* (2020.01); *G06F 3/0482* (2013.01); *G06F 3/04842* (2013.01);

(Continued)

(58) Field of Classification Search
CPC .......... G06F 40/58; G06F 40/44; G06F 40/45; G06F 40/47
See application file for complete search history.

(56) References Cited

U.S. PATENT DOCUMENTS 5,774,833 A * 6/1998 Newman .............. G06F 40/211 704/9
5,850,561 A * 12/1998 Church ................ G06F 40/247 715/260

(Continued)

FOREIGN PATENT DOCUMENTS

JP 1993-089103 4/1993
JP 1994-176015 6/1994

(Continued)

OTHER PUBLICATIONS

KIPO, Office Action of KR 10-2021-7005820 dated Jun. 11, 2021.

(Continued)

*Primary Examiner* — Lamont M Spooner
(74) *Attorney, Agent, or Firm* — LEX IP MEISTER, PLLC

(57) ABSTRACT

The present invention relates to a patent document creating device, method, computer program, computer-readable recording medium, server and system. The patent document creating device, according to one embodiment of the present invention, may comprise: a constituent element management unit for managing information on a constituent element which may be included in the content of a patent document; an autocomplete list generation unit for generating a data set on the basis of the information on the constituent element managed by the constituent element management unit, and generating an autocomplete list on the basis of a result extracted from the data set by having text, inputted by a user, as a keyword; and a text input element management unit for managing a text input element capable of receiving, as input, (Continued)

text from the user, extracting, as autocomplete keywords, some of the text inputted in the text input element and transferring same to the autocomplete list generation unit, outputting, on a screen, an autocomplete list generated on the basis of the autocomplete keywords, and when the user selects any one item included in the autocomplete list, replacing the autocomplete keywords with the selected item and outputting same in the text input element.

23 Claims, 35 Drawing Sheets

Related U.S. Application Data continuation of application No. 17/186,133, filed on Feb. 26, 2021, now abandoned, which is a continuation of application No. PCT/IB2019/057302, filed on Aug. 29, 2019.

(51) Int. Cl.

| | |
|---|---|
| ***G06F 3/04842*** | (2022.01) |
| ***G06F 16/9032*** | (2019.01) |
| ***G06F 16/955*** | (2019.01) |
| ***G06F 40/274*** | (2020.01) |
| ***G06F 40/40*** | (2020.01) |

(52) U.S. Cl.

CPC ...... *G06F 16/90332* (2019.01); *G06F 16/955* (2019.01); *G06F 40/40* (2020.01); *G06F 40/58* (2020.01)

(56) References Cited

U.S. PATENT DOCUMENTS 6,161,083 A * 12/2000 Franz .................... G06F 40/211 704/7
6,377,965 B1 4/2002 Hachamovitch et al.
6,523,000 B1 * 2/2003 Ando ...................... G06F 40/45 704/7
6,671,855 B1 * 12/2003 Hayashi ................. G06Q 10/10 715/767
9,846,694 B1 * 12/2017 Cook ...................... G06F 16/93
10,474,761 B2 * 11/2019 Nozue ................... G06F 40/123
2002/0107896 A1 8/2002 Ronai
2003/0028651 A1 * 2/2003 Schreckengast ........ H04L 63/10 705/52
2003/0065637 A1 * 4/2003 Glasgow ................ G06Q 10/10
2003/0191654 A1 * 10/2003 Panchal ............... G06Q 50/184 705/310
2004/0260569 A1 * 12/2004 Bell ....................... G06Q 50/18 705/311
2005/0210042 A1 * 9/2005 Goedken ............... G06F 16/338
2005/0267734 A1 * 12/2005 Masuyama ............. G06F 40/45 704/2
2006/0059413 A1 * 3/2006 Tran ........................ G06F 40/20 715/256
2006/0136824 A1 * 6/2006 Lin ......................... G06F 40/47 715/264
2007/0088743 A1 * 4/2007 Kikuchi ................. G06Q 10/10
2008/0059146 A1 * 3/2008 Liu ......................... G06F 40/45 704/2
2008/0162114 A1 * 7/2008 Torres-Rocca .......... G06F 40/47 704/7
2008/0162115 A1 * 7/2008 Fuji ......................... G06F 40/45 704/7
2008/0195604 A1 * 8/2008 Sears .................... G06F 16/382 707/999.005
2008/0288240 A1 * 11/2008 D'Agostini ............. G06F 40/47 704/3
2008/0306728 A1 * 12/2008 Kamatani ............... G06F 40/55 704/7
2008/0313528 A1 * 12/2008 Chang .................... G06Q 50/18 715/200
2009/0063427 A1 * 3/2009 Zuta ...................... G06F 40/247
2009/0210828 A1 8/2009 Kahn
2009/0254805 A1 * 10/2009 Milton, Jr. ............. G06Q 10/10 715/225
2010/0057439 A1 * 3/2010 Ideuchi ................... G06F 40/42 704/7
2010/0257089 A1 * 10/2010 Johnson ................. G06Q 40/04 705/37
2011/0035364 A1 * 2/2011 Lipsey .................... G06F 40/47 707/E17.084
2011/0131442 A1 * 6/2011 Watanabe ........... G06F 11/3636 713/502
2011/0161054 A1 * 6/2011 Woolf ..................... G06F 17/00 703/1
2011/0270826 A1 * 11/2011 Cha ......................... G06F 16/93 707/723
2012/0191757 A1 * 7/2012 Gross ................. G06Q 10/0633 707/E17.032
2013/0198092 A1 8/2013 Dugan
2013/0282599 A1 * 10/2013 Kang .................. G06Q 50/184 705/310
2014/0075004 A1 * 3/2014 Van Dusen ............ G06N 20/00 709/223
2016/0048936 A1 * 2/2016 Perkowski ........... G06Q 10/063 705/310
2016/0188575 A1 * 6/2016 Sawaf ..................... G06F 40/51 704/2
2017/0075877 A1 * 3/2017 Lepeltier ............... G06F 40/117
2019/0340217 A1 11/2019 Tran

FOREIGN PATENT DOCUMENTS

| | | |
|---|---|---|
| JP | 2003-316775 | 11/2003 |
| JP | 2012-048696 | 3/2012 |
| JP | 2017-091024 | 5/2017 |
| KR | 10-2001-0098042 | 11/2001 |
| KR | 10-2004-0033768 | 4/2004 |
| KR | 10-2004-0065468 | 7/2004 |
| KR | 10-2005-0106613 | 11/2005 |
| KR | 10-2007-0001020 | 1/2007 |
| KR | 10-2007-0059869 | 6/2007 |
| KR | 10-2011-0071240 | 6/2011 |
| KR | 10-1405070 | 6/2014 |
| KR | 10-2016-0098106 | 8/2016 |
| KR | 10-2018-0006518 | 1/2018 |
| KR | 10-2018-0077594 | 7/2018 |
| WO | 2011/109445 | 9/2011 |

OTHER PUBLICATIONS

KIPO, Office Action of KR 10-2021-7006099 dated May 18, 2021.
KIPO, Office Action of KR 10-2021-7006100 dated May 25, 2021.
KIPO, Office Action of KR 10-2021-7006101 dated May 25, 2021.
KIPO, Office Action of KR 10-2021-7006102 dated Jun. 14, 2021.
EPO, Search Report of EP 19855558.3 dated 31, 2022.
EPO, Search Report of EP 22164674.8 dated Jul. 19, 2022.
JPO, Office Action of JP 2021-188261 dated Sep. 6, 2023.
USPTO, Office Action of U.S. Appl. No. 17/186,133 dated Feb. 23, 2022.
USPTO, Final Office Action of U.S. Appl. No. 17/186,133 dated May 26, 2022.
USPTO, Office Action of U.S. Appl. No. 17/186,133 dated May 25, 2023.
USPTO, Office Action of U.S. Appl. No. 17/528,326 dated May 25, 2022.
USPTO, Office Action of U.S. Appl. No. 17/704,375 dated Jun. 23, 2022.

* cited by examiner (a) (b)

PATENT DOCUMENT CREATING DEVICE, METHOD, COMPUTER PROGRAM, COMPUTER-READABLE RECORDING MEDIUM, SERVER AND SYSTEM

TECHNICAL FIELD

The present invention relates to an apparatus, method, computer program, computer-readable recording medium, server and system for drafting a patent document.

BACKGROUND ART

A patent document is a document that must be drafted according to the description requirements regulated in a patent law, and may be understood to include a patent specification, a written opinion, an amendment, etc.

For example, a patent specification is a document in which an inventor expresses a technical idea to be protected according to the description requirements regulated in a patent law, and may be drafted to include the title of an invention, a background art, a brief description of drawings, a detailed description of the invention, the claims, etc. In general, the patent specification is drafted using a given document drafting program by a drafting person, such as a patent attorney who has a high degree of understanding of technology and the patent law.

In most of countries such as the United States, Europe, Korea, Japan, and China, "Word", that is, one of the Office product families of Microsoft, is used as the document drafting program. As a special example, in Korea, "KIPO e-filing S/W" distributed by the Korean Intellectual Property Office (KIPO) is used. The "KIPO e-filing S/W" has an advantage in that it provides structure windows so that a document can be drafted according to conditions required by the Korean patent law and lower statues thereof.

Such a document drafting program includes functions, such as symbol insertion, drawing insertion, and table insertion, but is basically a program based on text typing, which requires a drafting person to input all contents related to an invention by directly typing the contents on a keyboard. Accordingly, there is a problem in that it takes a lot of time to draft one patent specification.

Furthermore, a vast quantity of document tasks depend on only the memory of a drafting person, and all contents are input by the typing of the drafting person. Accordingly, there is a problem in that various forms of improper descriptions occur in which a drafted patent specification does not satisfy the description requirements regulated in a patent law or an invention is not precisely described. This results in a loss of time and costs caused to the drafting person and the Patent Office that examines the patent specification, which needs to be sublated.

In order to prevent such a problem, there has been suggested a separate program (e.g., an add-in installation type program in "Word") or a function (e.g., a "claim error check" function in "KIPO e-filing S/W") of the document drafting program for checking the improper descriptions included in a patent specification.

However, such a program or function is used to perform posterior reviews after a patent specification is fully drafted. A drafting person must inconveniently complete to draft a patent specification and then correct a problem found in a check process. Accordingly, there is a problem in that the time taken to complete the patent specification is further increased.

Meanwhile, in each country, the patent law requires that a patent document shall be drafted and submitted in a designated language. Accordingly, a patent document drafted in an undesignated language must be translated into a language designated by the patent law of a country to which the patent document will be submitted. For example, if a patent application having been filed in the United States is to be filed in Korea based on the claim priority under the Paris Convention, a patent specification associated with the patent application must be translated from English to Korean. If a patent application having been filed in Korea is to be filed in Japan based on the claim priority under the Paris Convention, a patent specification associated with the patent application must be translated from Korean to Japanese.

A patent document to be translated, for example, a patent specification is a document for protecting a technical idea of an invention and a document including a description on a recent technology. Furthermore, the patent specification is not only a technical document but a rights document. Accordingly, if the scope of patent rights is affected by an erroneous translation in the future, this may become an irrevocable problem. Accordingly, a patent document must be translated very precisely and faithfully to the original.

However, there are many cases where a translator who does not have sufficient knowledge and experiences on technology and the patent law performs such a translation task due to several realistic limits, such as a cost and time. For example, if a task for translating a patent specification and filing an application for the patent specification is entrusted to an agent such as a patent law firm, a translation of the patent specification is not performed by a corresponding agent, but is chiefly entrusted and performed by a freelancer translator or a translation company, that is, a third party. Accordingly, the problems with improper descriptions frequently occur in which the contents of a patent document are not technically and precisely translated or are translated out of accord with strict description requirements required by the patent law.

DISCLOSURE

Technical Problem

Embodiments of the present invention are proposed to solve the aforementioned problems, and provide an apparatus, method, computer program, computer-readable recording medium, server and system for drafting a patent document, which can reduce the time taken to draft a patent document.

Furthermore, embodiments of the present invention provide an apparatus, method, computer program, computer-readable recording medium, server and system for drafting a patent document, which can prevent improper descriptions which violate the description requirements required by a patent law when the patent document is drafted.

Technical Solution

An apparatus for drafting a patent document according to an embodiment of the present invention may include: an element management unit configured to manage information of an element capable of being included in contents of a patent document; an auto-complete list generation unit configured to generate a data set based on the information of the element managed by the element management unit and to generate an auto-complete list based on results extracted from the data set using, as a search term, text input by a user; and a text input component management unit configured to manage a text input component to which the user is able to input text, extract, as an auto-complete keyword, some of the text input to the text input component, transmit the extracted text to the auto-complete list generation unit, display, on a screen, the auto-complete list generated based on the auto-complete keyword, replace, when the user selects any one item included in the auto-complete list, the auto-complete keyword with the selected item and output the auto-complete keyword to the text input component.

Advantageous Effects

According to the apparatus, method, computer program, computer-readable recording medium, server and system for drafting a patent document according to an aspect of the present invention, there is an advantage in that the time taken to draft a patent document can be reduced.

Furthermore, there is an effect in that when a patent document is drafted, improper descriptions which violate the description requirements required by a patent law is violated can be prevented.

MODE FOR INVENTION

Figure 1:
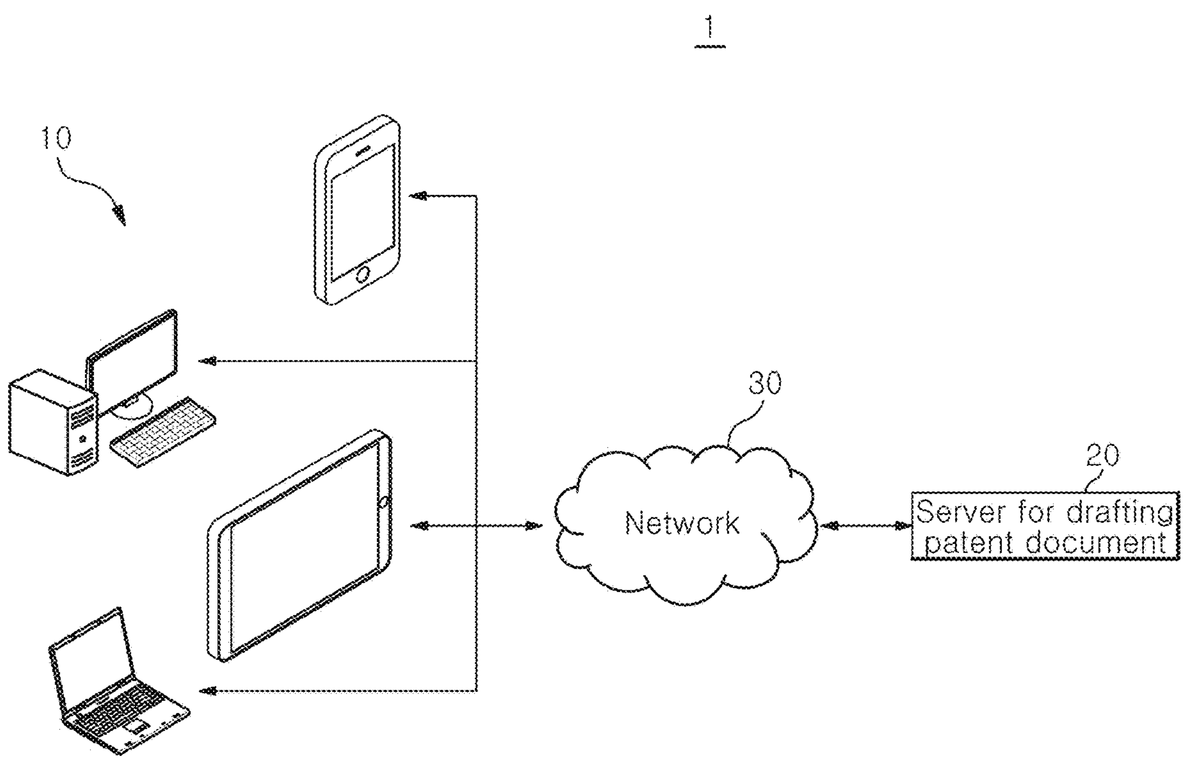
FIG. 1 is a diagram illustrating a system for drafting a patent document according to an embodiment of the present invention.

The present invention may be modified in various ways and may have various embodiments. Specific embodiments are illustrated in the drawings and are described in detail. The effects and characteristics of the present invention and a method for achieving them will become evident with reference to the embodiments described below in detail along with the drawings. However, the present invention is not limited to the following embodiments, but may be implemented in various forms.

Hereinafter, embodiments of the present invention are described in detail with reference to the accompanying drawings. In the drawings, the same or corresponding elements are assigned the same reference numerals, and a redundant description thereof is omitted. Furthermore, in describing the present invention, detailed descriptions of related publicly-known configurations or functions will be omitted if they are deemed to make the subject matter of the present invention vague.

In the following embodiments, terms, such as the first and the second, are not used as limiting meanings, but are used to distinguish one element from another element. In the following embodiments, an expression of the singular form includes an expression of the plural form unless clearly defined otherwise in the context. In the following embodiments, terms, such as include or have, are intended to mean that a characteristic or element described in the specification is present, and do not exclude the possible addition of one or more other characteristics or elements in advance. Furthermore, in the drawings, for convenience of description, the sizes of elements may be exaggerated or reduced. For example, the size, shape, and thickness of each element illustrated in the drawings are randomly expressed for convenience of description, and the present invention is not essentially limited to the drawings.

In the following description, a "patent document" is a document that needs to be drafted according to the description requirements regulated in a patent law, and may be understood to include a patent specification, a written opinion, an amendment, etc. Furthermore, it may be understood that the patent document includes a document (hereinafter referred to as a "patent translation") translated from a patent document drafted in another language (e.g., English or Japanese (hereinafter referred to as a "second language" which is not a language designated by the Korean Intellectual Property Office (KIPO)), not a language (e.g., Korean (hereinafter referred to as a "first language") which is a language designated by the KIPO) designated by a patent office to which the patent document is to be submitted. Furthermore, it may be understood that the patent document also includes a translation of a document (Office Action, for example, a notice of preliminary rejection, and a decision for rejection) issued by a patent office, a written opinion on the Office Action, and a translations of the written opinion.

Furthermore, in the following description, the "drafting" of a patent document is a behavior of completing, by a user, the patent document by inputting contents necessary for the patent document, and may be understood to include all behaviors, such as the input, correction, and deletion of data necessary to complete the patent document, such as text, a symbol, and an image related to the creation and editing of the patent document.

Furthermore, in the following description, the "management" of data or information may be understood as a concept, including the input, storage, correction, deletion, etc. of the data or information. Furthermore, in the following description, it may be understood that the "management" of a specific object includes the management of data or information included in the corresponding object, in addition to controlling the corresponding object.

Furthermore, in the following description, a user interface (UI) may be understood as a physical or virtual medium produced for temporary or permanent access purposes so that a user and an application for drafting a patent document can communicate with each other. It may be understood that the UI includes all types of physical hardware and logical software provided to enable a user and an application for drafting a patent document to interact with each other.

FIG. 1 is a diagram illustrating a system 1 for drafting a patent document according to an embodiment of the present invention.

Referring to FIG. 1, the system for drafting a patent document 1 according to an embodiment of the present invention may include an apparatus for drafting a patent document 10 and a server for drafting a patent document 20. The apparatus for drafting a patent document 10 and the server for drafting a patent document 20 may be connected to transmit and receive data to and from each other over a network 30.

In the present embodiment, the system for drafting a patent document 1 is provided to enable a user to draft a patent document. The user may rapidly and accurately draft a patent document using the system for drafting a patent document 1. The system for drafting a patent document 1 may provide the user with various functions for drafting the patent document through the apparatus for drafting a patent document 10. Such functions may be implemented by any one of the apparatus for drafting a patent document 10 and the server for drafting a patent document 20 or through an interaction between the apparatus for drafting a patent document 10 and the server for drafting a patent document 20.

For example, the system for drafting a patent document 1 may provide a service in which a user can draft a patent document in the first language or the second language according to a format designated by a patent office, may provide a service in which a user can translate a patent document, drafted in the second language or the first language, into the first language or the second language, or may provide the two services. As a detailed example, the system for drafting a patent document 1 may provide a user with one or more of a service in which a patent specification is drafted in the first language, a service in which a patent specification is drafted in the second language, a service in which a translation specification is drafted by translating a patent specification, drafted in the first language, into the second language, and a service in which a translation specification is drafted by translating a patent specification, drafted in the second language, into the first language.

In the following description, it may be understood that a "patent document drafting service" is provided by one or more of the system for drafting a patent document 1, the apparatus for drafting a patent document 10, and the server for drafting a patent document 20. For example, the "patent document drafting service" may be understood as a function or a set of functions provided to a user through an input and output interface (19 in FIG. 2) of the apparatus for drafting a patent document 10 so that the user can draft a patent document.

Furthermore, in the following description, a "case" may be understood as a unit of an object generated in order for a user to draft one patent document. It may be understood that "case information" includes basic information related to a patent document and information input in a process of drafting the corresponding patent document. For example, a user may generate one case for drafting a patent specification, and may input basic information, such as a management number, a client, a deadline, etc. of the corresponding case and data that need to be input as the contents of the patent specification, through the system for drafting a patent document 1.

Meanwhile, the system for drafting a patent document 1 may provide a user with a file through which a client who requests the drafting of the patent document can read a drafted patent document using a given program or which may be directly submitted to a patent office. For example, the system for drafting a patent document 1 may provide a function for downloading, by a user, a drafted patent document as a file, having an extension of doc or docx readable by the "Word" program of Microsoft, a file having a specific format (e.g., a file having an xml-based extension of hlt or hlz readable by "KIPO e-filing S/W" in Korea) which may be submitted to a patent office, a PDF file, a html file, etc.

In the present embodiment, the system for drafting a patent document 1 is described by taking, as an example, the providing of a service in which a patent specification and a patent translation can be drafted. For convenience of description, in the following description, a service in which a patent specification is drafted is called a first service, and a service in which a patent translation can be drafted is called a second service. That is, the system for drafting a patent document 1 according to the present embodiment may provide both the first service and the second service. However, the spirit of the present invention is not limited thereto, and the system for drafting a patent document 1 may provide only the first service or provide only the second service. Furthermore, the system for drafting a patent document 1 may provide a service in which another patent document, for example, a written opinion or an amendment other than a patent specification or a patent translation is drafted. For another example, the system for drafting a patent document 1 may also provide a service in which a document (e.g., a notice of preliminary rejection or a decision for rejection) issued by a patent office is translated, a opinion on the document is drafted, or a written opinion is translated.

Furthermore, the system for drafting a patent document 1, the apparatus for drafting a patent document 10, and the server for drafting a patent document 20 may selectively include only a necessary element of elements, described hereinafter, depending on a provided service.

The apparatus for drafting a patent document 10 is an apparatus provided to enable a user to input the contents of a patent document, and may be a stationary terminal or mobile terminal implemented as a computing device. For example, the apparatus for drafting a patent document 10 may be a computer, a notebook, a tablet PC, a smartphone, a mobile phone, a wearable device, etc., but the spirit of the present invention is not limited to such examples. The apparatus for drafting a patent document 10 may be a given terminal that has a function for inputting information necessary for a user to draft a patent document and displaying the information to the user. Hereinafter, contents described by taking a user as the subject may be understood as contents described by taking the apparatus for drafting a patent document 10 as the subject.

The server for drafting a patent document 20 enables a user to draft a patent document through communication with the apparatus for drafting a patent document 10 over the network 30, and may be a computing device for receiving an instruction, a code, a file, data, content, a service, etc. from the apparatus for drafting a patent document 10 or providing them to the apparatus for drafting a patent document 10. The server for drafting a patent document 20 may be implemented as any one of a virtual server and a physical server or a combination thereof. The type of server does not limit the scope of rights of the present invention. For example, the server for drafting a patent document 20 may be implemented as a virtual private server.

The server for drafting a patent document 20 may store, process, and work data received from the apparatus for drafting a patent document 10, and may transmit corresponding results to the apparatus for drafting a patent document 10. Furthermore, the server for drafting a patent document 20 may perform a given operation based on data received from the apparatus for drafting a patent document 10, and then transmit corresponding results to the apparatus for drafting a patent document 10. Furthermore, the server for drafting a patent document 20 may provide data, content, a service, etc. requested by the apparatus for drafting a patent document 10. Furthermore, the server for drafting a patent document 20 may perform a given function requested by the apparatus for drafting a patent document 10, or may function to transmit an instruction so that the apparatus for drafting a patent document 10 can perform a given function. Furthermore, the server for drafting a patent document 20 may perform data communication with another server, provided by a third party, in response to a request from the apparatus for drafting a patent document 10, and may transmit corresponding results to the apparatus for drafting a patent document 10.

The apparatus for drafting a patent document 10 and the server for drafting a patent document 20 may communicate with each other over the network 30 using a wireless or wired communication method. Furthermore, the apparatus for drafting a patent document 10 may be provided to be capable of communicating with another apparatus for drafting a patent document 10 or another server for drafting a patent document 20 over the network 30. Furthermore, the server for drafting a patent document 20 may be provided to be capable of communicating with another apparatus for drafting a patent document 10 or another server for drafting a patent document 20 over the network 30. In the present embodiment, the network 30 functions to connect the apparatus for drafting a patent document 10 and the server for drafting a patent document 20 so that they can transmit and receive data, and a communication method or the type of network 30 is not limited. For example, the network 30 may provide an access path along which the apparatus for drafting a patent document 10 can transmit and receive data after accessing the server for drafting a patent document 20.

Meanwhile, the apparatus for drafting a patent document 10 may include an application (hereinafter referred to as an "application for drafting a patent document") provided to enable a user to draft a patent document, or may drive the application for drafting a patent document. That is, the apparatus for drafting a patent document 10 may provide the user with a patent document drafting service through the application for drafting a patent document. The application for drafting a patent document may be provided as an operating system (OS) installed in the apparatus for drafting a patent document 10, one function of the OS, an application which may be driven by the OS, or one function of an application which may be driven by the OS.

For example, the application for drafting a patent document may be installed from a computer-readable recording medium or may be downloaded and installed from the server for drafting a patent document 20. In this case, the server for drafting a patent document 20 may store a file or a program source for installing the application for drafting a patent document, and may provide the file or the program source to the apparatus for drafting a patent document 10 in response to a request from the apparatus for drafting a patent document 10. Alternatively, the application for drafting a patent document is not independently installed, but may be implemented as one operating mode of an application which may be installed in the apparatus for drafting a patent document 10.

For example, the application for drafting a patent document may be a given application capable of displaying a web page implemented based on a web browser or HTML, and may output, to a user, screens that provide the patent document drafting service. For example, the application for drafting a patent document may be a web application. In this case, the server for drafting a patent document 20 may provide the apparatus for drafting a patent document 10 with a static web page having a form which may be output to the application for drafting a patent document and/or a dynamically generated web page, in response to a request from the apparatus for drafting a patent document 10. The web page output by the apparatus for drafting a patent document 10 may include a script for providing the patent document drafting service.

For another example, the application for drafting a patent document may be a word processor, and a patent document drafting function is basically mounted on the word processor or may be provided in the form of an add-in program. In the latter case, the server for drafting a patent document 20 may store the add-in program which may be installed in the apparatus for drafting a patent document 10, and may provide the add-in program to the apparatus for drafting a patent document 10 in response to a request from the apparatus for drafting a patent document 10.

It may be understood that functions of the apparatus for drafting a patent document 10 or functions related to the drafting of a patent document which are described hereinafter are implemented by the application for drafting a patent document although not particularly described.

In the present embodiment, an example is described in which the apparatus for drafting a patent document 10 is a communication terminal capable of using a web service in a wired/wireless communication environment and the server for drafting a patent document 20 is a server in which a web server program enabling the apparatus for drafting a patent document 10 to access a specific URL is executed in a wired/wireless communication environment. Furthermore, in the present embodiment, an example is described in which the application for drafting a patent document is a web application executable through an application capable of web browsing, such as a web browser. Specifically, a user may access a specific URL, assigned to the server for drafting a patent document 20, using a web browser installed in the apparatus for drafting a patent document 10. The apparatus for drafting a patent document 10 may load a web page for drafting a patent document, provided by a web server installed in the server for drafting a patent document 20, and may provide a user with the web page as the application for drafting a patent document. In other words, the web browser may function as the application for drafting a patent document. Accordingly, in the present embodiment, the application for drafting a patent document may be understood as a web browser onto which a specific web page provided by the server for drafting a patent document 20 is loaded.

The above example is merely an embodiment of the present invention. As described above, since the apparatus for drafting a patent document 10, the server for drafting a patent document 20, and the application for drafting a patent document may be variously configured, the scope of rights of the present invention is not limited by the above embodiments. For example, the application for drafting a patent document in the apparatus for drafting a patent document 10 may be implemented to be driven offline by using a web browser and storing data in the apparatus for drafting a patent document 10. Furthermore, the server for drafting a patent document 20 may provide a web page which can function as the application for drafting a patent document. The web page may include a responsive web page or adaptive web page which can implement a screen having a corresponding form when the web page is accessed by various forms of devices. Furthermore, the server for drafting a patent document 20 may provide the application for drafting a patent document in the form of a mobile-native application or a hybrid application. Furthermore, the apparatus for drafting a patent document 10 may be provided to drive the application for drafting a patent document, which is provided as desktop application software. In some embodiments, the apparatus for drafting a patent document 10 may independently operate without communicating with the server for drafting a patent document 20. Furthermore, the apparatus for drafting a patent document 10 may perform only a function for simply displaying a screen, and data storage or processing may be fully performed by the server for drafting a patent document 20. As described above, the apparatus for drafting a patent document 10, the server for drafting a patent document 20, and the application for drafting a patent document may be variously configured within a range in which a characteristic idea of the present invention is maintained.

Figure 2:
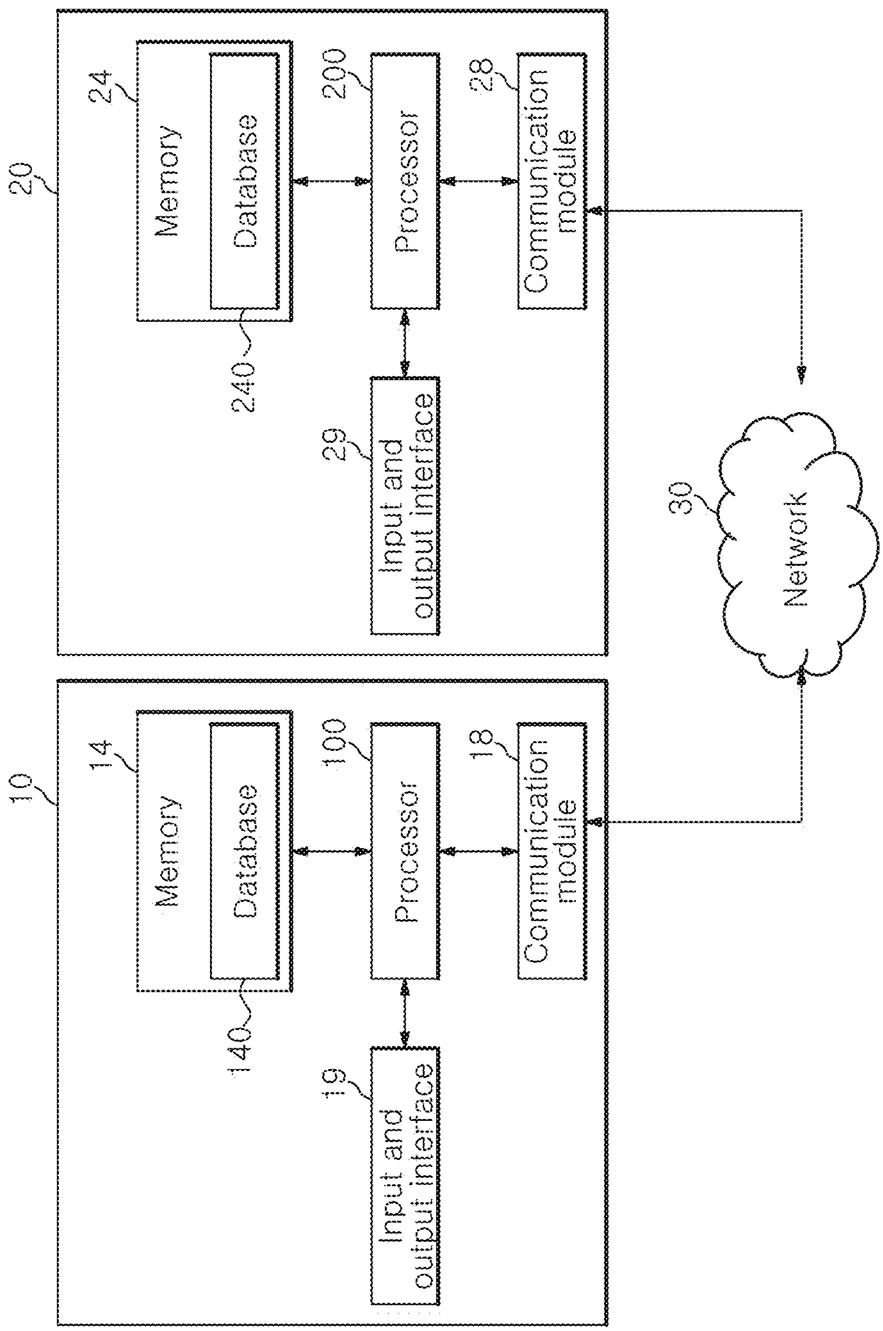
FIG. 2 is a diagram schematically illustrating the configurations of an apparatus for drafting a patent document and a server for drafting a patent document in FIG. 1.

FIG. 2 is a diagram schematically illustrating the configurations of the apparatus for drafting a patent document and the server for drafting a patent document in FIG. 1.

Referring to FIG. 2, the apparatus for drafting a patent document 10 and the server for drafting a patent document 20 may include processors 100 and 200, memories 14 and 24, communication modules 18 and 28, and input and output interfaces 19 and 29, respectively.

The processor 100, 200 may be configured to process an instruction of a computer program by performing basic arithmetic, logic and input and output operations. The instruction may be provided from the memory 14, 24 or the communication module 18, 28 to the processor 100, 200. Other instructions may be provided to the processor 100, 200 through a bus, that is, a communication channel between elements that constitute the apparatus for drafting a patent document 10 and the server for drafting a patent document 20.

The processor 100, 200 may perform various functions, such as the input and output of data necessary to draft a patent document, the processing of data, the management of data, and communication using the network 30. Detailed elements of the processor 100, 200 for the functions will be described later with reference to drawings. The elements of the processor 100, 200 may be functional modules implemented as program codes stored in the memory 14, 24.

The memory 14, 24, which is a computer-readable recording medium, may include a volatile recording device, such as a random access memory (RAM), and a permanent mass storage device such as a read only memory (ROM) and a disk drive. An OS or at least one program code, which may function as the application for drafting a patent document, may be stored in the memory 14, 24. The processor 100, 200 may load the program code, stored in the memory 14, 24, to enable a patent document drafting service to be implemented. The program code may be loaded from a recording medium (e.g., a DVD or a memory card) readable by a separate computer or may be transmitted from another apparatus to the memory 14, 24 through the communication module 18, 28 and stored in the memory 14, 24.

Furthermore, a database 140, 240 for storing data necessary to provide the patent document drafting service may be provided to the memory 14, 24. That is, it may be understood that the memory 14, 24 includes the database 140, 240. The database 140, 240 may be a database independently constructed in terms of software, and may also be a repository having a given form and capable of storing data. For example, the database 140, 240 may be a data repository, which is mounted as part of an application or operates in conjunction with a specific application. Specifically, in the case of the apparatus for drafting a patent document 10, the database 140 is a database provided by a web browser, and may use one or more of a web storage, a web SQL database, and an Indexed DB (hereinafter referred to as a "web DB") provided as the html5 function, for example. Furthermore, the database 140 of the apparatus for drafting a patent document 10 may further include an additional data repository in addition to the web DB. Furthermore, the database 140, 240 may be provided in an independent file form, and may manage data thereof through only a specific application or a specific protocol.

In the present embodiment, an example is described in which the database 140 of the apparatus for drafting a patent document 10 includes a web DB. Such a web DB may store at least several megabytes (Mbytes) to up to several tens of megabytes, and thus may store sufficient data necessary to draft a patent document. Accordingly, the apparatus for drafting a patent document 10 can effectively manage a technical characteristic, which needs to be included in a patent document and to be confidential, within the apparatus for drafting a patent document 10 without transmitting the technical characteristic to the server for drafting a patent document 20 over the network 30. In the present embodiment, data which needs to be confidential may be understood as data which may affect patent registration for a patent document, and may be understood as data which may affect the determination on novelty or inventive step of a patent specification when made public, for example.

Furthermore, the application for drafting a patent document can provide a user with substantially the same security performance as a conventional word processor, such as "WORD" of Microsoft, because it can store data in the apparatus for drafting a patent document 10 without using the network 30. Furthermore, the apparatus for drafting a patent document 10 may encrypt a technical characteristic which needs to be confidential and store the encrypted technical characteristic in a web DB. In this case, the apparatus for drafting a patent document 10 can provide a user with security performance better than that of the word processor.

The database 140, 240 may include various configurations capable of storing data necessary to draft a patent document, and the configurations may be implemented as one or more tables or a combination of the tables in one or more databases. In some embodiments, the database 140, 240 may be implemented in a format in which data are stored as a combination of key data and value data. Detailed elements of the database 140, 240 will be described later with reference to drawings.

Meanwhile, the memories 14, 24 may be physically provided in plural, and may be provided as a physical apparatus integrated with the processor 100, 200. Furthermore, the memory 14, 24 may be provided as a physically or logically independent apparatus and connected to an apparatus on which the processor 100, 200 is mounted, thus being capable of generally configuring the one apparatus 10, 20. The apparatus for drafting a patent document 10 and the server for drafting a patent document 20 are not limited to the physical or logical configurations of the processor 100, 200, the memory 14,24 and other apparatuses.

The communication module 18, 28 may provide a function to communicate with each other over the network 30, and may provide a function for enabling the apparatus for drafting a patent document 10 and the server for drafting a patent document 20 to communicate with another apparatus or another server. For example, data received from a user through the apparatus for drafting a patent document 10, a request generated by the processor 100 of the apparatus for drafting a patent document 10, a response to a request from the server for drafting a patent document 20, etc. may be transmitted to the server for drafting a patent document 20 through the communication module 18. Furthermore, data generated by the processor 200 of the server for drafting a patent document 20, a request generated by the processor 200 of the server for drafting a patent document 20, a response to a request from the apparatus for drafting a patent document 10, etc. may be transmitted to the apparatus for drafting a patent document 10 through the communication module 28.

The input and output interface 19, 29 is an element for receiving data from a user or outputting, to a user, data provided by the processor 100, 200, the memory 14, 24, the communication module 18, 28, etc., and may be understood to include both a hardware interface in a physical aspect and a software interface in a logical aspect. For example, the input and output interface 19, 29 may include a device, such as a keyboard, a mouse, a microphone, or a camera, as an input device, and may include a device, such as a speaker or a display, as an output device. For another example, the input and output interface 19, 29 may include a device, such as a touch screen, in which an input and an output are integrated into one, and an input tool, such as a touch pen.

A user may input data for drafting a patent document, while checking the input data through the input and output interface 19, 29, in particular, the input and output interface 19 of the apparatus for drafting a patent document 10 or checking data provided by the processor 100 or the memory 14. In other words, the input and output interface 19, 29 may receive, from the user, the data for drafting the patent document or may output, to the user, the data for drafting the patent document.

Figure 3:
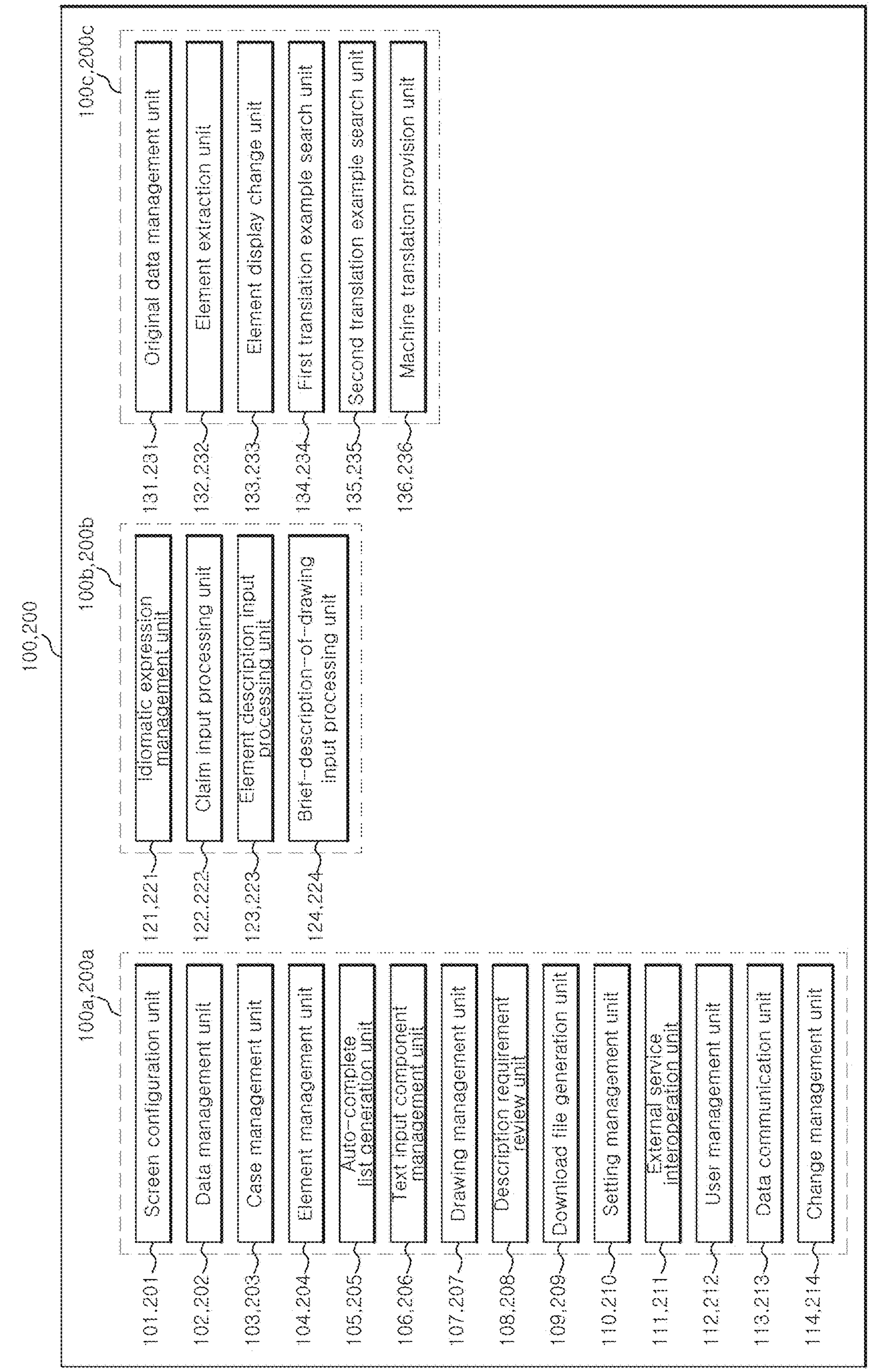
FIG. 3 is a diagram illustrating an example of the configurations of processors of the apparatus for drafting a patent document and the server for drafting a patent document in FIG. 2.

FIG. 3 is a diagram illustrating an example of the configurations of the processors of the apparatus for drafting a patent document and the server for drafting a patent document in FIG. 2.

Referring to FIG. 3, the processor 100 may include a common processing unit 100*a* that provides a function necessary in common for the first service and the second service, a first processing unit 100*b* that provides a function for the first service, and a second processing unit 100*c* that provides a function for the second service. In the present embodiment, the configuration of the processor 100 is dividedly described as the common processing unit 100*a*, the first processing unit 100*b*, and the second processing unit 100*c*, but the spirit of the present invention is not limited to such a configuration in which the processor 100 is separately implemented as the common processing unit 100*a*, the first processing unit 100*b*, and the second processing unit 100*c* physically or logically. For example, the processor 100 is not divided into the common processing unit 100*a*, the first processing unit 100*b*, and the second processing unit 100*c*, but may be implemented as a single integrated control unit. Furthermore, in some embodiments, if the apparatus for drafting a patent document 10 provides only the first service or the second service, the second processing unit 100*c* or the first processing unit 100*b* may be omitted. In this case, the common processing unit 100*a* is not separately provided, and elements of the common processing unit 100*a* and elements of the first processing unit 100*b* or the second processing unit 100*c* may be implemented as a single integrated control unit. Furthermore, it may be understood that the common processing unit 100*a*, the first processing unit 100*b*, and the second processing unit 100*c* are conceptually divided. In some embodiments, it may be understood that elements belonging to one of the common processing unit 100*a*, the first processing unit 100*b*, and the second processing unit 100*c* are included in another set or to be redundantly included.

The common processing unit 100*a* may include one or more of a screen configuration unit 101, a data management unit 102, a case management unit 103, an element management unit 104, an auto-complete list generation unit 105, a text input component management unit 106, a drawing management unit 107, a description requirement review unit 108, a download file generation unit 109, a setting management unit 110, an external service interoperation unit 111, a user management unit 112, a data communication unit 113, and a change management unit 114.

The screen configuration unit 101 may configure the structure and content of a screen shown to a user through the application for drafting a patent document. The screen configured through the screen configuration unit 101 may be provided to the user through the input and output interface 19. In this case, in the structure of the screen, it may be understood that a web page is dividedly disposed in a plurality of regions. The content may be understood as multimedia information and a web component, such as text, a still image, and a moving image, which will be displayed on a full screen or in respective regions. Furthermore, the content may include a UI for providing multimedia information to a user, receiving data or an instruction from a user, and allowing a user to perform a given manipulation on a screen. In the present embodiment, it may be understood that the UI includes an element provided to enable a user to recognize information through the application for drafting a patent document or to enable a user to input data or issue an instruction through the application for drafting a patent document. As in the present embodiment, if the application for drafting a patent document is provided as a web application, a UI may be understood as a given element which may be included in a web page, and may include, for example, a graphic user interface (GUI), a text user interface (TUI), a web user interface (WUI), etc.

The screen configuration unit 101 may be provided as one function of a web browser. Furthermore, the screen configuration unit 101 may receive a file and data from the server for drafting a patent document 20 or may read a file or data stored in the memory 14, and may configure a screen. A screen configured through the screen configuration unit 101 may be a static web page or a dynamic web page. The screen configuration unit 101 may refer to a file and a resource necessary for a web page implementation.

The function and role of each of the regions included in a screen displayed through the screen configuration unit 101 may be previously defined. For example, the screen configuration unit 101 may configure a screen with a preset structure in which a navigation region, a side bar region, a main region, etc. are disposed. Content included in each of the regions may be previously set or may be generated by receiving information from a user. For example, content displayed in the navigation region and the side bar region may be previously set, and preset information and information input by a user may be together displayed in the main region.

Furthermore, a web page configured through the screen configuration unit 101 may include a script that provides a UT for enabling a user to adjust the structure of a screen or to set or change the type, contents, a location, a form, etc. of content displayed on a screen. That is, the screen configuration unit 101 may be provided to enable a user to change the configuration of a web page. For example, a web page provided through the screen configuration unit 101 includes a plurality of regions, and may provide a UI having a function that enables a user to select a region to be displayed on a screen or to adjust one or more of the location and size of a region. Such a function of the UI may be implemented by using a program language, such as JavaScript, which can dynamically control a web page.

The screen configuration unit 101 may basically configure a "patent document drafting screen" on which a user can input the contents of a patent document using the input and output interface 19. The structure and content of the patent document drafting screen may be differently configured depending on a provided service. That is, the patent document drafting screen for the first service and the patent document drafting screen for the second service may be differently configured, and detailed contents related thereto will be described later.

In either case, the patent document drafting screen configured by the screen configuration unit 101 may include one or more text input components in which a user can input information, including text, as the contents of a patent document. The "text input component" may be understood as a UI provided to a user through the application for drafting a patent document so that the user can input text therein. If the application for drafting a patent document is implemented as a web application as in the present embodiment, the text input component may be a form component of html or a tag in which data can be input. For example, the text input component may be composed of an input, textarea, a div tag, etc.

In this case, some text input components may be provided to receive non-text data, such as a table and a drawing. For example, a web page may include a text input component in which a UI for performing functions, such as drawing a table, inserting a special character, inputting an equation, inputting a chemical formula, inputting sequence information, and inserting a drawing, is provided on one side of a text input window in a toolbar form. Such a UI may be positioned separately from the text input component.

The data management unit 102 may manage data necessary to draft a patent document, and may function as a data input and output interface for the database 140. For example, the data management unit 102 may provide a function for storing data in the database 140, reading stored data, correcting stored data or deleting stored data.

The data management unit 102 may be provided as one function of a web browser. Alternatively, the data management unit 102 may be a program source, a file, a library, etc. which may be loaded on or referred to and used in a web browser.

As described above, the database 140, which is a web DB provided by a web browser, may include one or more of a web storage, a web SQL DB, and an Indexed DB. The characteristics of the web DB such as whether the web DB is supported and the storage capacity are different depending on the type and version of a web browser. The data management unit 102 may enable a user to check information of a web browser, used to drive the application for drafting a patent document, so that the user can use a patent document drafting function using a desired given web browser, and then may enable one or more web DBs, supported by the corresponding web browser normally, to be used. To this end, the type of web DB used for each web browser may be previously set and stored in a web page or a script. For example, if a web browser being used is Internet Explorer 11 that does not support an Indexed DB normally, the data management unit 102 may enable a web storage to be used as the database 140. If a web browser being used is Chrome supporting an Indexed DB normally, the data management unit 102 may enable an Indexed DB, supporting a higher storage capacity, to be used as the database 140.

Furthermore, if the database 140 further includes a repository having another form other than a web DB, the data management unit 102 may be provided to operate in conjunction with the repository having another form.

Elements included in the apparatus for drafting a patent document 10 may manage data while operating in conjunction with the database 140 through the data management unit 102. In some embodiments, any one or more of the elements included in the apparatus for drafting a patent document 10 may independently operate in conjunction with the database 140. In the present embodiment, even if a special description is not added, it may be understood that the elements of the apparatus for drafting a patent document 10 operate in conjunction with the database 140 through the data management unit 102.

Furthermore, the data management unit 102 may encrypt and process data when operating in conjunction with the database 140. Specifically, the data management unit 102 may encode data, input by a user, through a preset encryption algorithm, may store the encoded data in the database 140, may read data stored in the database 140, may decode the read data using the same encryption algorithm, and may output the decoded data to the user through the input and output interface 19. In this case, the encryption algorithm used by the data management unit 102 may use a key value dependent on user account information. Accordingly, security performance of a patent document drafted through the application for drafting a patent document can be further improved.

Meanwhile, the data management unit 102 may be provided to operate in conjunction with the database 240 of the server for drafting a patent document 20, in addition to the database 140 of the apparatus for drafting a patent document 10. In this case, the data management unit 102 may transmit a given data processing request to the server for drafting a patent document 20 through the data communication unit 113 to be described later, and may receive the results of the processing from the server for drafting a patent document 20. In this case, the aforementioned interoperation method between the data management unit 102 and the database 140 may be substantially identically applied between the data management unit 102 and the database 240. In some embodiments, the data management unit 102 may be provided to operate in conjunction with any one of or both the database 140 of the apparatus for drafting a patent document 10 and the database 240 of the server for drafting a patent document 20.

The case management unit 103 may manage a case generated in order for a user to draft a patent document. Information of the case managed by the case management unit 103 may be received from the user or may be generated according to a preset rule. For example, information of a case may include information, such as a management number, a case name, a deadline, a client, a technical field, a document format, a storage method, and translation language information, depending on a related service. The screen configuration unit 101 may configure a screen for managing such information (hereinafter referred to as a “case management screen”), and may provide the case management screen to a user. The case management screen may be provided as an independent web page, may be provided as one region of a web page, may be provided as a region hidable or foldable in a web page, or may be provided as a pop-up page or window.

In this case, the management number, which is a value set to distinguish between a corresponding case and another case, may be received from a user through the case management screen or may be automatically assigned by the case management unit 103 according to a preset rule. In this case, the management number may be managed and used as a unique value for each case. The case management unit 103 may perform a process of verifying the uniqueness of a management number.

The case name may be understood as a value randomly received so that a user can recognize a corresponding case by distinguishing the corresponding case from another case. The deadline may be understood as a date on which the task of a corresponding case needs to be completed. The client may be understood as a person who has requested a corresponding case from a user. The technical field may be understood as a technology type (e.g., information and communication, machinery or chemistry) having a high relation with a corresponding case.

The document format may be understood as a structure with a patent document to be drafted needs to be basically equipped. Specifically, in the case of a patent specification, a format designated by each patent office is different. The case management screen may be configured to enable a user to select a format of a patent specification to be drafted. For example, a document format may include “KR”, “US”, “JP”, “PCT”, etc. If a user selects “KR”, a screen corresponding to a patent specification format requested by the Korean Intellectual Property Office (KIPO) may be provided to the user. The database 140 may store essential input information or a file template corresponding to each document format. The processor 100 may provide the corresponding screen or file to the user.

The storage method may be understood to select whether to store and manage information, input in relation to a corresponding case, in the apparatus for drafting a patent document 10 or to store and manage the information in the server for drafting a patent document 20. For example, the case management screen may provide a user with options "Local Database" and "Cloud Database." When the user selects the former, the information of the corresponding case may be stored in the database 140. When the user selects the latter, the information of the corresponding case may be transmitted to the server for drafting a patent document 20 over the network 30 and stored in the database 240. In the case of the former, there can be provided security performance having a level equal to or higher than that of a word processor that is independently driven in the apparatus for drafting a patent document 10 because information of a patent document is stored without the intervention of the network 30. In some embodiments, only some information may be stored in the database 140, and the remaining information may be stored in the database 240 of the server for drafting a patent document 20.

The translation language information may be a language (second language) of the original to be translated and a language (first language) of a translation, and may be used if a corresponding case is a case for the second service.

The element management unit 104 may manage an element included in the contents of a patent document. In the present embodiment, it may be understood that the "element" denotes a specific object, which may be included in the contents of a patent document and described as text. In some embodiments, the element may not constitute an invention, and may be part of text that expresses or describes a specific object. Furthermore, it may be understood that "information of an element" includes one or more pieces of information (e.g., the name of an element, an identification number (e.g., reference numeral) corresponding to the element, a translation of the element, whether the element is used, the number of times that the element is used) related to the corresponding element.

For example, contents that describe a plurality of elements constituting an invention may be included in a patent document. Such elements constituting an invention may be managed by the element management unit 104. Specifically, when a case where an invention includes elements, such as a motor, a shaft, and a gear, and identification numbers to denote the elements are set as 10, 20, and 30, respectively, is taken as an example, "motor", "shaft", "gear", "10", "20", "30", etc. may be managed as element information. Furthermore, if a patent document is a translation drafted by the second service, a translation of information of each element may also be managed as information of the element. In the above example, if the second language is English and the first language is Korean, "모터" may be managed as information of an element with respect to "motor", "회전축" may be managed as information of an element with respect to "shaft", and "기어" may be managed as information of an element with respect to "gear."

Furthermore, in some embodiments, an element managed by the element management unit 104 is not included in an invention, but may denote a specific object used to describe the contents of the invention. In the above example, if a term "driving" needs to be used to describe a characteristic of the "motor", the "driving" may also be managed by the element management unit 104.

Meanwhile, the element management unit 104 may manage, as one set, a plurality of pieces of information that describe any one element. For example, if the name of a corresponding element and an identification number to denote the corresponding element are set as information of the element, the element management unit 104 may assign a unique key value corresponding to a set of the name and identification number of the corresponding element, and may manage the information of the corresponding element based on the set key value. In the above example, the element management unit 104 may manage, as one set, each of "motor" and "10" and "모터", "shaft" and "회전축", and "gear" and "30" and "기어." A unique key value may be set to each set. Moreover, in order to set a unique key value to a set of elements, the element management unit 104 may block redundant element information from being stored. That is, the element management unit 104 can block a plurality of element sets, including the same element information, from being formed.

The screen configuration unit 101 may configure a screen for managing information of an element (hereinafter referred to as an "element management screen"), and may provide the element management screen to a user. The element management screen may be provided as an independent web page, may be provided as some regions of a web page, may be provided as a region hidable or foldable in a web page, may be provided as a pop-up page or window, etc.

If information of an element is changed by a user, the element management unit 104 may transmit element information prior to and after the change to the auto-complete list generation unit 105 and the text input component management unit 106, so that an auto-complete list is updated or auto-complete text or an auto-complete block to be described later is updated. In this case, it may be understood that a change in information of the element includes all of cases where information of a new element is input, information of a previously input component is updated, and information of a previously input component is deleted.

The auto-complete list generation unit 105 may generate an auto-complete list provided to minimize the time taken for text typing when a patent document is drafted. The auto-complete list generated by the auto-complete list generation unit 105 may be provided to and used by the text input component management unit 106.

The auto-complete list may include one or more items generated based on text input by a user. Some items included in the auto-complete list may be managed based on a unique key value set by the auto-complete list generation unit 105. A function, such as the batch update, of the text input component management unit 106 to be described later, may be applied to items having a unique key value.

Specifically, the auto-complete list generation unit 105 may configure an auto-complete list to be displayed on a screen, by loading data from a preset data source, generating a data set including all items which may be included in the auto-complete list, and extracting, from the generated data set, items corresponding to text input by a user. For example, the auto-complete list generation unit 105 may search a data source for items using text input by a user as a search term, and may configure an auto-complete list using the retrieved results. Alternatively, the auto-complete list generation unit 105 may receive text from a user, may extract data, corresponding to the input text, from a preset data source, and may configure an auto-complete list using the extracted data.

In this case, the data source may include elements managed by the element management unit 104. For example, each of the elements managed by the element management unit 104 may be included in the auto-complete list as one item. In this case, some or all of pieces of information included in a set of the elements may be used as one item of the auto-complete list. Referring to the above example, "motor", "shaft", "gear", "motor 10", "shaft 20", "gear 30", "모터", "회전축", "기어", "모터(10)", "회전축(20)", and "기어(30)", may be included as items in an auto-complete list. In this case, if an item including an identification code, such as a reference numeral, is generated, a format in which the identification code is included in the item (e.g., an identification code is parenthesized or a space character is used) may be preset. In some embodiments, a screen for configuring a format in which a user directly includes an identification code in an item may be provided through the application for drafting a patent document.

Furthermore, if the patent document drafting screen is for the second service in which a patent translation is drafted, the auto-complete list generation unit 105 may generate a data source by extracting only an element to which a translation of the element has been input, among elements managed by the element management unit 104. That is, only an element to which a translation has been input, among the elements managed by the element management unit 104, may be included in the auto-complete list as an item. In this case, if the element to which the translation has been input also includes identification code information, the auto-complete list generation unit 105 may include, in the auto-complete list, both an item composed of only the translation of the corresponding element and an item in which both the translation and the identification code are indicated.

If elements managed by the element management unit 104 are included in an auto-complete list as items, each of the items may have, as a unique key value, a combination of element information formed by being extracted from a corresponding set of element information. Referring to the above example, "motor10", "shaft20", "gear30", etc. may be used as a unique key value of a corresponding item.

Furthermore, a data source may include data stored in the database 140 or provided by the server for drafting a patent document 20. For example, expressions that are frequently used in drafting a patent document may be stored in the database 140 or the database 240. The auto-complete list generation unit 105 may load the expressions or receive the expressions from the server for drafting a patent document 20 through the data communication unit 113, and may include, as items, the expressions in an auto-complete list. In this case, the auto-complete list generation unit 105 may generate the auto-complete list by mixing information of elements managed by the element management unit 104 and data received from the database 140 or the server for drafting a patent document 20.

An item included in the auto-complete list generated by the auto-complete list generation unit 105 may have an attribute value indicative of attributes of the corresponding item. In this case, the attributes of the item may include the source of data (e.g., whether the data is data provided by the database 140 or the database 240) that generates the corresponding item, an object (e.g., whether the item is for automatically completing the element or whether the item is for automatically completing an idiom word) of the corresponding item, the type of data included in the corresponding item (e.g., the type of language used, whether a number is included, or whether a special character is included), a configuration of data included in the corresponding item (e.g., whether a reference numeral is included, a format in which a reference numeral is indicated, or whether a translation is included).

As an example of an attribute value of an item, a value corresponding to an item used to automatically complete information of an element of an invention and a value corresponding to an item used to automatically complete an expression repeated regardless of an element may be differently set and used. Hereinafter, an item having the former value will be referred to as an "element item", and an item having the latter value will be referred to as an "idiom word item." That is, it may be understood that the element item is used to automatically complete an element of an invention and the idiom word item is used to automatically complete an expression which may be repeatedly and frequently used. Furthermore, in the present embodiment, it may be understood that an "idiom word" includes a phrase or a clause, including a plurality of words, in addition to one word.

In this case, the element item may be generated from an element managed by the element management unit 104, and the idiom word item may be generated from data provided by the server for drafting a patent document 20. Accordingly, security can be strengthened because the element item which is related to core contents of an invention and may be used only within a specific case is managed by the apparatus for drafting a patent document 10. Furthermore, use convenience can be improved because the idiom word item which is not related to core contents of an invention and may be commonly used in all cases is managed by the server for drafting a patent document 20.

When information of an element managed by the element management unit 104 is changed, the auto-complete list generation unit 105 may update, with the changed information, information and an identification value of an item generated based on the corresponding element. In the above example, when a user changes the identification number of "motor" from "10" to "100" through the element management unit 104, the auto-complete list generation unit 105 may change the information of the corresponding element, included in a data resource and the item, from "10" to "100." Accordingly, "motor 100" instead of "motor 10" may be included as the item in the auto-complete list, and the identification value of the corresponding item may be changed from "motor10" to "motor100."

Furthermore, when information of a new element is added by the element management unit 104, the auto-complete list generation unit 105 may add the corresponding element as an element item of an element list. Furthermore, when information of an element managed by the element management unit 104 is deleted, the auto-complete list generation unit 105 may delete an item generated based on the corresponding element.

When generating an element list, the auto-complete list generation unit 105 may enable element items to be sorted in ascending order or descending order of the names of element text or to be sorted in ascending order or descending order of identification number text. In particular, the auto-complete list generation unit 105 may enable the element items of an element list to be sorted in ascending order of identification number text. Accordingly, use convenience can be improved because a corresponding element item can be first selected based on the number of identification numbers typed by a user. Specifically, when "main body, 100", "mobile phone, 1", and "motor, 10" are input as the names and identification numbers of elements by the element management unit 104, the auto-complete list generation unit 105 may generate an element list using "mobile phone 1", "motor 10", and "main body 100" in ascending order of identification number text. In this case, a user who attempts to type "mobile phone" will type only "1", and thus all of the three element items are displayed as an auto-complete list, but "mobile phone 1" will be first displayed. Therefore, the user can automatically complete "mobile phone 1" by directly selecting "mobile phone 1." If "mobile phone 1" is not first displayed, the user needs to perform an additional manipulation for selecting "mobile phone 1", which degrades use convenience. Furthermore, a user who attempts to type a "motor" will type "10." In this case, an auto-complete list in which "motor 10" except "mobile phone 1" is first displayed will be displayed. Accordingly, the user can automatically complete "motor 10" by directly selecting "motor 10."

A data set or an auto-complete list selected by the auto-complete list generation unit 105 may have a structured text document format, such as json or xml.

The text input component management unit 106 may manage a text input component included in a web page. As described above, the screen configuration unit 101 may configure the patent document drafting screen so that the screen includes one or more text input components. The text input component management unit 106 may control text input components included in the patent document drafting screen by the screen configuration unit 101.

The text input component management unit 106 may manage a form of text input to a text input component. For example, the text input component management unit 106 can manage effects which may be added to text, such as an underline, a bold strike, and an inclination, and attributes of text, which are commonly known, such as the size, font family, and color of text input to a text input component. Such management of a form may be performed on the entire text input to a text input component en bloc or may be performed only on some text selected by a user. Furthermore, the management of a form may be automatically performed by the text input component management unit 106 according to a preset condition or may be manually performed by a user. In the latter case, a UI for enabling the user to change the form may be included in a text input component.

In the present embodiment, it may be understood that editing text includes correcting or changing a form applied to the text, in addition to changing the contents of the text.

The text input component management unit 106 may enable any one text input component to have a form different from that of another text input component.

The text input component management unit 106 may detect an event occurring in a text input component, and may enable a preset operation to be performed based on the detected event. The event occurring in a text input component may include all of a keyboard event (e.g., key down, key press, key up, or an input), a mouse event (e.g., a click, a double click, or mouse down), and other events occurring in a web browser or an OS. Furthermore, it may be understood that the event occurring in a text input component includes a change (addition, correction or deletion) in a data value. In the following description, it may be understood that if an "event" is mentioned without a special additional description, the event includes all of the keyboard event, the mouse event, other events, and the data change.

The text input component management unit 106 may edit some or the entirety of text input to a text input component according to a preset rule, in response to an event occurring in the text input component. For example, when a specific keyboard event occurs, the text input component management unit 106 may extract part of text input to a text input component, and may determine whether the extracted text complies with a preset condition. Such an operation may be performed by a mouse event (e.g., after a pop-up menu is popped up by clicking on the right of a mouse, a preset item is selected in the pop-up menu by clicking on the left of the mouse) operating in a preset manner. The text input component management unit 106 may edit the extracted text according to a preset rule based on a result of the determination, may replace the extracted text with the edited text, and may output the replaced text to a text input component.

For example, in the case where English is input to a text input component, if a word input when a pressed key is the space bar is the first word of a sentence and the first character is not an upper case, the text input component management unit 106 may change the first character of the input word into an upper case, and may output the corresponding character to the text input component instead of the input word. Specifically, if a user types "this" in a text input component as the first word of a sentence and then presses the space bar of a keyboard, the text input component management unit 106 may extract "this", may change "this" into "This", and may output "This" to the text input component.

For another example, if Korean is input to a text input component, the text input component management unit 106 may check whether the postposition of a word input when a pressed key is the space bar is correctly used based on the final consonant of the last letter of a word located ahead of the postposition, may change the postposition of the input word into a correct postposition if the postposition of the input word is not correctly used, and may output the word, whose postposition is corrected, to a text input component instead of the input word. In this case, if the word located ahead of the postposition includes a portion indicative of a reference numeral, the text input component management unit 106 may check whether the postposition has been correctly used based on the final consonant of the last letter except the portion indicative of the reference numeral. Specifically, if a user types "목적어을" or "목적어(100)을" in a text input component and presses the space bar key of a keyboard, the text input component management unit 106 may change "목적어을" into "목적어를" and "목적어(100)을" into "목적어(100)를", and may output "목적어를" and "목적어(100)를" to the text input component.

Such a function for changing an upper case or a postposition may be identically applied to an auto-complete block to be described later.

When a user types text through a text input component, the text input component management unit 106 may provide an auto-complete function. In the present embodiment, it may be understood that "auto-complete" means that the entire phrase is input when a user inputs only some of a word or phrase to be input (hereinafter referred to as the "entire phrase") and then performs a preset key input or mouse input.

When a keyboard event (e.g., an input event, such as a, b, c, 1, or 2) for inputting text occurs in a text input component, the text input component management unit 106 may provide the auto-complete function in such a manner that an auto-complete list is displayed on a screen and a desired item selected by a user is received from the user. Each of items included in the auto-complete list may be used as one entire phrase.

As described above, an auto-complete list output by the text input component management unit 106 may be generated and provided by the auto-complete list generation unit 105. An auto-complete list generated by the auto-complete list generation unit 105 may include a plurality of items. A plurality of items may include an element item or an idiom word item. A user can reduce the time taken to draft a patent document using the auto-complete function.

For example, when a keyboard event for inputting text occurs in a text input component, the text input component management unit 106 may extract the location of a cursor where the event occurred. Furthermore, the text input component management unit 106 may extract text around the extracted location of the cursor (hereinafter referred to as an "extraction location") according to a preset condition. For example, the text input component management unit 106 may extract text corresponding to one word located at the front of the extraction location. For example, the extracted text may be a string that is present from the extraction location to the location of an identifier (e.g., text or a code set to be recognized as one word according to a text input method for each language provided by an OS and the application for drafting a patent document, such as a new-line character, a tag, or a space bar) located ahead of the extraction location. For example, the text input component management unit 106 may extract the location of a cursor and text using a selection object of a windows object in a web browser. Hereinafter, a "string" may be understood as a set of one or more continuous characters, numbers, symbols, or space characters. One unit that constitutes a string may be generally called a character.

In this case, the text input component management unit 106 may enable the auto-complete function to be provided although text is input between continuous strings. To this end, the text input component management unit 106 may store text written ahead of extracted text (hereinafter referred to as "front text") and text written behind the extracted text (hereinafter referred to as "rear text"). In this case, the front text and the rear text may be text up to a html tag located at the front and the rear of the extracted text. The front text and the rear text may be independently and explicitly stored in a function or method that implements a function of the text input component management unit 106, or may be automatically generated and managed by a library or a script to which reference is made by the text input component management unit 106.

Text extracted by the text input component management unit 106 may be used as a keyword for generating an auto-complete list. In other words, the auto-complete list generation unit 105 may generate items to be included in the auto-complete list by searching a preset data source or data set for data, which includes the extracted text or may correspond to the extracted text, using the text extracted by the text input component management unit 106 as a search term. Hereinafter, text extracted by the text input component management unit 106 and used by the auto-complete list generation unit 105 in order to generate an auto-complete list will be called an "auto-complete keyword."

The auto-complete list generation unit 105 may generate an auto-complete list based on an auto-complete keyword, and may provide the auto-complete list to the text input component management unit 106. The text input component management unit 106 may output the auto-complete list, provided by the auto-complete list generation unit 105, to a location of a cursor where a corresponding event occurred. The auto-complete list output by the text input component management unit 106 may include one or more items, and may be configured to enable a user to change a selected item using a mouse or a keyboard. For example, the auto-complete list, which is a block having a preset size, may be generated as an independent layer by the text input component management unit 106, and may be provided in a form appearing in a screen when the auto-complete list is invoked by the text input component management unit 106. In this case, the direction in which the auto-complete list appears may be set based on a location of the cursor so that the auto-complete list having a set size is fully included in the screen. To this end, the text input component management unit 106 may determine the direction to which the auto-complete list is output, by reading the size and location of a text input component provided by a web browser, the location of the cursor, etc. For example, if the location of the cursor has leaned to the left of the text input component, the auto-complete list may be output on the right of the cursor. If the location of the cursor has leaned to the right of the text input component, the auto-complete list may be output on the left of the cursor.

When a user selects a desired item in an output auto-complete list and then performs a preset key input (e.g., a tab key or an enter key) or a mouse input, the text input component management unit 106 may change an auto-complete keyword into the contents of the item selected by the user, and may output the selected item to a text input component. That is, the selected item may be output to the text input component as an auto-completed entire phrase. Hereinafter, the entire phrase output to the text input component by substituting the auto-complete keyword is called "auto-complete text."

In this case, the key input for outputting the auto-complete text may be plural. The text input component management unit 106 may configure the auto-complete text in another form based on an input key value. For example, auto-complete may be performed by a first key input and a second key input different from the first key input. If the first key input is performed, the text input component management unit 106 may output the entire phrase as an auto-complete text without any change. If the second key input is performed, the text input component management unit 106 may change the first character of the entire phrase into an upper case and output the changed entire phrase as auto-complete text. For another example, if the second key input is performed, the text input component management unit 106 may change the entire phrase into a singular expression or a plural expression and output the changed phrase as auto-complete text. For another example, if the second key input is performed, the text input component management unit 106 may output only the name of an element as auto-complete text by omitting a reference numeral included in the entire phrase. In this case, it may be understood that the key input also includes a combination of key inputs in addition to any one key input.

If a user types text between continuous strings, the text input component management unit 106 may couple front text to the front of an item selected in an auto-complete list and couple rear text to the rear of the selected item, so that other contents input to a text input component are maintained without any change. Accordingly, an auto-complete function can be provided although text is input to a given location of a text input component.

Moreover, the text input component management unit 106 may locate a cursor right behind auto-complete text so that a user can smoothly continue a text input. Such a function may be implemented in a manner that a location of a cursor and text are extracted using a selection object of a windows object in a web browser and an auto-complete keyword is replaced with auto-complete text using a range object.

Furthermore, the text input component management unit 106 may apply a preset format to auto-complete text so that the auto-complete text is recognized differently from other portions, and may enable text, to which the format has been applied, to be output to a text input component. For example, the text input component management unit 106 may surround auto-complete text using a tag (e.g., a span tag or div tag having a color, a font, or a size differently set) capable of applying the format to text within a text input component, and may output the auto-complete text to the text input component. Accordingly, pieces of auto-complete text can be recognized differently from other pieces of text within the text input component by the text input component management unit 106. A setting value or a tag itself for applying the format may be already included as the contents of an auto-complete list item or may be set as an attribute value of the auto-complete list item.

In this case, the text input component management unit 106 may apply a different format based on attributes of an item selected in the auto-complete list. As described above, the auto-complete list generation unit 105 may enable an item, included in an auto-complete list, to have an attribute value. When applying a format to auto-complete text, the text input component management unit 106 may apply a different format based on an attribute value of a corresponding item. For example, if a selected item is an element item, the text input component management unit 106 may designate a format so that auto-complete text is displayed in a first color different from a color of another text. Furthermore, if a selected item is an idiom word item, the text input component management unit 106 may display auto-complete text in a second color different from a color of another text and a first color, or may display the auto-complete text in the same color as the color of another text. For another example, the text input component management unit 106 may display auto-complete text in the same format as another text by omitting the designation of a format for an idiom word item.

Furthermore, the text input component management unit 106 may prevent auto-complete text from being randomly edited by a user. That is, the contents of the auto-complete text may be set not to be editable. For example, the text input component management unit 106 may surround auto-complete text with a given tag, such as a span tag, and may designate "contenteditable" attributes of the corresponding tag as a false. Accordingly, a region surrounded with the tag is randomly uncorrectable by a user, and thus auto-complete text can be prevented from being randomly changed by the user.

Whether auto-complete text can be edited may be differently set based on attributes of an item selected in an auto-complete list. For example, the text input component management unit 106 may set auto-complete text not to be editable if a selected item is an element item, and may set auto-complete text to be editable if a selected item is an idiom word item. Accordingly, the present embodiment can prevent the improper descriptions under the patent law that occurs because an element that requires the unity of expressions within a patent document is erroneously written or randomly changed, and can improve use convenience because an idiom word unrelated to the improper descriptions can be freely edited by a user.

Furthermore, if the text input component management unit 106 detects an event and the detected event is a delete event (e.g., a key input such as backspace or delete) for auto-complete text, the text input component management unit 106 may delete the auto-complete text at once. That is, the auto-complete text may be deleted by one event. For example, the text input component management unit 106 may surround auto-complete text with a given identifier or tag. When a delete event occurs, the text input component management unit 106 may implement an operation of deleting auto-complete text by one key input by generally deleting a portion surrounded with an identifier or tag. Furthermore, the text input component management unit 106 may use a method of designating auto-complete text as a range using a selection object of a windows object in a web browser and then deleting the designated range at once when a delete event occurs. Accordingly, the productivity of drafting a patent document can be further improved because the time taken to edit text can be further reduced.

Whether to provide the function for deleting auto-complete text by one event may be differently set based on attributes of an item selected in an auto-complete list. For example, the text input component management unit 106 may set auto-complete text to be deleted by one event if a selected item is an element item, and may set an individual character, constituting auto-complete text, to be deleted if a selected item is an idiom word item. Accordingly, it is possible to prevent the improper descriptions under the patent law that occurs because an element that requires the unity of expressions within a patent document is erroneously written or randomly changed, and to improve use convenience because an idiom word unrelated to the improper descriptions can be freely edited by a user.

As in the present embodiment, if the application for drafting a patent document is provided as a web application, auto-complete text may be surrounded with and managed by an html tag. Accordingly, functions, such as designating a format, making editing impossible, and deleting text by one event, can be provided. In the following description, auto-complete text surrounded with a tag is called an "auto-complete block." That is, the text input component management unit 106 may provide the auto-complete function using a method of adding an auto-complete block when a user types text to a text input component.

Meanwhile, the application for drafting a patent document is not a web application operating based on html, but may be independent application software implemented in a given program language. Even in this case, auto-complete text may be implemented to be displayed in a format different from other portions of a text input component, to be managed not to be randomly edited, or to be deleted by one event. Auto-complete text implemented as described above may be understood as an auto-complete block.

The text input component management unit 106 may assign an identification value to an auto-complete block, and may manage the auto-complete block based on the identification value. For example, if an auto-complete block uses a span tag, an identification value assigned by the text input component management unit 106 may be set based on an id value of the span tag. The text input component management unit 106 may control the auto-complete block based on the id value.

In this case, the identification value assigned to the auto-complete block by the text input component management unit 106 may be determined based on an item of an auto-complete list that generates the corresponding auto-complete block. That is, auto-complete blocks generated by any one item of the auto-complete list may have the same identification value. For example, an identification value of an auto-complete block generated by the text input component management unit 106 may be a unique key value of an item corresponding to the corresponding auto-complete block. In some embodiments, the text input component management unit 106 may generate a separate identification value based on the data of a corresponding item, not a unique key value of an item of an auto-complete list.

Referring to the above example, if items "motor 10", "shaft 20", and "gear 30" are included in an auto-complete list and "motor10", "shaft20", and "gear30" are set as key values of the respective items, all auto-complete blocks generated by a user's selecting "motor 10" in the auto-complete list may each have an identification value of "motor10." All auto-complete blocks generated by a user's selecting "shaft 20" may each have an identification value of "shaft20."

When information of a specific element managed by the element management unit 104 is changed, the text input component management unit 106 may automatically change a value of an auto-complete block generated based on an item corresponding to the corresponding element. That is, the user may change text, corresponding to the corresponding element auto-completed in a text input component, at once by changing the information of the element through the element management unit 104. Such a function is called a "batch update." Specifically, if a user changes information of a specific element through the element management unit 104, the element management unit 104 may request the text input component management unit 106 to update an auto-complete block corresponding to the element whose information has been changed. The request transmitted from the element management unit 104 to the text input component management unit 106 may include information of the corresponding element prior to and after the change. When receiving the update request for the auto-complete block, the text input component management unit 106 may check an identification value of the corresponding auto-complete block based on the information prior to the change, and may update the data of the auto-complete block with the information after the change based on the checked identification value. In this case, an identification value of the corresponding auto-complete block may be changed based on the information after the change, if necessary.

In the above example, if a user changes the identification number of "motor" from "10" to "100" through the element management unit 104, the text input component management unit 106 may check all auto-complete blocks in which "motor10", that is, a unique value of a corresponding item, has been set as an identification value, may change auto-complete text of the checked auto-complete block into "motor 100", and may simultaneously update the identification value with the changed "motor100."

When updating information of an auto-complete block, the text input component management unit 106 may change only text included in the auto-complete block within a text input component. In the above example, if a text input component includes a portion in which "motor 10" has been input as an auto-complete block and "motor 10" has been input as normal text, not an auto-complete block, when a user changes the identification number of "motor" from "10" to "100" in the element management unit 104, "motor 10", that is, normal text, is not changed, but "motor 10", that is, an auto-complete block, may be changed into "motor 100." Accordingly, the present embodiment can indirectly force a user to manage element information through the element management unit 104 and to draft a patent document using the auto-complete function, and can improve a skill level of a user for the system.

In some embodiments, if information of an element managed by the element management unit 104 is changed, the text input component management unit 106 may incorporate changed element information into a text input component using a method of replacing a string prior to the change with a string after the change with respect to the entire text or only auto-complete blocks input to the text input component. Furthermore, the text input component management unit 106 may previously show a user portions to be changed within the text input component, if necessary, may perform the entire change by receiving the user's confirmation on the entire change, or may change only portions selected by the user.

Meanwhile, when information of a specific element managed by the element management unit 104 is deleted, the text input component management unit 106 may change an auto-complete block, generated based on an item corresponding to the corresponding element, into simple auto-complete text. For example, the text input component management unit 106 may delete tag information, which assigns a format and attributes, from an auto-complete block corresponding to the deleted information of the element, and may maintain only simple text information. As another embodiment, when information of a specific element managed by the element management unit 104 is deleted, the text input component management unit 106 may delete a corresponding auto-complete block included in a text input component.

Furthermore, when new information of a element is added by the element management unit 104, the text input component management unit 106 may determine whether text corresponding to the information of the corresponding element is included in a text input component, and may change the corresponding text into an auto-complete block.

As described above, the text input component management unit 106 can provide the functions for designating a format, making editing impossible, deleting text by one event, and performing a batch update in an auto-complete block unit. Accordingly, a user can draft a patent document while recognizing the contents of the patent document, which he or she drafts, more precisely and can also edit the patent document rapidly and accurately. As a result, the patent document can be drafted more accurately and rapidly.

Meanwhile, in some embodiments, the text input component management unit 106 may output an auto-complete list only when a preset trigger character is input and a character is input subsequent to a trigger. For example, if "@" has been set as a trigger character, the text input component management unit 106 may provide the aforementioned auto-complete function only when a character subsequent to "@" is input to a text input component. In this case, when an auto-complete keyword is replaced with auto-complete text, the text input component management unit 106 may output the auto-complete keyword to a text display region in the state in which the trigger character has been removed. Specifically, if such a function is applied to the example, when a user simply inputs "mot", an auto-complete list is not output. When a user inputs "@mot", an auto-complete list including "motor 10" is output. When the user selects the auto-complete list, "motor 10" may be replaced with "@mot" and may be input as auto-complete text. If a trigger character is used as described above, there is an effect in that a user can autonomously select whether or not to pop up an auto-complete list.

Furthermore, when an element item is input through the auto-complete function, the text input component management unit 106 may add an antecedent for denoting an auto-completed element item. For example, if an auto-completed element item is already used in a corresponding text input component or another preset text input component, when the element item is auto-completed, the text input component management unit 106 may automatically add an antecedent, such as "상기" or "the." In this case, the added antecedent may be included as a part of an auto-complete text and positioned within an auto-complete block.

Whether to automatically add an antecedent when an element item is auto-completed may be managed as a setting value, and may be provided to be selected by a user in a setting management screen to be described later.

The text input component management unit 106 may provide a string insertion function for adding a preset string to a text input component A preset string (hereinafter referred to as an "insertion string") input by the string insertion function may not include an element managed by the element management unit 104, and may be a string previously input by a user in relation to the drafting of a patent document and stored in the database 140 or the database 240.

For example, the insertion string may be contents related to a corresponding case, such as the title of an invention, a background art, problems to be solved, effects of the invention, a brief description of drawings, and the claims which a user inputs when preparing the corresponding case. Such contents related to a case may be stored in the database 140.

Furthermore, the insertion string is contents not dependent on a corresponding case, and may include a sentence or expression which may be repeatedly used regardless of the type of case in drafting a patent document or idiomatic contents such as an explanation which may be repeatedly used regardless of the type of case in describing a specific technical term. In the present embodiment, a sentence or expression that is repeatedly used or an explanation that is idiomatically used as described above is referred to as an "idiomatic phrase" distinguished from the aforementioned idiom word. That is, the idiom word may be understood as an idiomatic expression used as an item of an auto-complete list, and the idiomatic phrase may be understood as an idiomatic expression used as an insertion string. The idiomatic phrase may be stored in the database 240. The text input component management unit 106 may be provided with an idiomatic phrase, which is stored, through the data communication unit 113. Furthermore, contents related to a case among the insertion string may be stored in the database 140 of the apparatus for drafting a patent document 10, and an idiomatic phrase may be stored in the database 240 of the server for drafting a patent document 20. A location where such an idiomatic phrase is stored and a method of storing such an idiomatic phrase have been illustratively suggested, and the spirit of the present invention is not limited thereto.

The idiomatic phrase may include an expression idiomatically used when a technical field is described, an expression idiomatically used when a prior art is described, an expression idiomatically used when problems to be solved are described, an expression idiomatically used when effects of the invention are described, an idiomatic expression used in a brief description of drawings, an expression idiomatically used when a quoted claim is indicated in the claims, etc. Such an idiomatic phrase may include a replacement portion which may be replaced with another text. Specifically, the replacement portion may include a boundary identifier (e.g., a character indicative of the start and end of a region to be replaced) indicative of the boundary of the replacement portion and an indication identifier indicative of text to be replaced and inserted. For example, the indication identifier may indicate the title of an invention or a claim number, etc. as text to be replaced.

The replacement portion may be replaced with another preset text and inserted when an idiomatic phrase is automatically inserted into a text input component by the text input component management unit 106. Specifically, when inserting the idiomatic phrase into the text input component, the text input component management unit 106 may determine whether the idiomatic phrase includes the replacement portion or whether a text input component to which a corresponding idiomatic phrase is inserted is a text input component including the replacement portion. If it is determined that the replacement portion needs to be replaced, the text input component management unit 106 may read text previously input to another text input component based on the contents of an indication identifier or change the replacement portion into text configured based on information provided by a user or user selection, and may output the read or changed text to the corresponding text input component.

In this case, the replaced portion output to the text input component may be configured like the aforementioned auto-complete block, and may have the functions, such as designating a format, making editing impossible, deleting text by one event, and performing a batch update, in a block unit.

The screen configuration unit 101 may configure a screen on which a string to be added to a text input component (hereinafter referred to as an "insertion string selection screen") is selected by a user, and may provide the insertion string selection screen to the user. The insertion string selection screen may be provided as an independent web page, may be provided as some regions of a web page, may be provided as a region hidable or foldable in a web page, or may be provided as a pop-up page or window. In this case, the insertion string selection screen may be independently configured depending on the type of insertion string. For example, the insertion string selection screen may be invoked through a UI, such as a button provided on the periphery of a text input component.

When a user selects a string in the insertion string selection screen, the text input component management unit 106 may insert the selected string into a text input component. In this case, a location into which the selected string is inserted may be a location of a cursor where the user invokes the insertion string selection screen. To this end, the text input component management unit 106 may store the location of the cursor when an event for invoking the insertion string selection screen occurs. If the cursor has not been located at the text input component, the insertion string selection screen may be controlled not to be invoked.

The text input component management unit 106 may store, in the database 140, text information input to a text input component in real time. In the present embodiment, it may be understood that "real-time" means that immediate processing is performed or processing is performed at a very short time interval when an event related to a data change occurs. Specifically, if an event occurs in a text input component and data input to the text input component is changed, the text input component management unit 106 may input data to the database 140 through the data management unit 102 or update data stored in the database 140. For example, the data management unit 102 may match a text input component managed by the text input component management unit 106 and a data storage formed in the database 140. When an event in the matched text input component is detected through the text input component management unit 106, the data management unit 102 may automatically update the data storage of the database 140. In this case, although a user does not specifically take an action of storing data, data input to the text input component can be safely managed. In some embodiments, the text input component management unit 106 may be provided to store the data input to the text input component at a preset time interval or to store the data in the database 240.

Meanwhile, the text input component management unit 106 may enable data input to any one text input component to be used in another text input component without any change. Specifically, when data "A" is input to any one text input component, the text input component management unit 106 may set data of another text input component so that "A" is included as part of data in another text input component. In this case, when a user changes "A" into another value, for example, "AA", the text input component management unit 106 may change, into "AA", "A" input to another text input component.

The text input component management unit 106 may provide such a function similar to the aforementioned auto-complete function. Specifically, the text input component management unit 106 may surround "A" with a tag, may assign a unique key value to the tag, and may add the tag as data of another text input component. Thereafter, when an event in which "A" changes into "AA" occurs, the text input component management unit 106 may search for a tag corresponding to a corresponding unique key value included in another text input component, and may change corresponding contents from "A" to "AA." In this case, the text input component management unit 106 may provide the functions, such as designating a format, making editing impossible, deleting text by one event, and performing a batch update, like the aforementioned auto-complete block through the tag with which "A" input to another text input component is surround.

Meanwhile, a data input to a text input component controlled by the text input component management unit 106 may be provided by another input and output interface 19 in addition to a keyboard or a mouse. For example, the apparatus for drafting a patent document 10 may further include a microphone as the input and output interface 19. The text input component management unit 106 may convert voice data, collected by the microphone, into text data, and may input the text data to a corresponding text input component. To this end, the text input component management unit 106 may include a function for converting the voice data into the text data. For the conversion of voice information into text, the external service interoperation unit 111 may be used. Specifically, the text input component management unit 106 may provide voice data, collected by the microphone, to a third party through the external service interoperation unit 111, and may receive text data, converted by a service provided by the third party, through the external service interoperation unit 111.

In this case, if an item corresponding to an auto-complete list is present in the contents of the text, the text input component management unit 106 may convert the item into an auto-complete block and output the auto-complete block to a text input component. In the aforementioned example, if "motor" or "motor 10" is included in the contents converted from voice to text data, the text input component management unit 106 may change corresponding text into a corresponding auto-complete block, and may output the corresponding auto-complete block to a text input component Through such a function, a user can input the contents of a patent document even through a voice without using a keyboard, and can use even the auto-complete function without any change. Accordingly, use convenience can be much improved.

Meanwhile, the text input component management unit 106 may control another text input component in response to an event occurring in any one text input component. For example, data input to any one text input component may be referred to as the contents of another text input component. When the referred data of the text input component is changed, the text input component management unit 106 may automatically update the contents of another text input component related to the changed data. As a detailed example, if data of a category input component of an independent claim provided to a claim drafting screen to be described later is changed, the text input component management unit 106 may change data of a category input component of dependent claims that quotes the corresponding independent claim.

The drawing management unit 107 may manage a drawing to which reference may be made when a patent document is drafted. In a patent document task, in general, a user needs to essentially refer to a drawing in order to understand the contents of an invention. The application for drafting a patent document according to the present embodiment is provided to enable a user to draft the contents of a patent document and to refer to a drawing. To this end, the drawing management unit 107 may store the drawing in the database 140 of the apparatus for drafting a patent document 10 or the database 240 of the server for drafting a patent document 20 or may store an access path to the drawing.

In the present embodiment, an example is described in which the drawing management unit 107 stores, in the database 140, a drawing file registered by a user. The drawing management unit 107 may receive a file having a preset file format, for example, a format such as pdf, jpg, or tiff, and may store the file in the database 140. In this case, the drawing management unit 107 may encode (e.g., base64 encoding) the drawing file into a format which may be directly displayed in a web browser, and may store the drawing file in the database 140. Furthermore, the screen configuration unit 101 may invoke the drawing data encoded and stored by the drawing management unit 107, and may display the invoked drawing data on a screen. Accordingly, the security of the drawing file can be maintained because the drawing file stored in the apparatus for drafting a patent document 10 can be provided to a user through the application for drafting a patent document even without being transmitted to the server for drafting a patent document 20.

As another embodiment, the drawing management unit 107 does not directly store a drawing file in the database 140, but may change the drawing file into a Binary Large Object (Blob), may receive a Blob URL assigned to the Blob, and may store the Blob URL in the database 140. In this case, the screen configuration unit 101 may read the Blob URL stored in the database 140, and may include the corresponding Blob URL in a web page so that the drawing file is output to a screen.

Meanwhile, the Blob URL may be changed whenever it is accessed. Accordingly, the drawing management unit 107 may store the absolute path of the drawing file along with the Blob URL, may update the Blob URL whenever the Blob URL of the drawing file is requested (e.g., if a new session of a web page is started), and may provide the updated Blob URL to the screen configuration unit 101.

Hereinafter, directly storing, by the drawing management unit 107, a drawing file and storing the access path of the drawing file will be collectively described as storing a drawing for convenience of description.

The drawing management unit 107 may store a drawing including a plurality of images or may store a plurality of files as a drawing of one case.

The screen configuration unit 101 may register a drawing file, may configure a screen on which the contents of the registered drawing can be confirmed and managed (hereinafter referred to as a "drawing management screen"), and may provide the drawing management screen to a user. The drawing management screen may be provided as an independent web page, may be provided as some regions of a web page, may be provided as a region hidable or foldable in a web page, or may be provided as a pop-up page or window.

The drawing management screen may include a UI through which images can be switched and confirmed if a registered drawing includes a plurality of images (one file includes a plurality of images or an image file is plural).

Furthermore, when a patent document is drafted, the sequence of images may need to be changed. The drawing management screen may include a UI through which the sequence of images being viewed may be changed.

Meanwhile, in some embodiments, the drawing management unit 107 may store a drawing in the server for drafting a patent document 20. In this case, the drawing management unit 107 may upload, to the server for drafting a patent document 20, a drawing file registered by a user through the data communication unit 113. Furthermore, the drawing management screen may receive an access path through which a drawing file can be accessed from the server for drafting a patent document 20, and may output the access path to a screen.

The requirement review unit 108 reviews whether the contents of a patent document drafted through the application for drafting a patent document comply with the description requirements under a patent law. The patent law is regulated in each country, and the required description requirements are also differently set. The description requirements reviewed by the requirement review unit 108 are also differently set for each country, and may be stored in the database 140 of the apparatus for drafting a patent document 10 or the database 240 of the server for drafting a patent document 20.

For example, the requirement review unit 108 may review whether contents essentially included in a patent application are included, whether a brief description of drawings has been correctly drafted, whether a detailed description of the invention has been correctly written, whether the claims is correctly written, etc. as the description requirements. Whether the claims is correctly written may include one or more of whether a method of describing a quoted claim is correct when the claims are written, whether a method of quoting a claim is correct when the claims are written, whether an unallowable expression has been used when the claims are written, whether a relation between contents included in a claim and contents included in a detailed description of the invention has been properly defined, whether a method of referring to a previously mentioned expression or element correct when the claims are written, and whether a reference numeral is correctly written in a claim. Furthermore, the requirement review unit 108 may review whether an antecedent has been properly used in the contents of a patent document according to the description requirement.

Various forms of text input components may be provided on the patent document drafting screen. The requirement review unit 108 may read the description requirements from the database 140 or the database 240 when the patent document drafting screen is loaded, and may check the corresponding description requirement for each text input component.

Furthermore, even when the contents of a patent document are changed through a UI provided by the patent document drafting screen, the requirement review unit 108 may review whether the change satisfies the description requirement. For example, if a user changes the sequence of a claim without editing text, included in the claim, through the claim drafting screen to be described later, the requirement review unit 108 may review whether the change satisfies the description requirements related to a method of describing the claims.

The requirement review unit 108 may provide a user with the results of a review for the description requirements through a web page. For example, the screen configuration unit 101 may set, as one region of the patent document drafting screen, a region in which the results of a review for description requirements is output to a user. Furthermore, the results of a review for the description requirement may be provided to the user through a warning message or a pop-up. Hereinafter, a portion to which the results of a review for the description requirements are output by the requirement review unit 108 will be referred to as a "description requirement review result screen" regardless of a method of outputting the results. That is, the patent document drafting screen may include the description requirement review result screen.

Meanwhile, the requirement review unit 108 may present, to a user, a method of correcting detected contents that violate the description requirements through the description requirement review result screen. Furthermore, the requirement review unit 108 may automatically correct the detected contents that violate the description requirements, and may present the results of the corrections on the description requirement review result screen.

In some embodiments, the requirement review unit 108 may be provided to review a condition set by a user or previously set in a system so that not only the description requirements regulated in a patent law, but the contents of a patent document are described precisely and concisely.

The results of a review of all description requirements reviewed when a corresponding patent document is drafted may be included in the description requirement review result screen. However, in some embodiments, the results of a review of a specific portion may be displayed as an independent region. For example, a region may be separately formed in which the results of a review for description requirements for a claim reviewed by a claim input processing unit 122 to be described later are displayed. In the present embodiment, it may be understood that the description requirement review result screen also includes and denotes an independently displayed region as described above.

The download file generation unit 109 may generate a download file so that a user can confirm a patent document, drafted through the application for drafting a patent document, through another software, not the application for drafting a patent document, and may provide the download file to the user.

As described above, a user may draft a patent document through the patent document drafting screen configured by the screen configuration unit 101. A plurality of text input components to which the contents of a patent document may be input may be provided on the patent document drafting screen. In this case, the plurality of text input components may be divided based on a drafting item of the patent document or divided and generated in the unit of a sentence, a paragraph, etc.

In general, a patent document is drafted as one file and transmitted to a client. Even when the patent document is submitted to a patent office, it is also submitted as one file. Accordingly, when a patent document drafted through the application for drafting a patent document is provided to a third party, it is necessary to integrate contents which are dividedly input to a plurality of text input components and to provide the integrated contents as one document.

To this end, the download file generation unit 109 may generate a file (hereinafter referred to as a "download file") which is obtained by integrating contents written in a plurality of text input components according to a document format designated for a corresponding case and may be downloaded through a web browser.

In this case, the download file generation unit 109 may add preset data as the contents of the download file, in addition to data input through a text input component, so that the download file satisfies description requirements required for the document format designated for a corresponding case. In this case, the preset data may be divided to correspond to the document format and stored in the database 140 or may be stored as a variable within a function or method corresponding to the download file generation unit 109. For example, identification codes indicative of the title of an invention and background technologies may be omitted in a text input component provided to the patent document drafting screen, but the download file generation unit 109 may include such an identification code as the contents of a document when a download file is generated.

Meanwhile, the download file generation unit 109 may form a download file by applying, to auto-complete text, one or more of formats applied to a text input component, in particular, formats expressed so that an auto-complete block is distinguished from pieces of other text without any change. For example, if an auto-complete block is expressed in a text input component in an italic font having a first color distinguished from those of pieces of other text by the text input component management unit 106, the download file generation unit 109 may apply the format to auto-complete text so that the auto-complete text is expressed in the first color or expressed in an italic font or expressed in the italic font having the first color when generating the download file. Accordingly, user satisfaction can be improved because the readability of a client who has requested the drafting of a patent document in addition to a user who drafts the patent document can be improved.

Alternatively, the download file generation unit 109 may not apply some of formats, applied to a text input component, when generating the download file. For example, a specific font (e.g., "Arial") has been applied to a text input component, but the download file generation unit 109 may generate the download file so that a preset specific font (e.g., "Times New Roman") is applied. A font applied to the download file may be provided so that a user can change the font through an environment setting screen, etc.

A text input component managed by the text input component management unit 106 may manage input text in an html tag form. The download file generation unit 109 may generate the download file based on data to which the html tag managed by the text input component has been applied. For example, the download file generation unit 109 may be implemented as JavaScript for generating a file having a format, such as "Word" or "PDF." In a web environment, a library for generating a Word file or a PDF file is an already known technology, and a detailed description related to a method of generating such a file is omitted.

In this case, the download file generation unit 109 does not transmit, to the server for drafting a patent document 20, data input to a text input component, and may independently operate in the apparatus for drafting a patent document 10 to generate the download file. Accordingly, the security of a drafted patent document can be maintained because the contents of the patent document may not be transmitted over the network 30.

Meanwhile, the download file generation unit 109 may include, in a download file, additional information related to a corresponding case, in addition to contents required in a document format designated for the corresponding case. For example, the download file generation unit 109 may include, in the download file, an element list written by the element management unit 104, so that a user or client who opens the download file can check elements included in a patent document at a look. Furthermore, the download file generation unit 109 may include, in a download document, information of a case managed by the case management unit 103.

In some embodiments, if the contents of a patent document include a value of a form component or need to be inserted in another format based on a value of a form component, the download file generation unit 109 may configure the contents of the download file by considering this.

The setting management unit 110 may manage required setting values in relation to the drafting of a patent document through the application for drafting a patent document. The screen configuration unit 101 may configure a screen for managing setting values (hereinafter referred to as a "setting management screen"), and may provide the setting management screen to a user. The setting management screen may be provided as an independent web page, may be provided as some regions of a web page, may be provided as a region hidable or foldable in a web page, or may be provided as a pop-up page or window.

For example, setting values managed by the setting management unit 110 may include the type of language used in a general UI of the application for drafting a patent document, a design theme and a text format applied to the general UI of the application for drafting a patent document, a format of the download file, etc.

The external service interoperation unit 111 may transmit data to an external service provided by a third party that provides a service not provided by the apparatus for drafting a patent document 10 or the server for drafting a patent document 20, or may receive the results of processing of the corresponding data. For example, the service provided by the third party may be a patent-related information query service, a voice-text conversion service, a translation example provision service, a machine translation service, a preliminary service, a card payment service, an account transfer service, etc. The external service interoperation unit 111 may transmit data to the third party side by invoking a service API provided by the third party, may receive the results of processing, and may provide the results to the patent document drafting screen.

The user management unit 112 may manage account information and use history information of a user who uses the application for drafting a patent document, and may perform member subscription/withdrawal processing, login processing, session management, use history management, etc. In particular, the user management unit 112 may manage session information so that one user does not redundantly and simultaneously log in the application for drafting a patent document using different web browsers. Accordingly, a problem in that case information and the contents of a patent document handled by a user are overwritten can be prevented.

The data communication unit 113 may play a role in transmitting and receiving data when the apparatus for drafting a patent document 10 communicates with the server for drafting a patent document 20 or a system of a third party over the network 30. As in the present embodiment, if the application for drafting a patent document is provided as a web application, the data communication unit 113 may be provided as one function of the web browser. Each of the aforementioned elements may have path information to be accessed through the data communication unit 113 or may obtain path information from the database 140.

The change management unit 114 may compare data at first timing and data at second timing with respect to data stored through the data management unit 102, and may manage a difference between the two data. Data whose change is written by the change management unit 114 may include text data managed by the text input component management unit 106. The change management unit 114 may compare the data at the first timing and the data at the second timing, and may separately store added contents and deleted contents. In this case, the added contents and the deleted contents may be managed as separate independent data, and may be managed as data included in text data in a preset format. For example, in a text input component, added text may be expressed as an underline, and deleted text may be expressed as a strikethrough. The change management unit 114 may store, as added data, data having an underline format and store, as deleted data, data having a strikethrough format along with data prior to a change. A method of managing, by the change management unit 114, changed data based on pieces of two timing may be variously provided according to embodiments.

The first processing unit **100*b* may include one or more of an idiomatic expression management unit 121, a claim input processing unit 122, an element description input processing unit 123, and a brief-description-of-drawing input processing unit 124**.

An idiomatic expression, such as the aforementioned idiom word or idiomatic phrase repeatedly used in drafting a patent document, may be managed by the idiomatic expression management unit 121. In the following description, an idiom word and an idiomatic phrase will be collectively referred to as an "idiomatic expression."

The idiomatic expression management unit 121 may manage one or more of an idiomatic expression previously set in a system and an idiomatic expression set by a user, as an idiomatic expression. The idiomatic expression management unit 121 may store and manage such idiomatic expressions in the database 140 or the database 240.

The screen configuration unit 101 may configure a screen for managing an idiomatic expression (hereinafter referred to as an "idiomatic expression management screen"), and may provide the idiomatic expression management screen to a user. The idiomatic expression management screen may be provided as an independent web page, may be provided as some regions of a web page, may be provided as a region hidable or foldable in a web page, or may be provided as a pop-up page or window. In the present embodiment, an example is described in which both an idiom word and an idiomatic phrase are managed in one idiomatic expression management screen. However, in some embodiments, a screen on which an idiom word is managed and a screen on which an idiomatic phrase is managed may be separately provided. In this case, the respective screens may be called an idiom word management screen and an idiomatic phrase management screen.

An idiom word management region and an idiomatic phrase management region may be dividedly provided on the idiomatic expression management screen so that a user can explicitly divide and manage an idiom word used for auto-completion and an idiomatic phrase used as an insertion string. In this case, a region in which an idiomatic phrase including a replacement portion is managed may be positioned to be distinguished from another idiomatic phrase management region in the idiomatic phrase management region. The idiomatic expression management unit 121 may include a replacement portion in a text input component so that a user can configure an idiomatic phrase including the replacement portion, and may output the text input component to the idiomatic expression management screen.

A user may add a desired idiomatic expression into the idiomatic expression management screen or may correct or delete an already input idiomatic expression.

Furthermore, an idiomatic expression may be set based on a language or a document format. A set of a plurality of idiomatic expressions may be provided to one language or document format, so that a user can select and use any one set of idiomatic expressions.

In the present embodiment, the idiomatic expression management unit 121 is described as one element of the first processing unit **100*b*. However, in some embodiments, the application for drafting a patent document may be configured so that an idiomatic expression is used in the second service. In this case, the idiomatic expression management unit 121 may be provided as one element of the common processing unit 100*a* or the second processing unit 100*c***.

The claim input processing unit 122 may receive, from a user, data, which constitutes a claim, according to a preset condition and manage the data so that the user can draft the claim easily and accurately. The claim input processing unit 122 may receive a claim number, the type of claim (an independent claim or a dependent claim), a quoted claim number, the category of an invention (the title of an invention), and a description related to an element, as data constituting a claim. The drafting, addition, correction, deletion, movement, etc. of a claim, which are described hereinafter and performed by the claim input processing unit 122, may be understood to manage such data that constitutes a claim.

The screen configuration unit 101 may configure a screen for drafting a claim (hereinafter referred to as a "claim drafting screen"), and may provide the claim drafting screen to a user. The claim drafting screen may be provided as an independent web page, may be provided as some regions of a web page, may be provided as a region hidable or foldable in a web page, or may be provided as a pop-up page or window.

The claim drafting screen may include a plurality of text input components or form components for receiving data that constitutes a claim. The claim input processing unit 122 may manage a text input component or form component provided to the claim drafting screen, or may manage data input through the text input component or form component. For example, a text input component or form component for inputting a claim number (hereinafter referred to as a "claim number input component"), a text input component or form component for inputting the type of claim (hereinafter referred to as a "claim type input component"), a text input component or form component for inputting a quoted claim number (hereinafter referred to as a "quoted claim input component"), a text input component or form component for inputting the category of an invention (hereinafter referred to as a "category input component"), and a text input component or form component for inputting a description and restriction related to an element (hereinafter referred to as an "element description input component") may be provided to the claim drafting screen. In some embodiments, these text input components or form components may be integrated and provided, or may be subdivided and provided. Various html tags, such as a button, a radio, a checkbox, and a select, may be properly used as form components used in the claim drafting screen depending on their characteristics. The type of form component does not limit the spirit of the present invention.

Specifically, the claim input processing unit 122 may receive, from a user, a drafted claim number through a claim number input component. In this case, the claim input processing unit 122 may automatically generate a claim number according to a preset method, and may present the claim number to the user. For example, if a user attempts to add a claim, the claim input processing unit 122 may output a claim number to a claim number input component by adding 1 to the greatest claim number of previously input claims. Alternatively, if no claim is drafted, the claim input processing unit 122 may output 1 to a claim number input component, and may set the claim type input component as an independent claim.

A user may input a previously input claim number to a claim number input component. In this case, the claim input processing unit 122 may have the user check whether the contents of a previously input claim will be replaced with the contents of the input claim number or whether a new claim will be inserted as the input claim number, and may perform a preset operation based on the selection of the user. In some embodiments, when the same number as the claim number of a previously drafted claim is input to a claim number input component, the claim input processing unit 122 may show an error message to a user. In the present embodiment, an example is described in which a UI, such as a button for explicit claim addition or insertion, is provided to the claim drafting screen and when the same number as the claim number of a previously drafted claim is input to a claim number input component, the claim input processing unit 122 outputs an error message and takes no operation.

The claim input processing unit 122 may receive whether a drafted claim is an independent claim or a dependent claim. through a claim type input component, and may control other input components in the claim drafting screen. Specifically, when a user selects an independent claim as the type of claim, the claim input processing unit 122 may deactivate a quoted claim input component and activate a category input component. In contrast, when the user selects a dependent claim as the type of claim, the claim input processing unit 122 may activate the quoted claim input component and deactivate the category input component. In this case, it may be understood that the deactivation prevents the user from selecting a corresponding input component (disable) or from editing input contents (read-only). In some embodiments, although an independent claim is selected as the type of claim, the claim input processing unit 122 may be configured to activate the quoted claim input component.

The claim input processing unit 122 may enable a user to intuitively recognize the type of drafted claim by changing a format or shape applied to a claim number displayed on a screen or a UI for the claim drafting screen, depending on the type of claim selected by the user.

The quoted claim input component may be activated when the type of selected claim is a dependent claim. In general, a method of writing a quoted claim number has been regulated by a patent law. Accordingly, a user needs to input a quoted claim number in an accurate and regulated manner when drafting a claim. A simple text input component may be provided as the quoted claim input component. In the present embodiment, an example is described in which the claim input processing unit 122 provides a "quoted claim selection screen" to a user for the precise input of a quoted claim number.

The quoted claim selection screen, which has a UI for selecting a claim, having a number prior to a number of a claim written by a user, as a quoted claim, may be configured by the screen configuration unit 101. The quoted claim selection screen may be provided as an independent web page, may be provided as some regions of a web page, may be provided as a region hidable or foldable in a web page, or may be provided as a pop-up page or window. The quoted claim selection screen may be provided to a user through an event, such as the selection of a quoted claim input component in an activated state or clicking on a present button by user.

Specifically, the quoted claim selection screen may be configured to enable a user to select a number of a claim which the user desires to quote. Whenever a user selects a claim number, the claim input processing unit 122 may review whether quoting the selected claim satisfies the description requirements under the patent law of a country corresponding to a corresponding case. In this case, the reviewed description requirements may include the improper description which may occur through a claim quotation relation, in addition to a method of quoting a claim. For example, if a Korean patent specification is drafted, the claim input processing unit 122 may review whether a claim quoting two or more claims quotes another claim quoting two or more claims, whether the categories of inventions of quoted claims are the same, etc. Hereinafter, to review whether the description requirements under the patent law of a country corresponding to a corresponding case are satisfied when a quoted claim is selected is referred to as a "quoted claim review." A quoted claim review function may be performed whenever a claim is selected. A review of a quoted claim may be performed by the requirement review unit 108, and the claim input processing unit 122 may be implemented in a manner to receive and process corresponding results. That is, a review of a quoted claim may be performed by any one or both of the requirement review unit 108 and the claim input processing unit 122, and results thereof may be shared between them. In the present embodiment, an example is described in which the quoted claim review is performed by the claim input processing unit 122, but the spirit of the present invention is not limited thereto.

The claim input processing unit 122 may provide the results of a quoted claim review to a user. The claim input processing unit 122 may not generate a special event when there is no problem, and may provide the results of a review to a user only when there is a problem. In this case, the results of the review may include an explanation regarding which description requirement has been violated by the selection of a corresponding claim. The claim input processing unit 122 may output a review result message and also deactivate the selection of a quoted claim so that the quoted claim violating the description requirement is not selected.

In this case, the quoted claim selection screen may previously review whether a claim may generate the improper description, and does not display a claim having a problem on the quoted claim selection screen or may deactivate the claim so that the claim cannot be selected.

Furthermore, the quoted claim selection screen may provide an all-claims citation selection function for quoting all claims each having a claim number ahead of a number of a claim being written. Furthermore, the quoted claim selection screen may provide a multi-selection function for simultaneously selecting a plurality of claims.

Furthermore, when a user selects a claim number by clicking on the claim number or a mouse cursor is placed on a claim number, the claim input processing unit 122 may output the contents of a corresponding quoted claim to the quoted claim selection screen or another screen so that the user can clearly recognize and select the contents of the claim. For example, the claim input processing unit 122 may output, as a tooltip tag, the contents of a claim where a mouse cursor is placed or may output the contents of the claim to a claims display screen to be described later.

When the selection of a quoted claim is completed on the quoted claim selection screen, the claim input processing unit 122 may generate a claim citation phrase to be displayed in the quoted claim input component, based on a claim citation type. To this end, the claim input processing unit 122 may determine the claim citation type to which the selected claims correspond. The claim citation phrase may be generated based on an idiomatic phrase, in particular, an idiomatic phrase including a replacement portion.

Specifically, the claim citation type may be classified based on one or more of the number of quoted claims (single quoted claim or plural quoted claims), a method of quoting a claim (selective quotation or simultaneous quotation), whether quoted claim numbers are continuous, and whether a quoted claim number includes a continuous portion as a part. An idiomatic phrase that generates a claim citation phrase may be differently set depending on a claim citation type. The claim input processing unit 122 may determine a claim citation type based on a selected claim, may read a corresponding idiomatic phrase from the database 140 or the database 240, and may generate a claim citation phrase.

In this case, the idiomatic phrase that generates the claim citation phrase may include, as a replacement portion, a portion that expresses a claim number. For example, if only one claim is quoted, an idiomatic phrase may include a replacement portion (e.g., "<N>" in which "<" and ">" are used as boundary identifiers and "N" is used as an indication identifier) corresponding to one claim number. If two or more claims are quoted, an idiomatic phrase may include replacement portions (e.g., "<N1>", "<N2>", "<N3>" in which "<" and ">" are used as boundary identifiers and "N1", "N2", "N3", etc. are used as indication identifiers) corresponding to two or more claim numbers. The claim input processing unit 122 may generate a claim citation phrase by replacing a replacement portion, such as that described above, with a corresponding claim number based on a claim citation type.

A claim citation phrase generated by the claim input processing unit 122 may be output to a quoted claim input component. In this case, the claim input processing unit 122 may further display a region in which a claim selected as a quoted claim is graphically displayed, in addition to the claim citation phrase. For example, the claim input processing unit 122 may generate a badge or button in which a claim number is written and which has a shape capable of identifying a claim type, and may display the badge or button on a screen as part of the quoted claim input component.

If the type of selected claim is an independent claim, the category input component may be activated so that a user can edit data. The claim input processing unit 122 may determine whether input data corresponds to the title of an invention of a corresponding case when a user inputs the data to the category input component, and may output an attention message to the user when the data input to the category input component does not correspond to or is not included in the title of an invention.

If the type of selected claim is a dependent claim, the claim input processing unit 122 may set a claim citation phrase in the quoted claim input component, may simultaneously read the category of an independent claim or any one dependent claim among quoted claims, and may set the read category in the category input component without any change. That is, the claim input processing unit 122 may automatically set the category input component based on the category of a quoted claim selected by a user. Accordingly, the improper description, which may occur due to the different categories of claims having a citation relation are different, can be prevented. If category data of selected claims are different when the quoted claims are selected, the claim input processing unit 122 may output an error message to a user, and may cancel the selection of a claim that has generated the error.

A user may input an element that constitutes an invention and restriction on the element through an element description input component. The element description input component may be configured based on a text input component, and may be managed by the text input component management unit 106. Accordingly, the user can draft the contents of the element description input component while auto-completing an element item or an idiom word item.

If a user inputs data to the element description input component using the auto-complete function, auto-complete text may be inserted into the element description input component, as an auto-complete block.

The claim input processing unit 122 may receive, from the user, whether to include an identification code, such as a reference numeral, in the auto-complete text. To this end, a UI for selecting whether to include an identification code upon auto-completion may be provided on the claim drafting screen or the setting management screen. For example, if it has been selected to include an identification code, auto-complete text and an auto-complete block may be generated in the state in which the identification code has been included. In contrast, if it has been selected to not include an identification code, auto-complete text and an auto-complete block may be generated in the state in which the identification code has been omitted. In this case, the element item of an auto-complete list provided through the text input component management unit 106 may be displayed in the state in which the identification code is always included therein. Furthermore, even in the latter case, a corresponding auto-complete block may have the same identification value as the auto-complete block in the state in which the identification code is included therein. Accordingly, an auto-complete block not including the identification code may be changed by a batch update. Furthermore, the claim input processing unit 122 may change the identification code inclusion state of auto-complete text of an auto-complete block displayed on a screen, based on the selection of a user regarding whether to include an identification code.

Furthermore, when an element item is input through the auto-complete function, the claim input processing unit 122 may add an antecedent for denoting an auto-completed element item. Specifically, the claim input processing unit 122 may determine whether an auto-completed element item has been first written in a claim (hereinafter referred to as a "cited claim") quoted by a corresponding claim (hereinafter referred to as a "claim being drafted") and in the claim being drafted, and may add an antecedent to auto-complete text or an auto-complete block so that auto-completion is performed, if the auto-completed element item has been written. In some embodiments, the antecedent may be added as normal text out of an auto-complete block.

Whether to automatically add an antecedent when data is input to the element description input component may be managed as a setting value, and may be provided so that it can be selected by a user in the claim drafting screen or the setting management screen. In some embodiments, a setting value applied to the entire patent document and a setting value for the claim drafting screen may be separately managed.

Meanwhile, the claim input processing unit 122 may review whether an antecedent is correctly used when data is input to the element description input component. In this case, if an antecedent has been correctly used, this may be understood as a case where, when the antecedent is used for a given element, the element has been used in a previous portion of the element in a cited claim or a claim being drafted. Furthermore, if an antecedent is correctly used, it may be understood as a concept, including a case where, when the antecedent is not used for a given element, the element has not been used in a previous portion of the element in a cited claim or a claim being drafted. The results of a review of the antecedent may be provided to a user in a way to be output to the description requirement review result screen, output to a description requirement review result region separately provided to the claim drafting screen, or output as a pop-up message, or to highlight an auto-complete block reviewed within the element description input component.

Hereinafter, to review whether an antecedent input to the element description input component of a claim has been correctly used will be referred to as a "claim antecedent review." The claim antecedent review may be performed on each claim and may be performed on all claims. In some embodiments, a review of a claim antecedent may be performed by the requirement review unit 108. The claim input processing unit 122 may be implemented to receive and process the results of the execution. That is, a review of a claim antecedent may be performed by any one or both of the requirement review unit 108 and the claim input processing unit 122, and results thereof may be shared between them. In the present embodiment, an example is described in which the claim antecedent review is performed by the claim input processing unit 122, but the spirit of the present invention is not limited thereto.

The claim antecedent review may be performed when a preset event occurs, such as when an event occurs in which an auto-complete block is input to the element description input component, when an event occurs in which the element description input component loses a focus, or when an event occurs in which the data of a corresponding claim is stored.

Furthermore, the claim antecedent review may be performed even on a portion input as normal text, in addition to an auto-complete block. The results of a review regarding whether an antecedent used for normal text is correctly used may also be output to the description requirement review result screen, etc.

The claim input processing unit 122 may automatically correct a portion where an antecedent is erroneously used, based on a result of a claim antecedent review, and may output the corrected portion to the element description input component. In some embodiments, the claim input processing unit 122 may previously display contents to be corrected to a user through a pop-up window, etc., and may perform a correction operation only when an explicit correction instruction is received from the user.

Meanwhile, the claim drafting screen may include an element name display region in which only the names of elements input to the element description input component are displayed. If a user adds or deletes an element item through the auto-complete function, the claim input processing unit 122 may add or delete the name of a corresponding element to or from the element name display region. In some embodiments, the claim input processing unit 122 may check the name of an input component by comparing the names of an element list managed by the element management unit 104 and text data input to the element description input component, and thus may manage the element name display region. Through such an element name display region, a user can draft the claims more easily and precisely because he or she can intuitively recognize an element included in a corresponding claim.

A user may draft a new claim through the claim drafting screen. The drafting of new claim may be divided into a case where it is added to the last of a previously drafted claim (hereinafter referred to as "new claim addition") and a case where it is inserted between previously drafted claims (hereinafter referred to as "new claim insertion"). The screen configuration unit 101 may include, in the claim drafting screen, a UI, such as a button that enables a user to explicitly generate a new claim addition event or a new claim insertion event.

When a user generates an event for new claim addition or new claim insertion through the claim drafting screen, the claim input processing unit 122 may initialize each of the input components and wait for the input of new data.

If a user requests new claim addition, the claim input processing unit 122 may set, in the claim number input component, a number obtained by adding 1 to the greatest claim number. If a user requests new claim insertion, the claim input processing unit 122 may receive, from the user, a location into which a claim to be drafted will be inserted, for example, a claim number to be inserted, may generate a corresponding claim number, and may set the generated claim number in the claim number input component. Thereafter, the claim input processing unit 122 may receive the type of claim, a quoted claim, a category, an element description, etc. for the new claim.

If a new claim is inserted, the claim input processing unit 122 may adjust the claim number of a claim (having a greater claim number) located behind a location into which the new claim is inserted. Specifically, the claim input processing unit 122 may store a claim number as data that constitutes a claim. If a new claim is inserted, the claim input processing unit 122 may store, as a new claim number of the new claim, a value obtained by adding 1 to the claim number of a claim located behind the location into which the new claim is inserted. For example, if claim 1 to claim 5 are drafted, when a user inserts a new claim as a claim number 4, the claim number of the existing claim 4 may be changed into a claim 5, and the claim number of the existing claim 5 may be changed into a claim 6. Hereinafter, a claim number prior to a change will be referred to as an "old number", and a claim number after a change will be referred to as a "new number."

Furthermore, if a new claim is inserted, the claim input processing unit 122 may update a number of a claim that a claim quotes which is located behind a location into which the new claim is inserted. Specifically, the claim input processing unit 122 may review quoted claim number data of a claim located behind the location into which the new claim is inserted, and may determine whether an old number is included as a quoted claim number. Furthermore, if an old number is included as a quoted claim number, the claim input processing unit 122 may update the old number with a corresponding new number. For example, if claim 1 to claim 5 have been drafted and claim 5 quotes claim 4, when a user inserts a new claim as a claim number 4, the claim input processing unit 122 may perform the aforementioned change in claim numbers and also update the quoted claim number of claim 6 from claim 4 to claim 5. In this case, if the claim having the new number quotes all claims ahead of the claim or quotes a claim in a given range including a location into which the new claim is inserted, the claim input processing unit 122 may include the inserted new claim in the quoted claim of the claim having the new number.

Hereinafter, to change a claim number and a quoted claim number by the claim input processing unit 122 is referred to as "claim number arrangement." The claim input processing unit 122 may perform the claim number arrangement when a new claim is inserted.

The claim input processing unit 122 may perform a claim antecedent review on a claim whose claim number is changed by the insertion of a new claim, that is, a claim whose claim number is updated with a new number.

An operation, such as the claim number arrangement and the claim antecedent review, may be automatically performed by the claim input processing unit 122 when a storage instruction for a claim inserted by a user is received. In this case, the claim input processing unit 122 may review whether an error, such as the improper description, occurs in a previously input claim due to the addition and insertion of a new claim. If an error occurs, the claim input processing unit 122 may display, to the user, the results of the review including error contents, may receive an explicit storage instruction from the user, and may then perform an operation of storing the data of the new claim.

Meanwhile, a user may correct the data of a previously drafted claim on the claim drafting screen. That is, the claim drafting screen may have a function for correcting a claim. If the claim drafting screen is displayed for a claim correction, the claim drafting screen may be provided to a user in the state in which the data of a corresponding claim has been previously set in each input component of the claim drafting screen. Hereinafter, the state in which data has been set in the claim drafting screen for a claim correction will be referred to as a "claim correction screen." In some embodiments, the claim correction screen may use the UI of the claim drafting screen without any change or may have an independent UI.

A method of displaying the claim correction screen may be variously provided. For example, the claims display screen on which the contents of a previously drafted claim are displayed may be provided on the patent document drafting screen. A correction button corresponding to each claim may be provided on the claims display screen. In this case, when a user clicks on any one correction button for a claim, the claim correction screen with which the data of the corresponding claim is filled may be displayed. If the claim drafting screen or the claim correction screen has already been displayed, the data of each input component may be changed into the contents of a claim corresponding to a clicked correction button claim. In addition, a UI for setting the contents of a claim to be corrected may be variously provided on the claim correction screen, and the spirit of the present invention is not limited thereto.

A user may change the type of claim through the claim type input component, may change a quoted claim through the quoted claim input component, may change the category of an invention through the category input component, and may change a description and restriction related to an element through the element description input component, in the claim correction screen, using the same method as that described above. In some embodiments, a change in a claim number through the claim number input component may be permitted. In the present embodiment, an example is described in which a case where a claim number is changed is processed as a movement of a claim. Such a movement of a claim is described by taking, as an example, a case where the data of the claim number input component is not corrected, but is performed through an explicit claim movement UI. Detailed contents related to a movement of a claim will be described later.

Specifically, when a user changes the type of claim from an independent claim to a dependent claim, the claim input processing unit 122 may activate the quoted claim input component and deactivate the category input component. In contrast, when a user changes the type of claim from a dependent claim to an independent claim, the claim input processing unit 122 may deactivate the quoted claim input component and activate the category input component.

If a user changes a quoted claim number through the quoted claim input component in the claim correction screen, the claim input processing unit 122 may perform the aforementioned quoted claim review, and may perform a preset operation based on a result of the review. For example, when a user changes a quoted claim number, the claim input processing unit 122 may review whether such a change satisfies the description requirements under the patent law of a country corresponding to a corresponding case. The quoted claim review of the claim input processing unit 122 when a claim is corrected and a resultant operation may be performed when a user selects a claim to be quoted through the quoted claim input component.

Furthermore, if the category of an invention is changed in response to a change in a quoted claim, that is, if category data of an invention of a quoted claim prior to a change and category data of an invention of a newly selected quoted claim are different, the claim input processing unit 122 may notify a user that the category of the invention is changed, and may receive a confirmation for the category change from the user. If a quoted claim having a different category is newly selected, the claim input processing unit 122 may invoke category data of an invention of the newly selected quoted claim and set the category data in the category input component.

Furthermore, if a user changes data of the element description input component in the claim correction screen, the claim input processing unit 122 may review whether an antecedent is correctly used. In this case, the claim input processing unit 122 may perform a claim antecedent review on not only a claim (hereinafter referred to as a "claim being corrected") which is being performed in the claim correction screen, but also the data of a claim that quotes the claim being corrected, and may provide a result of the execution to a user. Specifically, when a claim is corrected, there are a case where a new element is added as an element of an invention and a case where an included element is deleted. In this case, if a newly added element or deleted element is included in a claim that quotes the claim being corrected, it is necessary to change a antecedent for the newly added element or deleted element. To this end, when a claim is corrected, the claim input processing unit 122 may detect the addition or deletion of an element, and thus may determine whether it is necessary to correct an antecedent in the claim that quotes the claim being corrected. Furthermore, the claim input processing unit 122 may automatically correct the antecedent included in the data of the claim that quotes the claim being corrected, based on a result of the determination. The claim antecedent review of the claim input processing unit 122 when a claim is corrected and a resultant operation may be performed when a preset event occurs, such as when a user issues an instruction for storing corrected contents (e.g., clicks on a storage button) or when a focus exits from the element description input component.

In this case, the claim input processing unit 122 may output a warning message to a user if a previously input component is deleted based on a change in the data of the element description input component and a deleted element is included in the data of a claim that quotes a claim being corrected.

As described above, an operation performed by the claim input processing unit 122 when a user changes data of the element description input component in the claim correction screen may be performed even when a quoted claim is changed in the claim correction screen. That is, if a quoted claim number is changed, the claim input processing unit 122 may perform a claim antecedent review on the element description input component in addition to a quoted claim review, and may perform a preset operation based on a result of the execution. For example, as a quoted claim number is changed, whether the antecedent of a specific element needs to appear may be changed. Accordingly, if whether to use the antecedent of a corresponding element input to the element description input component of a claim being corrected or whether to use the antecedent of an element of a claim that quotes the claim being corrected needs to be changed, the claim input processing unit 122 may automatically add or delete the antecedent for a corresponding element of the claim being corrected or the claim that quotes the claim being corrected. In some embodiments, the claim input processing unit 122 may display a result of a review to a user, may receive an explicit instruction from the user, and may perform a data correction task.

Furthermore, the claim drafting screen or the claim correction screen may have a function capable of deleting a claim. The deletion of a claim may be implemented to be performed by only an explicit expression of a user, such as clicking on a delete button. In this case, the claim input processing unit 122 may expose a UI, such as the delete button, in the state in which the contents of the claim to be deleted has been displayed so that the user can issue a claim deletion instruction in the state in which the user has recognized the contents of the claim to be deleted. For example, the delete button for a claim may be displayed along with the aforementioned correction or storage button displayed when the claim is corrected. That is, the delete button may be configured so that a user can input the claim deletion instruction in the claim correction screen. In some embodiments, a UI for directly deleting a claim from the patent document drafting screen or the claims display screen may be provided.

When the claim deletion instruction is received from the user, the claim input processing unit 122 may determine whether there is a claim quoting a claim to be deleted and whether an element of a claim to be deleted is included in the data of the corresponding claim. The claim input processing unit 122 may output the results of the determination (e.g., a number of a claim that quotes the claim to be deleted and information of an element included therein) to a user, may receive, from the user, an instruction regarding whether to delete the claim or whether to correct the data of the claim that quotes the claim to be deleted, and may perform a resultant operation.

When a claim is deleted, the claim input processing unit 122 may perform a claim number arrangement, a quoted claim review, and an antecedent review for a claim located behind the deleted claim. Specifically, the claim input processing unit 122 may decrease the claim number of a claim behind a deleted claim by 1, and may perform updates from an old number of a corresponding quoted claim to a new number. Furthermore, the claim input processing unit 122 may review whether such a quoted claim satisfies the description requirements under a patent law according to a change in the quoted claim, may review whether an antecedent is correctly used, and may perform even a resultant correction task.

Meanwhile, the claim correction screen may provide a claim movement function. To this end, a UI, such as a claim movement button for enabling a user to input an explicit instruction for moving a claim may be provided on the claim correction screen. In the present embodiment, an example is described in which the claim movement button is included in the claim correction screen and a user inputs a location where a claim is to be moved, by clicking on the claim movement button. However, a UI for issuing a claim movement instruction in the patent document drafting screen is not limited to the above example, and the spirit of the present invention is not limited to a method of issuing a claim movement instruction. For example, a movement of a claim may be performed by a method of dragging & dropping a claim or moving a location thereof through a keyboard input in the claims display screen. Furthermore, if a tree screen showing a structure of claims is provided, a movement of a claim may be performed by a method of dragging & dropping a claim or moving a location thereof through a keyboard input in the tree screen.

A user may input a location where a corresponding claim is to be moved (hereinafter referred to as a "movement location"), for example, behind any claim, between any claim and any claim, or ahead of any claim, by clicking on the claim movement button. Hereinafter, a claim to be moved by a user will be referred to as a "target movement claim." The claim input processing unit 122 may simultaneously or sequentially perform an operation of receiving a movement location from a user and inserting a target movement claim into a movement location and an operation of deleting the target movement claim. That is, the claim input processing unit 122 may implement a movement of a claim through the insertion and deletion of the claim. In this case, the sequence in which the insertion and deletion of a claim are processed may be differently set according to some embodiments.

If a claim is inserted and deleted in response to a movement of the claim, the claim input processing unit 122 may perform the aforementioned operation, performed when a new claim is inserted and a claim is deleted, without any change. Specifically, the claim input processing unit 122 may perform a quoted claim review, a claim number arrangement, an antecedent review, etc. for the insertion of a target movement claim into a movement location, and may perform a quoted claim review, a claim number arrangement, an antecedent review, etc. for the deletion of a target movement claim. The claim input processing unit 122 may provide the results of such a review to a user. If an error according to a movement of a claim based on the results of the review occurs, the claim input processing unit 122 may prevent a movement of the claim. Alternatively, after providing the results of the review, the claim input processing unit 122 may receive an explicit movement instruction from the user or automatically correct an error, and may then perform an operation of actually inserting and deleting a claim. Alternatively, after providing the results of the review, the claim input processing unit 122 may configure a screen including an input component for editing a problematic claim and problematic data so that the user can correct an error, and may provide the screen to the user.

The claim input processing unit 122 may provide a user with the results of a review, performed when a claim movement is requested or after a claim is moved, by using a method of outputting the results of the review to the description requirement review result screen, outputting the results of the review to a description requirement review result region separately provided on the claim drafting screen, outputting the results of the review as a pop-up message, or highlighting a reviewed auto-complete block within the element description input component.

Through such a claim input processing unit 122, a user can draft the claims more conveniently and intuitively, and can draft the claims so that the claims comply with various description requirements under a patent law. Furthermore, an opportunity cost for an Office Action from a patent office in the future can be reduced and satisfaction of a client can be improved because the improper descriptions can be prevented which are caused by the addition, insertion, correction, deletion or movement of a claim which frequently occurs under the practice can be prevented.

The element description input processing unit 123 may receive, from a user, a preset subject for describing an element so that a user can draft a description of an element of an invention easily and accurately, and may manage the subject. The preset subject may be one or more of the definition of an element, an organic coupling relation with another element, a function of an element, an action of an element, an effect of an element, and a detailed embodiment of an element.

The screen configuration unit 101 may configure a screen for drafting a description of an element (hereinafter referred to as an "element description drafting screen"), and may provide the element description drafting screen to a user. The element description drafting screen may be provided as an independent web page, may be provided as some regions of a web page, may be provided as a region hidable or foldable in a web page, or may be provided as a pop-up page or window.

The element description input processing unit 123 may provide, to a user, the element description drafting screen for inputting a detailed description of a specific element in response to a request from the user. A UI for generating an event for invoking the element description drafting screen may be provided to the patent document drafting screen in a form, such as a button.

The element description drafting screen may include one or more text input components for receiving data on a preset subject. One text input component may correspond to one preset subject. In some embodiments, the element description input processing unit 123 may receive a plurality of preset subjects as one text input component, or may receive one preset subject as a plurality of text input components. Furthermore, when the element description drafting screen is first displayed, only one text input component for receiving any one preset subject is provided. When a user generates a text input component addition event through a button click, etc., the element description input processing unit 123 may add a text input component for receiving the same preset subject to the element description drafting screen. For example, the element description drafting screen may be configured to receive a function, action, and effect of an element as one text input component. Furthermore, a text input component for receiving a detailed embodiment of an element may be dividedly provided to receive a basic embodiment and to receive an additional embodiment.

The element description input processing unit 123 may generate one explanation for a specific element by integrating the data of a preset subject input in relation to the specific element. The explanation generated by the element description input processing unit 123 may be output to one explanation text input component. In this case, the explanation text input component may be provided to be edited by a user. Accordingly, the user can edit an automatically generated explanation as desired.

The element description input processing unit 123 may automatically generate an explanation when a user inputs data to a text input component corresponding to a preset subject, and may display the explanation in the explanation text input component. In some embodiments, the element description drafting screen may include an explicit UI for receiving an instruction to generate an explanation. The element description input processing unit 123 may generate an explanation only when an instruction is input from a user. The explanation text input component may be displayed along with the element description drafting screen. In some embodiments, when a user edits an explanation, the explanation automatic-generation function by the element description input processing unit 123 may be stopped.

The element description input processing unit 123 may automatically generate one completed sentence based on data input to a text input component corresponding to any one preset subject, and may generate an explanation for a corresponding element by connecting the completed one or more sentences. In this case, a user may input data to the text input component in a phrase or clause form. To complete the sentence based on the data may be performed by the element description input processing unit 123. To this end, a guide phrase for receiving the data in a phrase or clause form from a user may be provided on the element description drafting screen in parallel to the text input component. For example, in the element description drafting screen, a portion for receiving the definition of an element may be configured so that a guide phrase "[element name] is", a text input component, and a guide phrase "may be defined as" are disposed in parallel. Accordingly, a user can intuitively recognize that he or she has only to input, to the text input component, the remaining portions other than the guide phrase in a completed sentence.

A sentence completed or sentence being completed by the element description input processing unit 123 may be displayed in the explanation text input component. Accordingly, a user can recognize a process in which data input by the user is being completed as a sentence. In some embodiments, there may be a case where a guide phrase is not provided on the element description drafting screen. In this case, a user can input data using a suitable expression because he or she can recognize how text input by the user is used in a sentence with reference to contents displayed in the explanation text input component.

Meanwhile, as in the aforementioned detailed embodiment, if one preset subject includes a plurality of text input components, the element description input processing unit 123 may generate a completed sentence having another form based on each text input component. For example, if a detailed embodiment includes text input components for a basic embodiment and an additional embodiment, the element description input processing unit 123 may generate a sentence, such as "In the present embodiment, [element name] may be [data of a text input component for a basic embodiment], but the spirit of the present invention is not limited thereto", based on data input to the text input component for a basic embodiment, and may generate a sentence, such as "For example, [element name] may be [data of a text input component for an additional embodiment]", based on data input to the text input component for an additional embodiment.

The element description drafting screen may include a UI, such as a button for inserting an explanation or completed sentence of an element drafted as described above into a preset location of a preset text input component included in the patent document drafting screen (e.g., the location of a cursor in a text input component being drafted when the element description drafting screen is invoked). When an insertion instruction is input through such a UI, the element description input processing unit 123 may insert, into a preset text input component of the patent document drafting screen, data input to the explanation text input component or data, such as a completed sentence generated by the element description input processing unit 123.

In this case, the element description input processing unit 123 may store, through the data management unit 102, data input to a text input component corresponding to each preset subject or data input to the explanation text input component, may load the stored data when the element description drafting screen for a corresponding element is invoked again in the future, and may display the element description drafting screen in the state in which the stored data has been set in each text input component.

The brief-description-of-drawing input processing unit 124 may receive an explanatory phrase for a drawing from a user and manage the explanatory phrase so that the user can draft a brief description of drawings of a patent specification easily and conveniently. In a patent specification, a brief description of drawings may be configured with one or more sentences. Some users may draft a brief description of drawings using a clause, not a sentence. Hereinafter, for convenience of description, a sentence and a clause used in a brief description of drawings are collectively expressed as a sentence. Each sentence may include a reference numeral for describing the contents of one or a plurality of drawings and an explanatory phrase corresponding to the reference numeral.

The screen configuration unit 101 may configure a screen for drafting a brief description of drawings (hereinafter referred to as a "brief-description-of-drawing drafting screen"), and may provide the brief-description-of-drawing drafting screen to a user. The brief-description-of-drawing drafting screen may be provided as an independent web page, may be provided as some regions of a web page, may be provided as a region hidable or foldable in a web page, or may be provided as a pop-up page or window.

The brief-description-of-drawing drafting screen may be configured to include one or more drawing information input units for enabling a user to input data related to a drawing for each sentence. One drawing information input unit may include a text input component for inputting a reference numeral (hereinafter referred to as a "reference numeral text input component") and a text input component for receiving a description of a drawing (hereinafter referred to as a "drawing description text input component"). One drawing information input unit may include one reference numeral text input component and one drawing description text input component. In this case, a user may input one or more reference numerals to the reference numeral text input component. If a user attempts to input a plurality of reference numerals to the reference numeral text input component, the brief-description-of-drawing input processing unit 124 may force an input having a preset format for a normal operation, such as the addition, insertion, deletion, and movement of the drawing information input unit. For example, the brief-description-of-drawing input processing unit 124 may require all of a plurality of reference numerals to be divided by spacing words or to be used along with text, such as "도" and "FIG.", and may request a user to input data again if the data not satisfying the requirement is received.

The drawing information input unit may include a guide phrase, including a postposition or predicate customarily used, in addition to the reference numeral text input component and the drawing description text input component. The guide phrase of the drawing information input unit may be displayed along with the reference numeral text input component and the drawing description text input component, thus inducing a user to complete a sentence including the data of the reference numeral text input component, the data of the drawing description text input component, and the guide phrase. For example, any one drawing information input unit may include "도", that is, a guide phrase, "는(은)", that is, a reference numeral text input component and a guide phrase, and "이다", that is, a drawing description text input component and a guide phrase. Accordingly, a sentence, such as "도 [1] 는(은) [본 발명의 일 실시예의 사시도]이다" may be displayed in the drawing information input unit. In some embodiments, the brief-description-of-drawing input processing unit 124 may automatically change a postposition, a verb, etc. of a guide phrase based on data input to the reference numeral text input component. For example, when a Korean patent specification is drafted, the brief-description-of-drawing input processing unit 124 may display, as a guide phrase, any one postposition of "은" and "는" based on data input to the reference numeral text input component. Furthermore, when an English patent specification is drafted, if a plurality of reference numerals is written in the reference numeral text input component, the brief-description-of-drawing input processing unit 124 may change a guide phrase from "is" to "are" and may display the changed guide phrase.

The brief-description-of-drawing input processing unit 124 may manage a completed sentence, including a guide phrase along with data input to the reference numeral text input component and the drawing description text input component with respect to each drawing information input unit.

At this time, when loading the brief-description-of-drawing drafting screen, the brief-description-of-drawing input processing unit 124 may automatically generate a drawing information input unit having a number corresponding to the number of pages in a drawing file registered by the drawing management unit 107 or the number of drawing files or the number of drawings, and may provide the generated drawing information input unit to a user. Alternatively, the brief-description-of-drawing input processing unit 124 may recognize text included in a drawing file registered by the drawing management unit 107, may extract a reference numeral from the recognized text, and may generate a drawing information input unit corresponding to each drawing based on the reference numeral. At this time, the brief-description-of-drawing input processing unit 124 may automatically set the recognized reference numeral in a reference numeral text input component of each drawing information input unit.

If one drawing is related to another drawing, a number of the another drawing (hereinafter referred to as a "related reference numeral") may need to be input to the description of the corresponding drawing. That is, a related reference numeral may be written in the drawing description text input component, and the number of related reference numerals may be one or more. In some embodiments, the brief-description-of-drawing drafting screen may include a related reference numeral input component, such as a quoted claim input component, in the claim drafting screen. The brief-description-of-drawing input processing unit 124 may generate a related reference numeral in the drawing description text input component based on a selected related drawing, and may input the reference numeral thereto. In this case, the brief-description-of-drawing input processing unit 124 may provide a user with a related drawing selection screen, such as the quoted claim selection screen, for the accurate input of a related reference numeral. The related drawing selection screen may have a UI for selecting a reference numeral ahead of a reference numeral being written by a user, as in the quoted claim selection screen. When a related drawing is selected in the related drawing selection screen or a related reference numeral is input to a drawing description text input component, the brief-description-of-drawing input processing unit 124 may review whether such a selection or input of a related drawing satisfies the description requirements under a corresponding patent law. The brief-description-of-drawing input processing unit 124 may perform a preset operation so that a user can select a correct related drawing based on the results of the review.

The brief-description-of-drawing drafting screen may include a UI for adding a drawing information input unit. For example, a button for adding a new drawing information input unit may be provided on one side of the brief-description-of-drawing drafting screen. When a user clicks on the button, the brief-description-of-drawing input processing unit 124 may add a drawing information input unit to the brief-description-of-drawing drafting screen. In some embodiments, the function for adding a drawing information input unit may be dividedly implemented as the addition of new drawing information and the insertion of new drawing information, as in the aforementioned addition of a claim in the claim drafting screen.

Furthermore, the brief-description-of-drawing drafting screen may include a UI for deleting a drawing information input unit. For example, a button for deleting a drawing information input unit may be provided on one side of the brief-description-of-drawing drafting screen. When a user selects any one drawing information input unit and clicks on the delete button, the brief-description-of-drawing input processing unit 124 may delete the data of the selected drawing information input unit, and may remove the selected drawing information input unit from the brief-description-of-drawing drafting screen.

Furthermore, the brief-description-of-drawing drafting screen may include a UI for moving the location of a drawing information input unit. For example, the drawing information input unit may be provided as an html object which can be dragged & dropped. A user may input a movement instruction for a selected drawing information input unit by selecting the drawing information input unit to be moved and then dragging & dropping the selected drawing information input unit at a desired location. In some embodiments, the function for moving a drawing information input unit may be implemented in a way to receive a location where a drawing information unit is to be moved, as in the aforementioned movement of a claim in the claim drafting screen, but a method of moving a drawing information input unit does not limit the spirit of the present invention.

The brief-description-of-drawing input processing unit 124 may manage a reference numeral and a related reference numeral using the same method as the method of managing, by the claim input processing unit 122, a claim number and a quoted claim number. That is, the brief-description-of-drawing input processing unit 124 may treat a reference numeral in the same manner as in a claim number, and a related reference numeral in the same manner as in a quoted claim number. Specifically, when an addition or insertion instruction for a new drawing information input unit, a deletion instruction for a drawing information input unit, and a movement instruction for a drawing information input unit are input, such as those described above, the brief-description-of-drawing input processing unit 124 may correct a reference numeral and a related reference numeral using the same method as the claim number arrangement for changing, by the claim input processing unit 122, a claim number and a quoted claim number when an addition or insertion instruction for a new claim, a deletion instruction for a claim, and a movement instruction for a claim are input.

For example, when an addition instruction for a new drawing information input unit is input, the brief-description-of-drawing input processing unit 124 may automatically set a number, obtained by adding 1 to the greatest reference numeral, in a reference numeral text input component for an added drawing information input unit. Furthermore, when an insertion or deletion instruction for a new drawing information input unit is input, the brief-description-of-drawing input processing unit 124 may arrange a reference numeral and a related reference numeral based on reference numeral of an inserted or deleted drawing information input unit. Furthermore, when a movement instruction for a drawing information input unit is input, the brief-description-of-drawing input processing unit 124 may process the movement instruction by simultaneously or sequentially performing operations corresponding to the insertion and deletion of a reference numeral information input unit.

In this case, the brief-description-of-drawing input processing unit 124 may determine whether such a correction to a reference numeral and a related reference numeral satisfies the description requirements under a corresponding patent law. If there is a problem, the brief-description-of-drawing input processing unit 124 may output a corresponding warning message to a user, and may receive a confirmation as to whether to execute an instruction input by the user. In some embodiments, after executing an instruction input by a user, when a problem occurs, the brief-description-of-drawing input processing unit 124 may continue to display the problem in a preset region, such as the description requirement review result screen of the patent document drafting screen, until the problem is solved.

Meanwhile, a reference numeral may have a form in which a character is added to a number, like 1A, 1B, and 1C, in addition to a simple number. In this case, a reference numeral input unit having a reference numeral (hereinafter referred to as a "series reference numeral"), including a combination of any one number and a character having regularity like 1A, 1B, and 1C, may be treated as one bundle by the brief-description-of-drawing input processing unit 124. Specifically, if a movement instruction for any one of reference numeral input units having a series reference numeral is input, the brief-description-of-drawing input processing unit 124 may simultaneously move all of reference numeral input units having the corresponding series reference numeral.

Furthermore, if a new reference numeral input unit is inserted between reference numeral input units having a series reference numeral or a reference numeral input unit located at another location is moved, the brief-description-of-drawing input processing unit 124 may set reference numeral data of the inserted or moved reference numeral input unit based on the regularity of the series reference numeral, and thus may adjust another series reference numeral and other reference numerals.

Furthermore, if any one of reference numeral input units having a series reference numeral is deleted, the brief-description-of-drawing input processing unit 124 may update reference numeral data of reference numeral input units having another series reference numeral based on the regularity of the series reference numeral.

Furthermore, if a reference numeral other than a series reference numeral is changed, the brief-description-of-drawing input processing unit 124 may update only the number portion of the series reference numeral, among data of a reference numeral input unit in which the series reference numeral is included as a reference numeral and a related reference numeral. For example, if series reference numerals are 4A, 4B, and 4C and a user deletes a reference numeral input unit having a reference numeral of 2, the brief-description-of-drawing input processing unit 124 may update 4A, 4B, and 4C with 3A, 3B, and 3C by changing only the respective number portions thereof.

The second processing unit 100*c* may include one or more of an original data management unit 131, an element extraction unit 132, an element display change unit 133, a first translation example search unit 134, a second translation example search unit 135, and a machine translation provision unit 136.

The second service is a service in which a patent translation can be drafted, and basically requires original data of a patent specification, that is, a translation target. Hereinafter, the "original data" may be understood as text data included in a patent specification, that is, a translation target. The original data management unit 131 may receive, from a user, original data of a patent specification to be translated, and may manage the original data. Specifically, the user may input the original data of the patent specification to be translated, through the application for drafting a patent document. The original data management unit 131 may perform a series of processes for storing, in the memory 14, 24, the original data input through the application for drafting a patent document and managing the stored original data.

A method of registering a file having a preset format (e.g., a Word file having a doc or docx extension or a PDF file) through the application for drafting a patent document or directly inputting, in a text form, original data of a patent specification to the application for drafting a patent document, etc. may be used as a method of inputting original data of a patent specification whose translation is requested by a user. In some embodiments, the original data management unit 131 may access a path on a network or Internet designated by a user or a path on a preset network or Internet through the data communication unit 113, and may receive a file or text corresponding to original data of a patent specification.

In the present embodiment, an example is described in which a user inputs an original file of a patent specification (hereinafter referred to as an "original file") whose translation is requested by the user and which has a preset format, through the application for drafting a patent document and the original data management unit 131 extracts original data from the original file and inputs the extracted original data to the database 140. Various technologies for a method of extracting text data from the original file have been publicly known, and thus a detailed description thereof is omitted.

Meanwhile, in the present embodiment, an example is described in which a patent specification is translated, but as described above, a translation target may be a document, such as a notice of preliminary rejection issued by a patent office, in addition to a patent specification.

To this end, the screen configuration unit 101 may configure a screen for selecting an original file from the apparatus for drafting a patent document 10, registering the selected original file, extracting original data from the registered original file, and managing the extracted original data (hereinafter referred to as an "original data management screen"), and may provide the original data management screen to a user. The original data management screen may be dividedly provided as a screen on which a user registers an original file and a screen on which the user can check and edit original data. In this case, these screens may be configured to be sequentially displayed. Hereinafter, the screen on which an original file is registered will be referred to as an "original file registration screen." The screen on which original data are checked and edited will be referred to as an "original data edit screen." That is, it may be understood that the original data management screen includes the original file registration screen and the original data edit screen. The original data management screen may be provided as an independent web page, may be provided as some regions of a web page, may be provided as a region hidable or foldable in a web page, or may be provided as a pop-up page or window.

However, the spirit of the present invention is not limited thereto. The original data management screen may be configured to enable a user to input the text data of a patent specification through a preset text input component. In some embodiments, the original data management screen may be configured to enable a user to selectively input an original file or text data. Furthermore, the original data management unit 131 may transmit original data to the server for drafting a patent document 20 through the data communication unit 113, so that the original data are stored in the database 240. In some embodiments, original data may be stored in both the database 140 and the database 240 and the stored data may be synchronized and managed.

Meanwhile, the original data management unit 131 may receive, from the case management unit 103, language information or document format information, which may be received as case information, through the original data management screen.

The original data management unit 131 may dividedly manage original data in a sentence unit. In original data, one sentence may be understood to include a phrase or clause, which may indicate any one complete meaning, in addition to a sentence having a complete form, including a subject and a predicate. Furthermore, the original data management unit 131 may divide original data in a paragraph unit including one or more sentences, and may manage the divided original data. For example, one sentence may be divided based on a preset punctuation mark or sentential mark, and one paragraph may be divided based on a new-line character.

In some embodiments, original data may include data indicative of a paragraph number, such as "[0001]" or "[0002]." After reviewing whether original data includes data corresponding to such a paragraph number, the original data management unit 131 may use the data as an identifier for distinguishing between paragraphs, if it is determined that the data corresponding to the paragraph number is included the original data.

Furthermore, the original data management unit 131 may use data indicative of a claim, for example, "claim 1" or "claim 2", as an identifier for distinguishing between paragraphs, and may treat one claim as one paragraph.

The patent document drafting screen for the second service may be configured to show original data to a user in a preset translation unit and to receive translation data from the user in the same translation unit. In the present embodiment, an example is described in which a sentence unit is used as a minimum translation unit. In some embodiments, a paragraph unit may be used as a translation unit or a sentence unit and a paragraph unit may be used in combination. Furthermore, the patent document drafting screen may manage some items, constituting a patent specification, in a sentence unit, and may manage other some items in a paragraph unit.

In order for a user to conveniently input translation data in a sentence unit or a paragraph unit, a sentence and a paragraph need to be precisely distinguished according to a user's intention. To this end, the original data management unit 131 may enable a user to clearly edit the boundaries of a sentence and paragraph of original data through the original data edit screen. To this end, a text input component to which original data has been input (hereinafter referred to as an "original data-editing text input component") may be provided to the original data edit screen.

The original data management unit 131 may display a delimiter for indicating the boundary of a sentence and the boundary of a paragraph, when displaying original data in the original data-editing text input component. That is, the original data management unit 131 may identify the boundary locations of a sentence and a paragraph based on a preset condition by preprocessing the original data, and may display the original data along with the delimiter by editing the data at the identified boundary location or adding preset data for the delimiter at the identified boundary location.

In this case, the original data management unit 131 may treat, as one paragraph, one claim among original data, and may treat, as one sentence, a phrase or clause included in a claim. Alternatively, the original data management unit 131 may treat, as one sentence, one claim among original data. Alternatively, the original data management unit 131 may treat, as one paragraph, one independent claim among original data, may treat, as a sentence, a phrase or clause included in an independent claim, and may treat one dependent claim as one sentence. Such a combination may be variously performed within a range in which the spirit of the present invention is maintained.

Furthermore, if a user edits data through the original data-editing text input component and thus the boundary of a sentence or a paragraph is changed, the original data management unit 131 may automatically add or remove a corresponding delimiter. For example, the original data management unit 131 may detect an event occurring in the original data-editing text input component. If the detected event may correspond to the generation and deletion of a sentence or paragraph, the original data management unit 131 may add a delimiter to a corresponding location or delete a delimiter present at a corresponding location.

Any given data by which a user can recognize the boundary of a sentence or a paragraph may be used as the delimiter. For example, although not explicitly indicated in a text input component, a new-line character that cuts text data so that the cut text data is output in a next row may also be used as the delimiter. One new-line character may be used to indicate the boundary of a sentence, and two continuous new-line characters may be used to indicate the boundary of a paragraph. Alternatively, the delimiter of a sentence may include a preset first string. The delimiter of a paragraph may include a preset second string different from the first string. In this case, the first string and the second string may include one or more new-line characters. The type of delimiter is not limited if the delimiter can be used for a user to identify a sentence or a paragraph.

Accordingly, a user can clearly recognize the boundary of a sentence or a paragraph, that is, a unit by which translation data can be input, through the delimiter, and can conveniently edit a sentence or paragraph to be translated in a desired form through the original data-editing text input component.

When data editing is completed through the original data-editing text input component, the original data management unit 131 may extract data, input to the original data-editing text input component, in response to an instruction from a user, and may generate original sentence data and original paragraph data by parsing the extracted data. In this case, the original data management unit 131 may assign a unique identification code to each original paragraph data, and may assign a unique identification code even to original sentence data that constitutes one paragraph. Accordingly, each original sentence data may have a unique identification value having a combination of a paragraph identification code and a sentence identification code. A method of assigning a unique identification value to extracted original sentence data does not limit the spirit of the present invention. For example, an identification value unrelated to a paragraph may be assigned to original sentence data. Original sentence data, a paragraph identification code, and a sentence identification code generated by the original data management unit 131 may be stored and managed in the database 140.

As described above, the element management unit 104 can include the name of an element and translation thereof as element information. If elements that need to be translated are extracted from original data en bloc and registered in and managed by the element management unit 104, use convenience can be improved. To this end, the element extraction unit 132 may extract, from original data, elements which may be managed by the element management unit 104.

Specifically, the element extraction unit 132 may extract, from original data, data, which may be used as the name of an element, according to a preset rule. The preset rule may be differently set based on a language used in a patent specification to be translated or a document format, that is, a criterion for drafting a corresponding patent specification. In this case, the language information or the document format, that is, a criterion by which the element extraction unit 132 selects the preset rule, may be received through the case management unit 103 or the original data management unit 131 or may be the results of reading the original data by the element extraction unit 132.

Prior to the application of the preset rule, the original data may be subjected to a text preprocessing process by the element extraction unit 132. Examples of the text preprocessing include tokenization, cleaning, normalization, stemming, lemmatization, stopword removal, regular expression processing, splitting data, integer encoding, one-hot encoding, subword segmentation, etc. Such text preprocessing may be applied as part of the preset rule.

As an example of the preset rule, the element extraction unit 132 may first extract, from original data, a string which may be used as a reference numeral (hereinafter referred to as a "reference numeral string"), and may then extract, as the name of an element, a string written ahead of the reference numeral string. Specifically, the element extraction unit 132 may extract, as a reference numeral string, one or more number strings written between parentheses or distinguishably written as a space character in the original data or a string composed of a combination of numbers and characters. In some embodiments, the element extraction unit 132 may extract, as a reference numeral string, one or more number strings or numbers or a string composed of a combination of numbers and alphabetic characters without checking parentheses or a space character or in parallel to the checking of parentheses or a space character. In this case, the element extraction unit 132 may determine whether to use, as a reference numeral string, the data extracted as the reference numeral string based on the number of times that the extracted data appears within the original data.

The element extraction unit 132 may extract the name of an element by analyzing a string positioned ahead of a reference numeral string and having a preset length or less. For example, the element extraction unit 132 may extract the name of an element based on the number of times that a string positioned ahead of a reference numeral string and having a preset length or less appears in original data. In this case, it may be understood that the string having a preset length or less is a string set classified as a space character and having a preset number or less. For another example, the element extraction unit 132 may extract the name of an element based on whether a string positioned ahead of a reference numeral string and having a preset length or less appears in original data corresponding to the claims. For another example, the element extraction unit 132 may extract the name of an element based on whether a string positioned ahead of a reference numeral string and having a preset length or less is used in original data along with an antecedent.

As another example of the preset rule, the element extraction unit 132 may extract continuous strings having a preset length or less from original data, and may extract the name of an element based on the number of times that the extracted strings appear in the entire original data. For example, if the extracted string appears within the original data two or more times, the element extraction unit 132 may extract the extracted string as the name of an element. Alternatively, the element extraction unit 132 may extract the name of an element based on whether an extracted string appears in original data corresponding to the claims or the number of times that the extracted string appears in the original data.

As another example of the preset rule, the element extraction unit 132 may extract continuous strings having a preset length or less from original data, and may extract the name of an element based on whether the extracted strings have been used along with an antecedent within the original data.

As another example of the preset rule, the element extraction unit 132 may perform morpheme analysis or word class analysis on each word or string of original sentence data included within original data, and may extract, as the name of an element, a combination of words or strings satisfying a preset condition if a morpheme combination or a word class combination complies with the preset condition. In this case, the morpheme combination or the word class combination may be configured with one morpheme or one word class.

In the aforementioned process of extracting a string, the element extraction unit 132 may neglect exception strings, such as an antecedent, an article, a postposition, a conjunction, and a predicate. A set of exception strings may be preset and stored based on a language or document format of the set. For example, the element extraction unit 132 may remove, from original data, data corresponding to exception strings and extract a string, or may exclude, from a comparison target, an exception string if the exception string is included within a string having a preset length or less and then make a determination.

Meanwhile, if there is a difference between an upper case and a lower case or between a singular expression and a plural expression when comparing strings, the element extraction unit 132 may treat the strings as the same string. To this end, the element extraction unit 132 may have a function for changing a string into any one of an upper case and a lower case and changing the string into any one of a singular expression and a plural expression.

The element extraction unit 132 may extract an element from original data using one or more of the aforementioned preset rules. If the plurality of rules is applied, the element extraction unit 132 may designate priority to each rule or apply a weight to each rule. Alternatively, the element extraction unit 132 may extract, as an element, data that satisfies two or more of the plurality of rules.

Meanwhile, the element extraction unit 132 may transmit the extracted element to the element management unit 104. The element management unit 104 may be provided to manage, as an element, data received from the element extraction unit 132 and to input translation of the data received as element information. Accordingly, a user can rapidly register a plurality of major elements to be translated, through the element management unit 104 without registering each of the elements.

In this case, an element that does not actually constitute an invention may be included in the elements extracted using the aforementioned method. For example, the extracted elements may include part of text that expresses or describes the name of an element, not the name of an element that actually constitutes an invention. It is inefficient to transmit all of such data to the element management unit 104 and to manage the data as elements. Accordingly, the element extraction unit 132 may provide a user with an "element selection screen" so that the user can select data to be managed as an element.

The screen configuration unit 101 may configure an element selection screen, and may provide a user with the element selection screen if the user stores original data on the original data edit screen or when a preset event occurs in the patent document drafting screen. The element selection screen may be provided as an independent web page, may be provided as some regions of a web page, may be provided as a region hidable or foldable in a web page, or may be provided as a pop-up page or window.

The element selection screen may include a candidate element region and a storage element region. An element extracted by the element extraction unit 132 may be displayed in the candidate element region, and an element selected in the candidate element region may be displayed in the storage element region. The element extraction unit 132 may basically output a string, extracted as an element name, to the candidate element region, and may further display one or more of a corresponding reference numeral string and the number of times that the extracted string appears in the original data, along with the output of the extracted string.

When a user selects one or more of data displayed in the candidate element region or generates an event to move the data to the storage element region after selecting the data, the selected data may be moved to and displayed in the storage element region without any change. In contrast, when a user selects one or more of data displayed in the storage element region or generates an event to move the data to the candidate element region after selecting the data, the selected data may be moved to and displayed in the candidate element region without any change.

The element selection screen may include a UT, such as a button for generating an event for transmitting, to the element management unit 104, data included in the storage element region and registering the data as an element. When a user generates a corresponding event, the element extraction unit 132 may transmit, to the element management unit 104, the data included in the storage element region. In this case, the element extraction unit 132 may basically transmit, to the element management unit 104, a string corresponding to the name of an element, and may transmit, to the element management unit 104, the string along with a corresponding reference numeral string if the reference numeral string is present.

Through such a method, a user can conveniently select an element that will be managed by the element management unit 104 and that will be easily translated, among elements extracted by the element extraction unit 132, and can register the elements with the element management unit 104 en bloc.

In this case, the element extraction unit 132 may register translations of the extracted elements with the element management unit 104 as element information. Specifically, the element extraction unit 132 may directly search a first translation storage unit 172, a second translation storage unit 174, a translation vocabulary storage unit 175, etc. for the translations of the extracted elements, or may search for the translations of the extracted elements through the first translation example search unit 134, the second translation example search unit 135, or the machine translation provision unit 136, and may store, as element information, translation corresponding to the extracted element in the element management unit 104 if the translation is present.

Meanwhile, the element selection screen may be invoked on the patent document drafting screen. In this case, the storage element region may include elements already selected and managed by the element management unit 104. In this case, if a user moves any one element from the storage element region to the candidate element region and stores the moved element, the element may be deleted from an element managed by the element management unit 104.

Original data, that is, a translation target, is displayed on the patent document drafting screen. A UI for inputting translation data of the original data is provided on the patent document drafting screen. As in the present embodiment, if translation data are input in a sentence unit, original data may be dividedly displayed in an original sentence data unit generated by the original data management unit 131. In the second service, the element management unit 104 may manage the name of an element and a corresponding translation as information of an element. In this case, the name of the element may be part of original data. That is, the original data displayed on the patent document drafting screen may include the name of an element managed by the element management unit 104. Hereinafter, the name of an element included as part of original data will be referred to as "element display."

The element display change unit 133 may change, into corresponding translation, element display for original data displayed on the patent document drafting screen, or may change changed translation into element display. Hereinafter, to change element display into corresponding translation as part of original data and to display the element will be referred to as "translation indication." That is, the element display change unit 133 may mutually change element display and translation indication in the patent document drafting screen.

A UI, such as a button for generating an event for mutually changing element display and translation indication by the element display change unit 133, may be provided on the patent document drafting screen. For example, the button for generating a change event may be a toggle button for indicating a current state and also enabling a user to clearly recognize a state change.

When a change event occurs, the element display change unit 133 determines whether original data output to the patent document drafting screen includes element display or translation indication. If the original data includes element display or translation indication, the element display change unit 133 may search the element management unit 104 for translation of a corresponding element or the name of the element, and may change element display or translation indication, included in the original data, into the translation of the element or the name of the element. In some embodiments, the element display change unit 133 may previously search the element management unit 104 for translation of an element or the name of the element, may store the translation of the element or the name of the element in a variable, and may then use the variable.

In this case, the element display change unit 133 may assign a format to the element display or the translation indication so that the element display or the translation indication is recognized differently from another text portion of the original data including the element display or the translation indication, and may display the element display or the translation indication on a screen. For example, the element display or the translation indication may be output in a font having a color different from that of another text portion of the original data.

In some embodiments, the element display change unit 133 may provide a function for a change into original-translation simultaneous indication in which the name of an element and corresponding translation are output together, in addition to a mutual change between element display and translation indication.

A user can more conveniently perform translation business by allowing element display or translation indication, based on a language more proficiently used by him or her, to be displayed as original data through the element display change unit 133.

The patent document drafting screen is provided to show original data to a user in a translation unit and to enable the user to input corresponding translation data. In this case, the patent document drafting screen may provide a translation example so that the user can translate original data with reference to translation results similar to the original data to be translated. The provided translation example may be provided to correspond to the translation unit applied to the patent document drafting screen. In the present embodiment, the patent document drafting screen may provide original sentence data so that translation is performed in a sentence unit, and may provide a translation example in a sentence unit.

The translation example may include a first translation example, that is, translation results of original data being processed, and a second translation example, that is, translation results of another patent document. Each of the first translation example and the second translation example is composed of a pair of original data and corresponding translation data. The first translation example and the second translation example may be stored and managed in one or more of the database 140 and the database 240. In some embodiments, the second translation example may be provided by a third party, and may be provided to the apparatus for drafting a patent document 10 through the external service interoperation unit 111. The first translation example and the second translation example may be managed as data of a translation unit in the database 140 and the database 240. For example, original data and translation data included in the first translation example and the second translation example may be generated in a sentence unit and stored in one row of one table so that they are matched, or may be stored in different tables, but may be stored to have corresponding key values.

The patent document drafting screen may provide one or more of the first translation example and the second translation example in response to a request from a user. To this end, the patent document drafting screen may include one or more of a first translation example display region in which the first translation example is displayed and a second translation example display region in which the second translation example is displayed. In some embodiments, the first translation example display region may be one changed from a translation result display region to be described later. In the present embodiment, an example is described in which the patent document drafting screen provides both the first translation example and the second translation example.

UIs, such as a first translation example search button for generating an event to request the display of the first translation example similar to original data to be translated by a user and a second translation example search button for generating an event to request the display of the second translation example, may be provided on the patent document drafting screen. The first translation example search button and the second translation example search button may be provided for each original sentence data provided in a translation unit. The results of search of a translation example based on corresponding original sentence data when the button is clicked on may be output to the first translation example display region and the second translation example display region. The hide or display states of the first translation example display region and the second display region may be changed in response to clicking on the first translation example search button and the second translation example search button.

The first translation example search unit 134 may search for a first translation example including original data similar to original data for which a user has requested a search, and may provide the user with the first translation example. The data requested by the user and the first translation example corresponding to the data may be set in a translation unit. That is, in the present embodiment, the first translation example search unit 134 may search for similar data in a sentence unit, and may provide the results of the search and corresponding translation data in a sentence unit. For example, the first translation example search unit 134 may search original data, stored in a first original storage unit 171 to be described later, for data similar to original data for which a user has requested a search, may load translation data, corresponding to the original data determined to be similar, from a first translation storage unit 172 to be described later, and may output the translation data to the first translation example display region. If translation data corresponding to the original data determined to be similar is not present, the first translation example search unit 134 may output only the original data determined to be similar.

Whether original data for which a user has requested a search and the original data of a first translation example are similar may be determined based on a result of a comparison for the entire translation units. In other words, in the present embodiment, the first translation example search unit 134 may determine whether the original data for which the user has requested a search and the original data of the first translation example are similar by generally comparing a sentence for which the user has requested a search and a sentence stored as the first translation example.

The second translation example search unit 135 may search for a second translation example including original data similar to original data for which a user has requested a search, and may provide the second translation example to the user. The data requested by the user and the second translation example corresponding to the data may be set in a translation unit. That is, in the present embodiment, the second translation example search unit 135 may search for similar data in a sentence unit and provide the results of the search and corresponding translation data in a sentence unit. For example, the second translation example search unit 135 may search original data, stored in a second original storage unit 173 to be described later, for data similar to original data for which a user has requested a search, may load translation data, corresponding to the original data determined to be similar, from a second translation storage unit 174 to be described later, and may output the translation data to the second translation example display region.

Whether original data for which a user has requested a search and the original data of a second translation example are similar may be determined based on a result of a comparison for the entire translation unit. In other words, in the present embodiment, the second translation example search unit 135 may determine whether the original data for which the user has requested a search and the original data of the second translation example are similar by generally comparing a sentence for which the user has requested a search and a sentence stored as the second translation example.

The first translation example search unit 134 and the second translation example search unit 135 may digitize similarity between two data, that is, comparison targets, and may determine that the two data are similar if the similarity belongs to a preset range. For example, the similarity may be calculated based on the number of identical characters, the number of identical words, etc. between two original sentence data, or may be calculated using an edit distance.

Furthermore, the similarity may be calculated based on natural language processing. For example, the first translation example search unit 134 and the second translation example search unit 135 may determine the similarity using a statistical language model (SLM), such as N-gram, or using a count-based word representation, such as a document-term matrix or a term frequency-inverse document frequency (TF-IDF).

Furthermore, the similarity may be calculated using results trained based on a machine learning or deep learning model for natural language processing. For example, the first translation example search unit 134 and the second translation example search unit 135 may use results trained using a model, such as a recurrent neural network (RNN), a long short-term memory), or a gate recurrent unit (GRU).

Furthermore, the similarity may be calculated using word embedding in which words are expressed in a dense vector form and an embedding vector, that is, the results of the word embedding. For example, the first translation example search unit 134 and the second translation example search unit 135 may generate an embedding vector (understood to include data calculated from the embedding vector in order to determine similarity) for each word and sentence through a word embedding model, such as Word2Vec or FastText, and may determine whether two sentences, that is, comparison targets, are similar, using a cosine similarity value, calculated based on the embedding vector, as a similarity value.

In this case, the embedding vector of the original data or the translation data belonging to the first translation example and the second translation example may be stored along with corresponding data in the first original storage unit 171, the first translation storage unit 172, the second original storage unit 173, and the second translation storage unit 174. In this case, when determining the similarity, the first translation example search unit 134 and the second translation example search unit 135 may load and use only the embedding vector, not the original data or the translation data. Accordingly, the time taken to determine the similarity can be reduced. Specifically, when a translation example search request event occurs, the first translation example search unit 134 and the second translation example search unit 135 may generate the embedding vector of data for which a user wants a search, may compare the generated embedding vector with the embedding vector of a previously calculated translation example, and may extract a translation example having high similarity.

The similarity may be calculated using Euclidean similarity, Jaccard similarity, Manhattan similarity, etc., in addition to the aforementioned cosine similarity.

Meanwhile, the first translation example search unit 134 and the second translation example search unit 135 may use different similar data determination methods. For example, the first translation example search unit 134 may determine a similar sentence based on a similarity value calculated using the simple N-gram. The second translation example search unit 135 may determine a similar sentence based on a cosine similarity value based on an embedding vector generated using word embedding. Furthermore, the first translation example search unit 134 and the second translation example search unit 135 may use the same similar data determination method, but a detailed variable value may be differently applied thereto. For example, both the first translation example search unit 134 and the second translation example search unit 135 may calculate similarity using the N-gram, but the first translation example search unit 134 may calculate the similarity based on 2 characters and the second translation example search unit 135 may calculate the similarity based on 3 characters.

Furthermore, the first translation example search unit 134 and the second translation example search unit 135 may mix and use a plurality of similarity calculation methods. For example, the first translation example search unit 134 and the second translation example search unit 135 may use a method of applying priority to a plurality of similarity calculation methods or summing and aligning similarities.

The first translation example search unit 134 and the second translation example search unit 135 may output, to the first translation example display region and second translation example display region of the patent document drafting screen, a first translation example and a second translation example searched through the aforementioned similarity determination.

Similar to the aforementioned provision of the translation example, the patent document drafting screen may provide machine translation results of original data in response to a request from a user. To this end, the patent document drafting screen may include a machine translation display region in which the machine translation results are displayed.

A UI, such as a machine translation button for generating an event for a user to request machine translation results of original data to be translated, may be provided on the patent document drafting screen. The machine translation button may be provided for each original sentence data provided in a translation unit. When a button is clicked on, machine translation results based on corresponding original sentence data may be output to the machine translation display region. That is, the machine translation display region may be provided for each original sentence data. The hide or display state of the machine translation display region may be changed in response to clicking on the machine translation button.

The machine translation provision unit 136 may perform a machine translation of original data, requested by a user, into a target language to be translated, and may output the machine translation results to the machine translation display region. In this case, the machine translation provision unit 136 may treat, as the language of the original data, a second language received through the case management unit 103 or the original data management unit 131, and may perform the machine translation using a first language as the target translation language. The machine translation provision unit 136 may receive the original data in a translation unit, may perform the machine translation, and may provide the translated results in a translation unit.

The machine translation provision unit 136 may be a machine translation engine capable of independently performing machine translation, and may be an element for providing original data to a third party and receiving and providing the results of the original data. In the latter case, the machine translation provision unit 136 may operate in conjunction with the external service interoperation unit 111 or may independently use a machine translation service provided by a third party.

In the present embodiment, the elements of the processor 100 have been described to be included in the common processing unit 100a, the first processing unit 100b, and the second processing unit 100c, but the spirit of the present invention is not limited thereto. For example, an element included in the common processing unit 100a may be included in the first processing unit 100b or the second processing unit 100c according to embodiments. An element included in the first processing unit 100b or the second processing unit 100c may be included in the common processing unit 100a according to embodiments. Furthermore, an element included in the first processing unit 100*b* or the second processing unit 100*c* may be included in the second processing unit 100*c* or the first processing unit 100*b* according to embodiments. Furthermore, it may be understood that any one element is simultaneously included in two or more of the common processing unit 100*a*, the first processing unit 100*b*, and the second processing unit 100*c*.

Furthermore, the elements of the processor 100 are illustratively provided. The elements included in the processor 100 may be implemented as a new element by being physically and logically separated or integrated by a method which may be implemented as a program code. In this case, it may be understood that a new element performing the same function as a function performed by any one element of the processor 100 corresponds to the any one element.

Meanwhile, functions performed by the elements of the processor 100 of the apparatus for drafting a patent document 10 may also be performed by the processor 200 of the server for drafting a patent document 20. Specifically, the processor 200 of the server for drafting a patent document 20 may include a common processing unit 200*a*, a first processing unit 200*b*, and a second processing unit 200*c* which may correspond to the common processing unit 100*a*, first processing unit 100*b*, and second processing unit 100*c* of the apparatus for drafting a patent document 10, respectively. The common processing unit 200*a*, first processing unit 200*b*, and second processing unit 200*c* of the server for drafting a patent document 20 may have technical characteristics corresponding to those of the common processing unit 100*a*, first processing unit 100*b*, and second processing unit 100*c* of the apparatus for drafting a patent document 10.

Specifically, the common processing unit 200*a* of the server for drafting a patent document 20 may include one or more of a screen configuration unit 201, a data management unit 202, a case management unit 203, an element management unit 204, an auto-complete list generation unit 205, a text input component management unit 206, a drawing management unit 207, a requirement review unit 208, a download file generation unit 209, a setting management unit 210, an external service interoperation unit 211, a user management unit 212, a data communication unit 213, and a change management unit 214 which may correspond to the screen configuration unit 101, data management unit 102, case management unit 103, element management unit 104, auto-complete list generation unit 105, text input component management unit 106, drawing management unit 107, requirement review unit 108, download file generation unit 109, setting management unit 110, external service interoperation unit 111, user management unit 112, data communication unit 113 and change management unit 114 of the apparatus for drafting a patent document 10, respectively. Furthermore, the first processing unit 200*b* of the server for drafting a patent document 20 may include one or more of an idiomatic expression management unit 221, a claim input processing unit 222, an element description input processing unit 223, and a brief-description-of-drawing input processing unit 224 which may correspond to the idiomatic expression management unit 121, claim input processing unit 122, element description input processing unit 123 and brief-description-of-drawing input processing unit 124 of the apparatus for drafting a patent document 10, respectively. Furthermore, the second processing unit 200*c* of the server for drafting a patent document 20 may include one or more of an original data management unit 231, an element extraction unit 232, an element display change unit 233, a first translation example search unit 234, a second translation example search unit 235, and a machine translation provision unit 236 which may correspond to the original data management unit 131, element extraction unit 132, element display change unit 133, first translation example search unit 134, second translation example search unit 135, and machine translation provision unit 136 of the apparatus for drafting a patent document 10, respectively.

In this case, it is described in the aforementioned description of the elements of the processor 100 of the apparatus for drafting a patent document 10 that data is transmitted to the server for drafting a patent document 20 or that data is received and used from the server for drafting a patent document 20. Such a configuration may be understood as the configuration that a corresponding element of the processor 200 transmits data to the apparatus for drafting a patent document 10, receives data from the apparatus for drafting a patent document 10, or uses data stored in the server for drafting a patent document 20. Furthermore, it is described in the aforementioned description of the elements of the processor 100 of the apparatus for drafting a patent document 10 that data stored in the server for drafting a patent document 20 is used. Such a configuration may be understood as the configuration that a corresponding element of the processor 200 receives and uses data stored in the apparatus for drafting a patent document 10 or uses data stored in the server for drafting a patent document 20.

Corresponding elements of the processor 100 of the apparatus for drafting a patent document 10 and the processor 200 of the server for drafting a patent document 20 may be provided to both the processor 100 of the apparatus for drafting a patent document 10 and the processor 200 of the server for drafting a patent document 20, and may be selectively provided to any one of the processor 100 of the apparatus for drafting a patent document 10 and the processor 200 of the server for drafting a patent document 20. If any one element is provided to both the processor 100 of the apparatus for drafting a patent document 10 and the processor 200 of the server for drafting a patent document 20, a function of the corresponding element may be performed in both the processor 100 of the apparatus for drafting a patent document 10 and the processor 200 of the server for drafting a patent document 20, and some functions thereof may be performed in the processor 100 of the apparatus for drafting a patent document 10 and other functions may be dividedly performed in the processor 200 of the server for drafting a patent document 20. For example, elements of the processor 100 of the apparatus for drafting a patent document 10 may perform a function for collecting data from the application for drafting a patent document or the patent document drafting screen, transmitting the data to a corresponding element of the processor 200 of the server for drafting a patent document 20, and outputting data, received from a corresponding element of the processor 200 of the server for drafting a patent document 20, to the application for drafting a patent document or the patent document drafting screen. Furthermore, elements of the processor 200 of the server for drafting a patent document 20 may perform a function performed by corresponding elements of the processor 100 of the apparatus for drafting a patent document 10 based on data received from the corresponding elements of the processor 100 of the apparatus for drafting a patent document 10, and may transmit the results of the execution to the corresponding elements of the processor 100 of the apparatus for drafting a patent document 10. In this case, the elements of the processor 200 of the server for drafting a patent document 20 may use the memory 24 and database 240 of the server for drafting a patent document 20 in addition to the memory 14 and database 140 of the apparatus for drafting a patent document 10 for data management.

Furthermore, any one element may be provided to only the processor 100 of the apparatus for drafting a patent document 10 or may be provided to only the processor 200 of the server for drafting a patent document 20. In this case, a corresponding element may independently perform its function. For example, an element provided to only one of the processor 100 of the apparatus for drafting a patent document 10 and the processor 200 of the server for drafting a patent document 20 may perform a data management and data processing function required by the corresponding element without data transmission to and data reception from another apparatus over the network 30.

An element provided to the processor 200 of the server for drafting a patent document 20 may receive data, necessary to perform its function, from the apparatus for drafting a patent document 10, and may process the data. For example, the processor 200 of the server for drafting a patent document 20 may receive data, input through the application for drafting a patent document or the patent document drafting screen, from the apparatus for drafting a patent document 10, and may process the data. Furthermore, an element provided to the processor 200 of the server for drafting a patent document 20 may be provided to a user through the application for drafting a patent document or the patent document drafting screen, or may transmit data, necessary to perform a function of the application for drafting a patent document or the patent document drafting screen, to the apparatus for drafting a patent document 10.

Data transmitted from the processor 100 of the apparatus for drafting a patent document 10 to the processor 200 of the server for drafting a patent document 20 may be data input through the application for drafting a patent document or the patent document drafting screen or data obtained by processing, by the processor 100 of the apparatus for drafting a patent document 10, the input data. Furthermore, the processor 100 of the apparatus for drafting a patent document 10 may transmit, to the processor 200 of the server for drafting a patent document 20, data stored in the memory 14 or data obtained by processing the stored data. Furthermore, the processor 100 of the apparatus for drafting a patent document 10 may provide data on the side of the apparatus for drafting a patent document 10, which is requested by the processor 200 of the server for drafting a patent document 20. Furthermore, the processor 100 of the apparatus for drafting a patent document 10 may provide the processor 200 of the server for drafting a patent document 20 with data received from a third party or data obtained by processing the received data. Furthermore, the processor 100 of the apparatus for drafting a patent document 10 may provide processor 200 of the server for drafting a patent document 20 with results obtained by synthetically processing such data.

Data transmitted from the processor 200 of the server for drafting a patent document 20 to the processor 100 of the apparatus for drafting a patent document 10 may be results obtained by processing or working, by the processor 200 of the server for drafting a patent document 20, data received from the processor 100 of the apparatus for drafting a patent document 10. Furthermore, the processor 200 of the server for drafting a patent document 20 may transmit, to the processor 100 of the apparatus for drafting a patent document 10, data stored in the memory 24 or data obtained by processing the stored data. Furthermore, the processor 200 of the server for drafting a patent document 20 may provide data on the side of the server for drafting a patent document 20, which is requested by the processor 100 of the apparatus for drafting a patent document 10. Furthermore, the processor 200 of the server for drafting a patent document 20 may provide the processor 100 of the apparatus for drafting a patent document 10 with data received from a third party or data obtained by processing the received data. Furthermore, the processor 200 of the server for drafting a patent document 20 may provide the processor 100 of the apparatus for drafting a patent document 10 with results obtained by synthetically processing such data.

Such transmission of data between the apparatus for drafting a patent document and the server for drafting a patent document 20 may be performed through the communication module 18 of the apparatus for drafting a patent document 10 and the communication module 28 of the server for drafting a patent document 20, and may be controlled by the data communication unit 113 of the apparatus for drafting a patent document 10 and the data communication unit 213 of the server for drafting a patent document 20. Furthermore, each of the elements transmit and receive data directly or using the data communication unit 113 of the apparatus for drafting a patent document 10 and the data communication unit 213 of the server for drafting a patent document 20.

Figure 4:
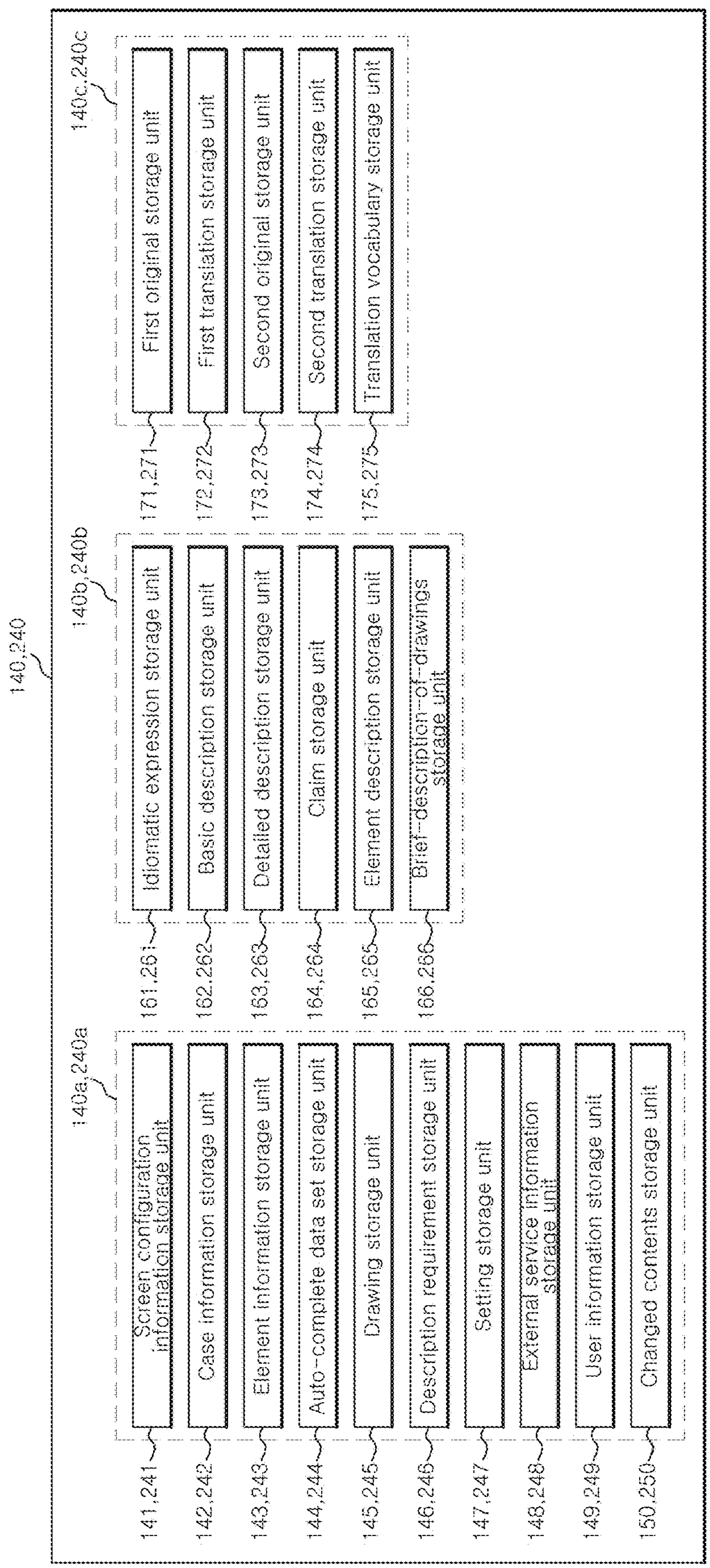
FIG. 4 is a diagram illustrating an example of the configurations of memories of the apparatus for drafting a patent document and the server for drafting a patent document in FIG. 2.

FIG. 4 is a diagram illustrating an example of the configurations of the memories of the apparatus for drafting a patent document and the server for drafting a patent document in FIG. 2.

Referring to FIG. 4, the database 140 may include a common storage unit 140*a* for managing data necessary in common for the first service and the second service, a first storage unit 140*b* for managing data for the first service, and a second storage unit 140*c* for managing data for the second service. In the present embodiment, the configuration of the database 140 is dividedly described as the common storage unit 140*a*, the first storage unit 140*b*, and the second storage unit 140*c*, but the spirit of the present invention is not limited to the common storage unit 140*a*, the first storage unit 140*b*, and the second storage unit 140*c* which are physically or logically separated and implemented. For example, the database 140 may be implemented as one integrated database without being divided into the common storage unit 140*a*, the first storage unit 140*b*, and the second storage unit 140*c*. Furthermore, in some embodiments, if the apparatus for drafting a patent document 10 provides only the first service or the second service, the second storage unit 140*c* or the first storage unit 140*b* may be omitted. In this case, the common storage unit 140*a* is not separately provided, and an element of the common storage unit 140*a* and elements of the first storage unit 140*b* or the second storage unit 140*c* may be implemented as one integrated database. Furthermore, it may be understood that the common storage unit 140*a*, the first storage unit 140*b*, and the second storage unit 140*c* are conceptually separated, and an element belonging to one of the common storage unit 140*a*, the first storage unit 140*b*, and the second storage unit 140*c* may be understood to be included in another set or may be understood to be redundantly included according to embodiments.

The database 140 and each of the elements of the database 140 may be implemented as a web DB as described above, and may perform a function for storing data, providing stored data, correcting stored data, or deleting stored data, in response to requests from the elements of the processor 100 of the apparatus for drafting a patent document 10 or the processor 200 of the server for drafting a patent document 20. However, the spirit of the present invention is not limited thereto, and another data repository, a file, etc. may be used as means for storing data.

Elements of the processor 100 described in the following description of the database 140 and the database 240 may be understood as corresponding elements of the processor 200 of the server for drafting a patent document 20. It may be understood that data for the elements are transmitted between the apparatus for drafting a patent document 10 and the server for drafting a patent document 20.

140*a* may include one or more of a screen configuration information storage unit 141, a case information storage unit 142, an element information storage unit 143, an auto-complete data set storage unit 144, a drawing storage unit 145, a description requirement storage unit 146, a setting storage unit 147, an external service information storage unit 148, a user information storage unit 149, and a change storage unit 150.

The screen configuration information storage unit 141 may store configuration information of a screen configured by the screen configuration unit 101, and may specifically store the structure and content of a screen configured by the screen configuration unit 101. It may be understood that the screen configuration information storage unit 141 may store all data necessary for the screen configuration unit 101 to configure a screen. A form in which the screen configuration information storage unit 141 store data does not limit the spirit of the present invention. For example, the screen configuration information storage unit 141 may be implemented as a web DB or part of a web DB as described above, and may include a file stored in the memory 14 and directly output through the application for drafting a patent document, part of the file, or contents stored in the file, or may include a file or resource to which reference may be made in a corresponding file. For example, the screen configuration information storage unit 141 may include a file, such as html, css, or JavaScript.

The screen configuration information storage unit 141 may include different pieces of screen configuration information depending on a service provided by the patent document drafting screen. For example, the screen configuration information storage unit 141 may include first screen configuration information for configuring the patent document drafting screen for the first service and second screen configuration information for configuring the patent document drafting screen for the second service. The first screen configuration information and the second screen configuration information may include several UT elements, including a UT element for the arrangement of one or more text input components for providing the respective services.

Furthermore, the screen configuration information storage unit 141 may include different pieces of screen configuration information depending on a language environment of a user who uses the application for drafting a patent document so that different screens are provided depending on the language environment of the user. Furthermore, the screen configuration information storage unit 141 may include screen configuration information according to a document format so that different screens are provided according to a document format among case information managed by the case management unit 103.

As a detailed example, the screen configuration information storage unit 141 may include data or a script file corresponding to each language so that a screen configuration for a user who uses Korean and a screen configuration for a user who uses English are different. The screen configuration unit 101 may load a corresponding data or script file from the screen configuration information storage unit 141 based on an environment of a user received from a web browser or a use language determined based on the environment, and may configure a screen. Furthermore, the screen configuration information storage unit 141 may include data or a script file for outputting patent document drafting screens corresponding to a Korean patent document format and a US patent document format, respectively. The screen configuration unit 101 may load a corresponding data or script file from the screen configuration information storage unit 141 based on information of a case input through the case management unit 103, and may configure a screen.

Meanwhile, a user may adjust a structure of a screen output through the application for drafting a patent document or may set or change the type of content, contents, a location, a form, etc. displayed on a screen. Data for the adjustment or setting or change may be stored in the screen configuration information storage unit 141, as environment variables for the application for drafting a patent document or the patent document drafting screen. For example, a user may change the display state of any one of a plurality of regions, provided on the patent document drafting screen, through the application for drafting a patent document. Such a display state may be written in the screen configuration information storage unit 141. Furthermore, when a user accesses the patent document drafting screen again in the future, the screen configuration unit 101 may configure a screen having the same structure as the existing screen based on data stored in the screen configuration information storage unit 141, and may provide the screen to the user.

The case information storage unit 142 may store case information managed by the case management unit 103. For example, the case information storage unit 142 may store, as information of a case, a management number, a case name, a deadline, a client, a technical field, a document format, a storage method, translation language information, etc. The case information stored in the case information storage unit 142 may be managed through the case management screen.

As described above, the screen configuration unit 101 may load a screen structure for each document format stored in the screen configuration information storage unit 141, based on a document format, that is, case information stored in the case information storage unit 142, and may configure the patent document drafting screen.

Furthermore, translation language information stored in the case information storage unit 142 may be used for the elements of 100*c* so that a proper translation service is performed. Specifically, first language information stored in the case information storage unit 142 may be used, as a language of a translation, in the first translation example search unit 134, the second translation example search unit 135, the machine translation provision unit 136, etc. Second language information stored in the case information storage unit 142 may be used, as a language of the original, in the original data management unit 131, the element extraction unit 132, the first translation example search unit 134, the second translation example search unit 135, the machine translation provision unit 136, etc. More specifically, the original data management unit 131 may differently apply a criterion for dividing original data in a translation unit, based on the second language information. The element extraction unit 132 may differently apply a criterion for extracting an element, based on the second language information. The first translation example search unit 134 and the second translation example search unit 135 may apply different similar sentence search algorithms or models based on the first language information and the second language information. The machine translation provision unit 136 may use corresponding machine translation engines based on the first language information and the second language information, or may transmit translation language information, along with original data, to a service provided by a third party.

The element information storage unit 143 may store information of an element managed by the element management unit 104. For example, the element information storage unit 143 may store a plurality of elements. Information of each of the elements may include the name of the element, an identification number corresponding to the element, translation of the element, the identification number of translation of the element, whether the element is used, the number of times that the element is used, etc. Furthermore, the element information storage unit 143 may set a unique key value for each element, and may manage a plurality of pieces of information related to one element, as one data set corresponding to a key value. The information of the element stored in the element information storage unit 143 may be managed through the element management screen.

The element information storage unit 143 may store independently information of an element for each case. For example, data stored in the element information storage unit 143 may have, as one identification value, a management number among case information. Accordingly, element information of different cases may be independently managed within the element information storage unit 143. Element information of any one case cannot be used for another case. Hereinafter, a characteristic that is independently stored or managed for each case as described above will be expressed as being "dependent on a case."

The auto-complete data set storage unit 144 may store a data set for generating an auto-complete list. The data set stored in the auto-complete data set storage unit 144 may be dependent on a case. As described above, a data set for auto-completion may include one or more auto-complete items. Each of the items may be generated based on a preset data source, for example, data provided by the element information storage unit 143 or an idiomatic expression storage unit 161 to be described later. If data of a data source is changed, the auto-complete data set storage unit 144 may automatically update a data set so that the data set corresponds to the changed data. The auto-complete list generation unit 105 may generate an auto-complete list, matched with text input by a user, from the data set stored in the auto-complete data set storage unit 144, and may provide the generated auto-complete list to the text input component management unit 106. For example, the auto-complete data set storage unit 144 may store an auto-complete data set, as part of a web DB, a file directly invoked through the application for drafting a patent document, part of the file, contents stored in the file, or a file or resource to which reference may be made in a corresponding file.

The drawing storage unit 145 may store one or more drawings managed by the drawing management unit 107. The drawing stored in the drawing storage unit 145 may be dependent on a case. The drawing storage unit 145 may directly store a drawing file, may store an access path through which a drawing file can be accessed, or may change a drawing file into a preset format and store the changed drawing file. Drawing information stored in the drawing storage unit 145 may be managed through the drawing management screen.

The description requirement storage unit 146 may store the description requirements which may be used by one or more of the requirement review unit 108 and the claim input processing unit 122. Required description requirements are differently set depending on a patent law regulated in each country as described above. The description requirement storage unit 146 may include the description requirements according to a document format so that a different criterion is applied according to the document format among case information managed by the case management unit 103. For example, the description requirement storage unit 146 may include, as data stored as the description requirements, the type of data that must be included in a patent application according to a document format, a correct description method for a brief description of drawings, a correct description method for a detailed description of the invention, a correct description method for a claim number and a quoted claim number, whether a reference numeral must be included in an element of a claim, whether multiple dependent claims are permitted, an expression unallowable when a claim is written, etc. Such description requirements may be stored in a web DB, and may be a file stored in the memory 14 and directly invoked through the application for drafting a patent document, part of the file or contents stored in the file, or may be a file or resource to which reference may be made in a corresponding file.

The description requirements stored in the description requirement storage unit 146 may be corrected by only an administrator of the system for drafting a patent document 1 or the server for drafting a patent document 20. For example, if description requirements must be changed according to the revision to a patent law of a specific country or a related legislations, the server for drafting a patent document 20 may transmit updated description requirement data to the requirement review unit 108. The requirement review unit 108 may change data, stored in the description requirement storage unit 146, into received new data, and may use the new data.

The setting storage unit 147 may store pieces of configuration information necessary in relation to patent document drafting through the application for drafting a patent document managed by the setting management unit 110. For example, the setting storage unit 147 may store the type of language used for an overall UI of the application for drafting a patent document, a design theme and text format applied to an overall UI of the application for drafting a patent document, the format of a download file, etc. At least some of the pieces of configuration information stored in the setting storage unit 147 may be managed through the setting management screen.

The external service information storage unit 148 may store information necessary for access to an external service, provided by a third party, so that the external service interoperation unit 111 can use the external service. For example, the external service information storage unit 148 may store information, such as an access path to an external service, authentication information necessary to use an external service, and variables necessary to use an external service.

The external service information stored in the external service information storage unit 148 may be corrected by only an administrator of the system for drafting a patent document 1 or the server for drafting a patent document 20. For example, if the URL of an API provided by a third party is changed, the server for drafting a patent document 20 may transmit the updated URL to the external service interoperation unit 111. The external service interoperation unit 111 may change data, stored in the external service information storage unit 148, into received new data, and may use the new data.

The user information storage unit 149 may store user information managed by the user management unit 112. The user information may include account information and use history information. The user management unit 112 may perform user login processing, session management, etc. based on information stored in the user information storage unit 149.

The change storage unit 150 may store changed contents managed by the change management unit 114. Specifically, the change storage unit 150 may store data at first timing, data at second timing, and a difference between the two data. As described above, the change storage unit 150 may divide the difference between the two data into added contents and deleted contents, and may store the contents, and may store the contents as text data to which a preset format has been applied. Data stored in the change storage unit 150 may be dependent on a case.

140*b* may include one or more of the idiomatic expression storage unit 161, a basic description storage unit 162, a detailed description storage unit 163, a claim storage unit 164, an element description storage unit 165, and a brief-description-of-drawings storage unit 166.

The idiomatic expression storage unit 161 may store idiomatic expressions managed by the idiomatic expression management unit 121. As described above, the idiomatic expression may include both an idiom word and an idiomatic phrase. The idiomatic expression storage unit 161 may assign distinguishable identification codes to an idiom word and an idiomatic phrase, and may store the idiom word and the idiomatic phrase. The idiomatic phrase stored in the idiomatic expression storage unit 161, as described above, may include a replacement portion. In this case, a separate identification code may be assigned to the idiomatic phrase including the replacement portion. The idiomatic expression stored in the idiomatic expression storage unit 161 may be managed through the idiomatic expression management screen. In some embodiments, the idiomatic expression storage unit 161 may be configured by being divided into an idiom word storage unit for storing idiom words and an idiomatic phrase storage unit for storing idiomatic phrases. Accordingly, the idiomatic expression management screen may be divided and provided.

In the present embodiment, the idiomatic expression storage unit 161 is described as one element of 140*b*. However, in some embodiments, the application for drafting a patent document may be configured so that idiomatic expressions are also used in the second service. In this case, the idiomatic expression storage unit 161 may be provided as one element of the common storage unit 140*a* or the second storage unit 140*c*.

In some embodiments, data stored in the idiomatic expression storage unit 161 may dependent on a case.

The basic description storage unit 162 may store data related to other items except contents corresponding to a detailed description of the invention, the claims, and a brief description of drawings, among items that constitute a patent specification. Hereinafter, other items except contents corresponding to a detailed description of the invention, the claims, and a brief description of drawings, among items that constitute a patent specification, will be referred to as a "basic description". For example, the basic description may include the title of an invention, a background art, problems to be solved, effects of the invention, an abstract, means for solving problems, etc. However, the spirit of the present invention is not limited thereto, and items included in the basic description may be differently configured depending on a document format, the setting of the system for drafting a patent document 1, or the setting of a user. Furthermore, the basic description storage unit 162 may be divided and configured into storage units based on sub-items included in the basic description.

Data stored in the basic description storage unit 162 may be configured to be dependent on a case. The basic description storage unit 162 may store data input to a text input component provided on the patent document drafting screen in order to input a basic item. Data stored in the basic description storage unit 162 may be updated in real time as a user inputs or edits data through a text input component in the patent document drafting screen. The patent document drafting screen may include one or more text input components corresponding to basic items, respectively. The basic description storage unit 162 may store data by assigning a corresponding identification code to each of the text input components, and may store data which can be distinguished for each item.

The detailed description storage unit 163 may store the contents of an item corresponding to a detailed description of the invention, among items that constitute a patent specification. Hereinafter, contents corresponding to a detailed description of an invention, among items that constitute a patent specification, will be referred to as the "detailed description." Data stored in the detailed description storage unit 163 may be configured to be dependent on a case. The detailed description storage unit 163 may store data input to a text input component provided on the patent document drafting screen in order to input a detailed description. Data stored in the detailed description storage unit 163 may be updated in real time as a user inputs or edits data through a text input component in the patent document drafting screen. One or more text input components corresponding to a detailed description may be provided on the patent document drafting screen. If a plurality of text input components is provided, the detailed description storage unit 163 may store data by assigning a corresponding identification code to each of the text input components.

The claim storage unit 164 may store one or more claim data that constitute the claims, among items that constitute a patent specification. The claim data may include a claim number, the type of claim, a quoted claim number, the category of an invention, and a description of an element. Such data may be input to the claim number input component, the claim type input component, the quoted claim input component, the category input component, the element description input component, etc. included in the claim drafting screen.

Data stored in the claim storage unit 164 may be configured to be dependent on a case. The claim storage unit 164 may store data input to each input component provided on the claim drafting screen. Data stored in the claim storage unit 164 may be updated in real time as a user inputs or edits data through each input component in the claim drafting screen. The claim storage unit 164 may store data by assigning a corresponding identification code to each input component, and may separately store the data for each claim.

The element description storage unit 165 may store a description of an element managed by the element description input processing unit 123. The description of an element may be configured with a plurality of preset subjects. For example, the preset subject may include the definition of an element, an organic coupling relation with another element, a function of the element, an action of the element, an effect of the element, and a detailed embodiment of the element. Such data may be input to the text input component provided on the element description drafting screen. Data stored in the element description storage unit 165 may be managed through the element description drafting screen. Furthermore, the element description storage unit 165 may store an explanation on an element generated by the element description input processing unit 123 or input through the element description drafting screen.

Data stored in the element description storage unit 165 may be configured to be dependent on a case. The element description storage unit 165 may store data input to each text input component provided on the element description drafting screen. Data stored in the element description storage unit 165 may be updated in real time as a user inputs or edits data through each text input component in the element description drafting screen. The element description storage unit 165 may store data by assigning a corresponding identification code to each text input component, and may separately store data for each element. In this case, information of an element stored in the element description storage unit 165 may correspond to information stored by the element information storage unit 143.

The brief-description-of-drawings storage unit 166 may store data that constitutes a brief description of drawings, among items that constitute a patent specification. In the brief-description-of-drawing drafting screen, the reference numeral text input component and the drawing description text input component may be provided in the unit of the drawing information input unit. Data stored in the brief-description-of-drawings storage unit 166 may also be formed in the unit of a drawing or in the unit of the drawing information input unit. Furthermore, the brief-description-of-drawings storage unit 166 may store completed sentence information generated based on data input to the reference numeral text input component and the drawing description text input component.

Data stored in the brief-description-of-drawings storage unit 166 may be configured to be dependent on a case. The brief-description-of-drawings storage unit 166 may store data input to each text input component provided on the brief-description-of-drawing drafting screen. Data stored in the brief-description-of-drawings storage unit 166 may be updated in real time as a user inputs or edits data through each text input component in the brief-description-of-drawing drafting screen. The brief-description-of-drawings storage unit 166 may store data by assigning a corresponding identification code to each text input component, and may separately store data for each drawing or each drawing information input unit.

140*c* may include one or more of the first original storage unit 171, the first translation storage unit 172, the second original storage unit 173, the second translation storage unit 174, and the translation vocabulary storage unit 175.

The first original storage unit 171 may store original data generated by the original data management unit 131. The first translation storage unit 172 may store translation data input as translation of original data through the patent document drafting screen. Data stored in the first original storage unit 171 and the first translation storage unit 172 may be configured to be dependent on a case. The first original storage unit 171 and the first translation storage unit 172 may dividedly store original data and translation data in a translation unit. For example, the first original storage unit 171 and the first translation storage unit 172 store data in a sentence unit, and may store a unique identification value, assigned to each sentence, along with original sentence data.

Data stored in the first original storage unit 171 and the first translation storage unit 172 may be updated in real time as a user inputs or edits data through each text input component in the patent document drafting screen. Specifically, the patent document drafting screen may provide the text input component for original data in a translation unit, and may include the text input component for receiving corresponding translation data. The first original storage unit 171 and the first translation storage unit 172 may store the aforementioned identification value along with data input to a pair of text input components corresponding to each other.

In the present embodiment, an example is described in which both the first original storage unit 171 and the first translation storage unit 172 are provided to the database 140, but the spirit of the present invention is not limited thereto. For example, original data and translation data may be stored in the database 240 of the server for drafting a patent document 20 or may be dividedly provided to the database 140 of the apparatus for drafting a patent document and the database 240 of the server for drafting a patent document 20.

The second original storage unit 173 may store original data of another patent document which may be used as a translation example. The second translation storage unit 174 may store corresponding translation data of the another patent document. Data stored in the second original storage unit 173 and the second translation storage unit 174 may be generated by using, as original data, a patent document actually filed in a second language, and may be generated using, as translation data, a patent document applied based on a translation of the patent document into a first language. The second original storage unit 173 and the second translation storage unit 174 may share a key value so that original data and translation data corresponding to each other are matched. One or more of the second original storage unit 173 and the second translation storage unit 174 may store information on a patent document applied in a second language, that is, source information of corresponding data, and information on a patent document applied in a first language. An application number, a publication number, a registration number, an applicant, a language used, an application country, whether an international application has been applied, etc. may be used as the information on the patent document.

Like the first original storage unit 171 and the first translation storage unit 172, the second original storage unit 173 and the second translation storage unit 174 may dividedly store original data and translation data in a translation unit. A key value that matches each original data and each translation data as described above may be set.

Meanwhile, each of the second original storage unit 173 and the second translation storage unit 174 may further include a separate table in which original data and translation data are processed and stored so that each original data and each translation data can be rapidly searched for. For example, each of the second original storage unit 173 and the second translation storage unit 174 may include an inverted index table generated based on original data and translation data each separated for each sentence.

Furthermore, the second original storage unit 173 and the second translation storage unit 174 may store the aforementioned embedding vector along original data and translation data so that a similarity comparison between each original data and each translation data can be rapidly performed.

Meanwhile, the second original storage unit 173 and the second translation storage unit 174 may be provided in the database 240 of the server for drafting a patent document 20, not in the database 140, or may be dividedly provided in the database 140 of the apparatus for drafting a patent document 10 and the database 240 of the server for drafting a patent document 20.

The translation vocabulary storage unit 175 may store translation vocabulary data in order to enable a user to refer to a translation example for a word or a specific expression, like a dictionary, when performing translation. The translation vocabulary data may be configured to be matched between languages supported by the application for drafting a patent document. Original data and translation data may be matched and stored in one table. For example, if the application for drafting a patent document supports Korean, English, Japanese, and Chinese services, a translation vocabulary may be configured to correspond to each of Korean-English, Korean-Japanese, Korean-Chinese, English-Japanese, English-Chinese, and Japanese-Chinese. The patent document drafting screen may include a vocabulary management screen on which a user or an administrator may add a new word or correct a previously input word, and data stored in the translation vocabulary storage unit 175 can be managed through the vocabulary management screen. In this case, the vocabulary management screen may provide a function for enabling a user to upload a large amount of translation data as data of the translation vocabulary storage unit 175.

In the present embodiment, the aforementioned elements of the database 140 have been described to be included in the common storage unit 140*a*, the first storage unit 140*b*, and the second storage unit 140*c*, but the spirit of the present invention is not limited thereto. For example, an element included in the common storage unit 140*a* may be included in the first storage unit 140*b* or the second storage unit 140*c* according to embodiments. An element included in the first storage unit 140*b* or the second storage unit 140*c* may be included in the common storage unit 140 an according to embodiments. Furthermore, an element included in the first storage unit 140*b* or the second storage unit 140*c* may be included in the second storage unit 140*c* or the first storage unit 140*b* according to embodiments. Furthermore, it may be understood that any one element is simultaneously included in two or more of the common storage unit 140*a*, the first storage unit 140*b*, and the second storage unit 140*c*.

Furthermore, the aforementioned elements of the database 140 have been illustratively provided. The elements included in the database 140 may be physically and logically separated and integrated as an element of the memory 14, and may be implemented as a new element. In this case, it may be understood that the new element performing the same function as a function performed by any one element of the database 140 corresponds to the any one element.

Meanwhile, data stored by the aforementioned elements of the database 140 of the apparatus for drafting a patent document 10 may be stored in the database 240 of the server for drafting a patent document 20. Specifically, the database 240 of the server for drafting a patent document 20 may include a common storage unit 240*a*, a first storage unit 240*b*, and a second storage unit 240*c* which may correspond to the common storage unit 140*a*, first storage unit 140*b*, and second storage unit 140*c* of the apparatus for drafting a patent document 10, respectively. The common storage unit 240*a*, first storage unit 240*b*, and second storage unit 240*c* of the server for drafting a patent document 20 may have technical characteristics corresponding to the common storage unit 140*a*, first storage unit 140*b*, and second storage unit 140*c* of the apparatus for drafting a patent document 10.

Specifically, the common storage unit 240*a* of the server for drafting a patent document 20 may include one or more of a screen configuration information storage unit 241, a case information storage unit 242, an element information storage unit 243, an auto-complete data set storage unit 244, a drawing storage unit 245, a description requirement storage unit 246, a setting storage unit 247, an external service information storage unit 248, a user information storage unit 249, and a change storage unit 250 which may correspond to the screen configuration information storage unit 141, case information storage unit 142, element information storage unit 143, auto-complete data set storage unit 144, drawing storage unit 145, description requirement storage unit 146, setting storage unit 147, external service information storage unit 148, user information storage unit 149, and change storage unit 150 of the apparatus for drafting a patent document 10, respectively. Furthermore, the first storage unit 240*b* of the server for drafting a patent document 20 may include one or more of an idiomatic expression storage unit 261, a basic description storage unit 262, a detailed description storage unit 263, a claim storage unit 264, an element description storage unit 265 and a brief-description-of-drawings storage unit 266 which may correspond to the idiomatic expression storage unit 161, basic description storage unit 162, detailed description storage unit 163, claim storage unit 164, element description storage unit 165, and brief-description-of-drawings storage unit 166 of the apparatus for drafting a patent document 10, respectively. Furthermore, the second storage unit 240*c* of the server for drafting a patent document 20 may include one or more of a first original storage unit 271, a first translation storage unit 272, a second original storage unit 273, a second translation storage unit 274, and a translation vocabulary storage unit 275 which may correspond to the first original storage unit 171, first translation storage unit 172, second original storage unit 173, second translation storage unit 174, and translation vocabulary storage unit 175 of the apparatus for drafting a patent document 10, respectively.

Corresponding elements of the database 140 of the apparatus for drafting a patent document 10 and the database 240 of the server for drafting a patent document 20 may be provided in both the database 140 of the apparatus for drafting a patent document 10 and the database 240 of the server for drafting a patent document 20, and may be selectively provided in any one of the database 140 of the apparatus for drafting a patent document 10 and the database 240 of the server for drafting a patent document 20. If any one element is provided in both the database 140 of the apparatus for drafting a patent document 10 and the database 240 of the server for drafting a patent document 20, data stored in corresponding elements may be synchronized. That is, if any one data is changed, another data corresponding to the any one data may also be changed. Such a synchronization function may be performed by an element of the processor 100 of the apparatus for drafting a patent document 10 or the processor 200 of the server for drafting a patent document 20, which manages a corresponding repository. Furthermore, in some embodiments, some data may be stored in an element of the database 140 of the apparatus for drafting a patent document 10, and other data may be stored in a corresponding element of the database 240 of the server for drafting a patent document 20. For example, an idiom word used to generate an auto-complete list among idiomatic expressions may be stored and managed in the database 140 of the apparatus for drafting a patent document 10, and an idiomatic phrase may be stored and managed in the database 240 of the server for drafting a patent document 20.

Furthermore, any one element may be provided only in the database 140 of the apparatus for drafting a patent document 10 or may be provided only in the database 240 of the server for drafting a patent document 20. In this case, the element may independently store data. For example, data related to a document that is now being translated may be stored in the database 140 of the apparatus for drafting a patent document 10. A translation example related to another document, that is, already translated results may be stored in the database 240 of the server for drafting a patent document 20. In this case, to independently store data may be understood to store data in an element provided only in any one of the database 140 of the apparatus for drafting a patent document 10 and the database 240 of the server for drafting a patent document 20 and not to share the corresponding data with another apparatus over the network 30.

In the present embodiment, each function for drafting a patent document in the application for drafting a patent document may be performed by any one of the apparatus for drafting a patent document 10 and the server for drafting a patent document 20, may be simultaneously performed by the apparatus for drafting a patent document 10 and the server for drafting a patent document 20, or may be performed through interoperation between the apparatus for drafting a patent document 10 and the server for drafting a patent document 20 according to detailed embodiments. In other words, for an operation of the application for drafting a patent document in the apparatus for drafting a patent document 10, the aforementioned elements which may be included in the apparatus for drafting a patent document 10 and the server for drafting a patent document 20 may be properly selected or may be used in combination. A combination of the elements may be changed depending on the type of program of the application for drafting a patent document or a service provided by the application for drafting a patent document.

For example, the apparatus for drafting a patent document 10 and the server for drafting a patent document 20 may be configured so that the contents of a patent document which require confidentiality are processed within the apparatus for drafting a patent document 10 without being transmitted from the apparatus for drafting a patent document 10 to the server for drafting a patent document 20 over the network 30. Accordingly, it is possible to remove a danger of security attributable to the transmission of the contents of a patent document, which require confidentiality, over the network 30. In this case, the contents of a patent document which require confidentiality may include one or more of the title of an invention, a technical field, a background art, related document information, problems to be solved, means for solving problems, abstract, effects of the invention, a detailed description of the invention, the claims, a brief description of drawings, and the drawings. Such data may be understood to be dependent on a case. In this case, it may be understood that data which may be previously drafted and used as contents not dependent on a case, among idiomatic expressions or insertion strings, are excluded from the contents of a patent document which require confidentiality. Hereinafter, the contents of such a patent document which require confidentiality will be referred to as "security data."

Specifically, however, in the present embodiment, an example is described in which security data are stored in the element information storage unit 143, auto-complete data set storage unit 144, drawing storage unit 145, change storage unit 150, idiomatic expression storage unit 161, basic description storage unit 162, detailed description storage unit 163, claim storage unit 164, element description storage unit 165, brief-description-of-drawings storage unit 166, first original storage unit 171, and first translation storage unit 172 of the database 140, and the element management unit 104, the auto-complete list generation unit 105, the text input component management unit 106, the drawing management unit 107, the requirement review unit 108, the download file generation unit 109, the change management unit 114, the idiomatic expression management unit 121, the claim input processing unit 122, the element description input processing unit 123, the brief-description-of-drawing input processing unit 124, the original data management unit 131, the element extraction unit 132, the element display change unit 133, and the first translation example search unit 134 for managing the security data are provided to the processor 100 and operate in the apparatus for drafting a patent document 10.

However, such an embodiment should not be understood to exclude corresponding elements which may be provided to the server for drafting a patent document 20. Even in the present embodiment, the application for drafting a patent document may transmit and store data of the apparatus for drafting a patent document 10 to and in the server for drafting a patent document 20 in response to a request from a user and based on a setting value, or may transmit data of the apparatus for drafting a patent document 10 to the server for drafting a patent document 20 and then receive processed results. To this end, elements corresponding to the aforementioned elements provided to the apparatus for drafting a patent document 10 may be provided to the server for drafting a patent document 20. Furthermore, some idiomatic expressions which may be included as some of security data, but may be managed by the auto-complete list generation unit 105 or the idiomatic expression management unit 121 may be received from the server for drafting a patent document 20. The received data may be managed by the auto-complete data set storage unit 144 and idiomatic expression storage unit 161 of the apparatus for drafting a patent document 10.

Moreover, in the present embodiment, another data (hereinafter referred to as a "non-security data") other than security data, for example, screen configuration information, case information, various setting values, etc. may be stored in the database 240 of the server for drafting a patent document 20. To this end, corresponding elements provided to the apparatus for drafting a patent document 10 and the server for drafting a patent document 20 are described to operate in conjunction with each other. Likewise, such an embodiment should not be understood to exclude a corresponding element which may be provided to the apparatus for drafting a patent document 10. Even in the present embodiment, for rapid processing, the application for drafting a patent document may store, in the apparatus for drafting a patent document 10, some of data stored in the server for drafting a patent document 20, and may use the data stored in the apparatus for drafting a patent document 10. For example, data, such as case information or description requirements, may be stored and managed in the case information storage unit 242 or description requirement storage unit 246 provided in the server for drafting a patent document 20. However, the application for drafting a patent document may receive such information from the server for drafting a patent document 20, may store the information in the case information storage unit 142 or the description requirement storage unit 146, and may use the stored information. If data of the server for drafting a patent document 20 are updated, the application for drafting a patent document may update data, stored in the case information storage unit 142 or the description requirement storage unit 146, in accordance with the updated data, and may use the updated data.

In the present embodiment, more detailed contents related to an operation of elements of the apparatus for drafting a patent document 10 and the server for drafting a patent document 20 for the processing and management of security data and the processing and management of non-security data will be described later with reference to drawings illustrating screens of the application for drafting a patent document.

A combination of the aforementioned elements has been illustratively proposed, and may have a technical meaning in the present embodiment, but does not limit the spirit of the present invention.

Moreover, in the present embodiment, an example is described in which the application for drafting a patent document is provided as a web application. Accordingly, it may be understood that the elements of the apparatus for drafting a patent document 10 and the server for drafting a patent document 20 operate based on interoperation between an application capable of web browsing, such as a web browser, and a web server program. Accordingly, it may be understood that in corresponding elements of the apparatus for drafting a patent document 10 and the server for drafting a patent document 20, a corresponding element is dividedly provided in an application of the apparatus for drafting a patent document 10 and a server program of the server for drafting a patent document 20. Furthermore, corresponding elements of the apparatus for drafting a patent document 10 and the server for drafting a patent document 20 may be understood as one element. If corresponding elements of the apparatus for drafting a patent document 10 and the server for drafting a patent document 20 are understood as one element, the one element may be understood as an element of the system for drafting a patent document 1. Such understanding of the elements may be applied in common to all cases where the application for drafting a patent document operates in a client-server application program manner.

In another aspect, it may be understood that the application for drafting a patent document in the apparatus for drafting a patent document 10 loads one or more web pages capable of implementing any one element of the system for drafting a patent document 1 stored in the server for drafting a patent document 20. Some functions may be performed by the apparatus for drafting a patent document 10 and other some functions may be performed by the server for drafting a patent document 20, based on the contents of a loaded web page and a processing module assigned to a corresponding web page by the web server program. In this case, a physical, logical module performing a function assigned to the apparatus for drafting a patent document 10 may be understood as an element in the apparatus for drafting a patent document 10 of the corresponding element. A physical, logical module performing a function assigned to the server for drafting a patent document 20 may be understood as an element in the server for drafting a patent document 20 of the corresponding element.

In another aspect, the elements of the apparatus for drafting a patent document 10 may be understood as physical and logical modules of a front-end stage which are driven by a web page transmitted from the server for drafting a patent document 20 to an application capable of web browsing. The elements of the server for drafting a patent document 20 may be understood as physical and logical modules of a back-end stage which may operate on the web server program side based on data received from the apparatus for drafting a patent document 10 or data stored in the database 240.

As described above, in the present embodiment, an example is described in which the application for drafting a patent document is a web application. The elements of each of the apparatus for drafting a patent document 10 and the server for drafting a patent document 20 have been described as an example in which the elements are implemented as the web application, but the spirit of the present invention is not limited thereto. For example, the application for drafting a patent document may be driven in the apparatus for drafting a patent document 10, but may be a client-server application program capable of data communication with the server for drafting a patent document 20. In this case, it may be understood that the elements of each of the apparatus for drafting a patent document 10 and the server for drafting a patent document 20 are modified accordingly. For example, it may be understood that elements described to configure a web page or use the web browser-embedded database may configure a screen of an independently driven form-based application or may access a database in which such a program is independently provided and perform data processing. For another example, the application for drafting a patent document may be a program installed as an extension program of another piece of software and driven dependently on the another piece of software. As a detailed example, the application for drafting a patent document may be the add-in installation type program of "Word." For another example, the application for drafting a patent document may be a program which operates in a stand-alone manner and installed in the apparatus for drafting a patent document 10. In this case, all of the elements of the server for drafting a patent document 20 may be omitted, and the application for drafting a patent document may be driven by only the elements provided in the apparatus for drafting a patent document 10.

Hereinafter, an apparatus, method, computer program, computer-readable recording medium, server and system for drafting a patent document according to the present embodiment will be specifically described with reference to screens provided by the application for drafting a patent document in order to provide the first service and the second service. In the present embodiment, an example is described in which the application for drafting a patent document is provided as a web application as described above. It may be understood that a screen described below are output to a screen of a web browser through the display device of the input and output interface 19.

Furthermore, a screen described below may be a screen whose structure and contents are configured by the screen configuration unit 101 and which is output to a web browser. To this end, the screen configuration unit 101 may load a web page provided by the server for drafting a patent document 20, and may configure the structure and content of a screen based on contents of the loaded web page. In this case, the web page provided from the server for drafting a patent document 20 to the apparatus for drafting a patent document 10 may be a web page previously configured by the screen configuration unit 201 and stored in the memory 24. In some embodiments, contents provided from the server for drafting a patent document 20 to the apparatus for drafting a patent document 10 for a screen configuration may be a resource having another format and including information on a configuration of a screen. The screen configuration unit 101 may receive a corresponding resource from the server for drafting a patent document 20 and configure a screen. In this case, the resource including the information on a configuration of a screen may be previously downloaded to the apparatus for drafting a patent document 10 and stored in the memory 14. The screen configuration unit 101 may configure a screen based on the resource stored in the memory 14, and then may output the configured screen to a screen.

Furthermore, in the following description, it may be understood that a function provided by the application for drafting a patent document or a function provided by a screen output through the application for drafting a patent document is implemented by the aforementioned one or more elements of the apparatus for drafting a patent document 10 and the server for drafting a patent document 20, which perform a function corresponding to the function, although an element performing the function is not explicitly expressed.

Furthermore, in the following description, it may be understood that management, such as storage, correction and deletion, may be performed together on data or information, received by the application for drafting a patent document through a screen from a user, through the screen although an explicit description is not added.

Furthermore, in the following description, an element provided to a screen in order to receive data from a user or to collect information may include a proper input component suitable for characteristics of input data. An input component used on a screen does not limit the spirit of the present invention.

Furthermore, a technical characteristic, action and effect of an element briefly described in the following screen description, may be understood with reference to the aforementioned detailed contents of the elements of the apparatus for drafting a patent document and the server for drafting a patent document 20. Furthermore, a briefly described element may be understood with reference to a description of an element of another screen which may correspond to or operate similarly to the briefly described element.

Figure 5:
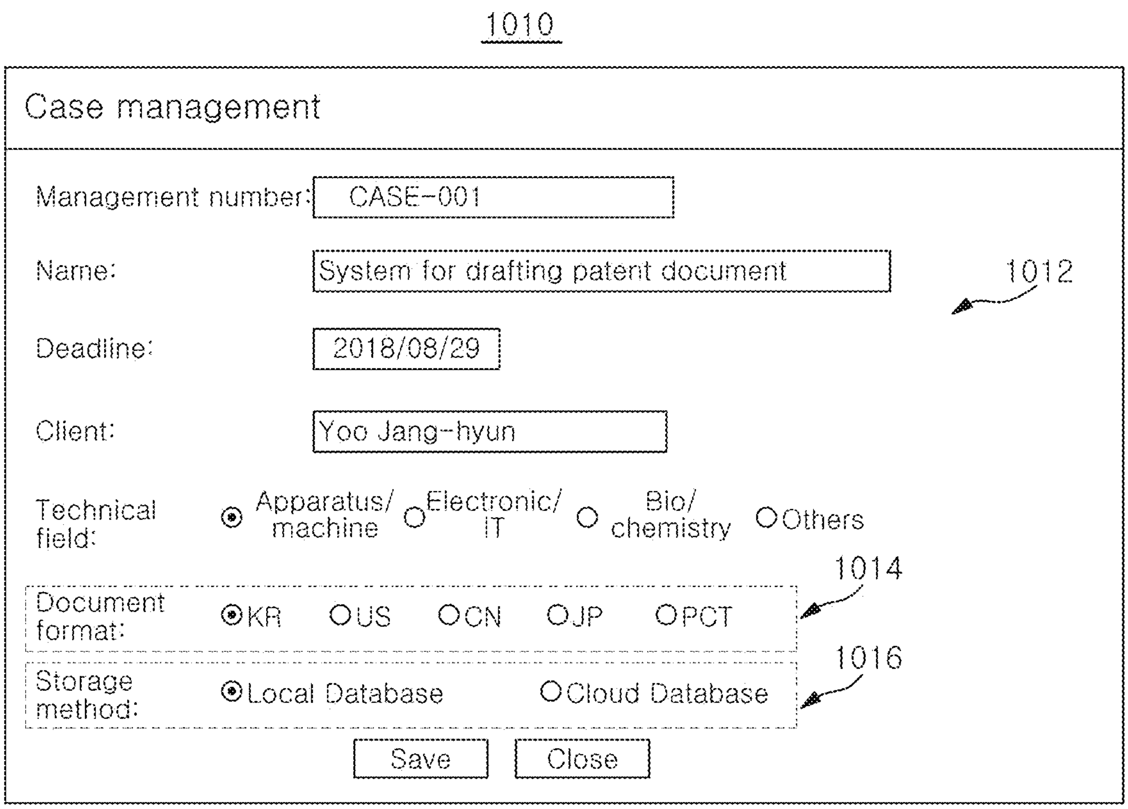
FIG. 5 is a diagram illustrating an example of a case management screen of an application for drafting a patent document for providing a first service according to an embodiment of the present invention.

FIG. 5 is a diagram illustrating an example of the case management screen of the application for drafting a patent document for providing the first service according to an embodiment of the present invention.

Referring to FIG. 5, the application for drafting a patent document may provide a user with a case management screen 1010 for generating and managing a case, as an object that drafts one patent specification, in order to provide the user with the first service for drafting the patent specification.

The case management screen 1010 may include a basic information input UI 1012 configured to receive basic information related to a case, such as a management number, a case name, a deadline, a client, and a technical field, from a user, a document format selection UI 1014 configured to enable a user to select a document format applied to a case, and a storage method selection UI 1016 configured to enable a user to select a location where information input in relation to a case will be stored.

In the present embodiment, an example is illustrated in which in the document format selection UI 1014, "KR", "US", "CN", "JP", "PCT", etc. are selected as document formats. It has been expressed that radio buttons are provided as input components and only any one of the buttons can be selected. A configuration of the patent document drafting screen, a criterion for a description requirement review, an idiomatic expression, setting, etc. may be differently applied based on a result of selection through the document format selection UI 1014. In the present embodiment, an example is described in which "KR" is selected in the document format selection UI 1014, that is, a patent specification to be applied to the Korean Intellectual Property Office (KIPO) is drafted.

Furthermore, in the present embodiment, an example is illustrated in which the storage method selection UI 1016 is configured as a radio button capable of selecting one of "Local Database" and "Cloud Database". A storage location of contents input as the contents of a patent document, in particular, security data, may be determined based on a result of selection through the storage method selection UI 1016. For example, when Local Database is selected in the storage method selection UI 1016, security data may be stored in elements provided in the database 140. When Cloud Database is selected in the storage method selection UI 1016, security data may be transmitted to the server for drafting a patent document 20 and stored in elements provided in the database 240. However, even in the latter case, security data may be stored in the database 140. Data stored in the database 140 and data stored in the database 240 may be synchronized by the data management unit 102, 202.

When a storage instruction is received from a user who has finished a data input, through a UI of the case management screen 1010, the case management unit 103 may transmit, to the server for drafting a patent document 20, the data input to the case management screen 1010. The case management unit 203 may store the received data in the case information storage unit 242. In this case, the case management unit 103 may verify the validity of the received data. The case management unit 203 may transmit the results of processing of the received data to the case management unit 103. The case management unit 103 may provide the results to the user, and may perform preset processing based on the results. For example, if case information is stored normally, the case management unit 103 may change a screen, output to the application for drafting a patent document, into the patent document drafting screen for providing the first service. In some embodiments, data input to the case management screen 1010 is not transmitted to the server for drafting a patent document 20, and may be managed only in the apparatus for drafting a patent document 10.

After a case is generated, the case management screen 1010 may be invoked again on the patent document drafting screen again. In this case, each input component may be provided in the state in which each input component has been filled with previously input case information. A user may correct case information based on the input case information. In this case, the document format selection UI 1014 may be provided in the state in which the document format cannot be corrected.

Figure 6:
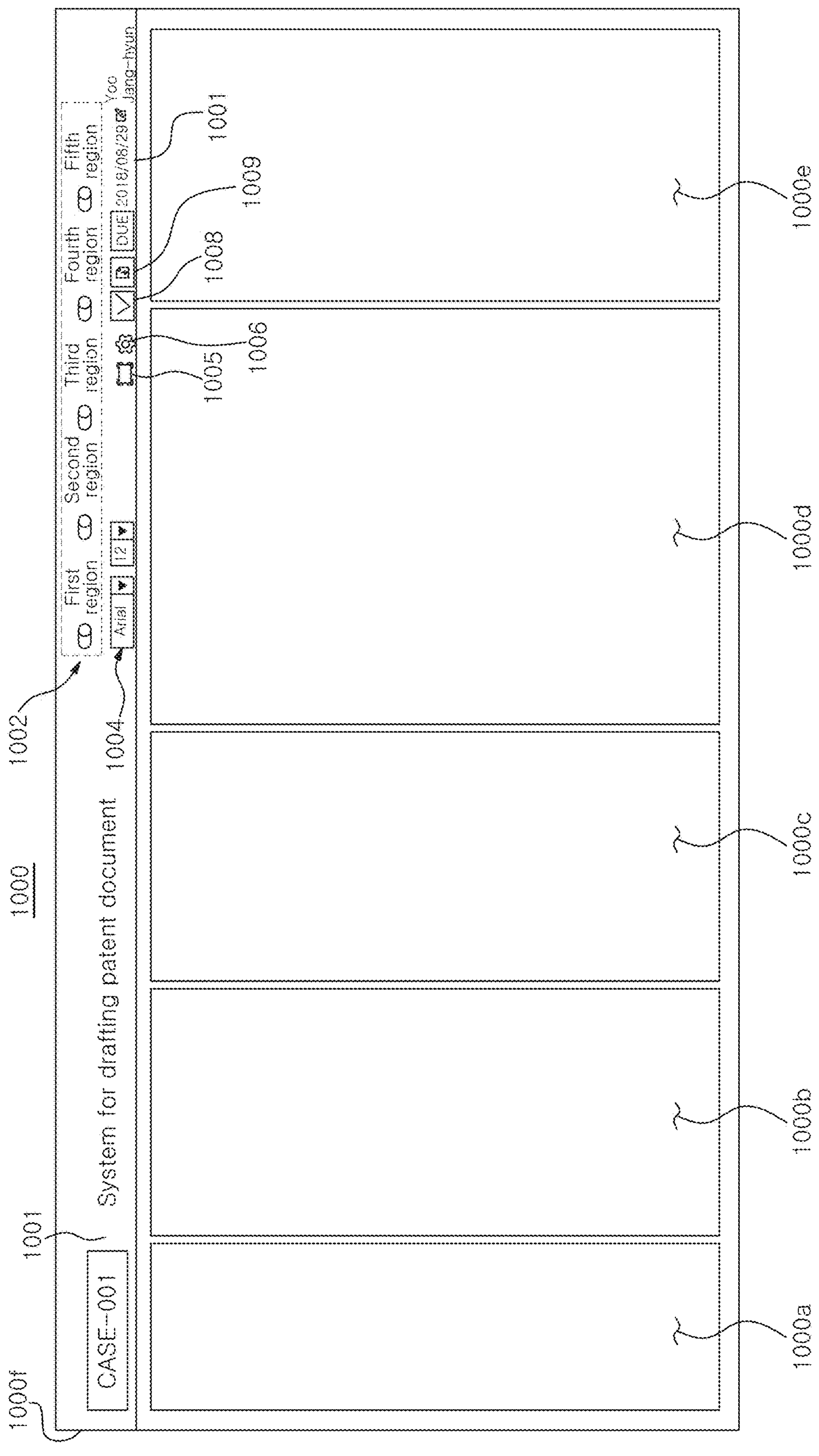
FIG. 6 is a diagram illustrating an example of a patent document drafting screen of the application for drafting a patent document in FIG. 5.

FIG. 6 is a diagram illustrating an example of a patent document drafting screen of the application for drafting a patent document in FIG. 5.

Referring to FIG. 6, a patent document drafting screen 1000 for the first service, output by the application for drafting a patent document, may be configured with a plurality of divided regions. A screen or preset content for providing the first service for drafting a patent specification may be positioned in each region. In some embodiments, it may be understood that the patent document drafting screen 1000 for the first service is configured with one region and a screen or content for providing the first service is positioned within the one region.

In the present embodiment, an example is described in which the patent document drafting screen 1000 for the first service includes a plurality of regions **1000*a*, 1000*b*, 1000*c*, 1000*d*, and 1000*e* transversely divided and a header region 1000*f* is provided on the upper side of the patent document drafting screen 1000**.

Specifically, the patent document drafting screen may include a first region 1000*a*, a second region 1000*b*, a third region 1000*c*, a fourth region 1000*d*, and a fifth region 1000*e* from the left of FIG. 6. In the present embodiment, an example is described in which an element management screen 1100 is positioned in the first region 1000*a*, a basic description drafting screen 1200 is positioned in the second region 1000*b*, a claims display screen 1400 is positioned in the third region 1000*c*, a detailed description drafting screen 1600 is positioned in the fourth region 1000*d*, and a drawing management screen 1700 is positioned in the fifth region 1000*e*. Each of the regions and detailed contents of a screen positioned within each region will be described later with reference to a drawing.

Information of a case input through the case management screen 1010 may be displayed on the header region 1000*f*. UIs for editing case information and setting an application for drafting a patent document or the patent document drafting screen may be disposed in the header region 1000*f*. For example, the header region 1000*f* may include a case information display region 1001 in which basic information related to a case, such as a management number, a case name, a deadline, and a client, are displayed. In this case, the case information display region 1001 may be distributed and disposed at a preset location within the header region 1000*f*.

Furthermore, a screen configuration setting UI 1002 for changing a configuration of the patent document drafting screen may be provided in the header region 1000*f*. Specifically, the screen configuration setting UI 1002 may control whether to display each of the plurality of regions 1000*a*, 1000*b*, 1000*c*, 1000*d*, and 1000*e*. For example, the screen configuration setting UI 1002 may include a toggle button for controlling whether to display each region. The screen configuration unit 101 may change whether to display a corresponding region based on a state of each toggle button. Moreover, if the display state of any one region is changed, the screen configuration unit 101 may automatically adjust the sizes of other regions in response to the change. FIG. 6 illustrates the state in which all of the 5 regions are displayed. For example, in this state, if a user changes a display state of the fifth region 1000*e* by adjusting the toggle button of the screen configuration setting UI 1002 corresponding to the fifth region 1000*e* in which the drawing management screen 1700 is positioned, the fifth region 1000*e* disappears from a screen, and the width of each of the remaining regions 1000*a*, 1000*b*, 1000*c*, and 1000*d* may be increased by a preset ratio.

Meanwhile, in some embodiments, the locations of the plurality of regions 1000*a*, 1000*b*, 1000*c*, 1000*d*, and 1000*e* may be changed. For example, each region may be implemented as an html object which may be dragged & dropped. If a user selects a region whose location is to be changed, drags the region, and drops the region at a desired location, the screen configuration unit 101 may change may collect corresponding information and change screen configuration information.

Furthermore, in some embodiments, the size of each of the plurality of regions 1000*a*, 1000*b*, 1000*c*, 1000*d*, and 1000*e* may be provided to be adjusted. For example, the boundary of each region may be implemented as an html object which may be dragged & dropped. If a user drags the boundary of a region whose size is to be adjusted, and drops the boundary at a desired location, the screen configuration unit 101 may collect corresponding information, and may change the sizes of regions disposed on both sides of the boundary.

Screen configuration information or arrangement information of regions or size information of regions controlled by the screen configuration setting UI 1002 may be stored and managed as setting values. In this case, use convenience can be improved because a user can previously set a preferred configuration of a screen.

The header region 1000*f* may include a UI displayed on the patent document drafting screen or a text format setting UI 1004 for adjusting the format of a text portion included in the contents of a patent document. The text format setting UI 1004 may be included in a setting management screen 1900 to be described later. As in the present embodiment, if the text format setting UI 1004 is provided in the header region 1000*f*, a user can more conveniently change a form of text displayed on the patent document drafting screen. FIG. 6 illustrates an example in which a UI for adjusting the font and size of text is provided as the text format setting UI 1004.

A screen control UI 1005 for fully displaying the patent document drafting screen on a display device may be provided in the header region 1000*f* as a function for improving use convenience. The screen control UI 1005 may be provided in a button form. When a user clicks on the screen control UI 1005, the screen configuration unit 101 may change a screen state to a full screen state from which a basic frame of the application for drafting a patent document has been removed or a default screen state in which the basic frame of the application for drafting a patent document is displayed.

A setting management screen invoking UI 1006 for invoking the setting management screen 1900 to be described later may be provided in the header region 1000*f*. The setting management screen invoking UI 1006 may be provided in a button form. When a user clicks on the setting management screen invoking UI, the setting management screen 1900 may be output in the form of a pop-up window or a modal window. In some embodiments, the setting management screen invoking UI 1006 may be provided in the header, main navi bar, sidebar, etc. of a full screen output to a web browser, not in the header region 1000*f*.

The header region 1000*f* may include a case completion processing UI 1008 for inputting a case completion instruction capable of deactivating a corresponding case after the drafting of a patent specification is completed. As illustrated in FIG. 6, the case completion processing UI 1008 may be provided in a button form or may be provided as an input component, such as a check box. When a user selects the case completion processing UI 1008, the application for drafting a patent document may perform a procedure of confirming the user's case completion intention. When an explicit case completion instruction is input from the user, the case management unit 103, 203 may change the activation state of a corresponding case to a deactivation state. Information of a case completed as described above may be provided through a completion case management screen provided by the application for drafting a patent document.

A download file creation UI 1009 for issuing an instruction to generate a download file based on the contents of a patent specification may be provided in the header region 1000*f*. The download file creation UI 1009 may be provided in a button form as illustrated in FIG. 6. When a user clicks on the download file creation UI 1009, the download file generation unit 109 may generate the download file by collecting data drafted through the patent document drafting screen, and may provide the user with the generated download file through the application for drafting a patent document. If the user has set that data is stored in the server for drafting a patent document 20 through a storage method selection UI 1016, the download file generation unit 209 of the server for drafting a patent document 20 may generate the download file and transmit the generated download file to the application for drafting a patent document over the network 30.

The aforementioned structure of the patent document drafting screen 1000 for the first service has been illustratively provided. The regions may be divided and provided in a given direction, such as a horizontal, vertical, or diagonal direction, and may not be consecutively disposed. The number, shapes, sizes, and arrangement of the regions do not limit the spirit of the present invention. Furthermore, the type of screen and the type of UI disposed in each region do not limit the spirit of the present invention.

Meanwhile, in the present embodiment, an example has been described in which a screen or UI for inputting data of each item included as the contents of a patent specification is dividedly disposed in divided regions, but the spirit of the present invention is not limited thereto. In some embodiments, the screen or UI for inputting data of each item included as the contents of a patent specification may be positioned in one region and may be provided to be input through one text input component. In this case, a structure window UI having a navigation function for a location movement or a cursor movement between items may be included in the patent document drafting screen.

As in the present embodiment, if the patent document drafting screen is dividedly provided as a plurality of regions and screens necessary to draft a patent specification are disposed in the respective regions, a user can more rapidly and accurately draft a patent specification because the user can draft the patent specification while checking the contents of the patent specification on one screen.

Figure 7:
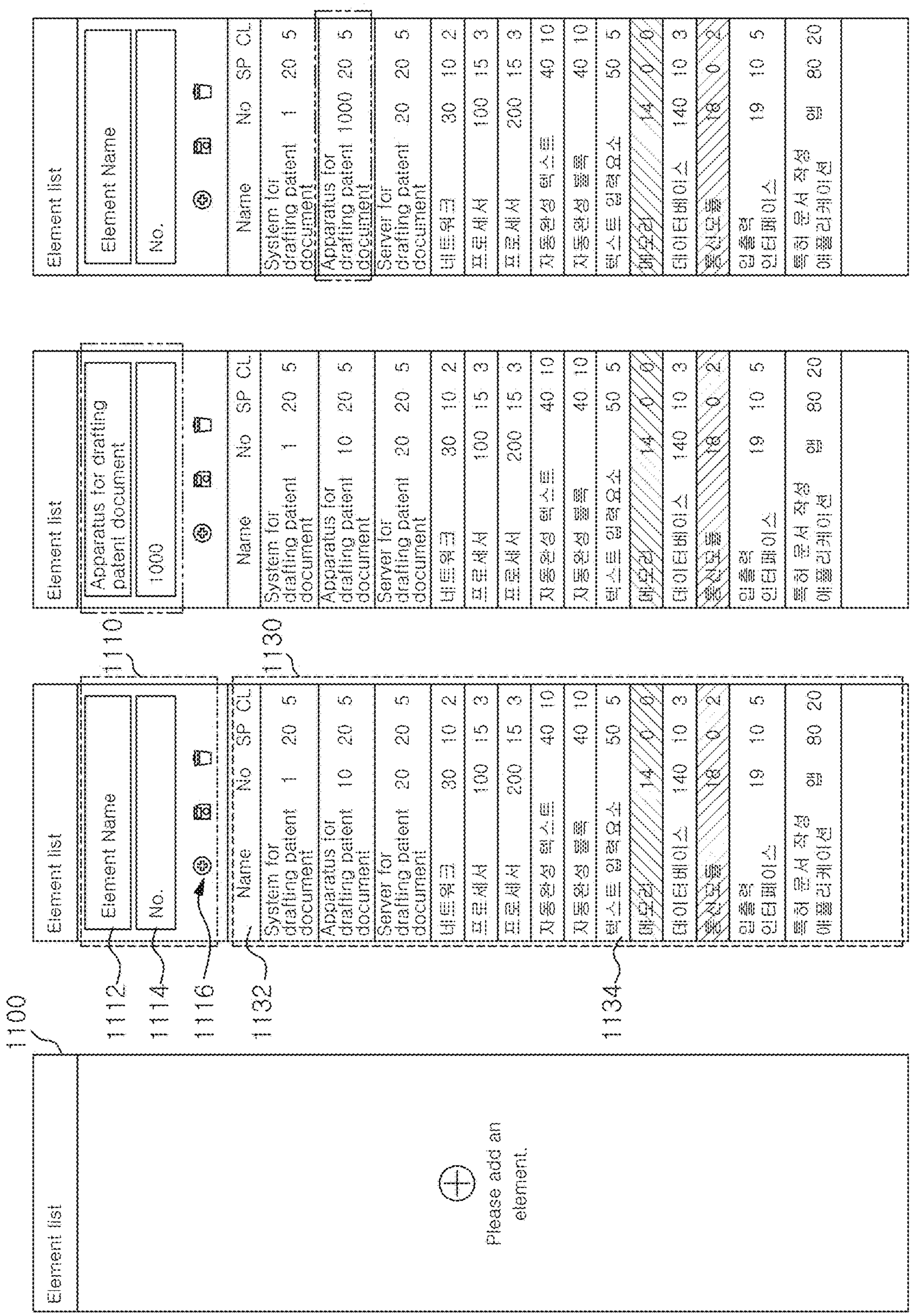
FIG. 7 is a diagram illustrating an example of an element management screen of the application for drafting a patent document in FIG. 5.

FIG. 7 is a diagram illustrating an example of an element management screen of the application for drafting a patent document in FIG. 5.

Referring to FIG. 7, the element management screen 1100 may be understood as a screen provided to manage element information which may be used to draft a patent specification. In order to improve space utilization, the element management screen 1100 may be provided to fill the first region 1000*a*. The screen configuration unit 101 may also adjust the size of the element management screen 1100 if the size of the first region 1000*a* is changed by a manipulation of the screen configuration setting UI 1002.

FIG. 7(*a*) illustrates an initial state of the element management screen 1100, and illustrates the state in which no element has been registered. In this case, a phrase for inducing the registration of an element and a UI for changing the element management screen 1100 into a screen for registering an element may be provided on the element management screen 1100.

FIG. 7(*b*) illustrates the state in which an element management UI 1110 for performing management operations, such as the input, correction, and deletion of an element, and an element display UI 1130 for displaying input component information have been displayed on the element management screen 1100. In the present embodiment, element information used to draft a patent specification may include the name of an element and an identification code corresponding to the element. In this case, the identification code may be a reference numeral assigned to the element and may be a string randomly assigned by a user in order to identify the corresponding element.

The element management UI 1110, which is provided for a user to input, correct, or delete element information, may include an element name input component 1112 for inputting the name of an element and an identification code input component 1114 for inputting an identification code. Both the element name input component 1112 and the identification code input component 1114 are illustrated as being text input components, but the spirit of the present invention is not limited thereto.

Furthermore, the element management UI 1110 may include an instruction input component 1116 for providing UIs, such as a button for issuing an instruction capable of initializing, storing, correcting or deleting data input to the element name input component 1112 and the identification code input component 1114. For example, the instruction input component 1116 may include an initialization button for enabling a user to remove data input to the element name input component 1112 and the identification code input component 1114 in order to register a new element, a storage button for enabling a user to add a new element or correct the existing input component information by storing, in the element information storage unit 143, data input to the element name input component 1112 and the identification code input component 1114, and a delete button for deleting, from the element information storage unit 143, data displayed in the element name input component 1112 and the identification code input component 1114.

The element display UI 1130 may display element information stored in the element information storage unit 143. For example, the element display UI 1130 may display element information in a table form, and may include a title region 1132 in which displayed contents are described and a data region 1134 in which data is displayed. In the present embodiment, the number of times that a corresponding element appears in a basic description, a detailed description, and the claims may be displayed in the element display UI 1130 along with the name and reference numeral of the element. In the drawing, the title of the number of times that a corresponding element appears in the basic description and the detailed description is indicated as SP, and the title of the number of times that a corresponding element appears in the claims is indicated as CL. In this case, an element having the numbers of times of 0 (the memory 14 in FIG. 7), or an element that has appeared in the claims, but has not appeared in the basic and detailed descriptions (the communication module 18 in FIG. 7) may be displayed to be distinguished from other elements. Accordingly, a user can intuitively recognize an element having a possible improper description, and prevent the occurrence of improper description.

FIGS. 7(*c*) and (*d*) are diagrams illustrating examples of a correction process. For example, when a user clicks on an element to be corrected in the element display UI 1130, information of the element may be input to the element management UI 1110. The user may input data to be corrected to the element management UI 1110. FIGS. 7(*c*) and (*d*) illustrate examples in 특허 문서 작성 장치 which a reference numeral of "특허 문서 작성 장치" is changed from 10 to 1000.

Furthermore, when the user clicks on the storage button of the instruction input component 1116, corresponding information may be written in the element information storage unit 143 by the element management unit 104, and information displayed in the element display UI 1130 may be changed and the changed information may be displayed.

The aforementioned configurations and operation methods of the element management UI 1110 and the element display UI 1130 are illustratively provided. Various forms of UIs in which a user may manage and express information of an element may be provided as the element management UI 1110 and the element display UI 1130.

When a user inputs an instruction related to element information through the element management UI 1110, the element management unit 104 may perform an operation, corresponding to the instruction, on the element information storage unit 143. In this case, the element management unit 104 may perform a validity check for preventing the same element information from being stored in the element information storage unit 143. For example, the element management unit 104 may check whether an element having the same name and identification number is present in the element information storage unit 143, before newly storing or updating element information. If the same element is present, the element management unit 104 may stop data processing, and may provide a user with a message indicating an error according to redundant storage.

Furthermore, the auto-complete list generation unit 105 may update a data set for auto-completion in response to a change in information of an element by the element management unit 104. To this end, when an event corresponding to an element information change occurs, the element management unit 104 may transmit the element information change to the auto-complete list generation unit 105. For example, when an event in which new element information is added occurs, the auto-complete list generation unit 105 may add, to a data set, an element item corresponding to a corresponding element. Furthermore, when an event in which input component information having been input is corrected occurs, the auto-complete list generation unit 105 may correct the data of an element item corresponding to a corresponding element. Furthermore, when an event in which input component information having been input is deleted occurs, the auto-complete list generation unit 105 may delete, from a data set, an element item corresponding to a corresponding element.

Furthermore, the text input component management unit 106 may update auto-complete text or an auto-complete block input to a text input component as described above in response to a change in information of an element by the element management unit 104. A detailed example in which auto-complete text or an auto-complete block is updated by the text input component management unit 106 will be described later with reference to a drawing.

Meanwhile, if a storage location has been set as the server for drafting a patent document 20 in the storage method selection UI 1016, the element management unit 104 may transmit, to the element management unit 204, element information received through the element management UI 1110, so that the element information is stored in the element information storage unit 243. In this case, after the aforementioned functions of the element management unit 104 are performed on the server side, the element management unit 204 may transmit the results of the execution to the element management unit 104.

A user may previously register an element through the element management screen 1100, so that the element is used in the auto-complete function or used as basic material for checking the improper descriptions. In this case, an example has been described in which element data includes the name and identification number of an element. However, as illustrated in FIG. 7, it may not be essential that the identification number is set to be input, and not a number, but a given character determined by a user may be used as the identification number. A user can input component information as described above, and can conveniently use an auto-complete function based on the input of element information and functions, such as designating a format, making editing impossible, deleting text by one event, and performing a batch update, etc. based on auto-completion.

Figure 8:
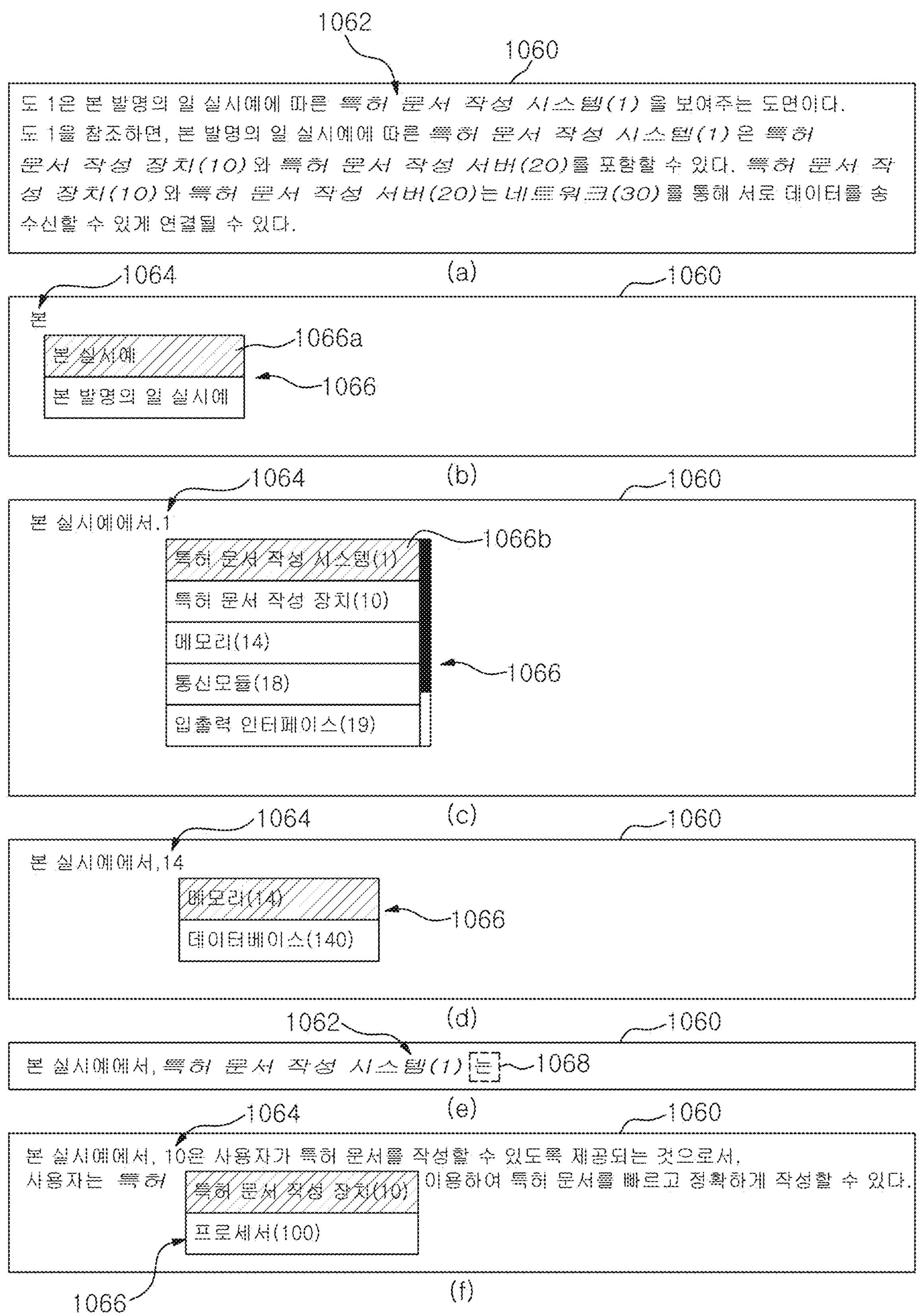
FIG. 8 is a diagram illustrating an example of an auto-complete function implemented by the application for drafting a patent document in FIG. 5.
Figure 9:
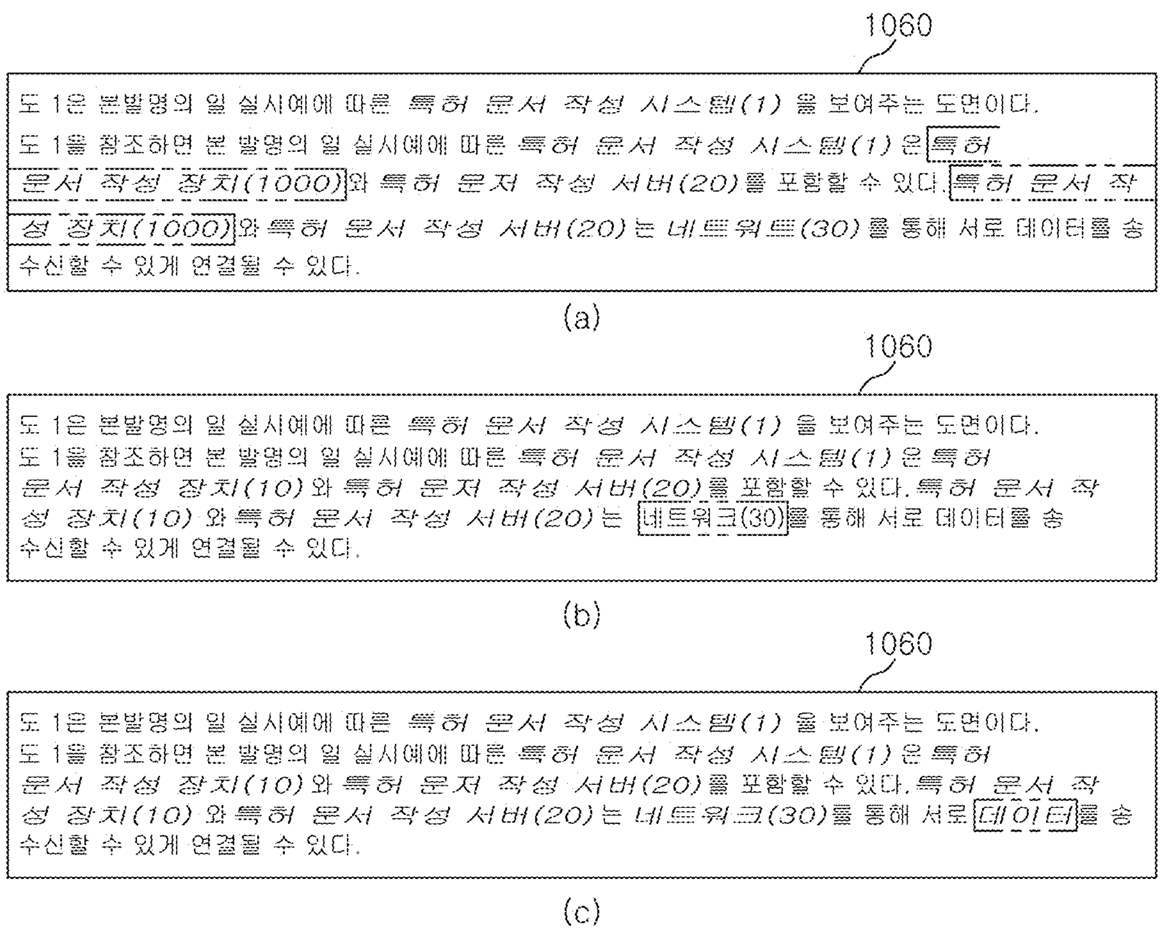
FIG. 9 is a diagram illustrating an example of a change in an auto-complete block attributable to a change in information of an element implemented by the application for drafting a patent document in FIG. 5.

FIG. 8 is a diagram illustrating an example of the auto-complete function implemented by the application for drafting a patent document in FIG. 5. FIG. 9 is a diagram illustrating an example of a change in an auto-complete block attributable to a change in information of an element implemented by the application for drafting a patent document in FIG. 5.

From FIGS. 8 and 9, various forms of auto-complete functions which may be applied to a text input component 1060 which may be provided on the patent document drafting screen can be seen.

First, FIG. 8(*a*) illustrates the state in which an auto-complete block 1062 is applied to the text input component 1060. In the present embodiment, an example is illustrated in which the auto-complete block is provided in a thick and inclined style so that it is distinguished from another text. In FIG. 8(*a*), the auto-complete block 1062, including "특허 문서 작성 시스템(1)", "특허 문서 작성 장치(10)", "특허 문서 작성 장치(20)", and "네트워크(30)" is auto-completed and inserted into a sentence. The auto-complete block 1062 may have attributes that cannot be edited, and may be configured to be treated as one body and deleted by one event at once.

FIG. 8(*b*) illustrates the state in which an idiom word item 1066*a* has been displayed as an auto-complete list in the text input component 1060. The text input component management unit 106 outputs an auto-complete list 1066 using data, input to the text input component 1060, as an auto-complete keyword 1064. Specifically, in FIG. 8(*b*), "본" is used as the auto-complete keyword 1064. The auto-complete list generation unit 105 generates an auto-complete list using "본" as the auto-complete keyword 1064, and then provides the generated auto-complete list to the text input component management unit 106. In this case, the idiom word item 1066*a*, such as "본 실시예" and "본 발명의 실시예", has been illustrated as an auto-complete item including "본" The text input component management unit 106 displays an auto-본 complete list, provided by the auto-complete list generation unit 105, adjacent to the auto-complete keyword 1064. When a user selects an item, the text input component management unit 106 may input the item to the text input component 1060 as auto-complete text instead of the auto-complete keyword 1064. For example, when a user selects "본 실시예" in the auto-complete list 1066, "본 실시예" instead of "본", that is, the auto-complete keyword 1064, may be inserted into the text input component 1060. In this case, "본실시예" is the idiom word item 1066*a*, and thus may be inserted into the text input component 1060 in the same format as that of another text.

FIGS. 8(*c*) and (*d*) illustrate the state in which an element item 1066*b* has been displayed as an auto-complete list in the text input component 1060. In FIG. 8(*c*), "1" is used as an auto-complete keyword 1064. An item, such as "특허 문서 작성 시스템(1)" including "1" among elements input by the element management unit 104, has been illustrated as the element item 1066*b*. As illustrated, the size of the auto-complete list 1066 may be previously set. If lots of elements are included in the list, scroll may automatically occur. In FIG. 8(*d*), since "14" is used as the auto-complete keyword 1064, "메모리(14)" and "데이터베이스(140)" including "14" may 데이터베이스 be provided as the auto-complete list.

When a user selects the element item 1066*b* in the auto-complete list displayed in the text input component 1060 by the text input component management unit 106 as described above, as illustrated in FIG. 8(*a*), the selected item may replace the auto-complete keyword 1064, and may be inserted into the text input component 1060 as the auto-complete block 1062.

FIG. 8(*e*) illustrates that if text input after the auto-complete block 1062 is inserted is a typographical error 1068, the text input component management unit 106 can detect and automatically correct the typographical error. In the drawing, a postposition "는" needs to be indicated as "은.." When a preset event, such as the input of a space bar or punctuation mark, is detected after "는" is input, the text input component management unit 106 can change "는" into "은" and display "은" on a screen. The aforementioned function may be applied to the conjugations of a verb according to the singular, the plural, and the person, the use of an upper case for the first character in a sentence, etc. in English, in addition to the use of a postposition in Korean.

FIG. 8(*f*) is a diagram illustrating that although text is input between continuous strings input to the text input component 1060, the auto-complete function may be provided. Specifically, "10" may be inserted between text as the auto-complete keyword 1064. In this case, the text input component management unit 106 may extract surrounding text including "10", and may set "10" as the auto-complete keyword 1064. The auto-complete list generation unit 105 provides an auto-complete list based on the extracted "10", and the auto-complete list is output to a screen by the text input component management unit 106. In this case, the auto-complete list 1066 output to the screen by the text input component management unit 106 may be provided to be positioned at a front location on a screen compared to the text input component 1060, so that a user can select a desired auto-complete item without being hindered by another text.

Meanwhile, when information of an element is changed in the element management screen 1100, the change is transmitted to the auto-complete list generation unit 105 and the text input component management unit 106 through the element management unit 104. Accordingly, an auto-complete data set is updated, and the auto-complete block 1062 and the auto-complete list 1066 provided to the text input component 1060 also need to be changed.

Specifically, FIG. 9(*a*) illustrates that the auto-complete block 1062 in FIG. 8(*a*) is changed if an identification code of "the apparatus for drafting a patent document" is changed from "10" to "1000" as in FIG. 7(*d*). The text input component management unit 106 may perform a batch update on values of the auto-complete block 1062 corresponding to an element whose data has been changed, based on a unique key value included in the auto-complete block 1062.

FIG. 9(*b*) illustrates that when a user deletes "네트워크(30)" in an element list, the format of an auto-complete block applied to the text input component 1060 is removed and auto-complete text has the same format as pieces of other text.

FIG. 9(*c*) illustrates that when a user registers "데이터" an element list as a new element, a portion corresponding to "데이터" among data input to the text input component 1060 is changed into an auto-complete block.

In addition to the illustrated functions, the auto-complete function may be provided to have various characteristics, such as those described above with reference to the text input component management unit 106.

Since the auto-complete functions are provided as described above, a user can significantly improve a patent document drafting speed.

Figure 10:
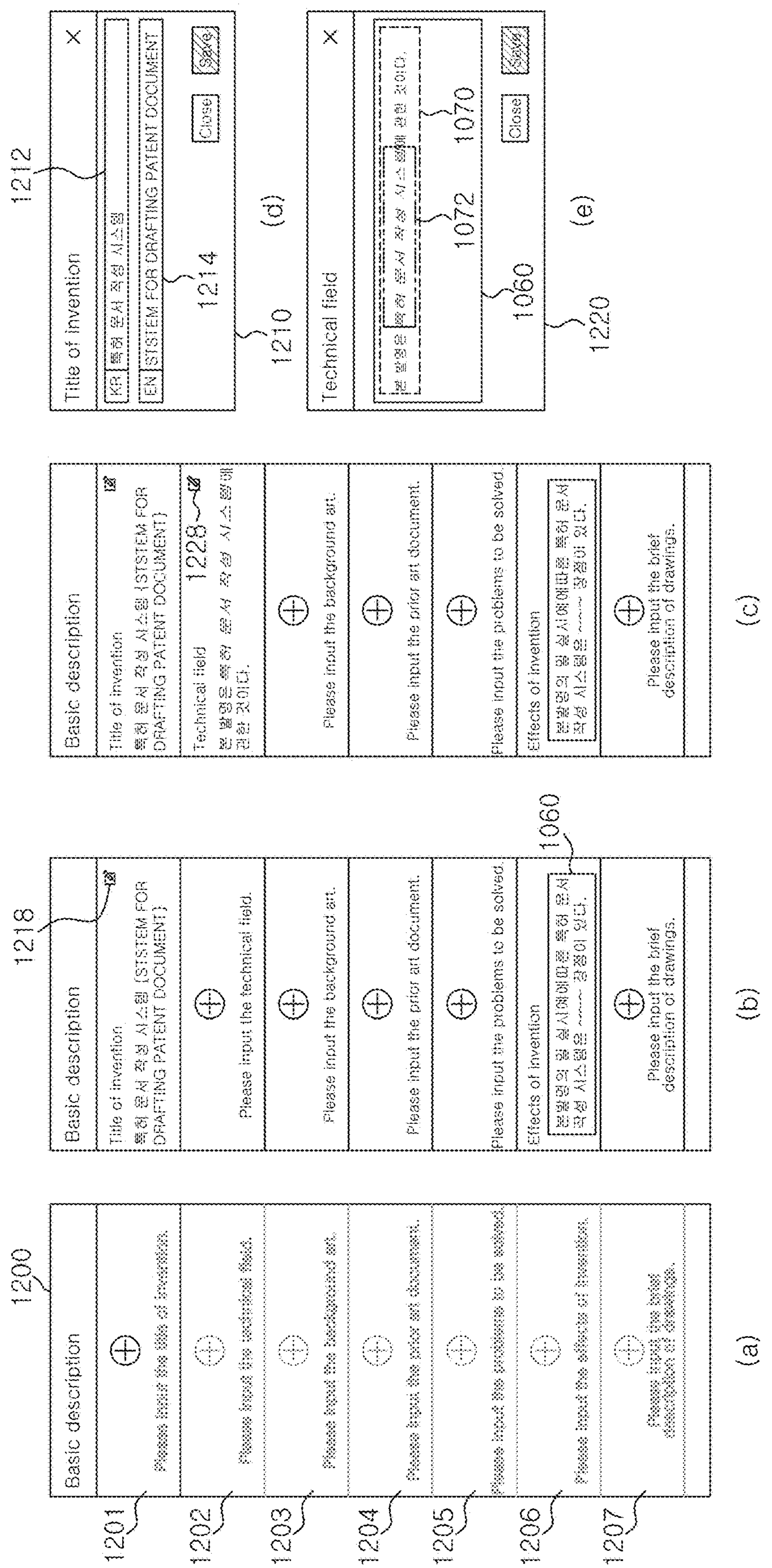
FIG. 10 is a diagram illustrating an example of a basic description drafting screen of the application for drafting a patent document in FIG. 5.

FIG. 10 is a diagram illustrating an example of a basic description drafting screen of the application for drafting a patent document in FIG. 5.

Referring to FIG. 10, the basic description drafting screen 1200 may be understood as a screen provided to draft items related to the basic description of a patent specification. The contents of a patent specification included in the basic description drafting screen 1200 may be differently set according to embodiments. In the present embodiment, an example is described in which the title of an invention, a technical field, a background art, a prior art document, problems to be solved, effects of the invention, and a brief description of drawings are included in the basic description.

In order to increase space utilization, the basic description drafting screen 1200 may be provided to fill the second region 1000*b*. The screen configuration unit 101 may also adjust the size of the basic description drafting screen 1200 if the size of the second region 1000*b* is changed by a manipulation of the screen configuration setting UI 1002.

FIG. 10(*a*) illustrates an initial state of the basic description drafting screen 1200, and illustrates the state in which no item of the basic description has been registered. In this case, a phrase for inducing the title of an invention to be first input and a UI for invoking a title-of-invention drafting screen 1210 may be provided on the basic description drafting screen 1200. The title of an invention is customarily and repeatedly used in the technical field, the background art, the problems to be solved, the effects of the invention, the brief description of drawings, etc. Therefore, when the title of the invention is first received, the basic description can be effectively drafted.

Specifically, the basic description drafting screen 1200 may include a title-of-invention drafting screen invoking UI 1201, a technical field drafting screen invoking UI 1202, a background art drafting screen invoking UI 1203, a related document information drafting screen invoking UI 1204, a problem-to-be-solved drafting screen invoking UI 1205, an effects-of-invention input UI 1206, and a brief-description-of-drawing drafting screen invoking UI 1207. In an initial screen, only the title-of-invention drafting screen invoking UI 1201 may activated, and the remaining UIs may be deactivated.

When a user clicks on the title-of-invention drafting screen invoking UI 1201, the title-of-invention drafting screen 1210 illustrated in FIG. 10(*d*) may be invoked. The title-of-invention drafting screen 1210 may be output as a pop-up window or a modal window, and the spirit of the present invention is not limited thereto. In some embodiments, the title-of-invention drafting screen 1210 is not provided as a separate window as illustrated in the region of the effects-of-invention input UI 1206 of FIG. 10(*b*), and may be provided in such a manner in which a screen of the region of the effects-of-invention input UI 1206 is changed and the text input component 1060 for inputting data is displayed.

In the present embodiment, the title-of-invention drafting screen 1210 may include a first language name input component 1212 and a second language name input component 1214. Both the first language name input component 1212 and the second language name input component 1214 may be provided as the text input component. The second language name input component 1214 may be omitted according to a document format.

When a user inputs a first language name and a second language name, the application for drafting a patent document may generate the title of an invention which may be included as the contents of a patent document based on the input data, and may display the title of the invention in the title-of-invention drafting screen invoking UI 1201. This is illustrated in FIG. 10(*b*). In the present embodiment, an example is described in which a Korean patent specification is drafted, and thus the title of the invention needs to be composed of "Korean name {English name}." Accordingly, as illustrated in the drawing, the title of the invention may be output to the title-of-invention drafting screen invoking UI 1201 like "특허 문서 작성 시스템 {SYSTEM FOR DRAFTING PATENT DOCUMENT}."

Meanwhile, the title of the invention input through the title-of-invention drafting screen 1210 may repeatedly and frequently appear even in the detailed description or the claims in addition to the basic description. Accordingly, the element management unit 104 may register, as an element, the title of the invention input through the title-of-invention drafting screen 1210.

When the title of the invention is input, the technical field drafting screen invoking UI 1202, the background art drafting screen invoking UI 1203, the related document information drafting screen invoking UI 1204, the problem-to-be-solved drafting screen invoking UI 1205, the effects-of-invention input UI 1206, and the brief-description-of-drawing drafting screen invoking UI 1207 may be activated. The user may invoke a screen for inputting data by selecting each UI. For example, when the user selects the technical field drafting screen invoking UI 1202, a technical field drafting screen 1220 illustrated in FIG. 10(*e*) may be invoked. The technical field drafting screen 1220 may be provided on a screen by the same method as the title-of-invention drafting screen 1210, and a redundant description thereof is omitted.

The technical field drafting screen 1220 may include the text input component 1060 for enabling a user to input required data. In this case, an idiomatic phrase 1070 corresponding to a technical field may be previously displayed in the text input component 1060. In this case, the idiomatic phrase 1070 may include a replacement portion corresponding to the title of the invention. Accordingly, when the text input component 1060 is previously filled with data, the text input component management unit 106 may replace the replacement portion, corresponding to the title of the invention, with the title of the invention input through the title-of-invention drafting screen 1210, and may then input the title of the invention to the text input component 1060. In the present embodiment, since "특허 문서 작성 시스템" has been input as the title of the invention, the idiomatic phrase 1070 may be inserted like "본 발명은 *특허 문서 작성 시스템*에 관한 것이다." In this case, replaced text 1072 included in the idiomatic phrase 1070 may be treated like an auto-complete block. That is, the replaced text 1072 may have functions, such as designating a format, making editing impossible, deleting text by one event, and performing a batch update, such as an auto-complete block or as an auto-complete block.

A detailed example related to the aforementioned idiomatic phrase 1070 including the replacement portion 1072 will be described later with reference to a drawing.

The same method as such drafting of an item of the basic description may be applied to not only the technical field drafting screen invoking UI 1202 but also the background art drafting screen invoking UI 1203, the related document information drafting screen invoking UI 1204, the problem-to-be-solved drafting screen invoking UI 1205, the effects-of-invention input UI 1206, and the brief-description-of-drawing drafting screen invoking UI 1207. As described above, a separate screen is not invoked in order to draft an item of the basic description, but a UI, such as the text input component 1060 for directly inputting an item of the basic description to the basic description drafting screen 1200, may be provided. A method of inputting data may be variously modified and provided.

Moreover, it is described in the present embodiment that, in order to conveniently draft a brief description of drawings, the brief-description-of-drawing drafting screen invoking UI 1207 invokes a brief-description-of-drawing drafting screen 1300 that is separately provided.

Meanwhile, the user may correct data input as the basic description while drafting the patent specification. To this end, an edit screen invoking UTs 1218 and 1228 may be provided on the basic description drafting screen 1200. When the user clicks on the edit screen invoking UI, a corresponding data edit screen, such as the title-of-invention drafting screen 1210 or the technical field drafting screen 1220, may be invoked. When the title-of-invention drafting screen 1210 or the technical field drafting screen 1220 is invoked, previously input data may be previously set in each input component.

When the user corrects the title of the invention through the title-of-invention drafting screen 1210, a corresponding change may be incorporated into data, registered as element information, through the element management unit 104, and may also be incorporated into the replaced text 1072 applied to each basic description item. For example, if the user corrects the title of the invention to "특허 문서 작성 시스템 및 장치", the data displayed in the technical field drafting screen invoking UI 1202 may be changed into "본 발명은 *특허 문서 작성 시스템 및 장치*에 관한 것이다."

Data input on the basic description drafting screen 1200 may be stored in the basic description storage unit 162 and the brief-description-of-drawings storage unit 166. If a user has set data to be stored in the server for drafting a patent document 20 through the storage method selection UI 1016, data may be stored in the basic description storage unit 262 and brief-description-of-drawings storage unit 266 of the server for drafting a patent document 20.

Meanwhile, in the present embodiment, description of means for solving problems which may be included in the contents of a patent specification as the basic description has been omitted. In this case, the download file generation unit 109, etc. may automatically generate means for solving problems based on contents written in the claims, and may include the generated means for solving problems as the contents of a patent document. A rule, etc. for automatically generating means for solving problems from the claims may be previously set according to a document format, and may be managed by the setting management screen 1900.

Figure 11:
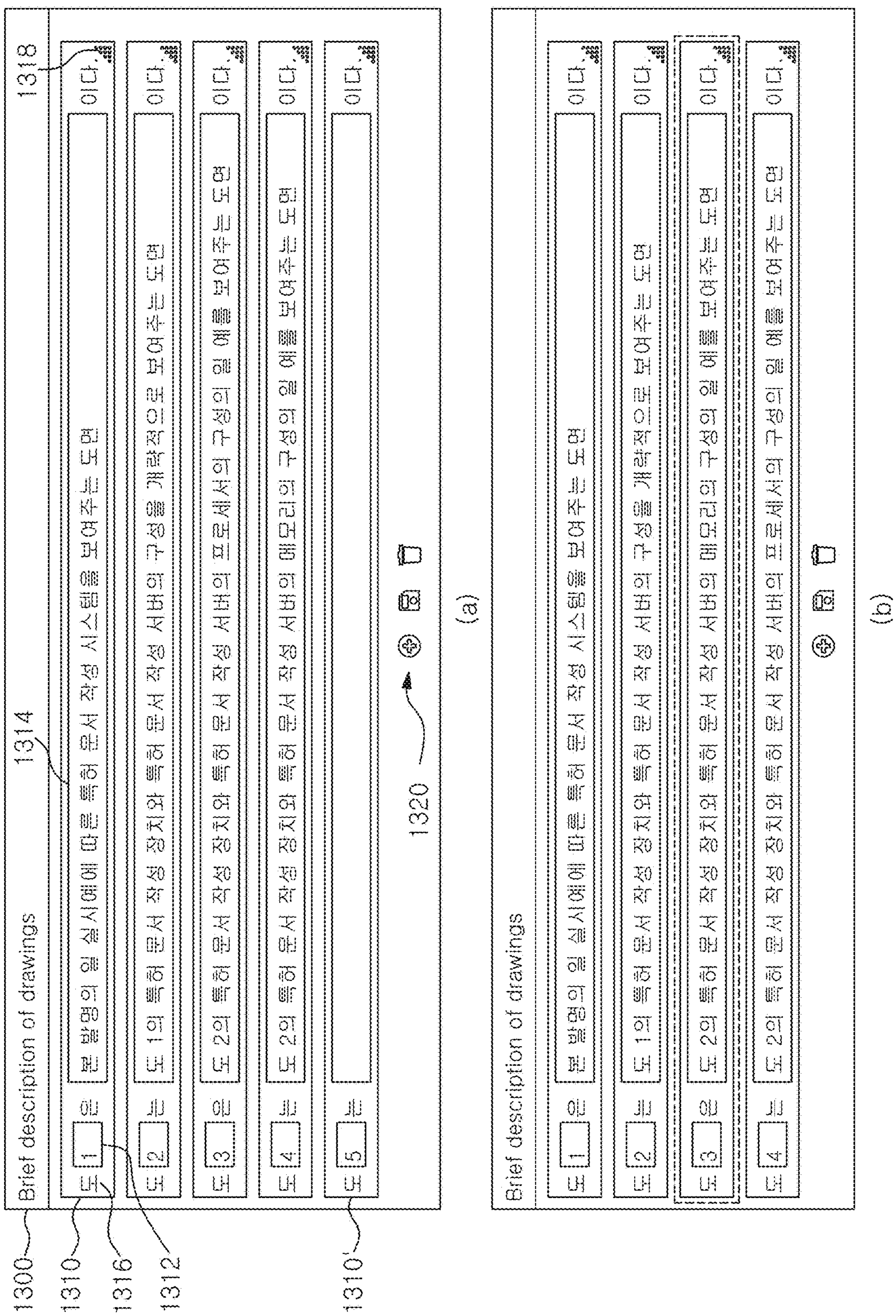
FIG. 11 is a diagram illustrating an example of a brief-description-of-drawing drafting screen of the application for drafting a patent document in FIG. 5.

FIG. 11 is a diagram illustrating an example of a brief-description-of-drawing drafting screen of the application for drafting a patent document in FIG. 5.

Referring to FIG. 11, the brief-description-of-drawing drafting screen 1300, which is a screen provided to draft a brief description of drawings, may be invoked by the brief-description-of-drawing drafting screen invoking UI 1207.

The brief-description-of-drawing drafting screen 1300 may include one or more drawing information input units 1310 in which a user can input data related to a drawing for each sentence. The drawing information input unit 1310 may include a reference numeral text input component 1312, a drawing description text input component 1314, and a guide phrase 1316. Descriptions related to the reference numeral text input component 1312, the drawing description text input component 1314, and the guide phrase 1316 are the same as those described in the brief-description-of-drawing input processing unit 124, and thus detailed descriptions thereof are omitted.

The drawing information input unit 1310 may be provided so that the drawing information input unit 1310 may be dragged & dropped. For the drag & drop, a drag point 1318 may be provided at one point of the drawing information input unit 1310. In some embodiments, the entire region of the drawing information input unit 1310 may be the drag point 1318. After selecting the drag point 1318, a user may drag and drop a corresponding drawing information input unit 1310 to a desired location.

The drawing information input unit 1310 may be added one by one through an addition button (icon "+" in the drawing) provided to an instruction input component 1320. In the drawing, a newly added drawing information input unit 1310 is indicated as 1310'. A reference numeral may be automatically set in the reference numeral text input component 1312 of 1310'. In some embodiments, several drawing information input units 1310 may be added at a time. To this end, the brief-description-of-drawing drafting screen 1300 may allow a user to input the start number and end number of drawings to be added or a start number and the number of drawings to be added.

FIG. 11(*a*) is a drawing illustrating an example in which a user inputs the brief description of drawings while adding the drawing information input unit 1310 one by one. FIG. 11(*b*) is a diagram illustrating results in which the drawing information input unit 1310 도 corresponding to "도 4" in FIG. 11(*a*) is dragged and dropped at a location corresponding to "도 3." Accordingly, the data of the reference numeral input component 1312 of the drawing information input unit 1310 corresponding to "도 4" may be changed from "4" to "3", and the data of the reference numeral text input component 1312 of the drawing information input unit 1310 corresponding to "도 3" may be changed from "3" to "4."

Detailed operations of the brief-description-of-drawing input processing unit 124 according to the addition, movement, and deletion of the drawing information input unit 1310 have been described above, and thus detailed descriptions thereof are omitted.

Figure 12:
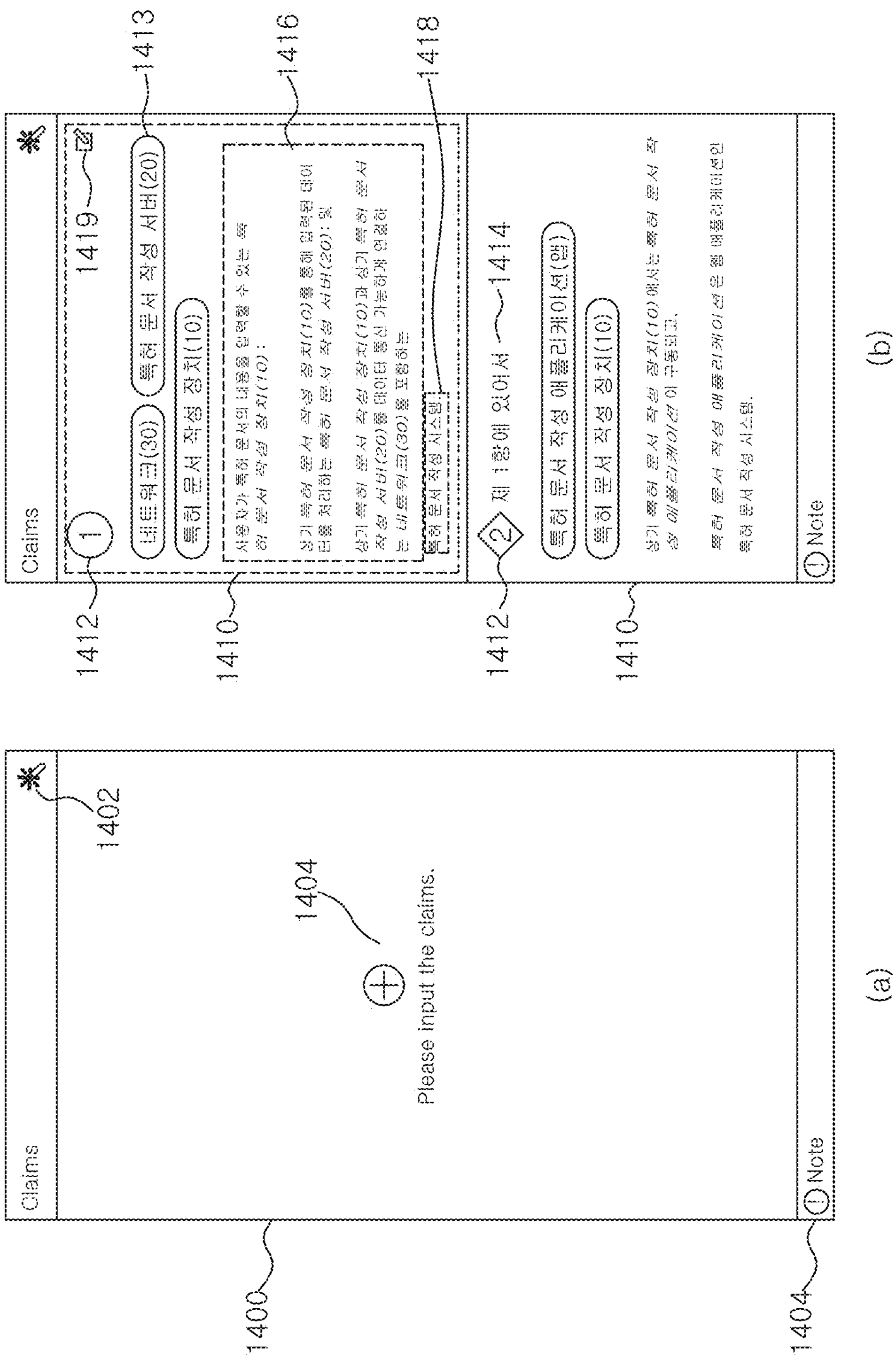
FIG. 12 is a diagram illustrating an example of a claims display screen of the patent document drafting screen of the application for drafting a patent document in FIG. 5.

FIG. 12 is a diagram illustrating an example of a claims display screen of the patent document drafting screen of the application for drafting a patent document in FIG. 5.

Referring to FIG. 12, the claims display screen 1400 may be understood as a screen provided to display the claims. In order to increase space utilization, the claims display screen 1400 may be provided to fill the third region 1000*c*. The screen configuration unit 101 may also adjust the size of the claims display screen 1400 if the size of the third region 1000*c* is changed by a manipulation of the screen configuration setting UI 1002.

FIG. 12(*a*) illustrates an initial state of the element management screen 1100, and illustrates the state in which no claim has been registered. In this case, a phrase for inducing the drafting of a claim and a UI for invoking a claim drafting screen 1500 may be provided on the claims display screen 1400. Furthermore, a claim drafting screen invoking UI 1402 for invoking the claim drafting screen 1500 may be provided on the claims display screen 1400.

A description requirement review result screen invoking UI 1404 is a UI for invoking a screen on which the results of a review for description requirements are output from are displayed from the description requirement storage unit 146 and the claim input processing unit 122. The description requirement review result screen invoking UI 1404 may be changed into a UI having a different form, such as a change in color or flickering in order to attract a user's intention, if a problem, such as the improper descriptions, is present.

FIG. 12(*b*) illustrates the claims display screen 1400 on which an illustratively drafted claim is displayed. The claims display screen 1400 may include a claim display region 1410 in which the contents of a claim is displayed, and the number of the claim display regions 1410 is the same as the number of claims. The contents of one claim may be included in each claim display region 1410.

The claim display region 1410 may include a claim number display region 1412, an element name display region 1413, a quoted claim display region 1414, an element description display region 1416, and a category display region 1418.

The claim number display region 1412 may display a claim number and the type of claim together. In the present embodiment, an independent claim has been expressed in a circle, and a dependent claim has been expressed in a diamond shape. When a new claim is written, the new claim has been expressed in a square in the state in which the type of claim has not yet been determined.

The element name display region 1413 separately displays an element input to the element description display region 1416 so that a user can intuitively recognize what element has been included in a corresponding claim.

The quoted claim display region 1414 is displayed when the type of claim is a dependent claim, and is a region in which a cited claim is displayed.

The element description display region 1416 is a region in which a description and restriction for an element are displayed, and may be displayed to include an auto-complete block.

The category display region 1418 is a region in which a category is displayed.

The arrangement of the elements of the claim display region 1410 may be different according to a document format or based on a setting value of a user. In the present embodiment, a Korean patent specification is described as an example. According to a claim drafting example that is customarily used, the quoted claim display region 1414 has been first displayed, and then the category display region 1418 has been displayed. However, in the case of a US patent specification, the quoted claim display region 1414 and the category display region 1418 may be integrated into one body and displayed.

Furthermore, the claim display region 1410 may include a claim correction screen invoking UI 1419 for invoking a claim correction screen 1500*a* to be described later. When a user clicks on the claim correction screen invoking UI 1419, the claim correction screen 1500*a* on which the contents of a corresponding claim can be corrected may be displayed.

Figure 13:
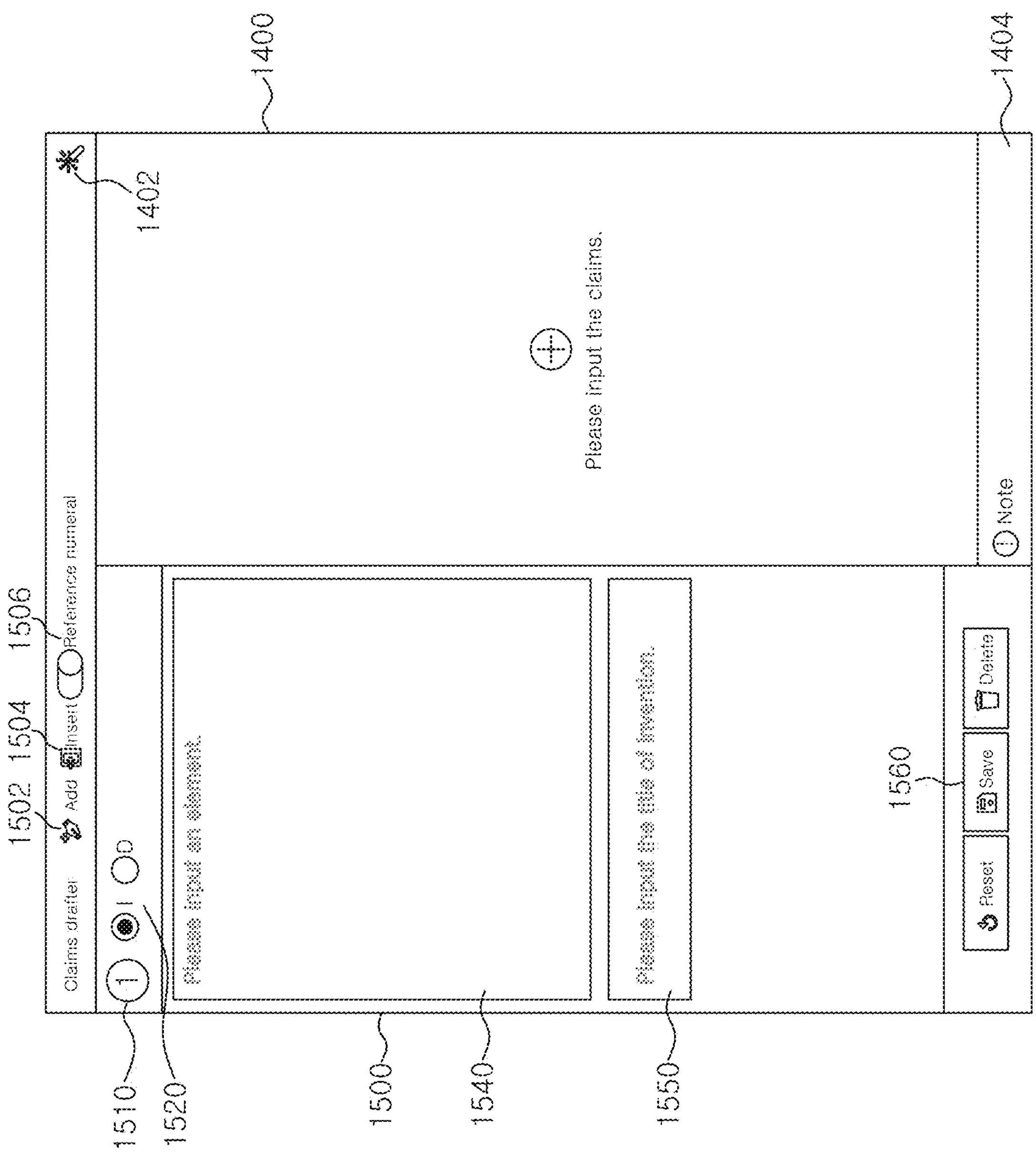
FIG. 13 is a diagram illustrating an example in which an independent claim is drafted on a claim drafting screen of the application for drafting a patent document in FIG. 5.

FIG. 13 is a diagram illustrating an example in which an independent claim is drafted on the claim drafting screen of the application for drafting a patent document in FIG. 5.

FIG. 13 illustrates the state in which the claim drafting screen 1500 has been invoked by the claim drafting screen invoking UI 1402 in the state in which no claim has been input as in FIG. 12(*a*).

The claim drafting screen 1500 may be provided as a UI, such as a screen on which the region of the claims display screen 1400 has been extended. That is, the claim drafting screen 1500 and the claims display screen 1400 may be provided to be adjacent to each other. If the claim drafting screen 1500 is displayed, some other regions of the patent document drafting screen may be hidden by the claim drafting screen 1500. For example, the claim drafting screen 1500 may be provided to have a size corresponding to the size of the second region 1000*b*. When invoked by the claim drafting screen invoking UI 1402, the claim drafting screen 1500 may be displayed in a form that fully replace or cover the second region 1000*b*. If the second region 1000*b* has not been displayed by the screen configuration setting UI 1002, the claim drafting screen 1500 may be displayed on the premise that the second region 1000*b* has been displayed.

The claim drafting screen 1500 may include a claim number input component 1510, a claim type input component 1520, an element description input component 1540, and a category input component 1550. Detailed contents related to these elements have been described in the portion of the claim input processing unit 122 and the claim storage unit 164, and thus redundant descriptions thereof will be omitted. The claim number input component 1510 may be configured to simultaneously display a claim number and the type of claim as described above. The claim type input component 1520 may be provided in a radio button form so that any one of an independent claim I and a dependent claim D can be selected. The element description input component 1540 as a text input component may include an auto-complete function, like the text input component 1060. The category input component 1550 may also be provided as a text input component.

FIG. 13 illustrates an example in which the first independent claim is input. FIG. 13 illustrates the state in which "1" has been previously input to the claim number input component 1510, an independent claim has been selected as the claim type input component 1520, and data have not been input to the element description input component 1540 and the category input component 1550.

A claim addition instruction UI 1502 and a claim insertion instruction UI 1504 may be provided on one side of the claim drafting screen 1500. The claim addition instruction UI 1502 and the claim insertion instruction UI 1504 may be used to explicitly issue instructions to add a new claim and insert a new claim, respectively. Contents related to the addition of a new claim and the insertion of a new claim have been described in detail in the portions related to the claim input processing unit 122 and the claim storage unit 164, and thus redundant descriptions thereof are omitted.

Furthermore, a reference numeral display change UI 1506 may be provided may be provided on one side of the claim drafting screen 1500. The reference numeral display change UI 1506 may be provided in a form, such as a toggle button. When an auto-complete block is inserted into the element description input component 1540, whether an identification code of an element will be inserted as auto-complete text may be set in the reference numeral display change UI 1506. Moreover, as a state of the reference numeral display change UI 1506 changes, an identification code inclusion state of an element in an auto-complete block included in the element description input component 1540 may be changed. This may be implemented similar to the aforementioned batch update of an auto-complete block. For example, if the state of the reference numeral display change UI 1506 changes, the claim input processing unit 122 may change the identification code inclusion states of all the auto-complete blocks, included in the element description input component 1540, in response to the change.

Meanwhile, an instruction input component 1560 for storing, correcting, or deleting data input as information of a claim may be provided on the claim drafting screen 1500. A review for description requirements, etc. may be performed in response to an event, such as data storage generated through the instruction input component 1560.

Figure 14:
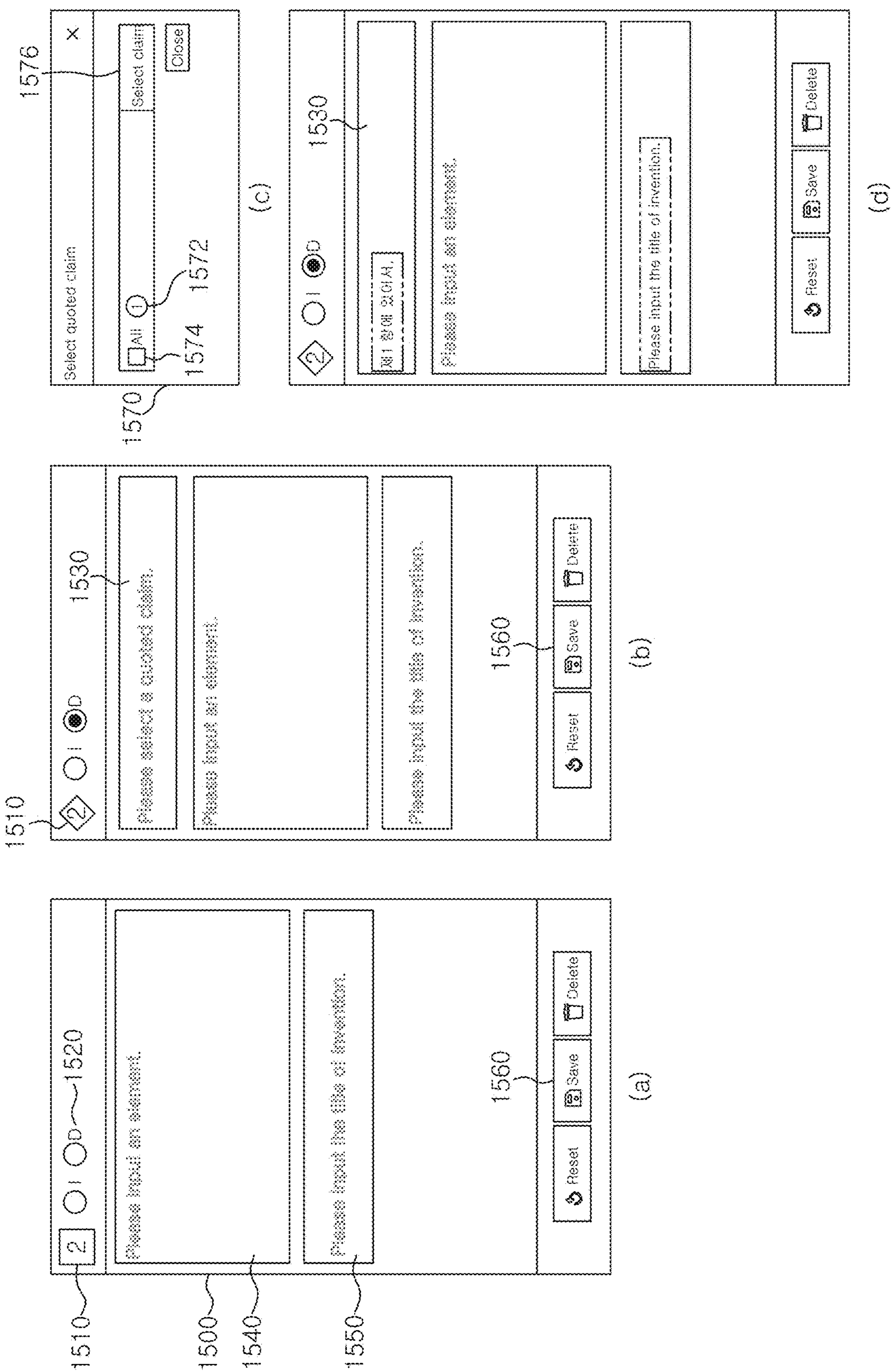
FIG. 14 is a diagram illustrating an example in which a new claim and a dependent claim are drafted on the claim drafting screen of the application for drafting a patent document in FIG. 5.

FIG. 14 is a diagram illustrating an example in which a new claim and a dependent claim are drafted on the claim drafting screen of the application for drafting a patent document in FIG. 5.

FIG. 14(*a*) is a screen on which a user inputs a new claim through the claim addition instruction UI 1502 or the claim insertion instruction UI 1504. The claim number input component 1510 may be previously set according to circumstances. A user may select the type of claim through the claim type input component 1520.

When the user selects an independent claim in the claim type input component 1520, the claim drafting screen 1500 of FIG. 13 may be invoked, but may be provided in the state in which the data of the claim number input component 1510 has been adjusted according to circumstances.

When the user selects a dependent claim in the claim type input component 1520, the screen may change into a screen of FIG. 14(*b*).

A shape of the claim number input component 1510 may be changed in a form in which a dependent claim is displayed. A quoted claim input component 1530 for inputting a quoted claim may be added to the claim drafting screen 1500.

When the user selects or clicks on the quoted claim input component 1530, a quoted claim selection screen 1570, such as FIG. 14(*c*), may be invoked. The quoted claim selection screen 1570 may include a citable claim display region 1572 in which a claim prior to a corresponding claim may be selected. A claim which a corresponding claim may quote may be displayed in the citable claim display region 1572. A symbol for identifying the type of claim applied to the claim number input component 1510 may be also displayed in each claim. Furthermore, an all-claims selection UI 1574 for selecting all citable claims may be provided on the quoted claim selection screen 1570. When the user finishes the selection of a claim and clicks on a quoted claim selection confirmation UI 1576, the claim drafting screen 1500 may be configured based on the contents of the selected claim. Contents related to the selection of a quoted claim have been specifically described above in relation to the claim input processing unit 122, and a redundant description thereof will be omitted.

FIG. 14(*d*) is a diagram illustrating the state in which data of the quoted claim input component 1530 and the category input component 1550 have been changed in response to the selection of a quoted claim.

Figure 15:
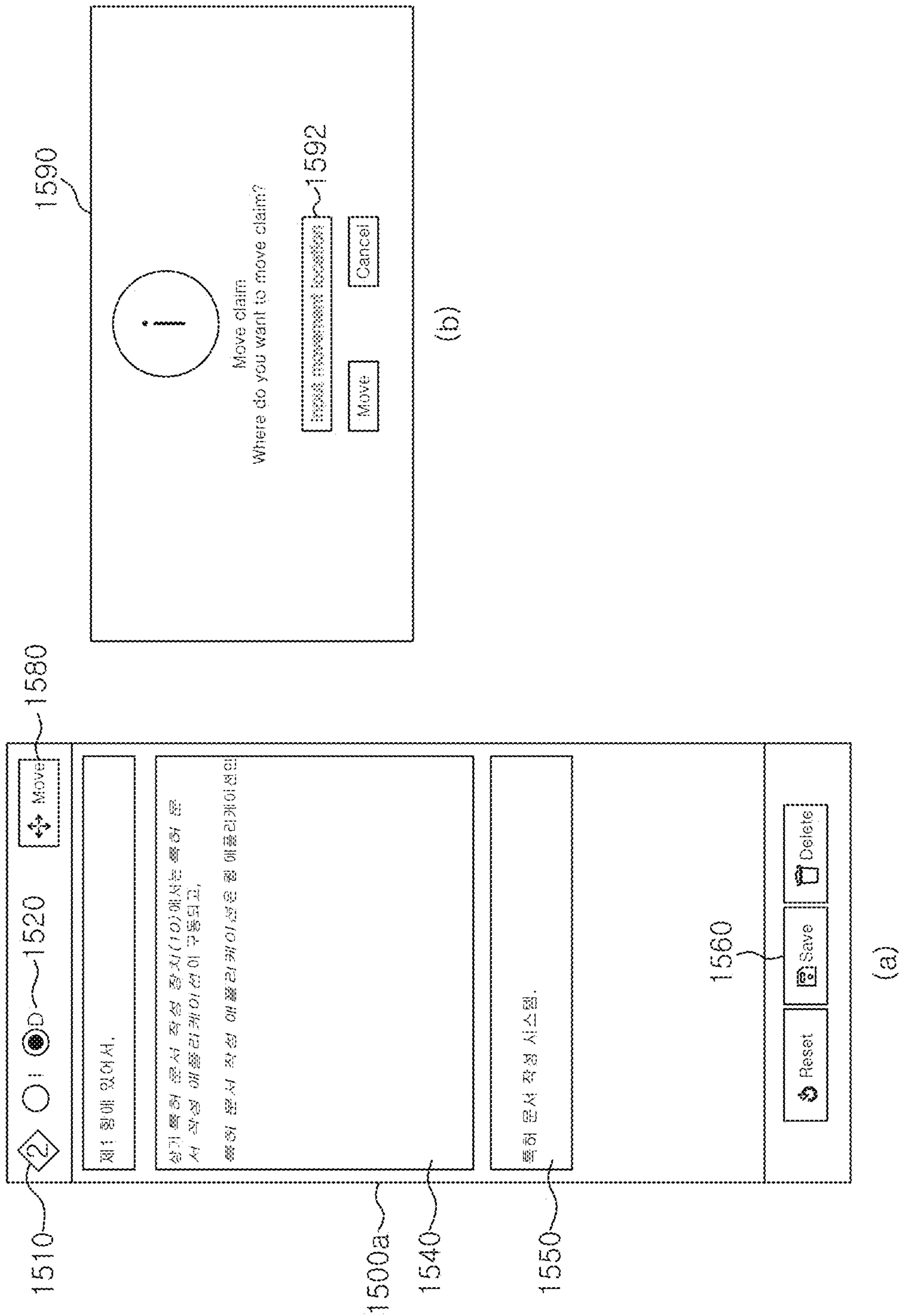
FIG. 15 is a diagram illustrating an example of a claim correction screen of the application for drafting a patent document in FIG. 5.

FIG. 15 is a diagram illustrating an example of a claim correction screen of the application for drafting a patent document in FIG. 5.

Referring to FIG. 15(*a*), the claim correction screen 1500*a* on which the contents of a claim may be corrected is configured substantially identically with the claim drafting screen 1500, but may be provided in the state in which the claim number input component 1510, the claim type input component 1520, the quoted claim input component 1530, the element description input component 1540, the category input component 1550, etc. have been set based on previously input contents. The claim correction screen 1500*a* may be invoked by the claim correction screen invoking UI 1419 provided on the claims display screen 1400.

After correcting the contents of a claim into desired contents on the claim correction screen 1500*a*, a user may store the corrected contents through the instruction input component 1560. Furthermore, the user may delete a claim on this screen.

At this time, a claim movement instruction UI 1580 for explicitly instructing a movement of a claim may be provided on the claim correction screen 1500*a*. The claim movement instruction U 1580 may be provided in a button form. When a user clicks on the claim movement instruction UT 1580, a claim movement location input screen 1590, such as FIG. 15(*b*), may be invoked. The user may input a location for a movement to a movement location input component 1592 provided on the claim movement location input screen 1590, and may issue a movement instruction. Accordingly, a movement of a claim described in the portion related to the claim input processing unit 122 may be implemented.

A movement of a claim may be provided by various UIs, such as drag & drop, in addition to the method illustrated in the drawing. However, if an explicit movement instruction and a movement location are received as in the present embodiment, the occurrence of the improper descriptions attributable to a frequent movement of a claim, etc. can be prevented, and a user can intuitively recognize a movement of a claim.

Figure 16:
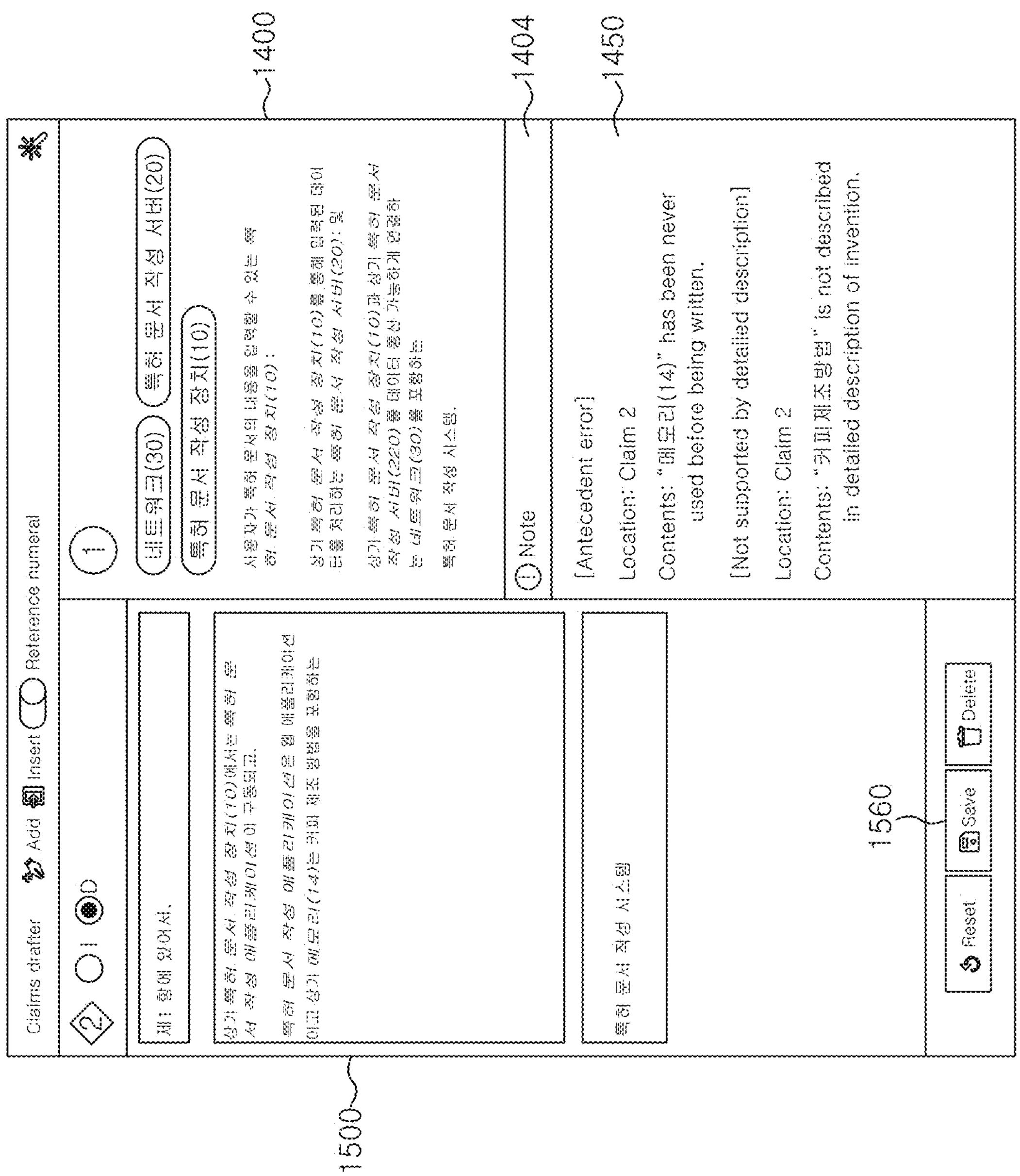
FIG. 16 is a diagram illustrating an example of a description requirement review result screen of the application for drafting a patent document in FIG. 5.

FIG. 16 is a diagram illustrating an example of a description requirement review result screen of the application for drafting a patent document in FIG. 5.

Referring to FIG. 16, the description requirement review result screen 1450 may be provided in a form unfold in some regions of the claims display screen 1400. A user can change a display state of the description requirement review result screen 1450 by clicking on a description requirement review result screen invoking U 1404.

A violation of a description requirement occurring in a claim may be displayed on the description requirement review result screen 1450 depending on the type or location of the violation as illustrated in the drawing. In some embodiments, a violation pointed out in the description requirement review result screen 1450 may be displayed in the claim display region 1410 or the element description input component 1540, etc. Specifically, text having a problem may be highlighted to be distinguished from other portions.

In the present embodiment, an example is described in which all of the results of a review for description requirements for the entire patent specification and the results of a review for description requirements for the claims are displayed on the description requirement review result screen 1450 invoked by the description requirement review result screen invoking UI 1404. In some embodiments, the results of a review for description requirements for the claims and the results of a review for description requirements for other portions may be provided on different screens. Furthermore, the description requirement review result screen invoking UI 1404 is not provided as part of the claims display screen 1400, and may be provided in another region or may be provided as part of another screen. The description requirement review result screen 1450 may be provided as an independent screen.

Figure 17:
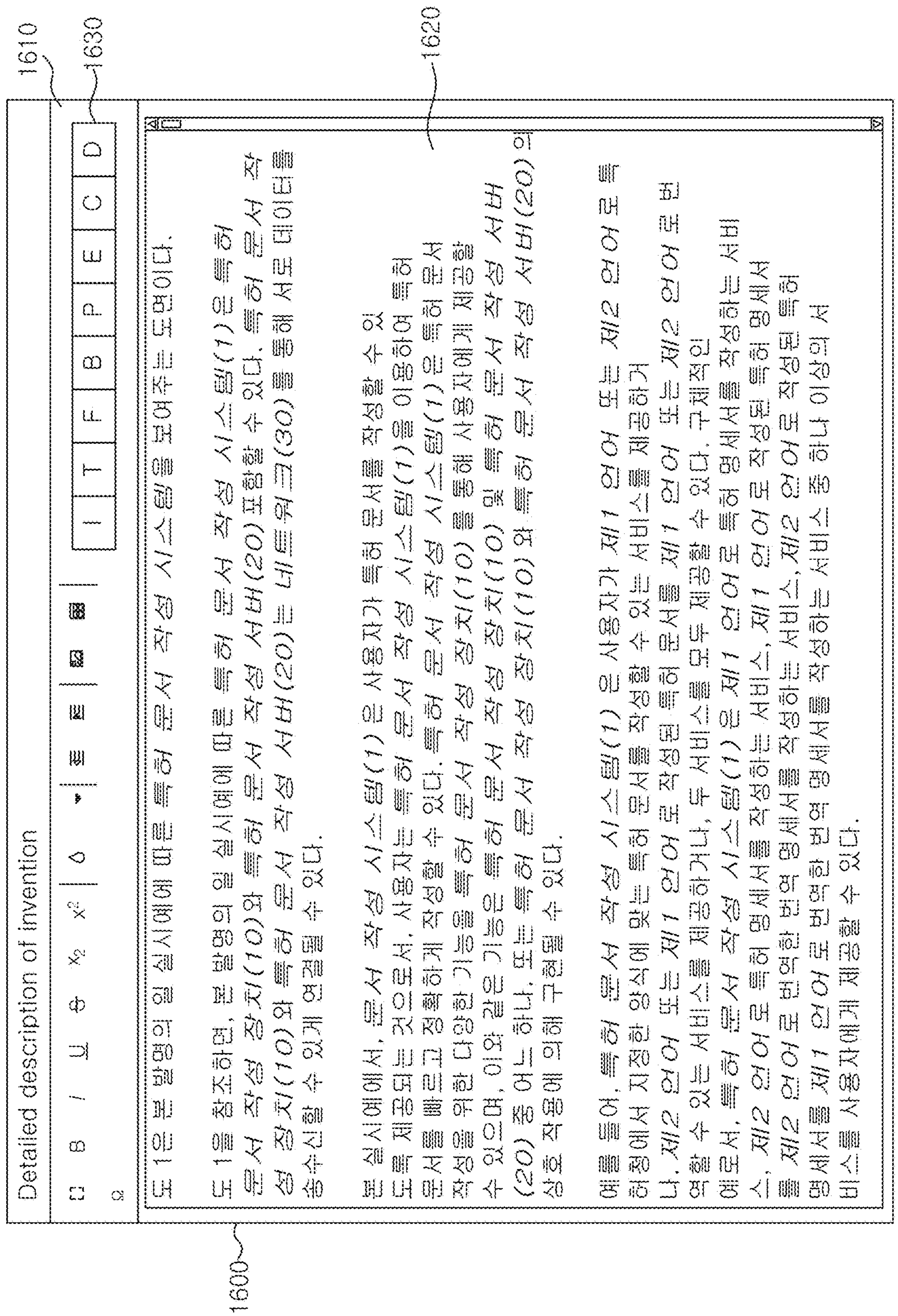
FIG. 17 is a diagram illustrating an example of a detailed description drafting screen of the application for drafting a patent document in FIG. 5.

FIG. 17 is a diagram illustrating an example of a detailed description drafting screen of the application for drafting a patent document in FIG. 5.

Referring to FIG. 17, the detailed description drafting screen 1600 may be understood as a screen provided to draft a detailed description of an invention. In order to increase space utilization, the detailed description drafting screen 1600 may be provided to fill the fourth region 1000*d*. The screen configuration unit 101 may also adjust the size of the detailed description drafting screen 1600 if the size of the fourth region 1000*d* is changed by a manipulation of the screen configuration setting UI 1002.

The detailed description of the invention is a portion that occupies the greatest amount of items of a patent specification. The detailed description drafting screen 1600 may include a detailed description input component 1620 provided to be relatively greater than a text input component provided on another screen. The detailed description drafting screen 1600 may include a toolset UI 1610 for a non-text data input or format setting.

In this case, an insertion string selection screen invoking UI 1630 for conveniently inputting an insertion string into a detailed description may be provided on the detailed description drafting screen 1600. The insertion string selection screen invoking UI 1630 may include UIs, such as several buttons for invoking different screens depending on the type of insertion string. In the present embodiment, the insertion string selection screen invoking UI 1630 is illustrated as being included in the toolset UI 1610, but the location of the insertion string selection screen invoking UI 1630 is not limited thereto. For example, the insertion string selection screen invoking UI 1630 may be provided on another screen, not the detailed description drafting screen 1600.

Data which may be inserted into the detailed description input component 1620 as an insertion string through the insertion string selection screen invoking UI 1630 may include an idiomatic phrase I, a technical field F, a background art B, problems to be solved P, effects of an invention E, the claims C, a brief description of drawings D, etc. Screens for inserting the data may be separately provided. An element description input screen invoking UI T for invoking an element description drafting screen 1680 to be described later may be provided in the insertion string selection screen invoking UI 1630.

Figure 18:
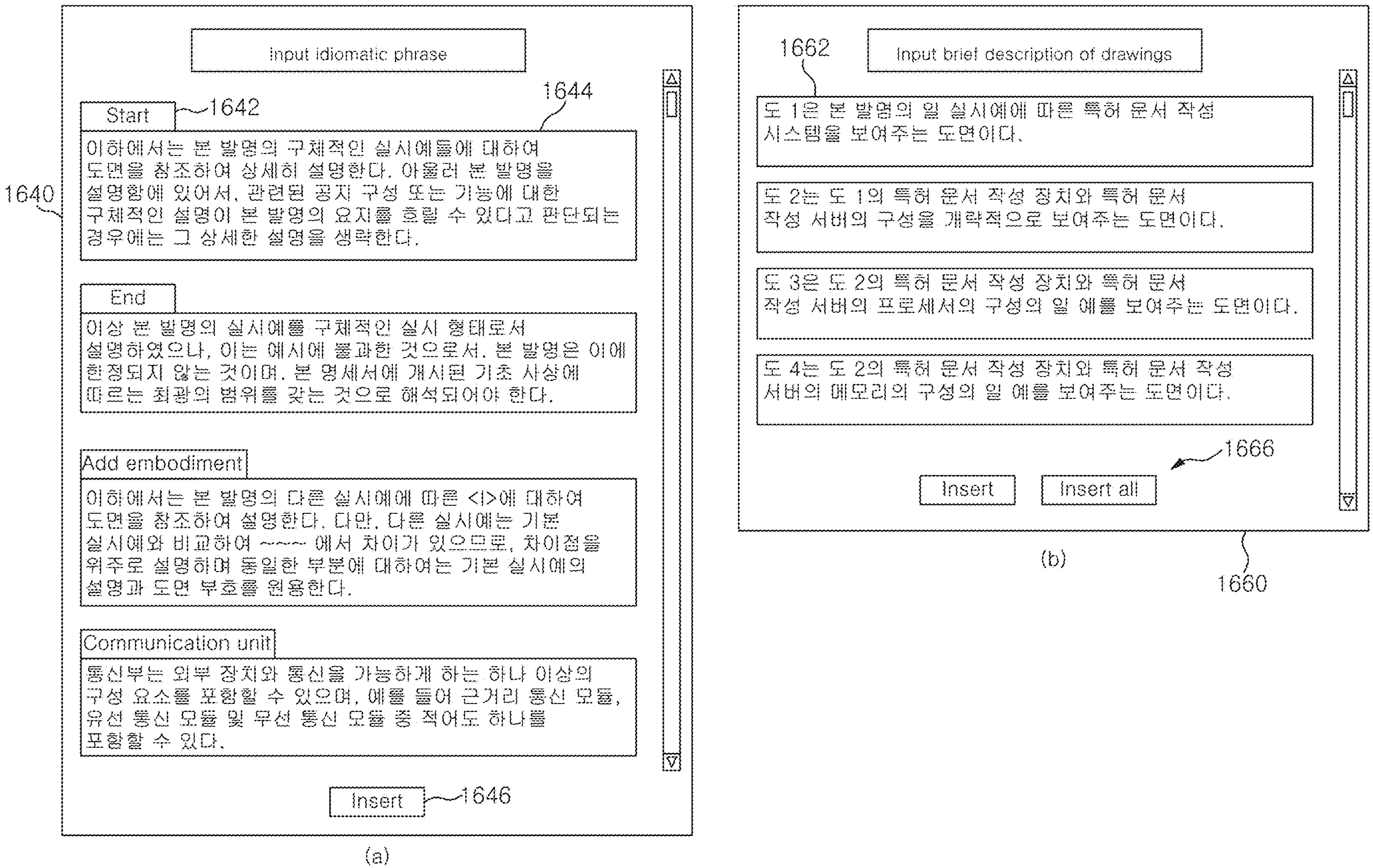
FIG. 18 is a diagram illustrating an example of an insertion string selection screen of the application for drafting a patent document in FIG. 5.

FIG. 18 is a diagram illustrating an example of an insertion string selection screen of the application for drafting a patent document in FIG. 5.

FIG. 18(*a*) illustrates an idiomatic phrase selection screen 1640 invoked to input, as an insertion string, an idiomatic phrase into the detailed description input component 1620. Referring to FIG. 18(*a*), a plurality of previously input idiomatic phrases may be displayed on the idiomatic phrase selection screen 1640. Specifically, an idiomatic phrase title display region 1642 and an idiomatic phrase contents display region 1644 may be output. In this case, the content of the idiomatic phrase may include a replacement portion. In the drawing, an "embodiment addition" includes a replacement portion "<I>." "<I>" may be replaced with the title of an invention and inserted into the detailed description input component 1620.

After selecting an idiomatic phrase to be inserted, a user may issue an insertion instruction through an instruction input component 1646. Accordingly, the text input component management unit 106 inserts the selected idiomatic phrase into the detailed description input component 1620.

The idiomatic phrase selection screen 1640 may be used to insert, as an insertion string not directly related to the contents of an invention, data previously input by an idiomatic expression management screen 1800, etc.

FIG. 18(*b*) illustrates a brief-description-of-drawings selection screen 1660 invoked to input, as an insertion string, a brief description of drawings into the detailed description input component 1620. Unlike the idiomatic phrase selection screen 1640, the brief-description-of-drawings selection screen 1660 may be understood to be provided as an example of a screen for inserting data, previously drafted as the contents of a patent specification, into the detailed description input component 1620. That is, as in the brief-description-of-drawings selection screen 1660, the claim insertion screen, the effects-of-invention insertion screen, etc. may be provided.

The brief-description-of-drawings selection screen 1660 may include a drawing description display region 1662 which may be provided for each drawing information input unit. A sentence which may be generated by the drawing information input unit may be included as corresponding contents in the drawing description display region 1662. After selecting a description of a drawing to be inserted, a user may issue an insertion instruction through an instruction input component 1666. Accordingly, the text input component management unit 106 inserts the selected description of the drawing into the detailed description input component 1620. In this case, the instruction input component 1666 may also include a button for issuing the entire insertion instruction. If the button is selected, all of contents displayed on a screen may be inserted into the detailed description input component 1620. The aforementioned function may be useful to a user who drafts a detailed description after fully moving a brief description of drawings to the detailed description or fully moving the claims to the detailed description.

Figure 19:
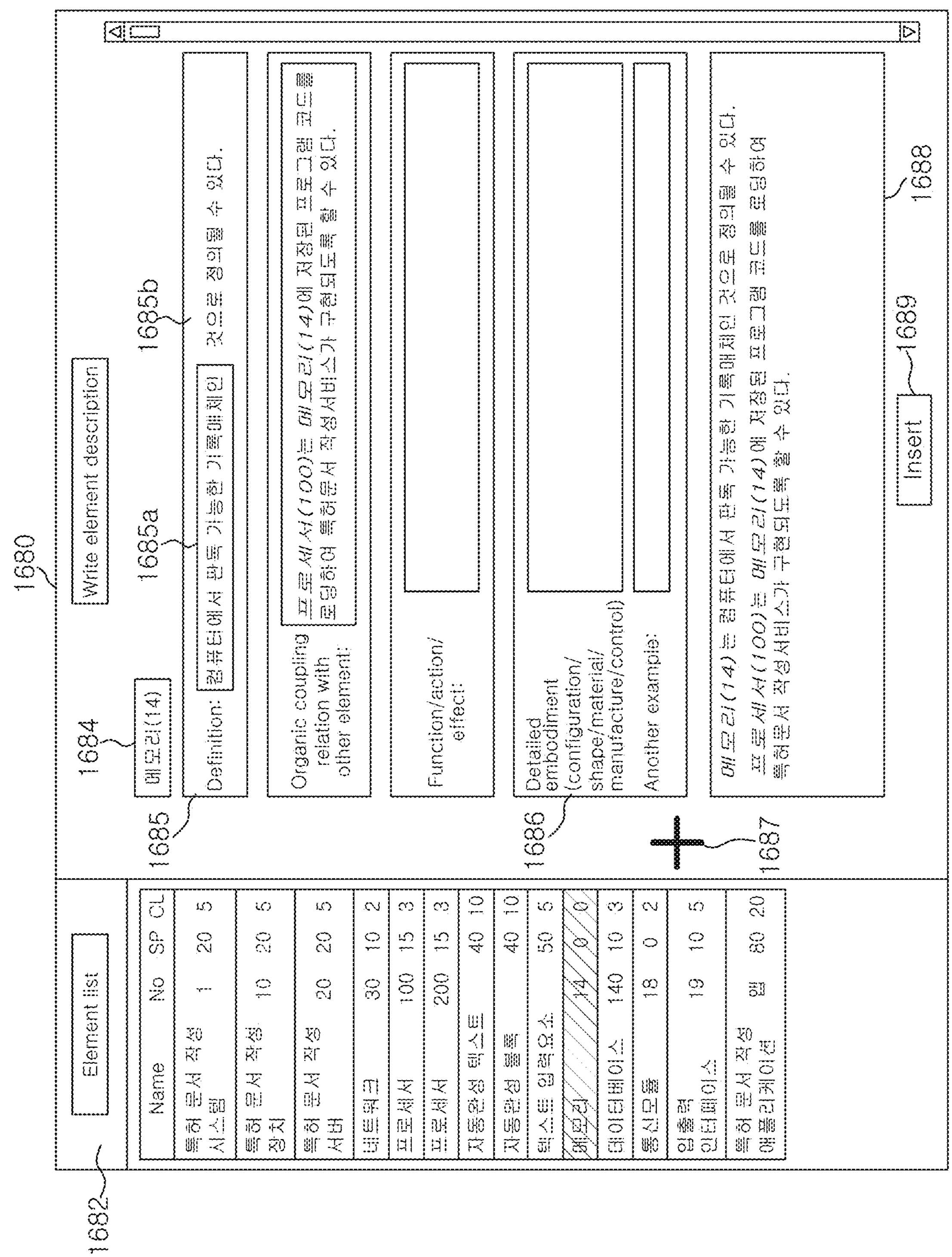
FIG. 19 is a diagram illustrating an example of an element description drafting screen of the application for drafting a patent document in FIG. 5.

FIG. 19 is a diagram illustrating an example of an element description drafting screen of the application for drafting a patent document in FIG. 5.

Referring to FIG. 19, the element description drafting screen 1680 may be provided. The element description drafting screen 1680 may include an element selection U 1682 provided by an element list. When a user selects any one element in the element selection UI 1682, other input components may be set so that a detailed description of the element can be input.

Specifically, the element description drafting screen 1680 may include an element name display region 1684 in which the name of a selected element is displayed, and may include one or more subject contents input units 1685 for inputting contents related to a preset subject. A subject contents input component 1685*a* and a guide phrase 1685*b* may be provided in the subject contents input unit 1685. A user can adjust contents, input to the subject contents input component 1685*a*, with reference to the guide phrase 1685*b* so that a completed sentence is formed.

As in a detailed embodiment, several additional subject contents input units 1686 which may be added may be provided. An input unit addition UI 1687 for adding the additional subject contents input unit 1686 may be provided.

An explanation text input component 1688 may be provided in which a description of an element may be drafted based on contents input to the subject contents input unit 1685 and the additional subject contents input unit 1686.

After completing a data input on the element description drafting screen 1680, a user may input an insertion instruction through an instruction input component 1689. Accordingly, the data of the explanation text input component 1688 may be inserted into the detailed description input component 1620.

Detailed contents related to the function of the element description drafting screen 1680 have been specifically described in the portions related to the element description input processing unit 123 and the element description storage unit 165, and thus a redundant description thereof is omitted.

Figure 20:
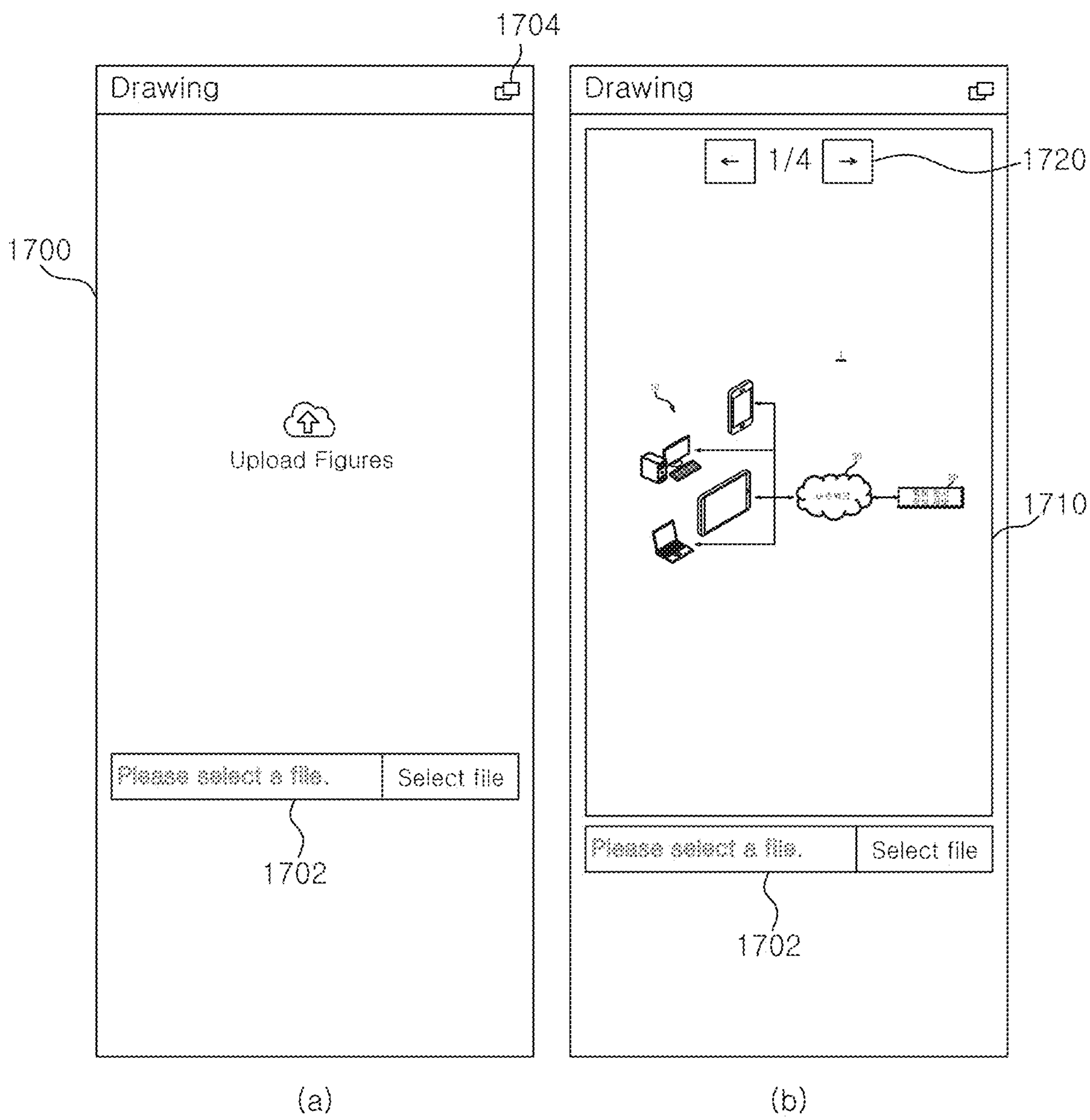
FIG. 20 is a diagram illustrating an example of a drawing management screen of the application for drafting a patent document in FIG. 5.

FIG. 20 is a diagram illustrating an example of a drawing management screen of the application for drafting a patent document in FIG. 5.

Referring to FIG. 20, the drawing management screen 1700 may be understood as a screen provided to register a drawing and refer to the contents of a drawing. In order to increase space utilization, the drawing management screen 1700 may be provided to fill the fifth region 1000*e*. The screen configuration unit 101 may also adjust the size of the drawing management screen 1700 if the size of the fifth region 1000*e* is changed by a manipulation of the screen configuration setting UI 1002.

The drawing management screen 1700 may include a drawing registration UI 1702 and a drawing display region 1710. A user can register a drawing file located in the apparatus for drafting a patent document 10 through the drawing registration UI 1702. The registered file may be displayed in the drawing display region 1710.

In this case, the drawing management screen 1700 may further include a drawing movement UI 1720 for changing a displayed drawing if a plurality of drawings is registered.

Meanwhile, a new window UI 1704 for popping up the drawing management screen 1700 as a new window may be provided on the drawing management screen 1700. The new window UI 1704 may be provided even on another screen. If a new window is popped up by the new window UI 1704, the state of a corresponding screen may be changed so that the screen is not displayed on the patent document drafting screen.

Detailed contents related to the function of the drawing management screen 1700 have been specifically described in the portions related to the drawing management unit 107 and the drawing storage unit 145, and thus a redundant description thereof is omitted.

Figure 21:
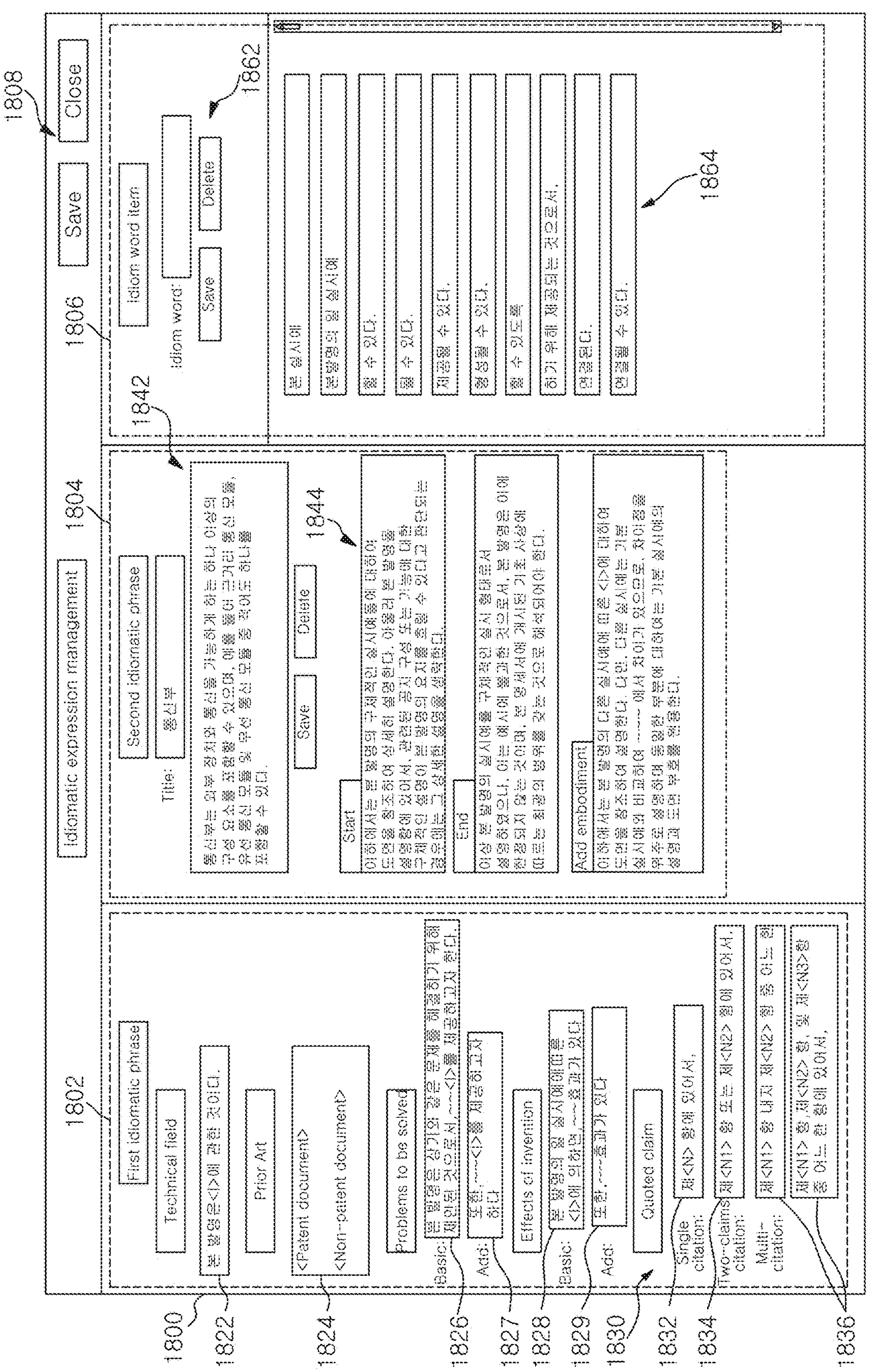
FIG. 21 is a diagram illustrating an example of an idiomatic expression management screen of the application for drafting a patent document in FIG. 5.

FIG. 21 is a diagram illustrating an example of an idiomatic expression management screen of the application for drafting a patent document in FIG. 5.

Referring to FIG. 21, the idiomatic expression management screen 1800 may be provided. The idiomatic expression management screen 1800 may be invoked through the patent document drafting screen or a given UI provided in the application for drafting a patent document.

The idiomatic expression management screen 1800 may include a first idiomatic phrase management region 1802 in which an idiomatic phrase which may be used dependently on each item of a patent specification is managed, a second idiomatic phrase management region 1804 in which an idiomatic phrase which may be used as an insertion string is managed, and an idiom word management region 1806 in which an idiom word which may be used as an autocomplete item is managed.

The first idiomatic phrase management region 1802 may include a technical field idiomatic phrase management UI 1822, a document information idiomatic phrase management UI 1824, a basic object idiomatic phrase management UI 1826, an additional object idiomatic phrase management UI 1827, a basic effect idiomatic phrase management UI 1828, an additional effect idiomatic phrase management UI 1829, and a quoted claim input idiomatic phrase management UI 1830. Each of the UIs may include a text input component. Contents input to the text input component may be used as an idiomatic phrase on a corresponding drafting screen.

In this case, a replacement portion may be included in the idiomatic phrase. In the present embodiment, an example is illustrated in which "<I>" is used as a replacement portion for the title of an invention. In this case, the title of an invention in lieu of "<I>" may be inserted into an idiomatic phrase and used.

Meanwhile, the quoted claim input idiomatic phrase management UI 1830 may include a single citation idiomatic phrase management UI 1832, a two-claim citation idiomatic phrase management UI 1834, and a multi-citation idiomatic phrase management UI 1836. In the idiomatic phrase management UIs, "<N>", "<N1>", "<N2>", "<N3>", etc. may be used as replacement portions for claim numbers. The quoted claim input idiomatic phrase management UI 1830 may be further subdivided depending on a document format or user setting.

An insertion string management UI 1842 in which an insertion string may be registered, corrected or deleted and an insertion string display UI 1844 in which input contents are displayed may be provided in the second idiomatic phrase management region 1804. In this case, a replacement portion, such as "<I>", may be used as the contents of the insertion string.

An idiom word management UI 1862 in which an idiom word item may be registered, corrected or deleted and an idiom word display UI 1864 in which input contents are displayed may be provided in the idiom word management region 1806. A user can freely add and use an idiomatic expression to be included in an auto-complete list through the idiom word management region 1806.

After data management for an idiomatic expression is completed, a user may store edited data through an instruction input component 1808.

Figure 22:
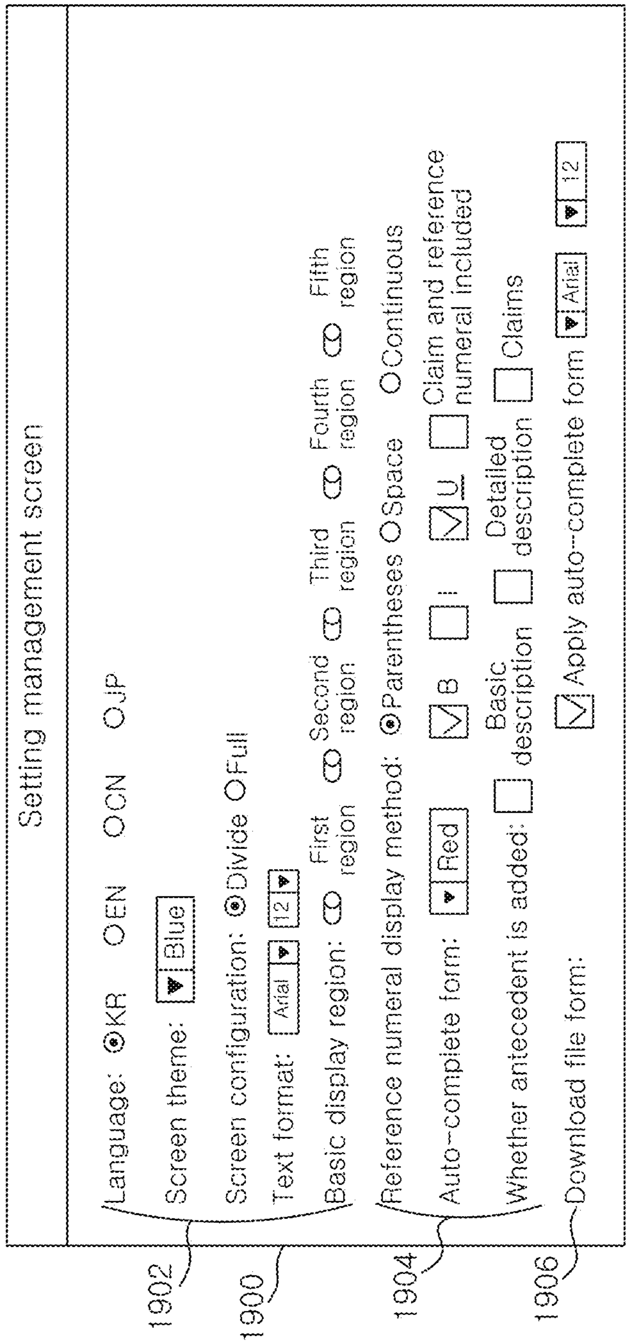
FIG. 22 is a diagram illustrating an example of a setting management screen of the application for drafting a patent document in FIG. 5.

FIG. 22 is a diagram illustrating an example of a setting management screen of the application for drafting a patent document in FIG. 5.

FIG. 22 illustrates the setting management screen 1900 on which a required setting value may be changed in using the application for drafting a patent document and the patent document drafting screen. The setting management screen 1900 may include a global setting management UI 1902 which may be applied to the entire application for drafting a patent document or the entire patent document drafting screen, an auto-complete setting management UI 1904 which may be used for auto-completion, and a download file management UI 1906 which may be applied to generate a download file.

In some embodiments, the setting management screen 1900 may further include UIs for determining whether to include an element list in a download file, configuring a combination of key inputs for modifying data upon auto-completion, etc.

Figure 23:
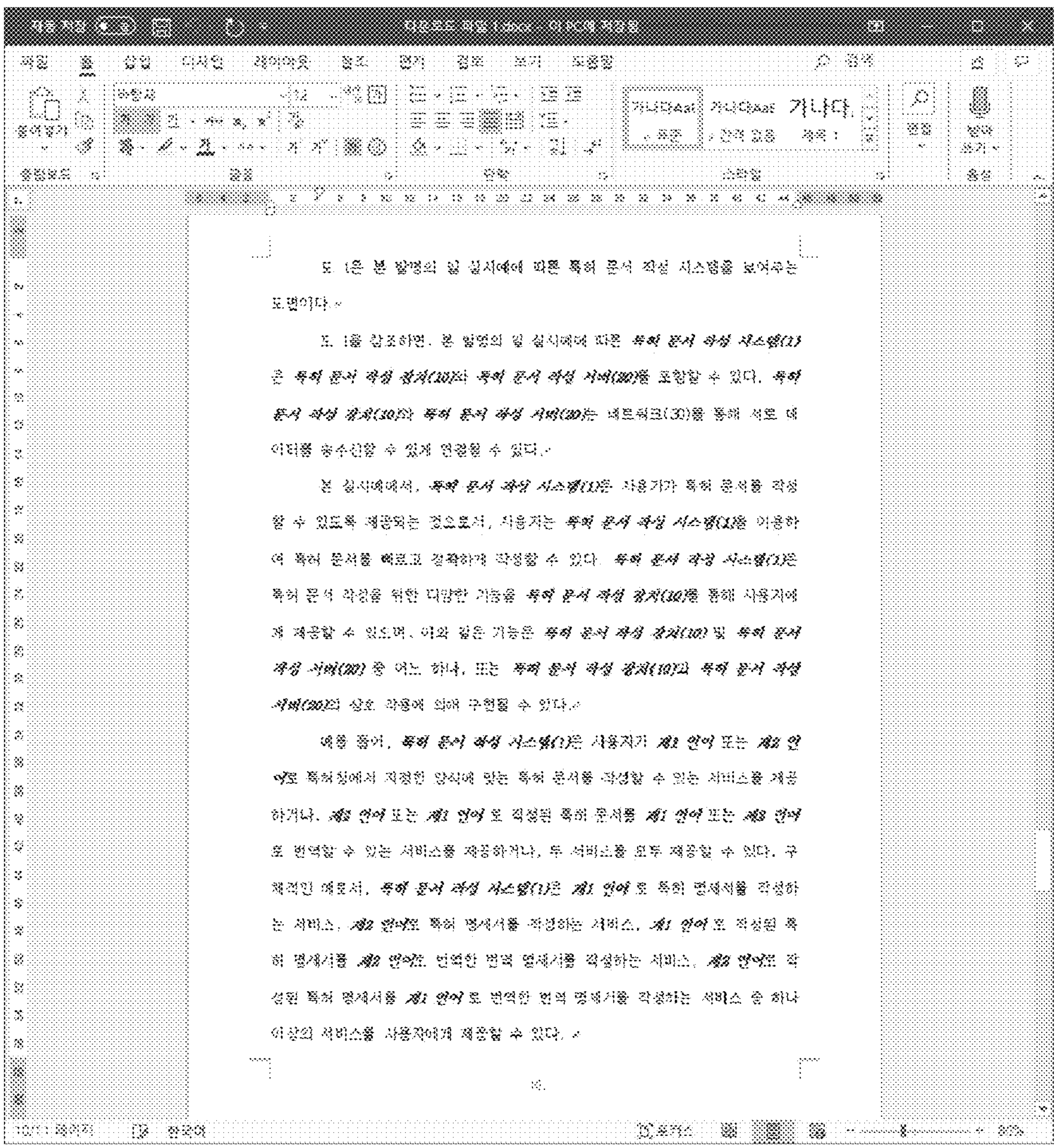
FIG. 23 is a diagram illustrating an example of a download file which may be downloaded after a patent document is drafted through the application for drafting a patent document of FIG. 5.

FIG. 23 is a diagram illustrating an example of a download file which may be downloaded after a patent document is drafted through the application for drafting a patent document in FIG. 5.

Referring to FIG. 23, a patent document drafted through the application for drafting a patent document may be provided in a file form downloadable by the download file generation unit 109. In the present embodiment, a file downloaded in the "Word" file format is illustrated. In this case, data included in the download file may be displayed so that auto-complete text or an auto-complete block is distinguished from other text portions, as illustrated on the patent document drafting screen.

In some embodiments, in addition to data directly written as the contents of a patent specification, a list of elements written through the element management screen 1100 may also be included in a download file.

A download file provided as described above may be provided from a user who has drafted a patent specification through the application for drafting a patent document to a client who has requested a patent document to be drafted. The client can receive the patent document having improved readability as described above, and can more comfortably review the contents of the patent document.

Figure 24:
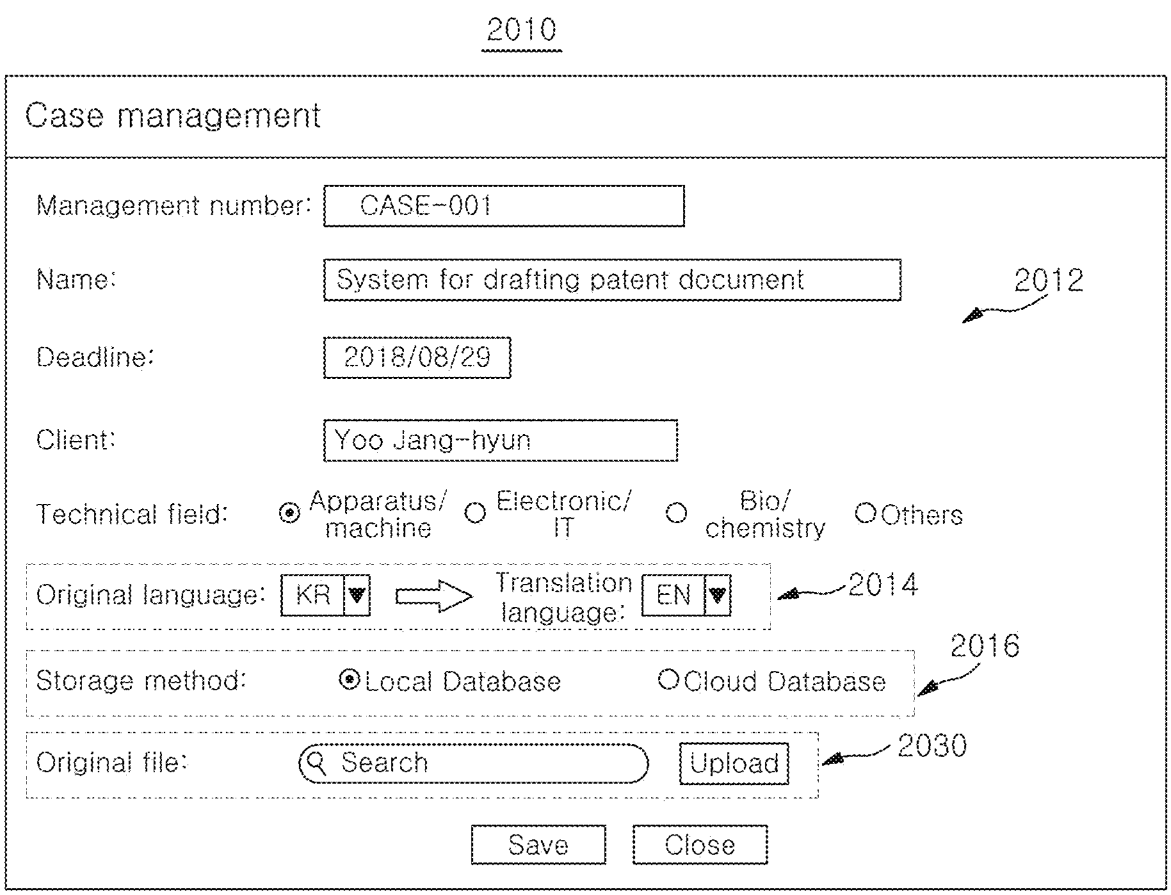
FIG. 24 is a diagram illustrating an example of a case management screen and original file registration screen of the application for drafting a patent document for providing a second service according to an embodiment of the present invention.

FIG. 24 is a diagram illustrating an example of a case management screen and original file registration screen of the application for drafting a patent document for providing the second service according to an embodiment of the present invention.

Referring to FIG. 24, the application for drafting a patent document may provide a user with a case management screen 2010 for generating and managing a case as an object for drafting one patent translation, in order to provide the user with the second service in which a patent translation is drafted.

The case management screen 2010 may be basically configured to have a structure similar to that of the case management screen 1010. Specifically, the case management screen 2010 may include a basic information input UI 2012 for receiving, from a user, basic information related to a case, such as a management number, a case name, a deadline, a client, and a technical field, and may include a storage method selection UI 2016 configured to enable a user to select a location where information input in relation to a case will be stored. The basic information input UI 2012 and the storage method selection UI 2016 may substantially correspond to the basic information input UI 1012 and the storage method selection UI 1016, and thus detailed descriptions thereof are omitted.

The case management screen 2010 may include a language information selection UI 2014 in which a second language, that is, a language of the original to be translated and a first language, that is, a language of a translation, may be selected. The language information selection UI 2014 may be configured to combine sets of the first language and the second language supported by a system. In the present embodiment, an example is illustrated in which a language is selected as a select input component. A rule used by the elements of the second processing unit 100*c*, 200*c* may be different depending on language information selected through the language information selection UI 2014, and data used for the second storage unit 140*c*, 240*c* may be different depending on the language information.

In the present embodiment, an example is described in which Korean is selected as the second language, that is, an original language, and English is selected as the first language, that is, a translation language.

Meanwhile, an original file registration screen 2030 onto which an original file to be translated by a user may be uploaded may be provided in some regions of the case management screen 2010. The original file registration screen 2030 may include an input component in which a user may select and register an original file to be translated in the apparatus for drafting a patent document 10. For example, the original file registration screen 2030 may include a file input component of html. A UI for registering a file on a web page may be variously provided, and the spirit of the present invention is not limited thereto.

When a storage instruction is received through the UI of the case management screen 2010 from a user who has finished a data input, the case management unit 103 may transmit, to the server for drafting a patent document 20, data input to the case management screen 2010. The case management unit 203 may store the received data in the case information storage unit 242. In this case, the case management unit 103 may verify the validity of the received data and the selected original file. The case management unit 203 may transmit the results of the processing of the received data to the case management unit 103. The case management unit 103 may provide the results to the user, and may perform preset processing according to the results.

Furthermore, in the present embodiment, the original file registration screen 2030 is provided as some regions of the case management screen 2010. When received from a user through the UI of the case management screen 2010, a storage instruction may also be recognized as the storage instruction for the original file. Accordingly, the original data management unit 131 may perform preset processing. For example, if a storage location selected through the storage method selection UI 2016 is the apparatus for drafting a patent document 10, the original data management unit 131 may extract original data from an original file and then invoke an original data edit screen 2100 to be described later. If a storage location selected through the storage method selection UI 2016 is the server for drafting a patent document 20, the original data management unit 131 may transmit an original file to the original data management unit 231 of the server for drafting a patent document 20. The original data management unit 231 of the server for drafting a patent document 20 may extract original data from the original file and transmit the extracted original data to the original data management unit 131. In this case, the original data management unit 131 may invoke the original data edit screen 2100 to be described later based on the received original data.

If case information is stored normally and original data is extracted normally from an original file, the case management unit 103 may change, into the original data edit screen 2100, a screen output to the application for drafting a patent document. In this case, as in the first service, data input on the case management screen 2010 is not transmitted to the server for drafting a patent document 20, and may be managed only in the apparatus for drafting a patent document 10.

Furthermore, after a case is generated, the case management screen 2010 may be invoked again on the patent document drafting screen. In this case, each input component may be provided in which the input component has been filled with previously input case information. Accordingly, a user can correct case information. In this case, the language information selection UI 2014 may be provided so that language information cannot be corrected. Moreover, the original file registration screen 2030 may be provided so that a new original file is not registered after an original file is registered and original data is extracted. In this case, a user needs to input new case information and use the second service as a new case, in order to register a new original file.

In the present embodiment, an example has been described in which the original file registration screen 2030 is provided as part of the case management screen 2010, but the spirit of the present invention is not limited thereto. For example, the original file registration screen 2030 may be provided as an independent web page, may be provided as a region hidable or foldable in a web page, or may be provided as a pop-up page or window. For example, the original file registration screen 2030 may configure a form wizard that provides a series of continuous input screens along with the case management screen 2010 and the original data edit screen 2100. In this case, the original file registration screen 2030 may be positioned as a next screen of the case management screen 2010 so that a user can register an original file after basic information of a case is input by the case management screen 2010.

Figure 25:
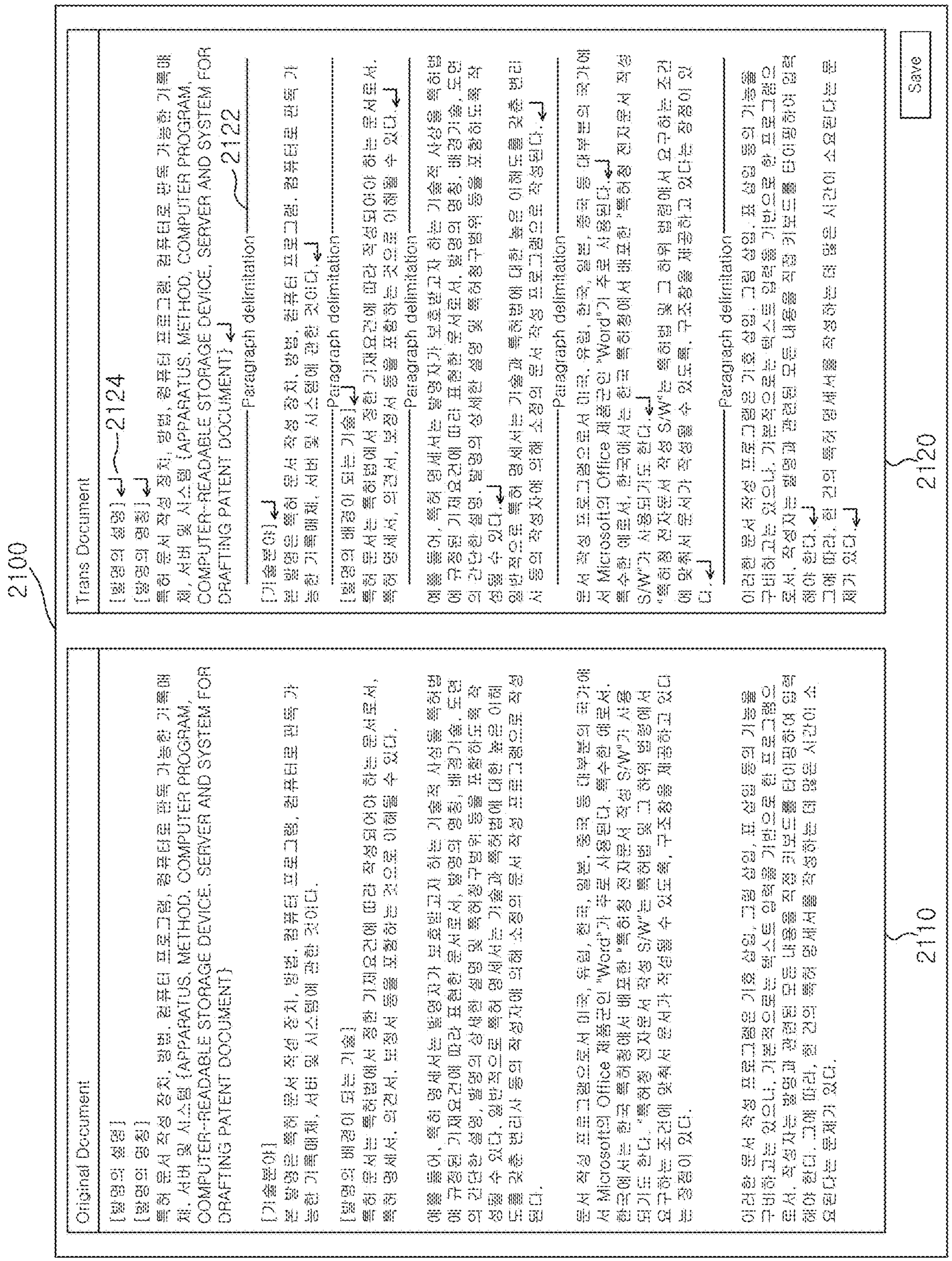
FIG. 25 is a diagram illustrating an example of an original data edit screen of the application for drafting a patent document in FIG. 24.

FIG. 25 is a diagram illustrating an example of an original data edit screen of the application for drafting a patent document in FIG. 24.

FIG. 25 illustrates the original data edit screen 2100. An original data display UI 2110 for displaying the contents of an original file without any change is provided on one side of the original data edit screen 2100. The original data display UI 2110 may output data, read from an original file, without any change. Accordingly, a user may understand the original data display UI 2110 as a portion that substitutes the original file. An original data-editing text input component 2120 is provided on the other side of the original data edit screen 2100. A user may edit original data in a form, in which the original data can be used in the application for drafting a patent document, using the original data-editing text input component 2120. Basically, the boundaries of a paragraph and a sentence may be determined by the original data management unit 131. The original data management unit 131 may add a paragraph boundary delimiter 2122 and a sentence boundary delimiter 2124 to data displayed in the original data-editing text input component 2120. When a user edits data in the original data-editing text input component 2120, the original data management unit 131 may automatically add the paragraph boundary delimiter 2122 and the sentence boundary delimiter 2124 to corresponding locations. The paragraph boundary delimiter 2122 and the sentence boundary delimiter 2124 are shown to the user through the original data-editing text input component 2120. Accordingly, the user can more conveniently check whether the boundaries of a sentence and a paragraph are set well.

Figure 26:
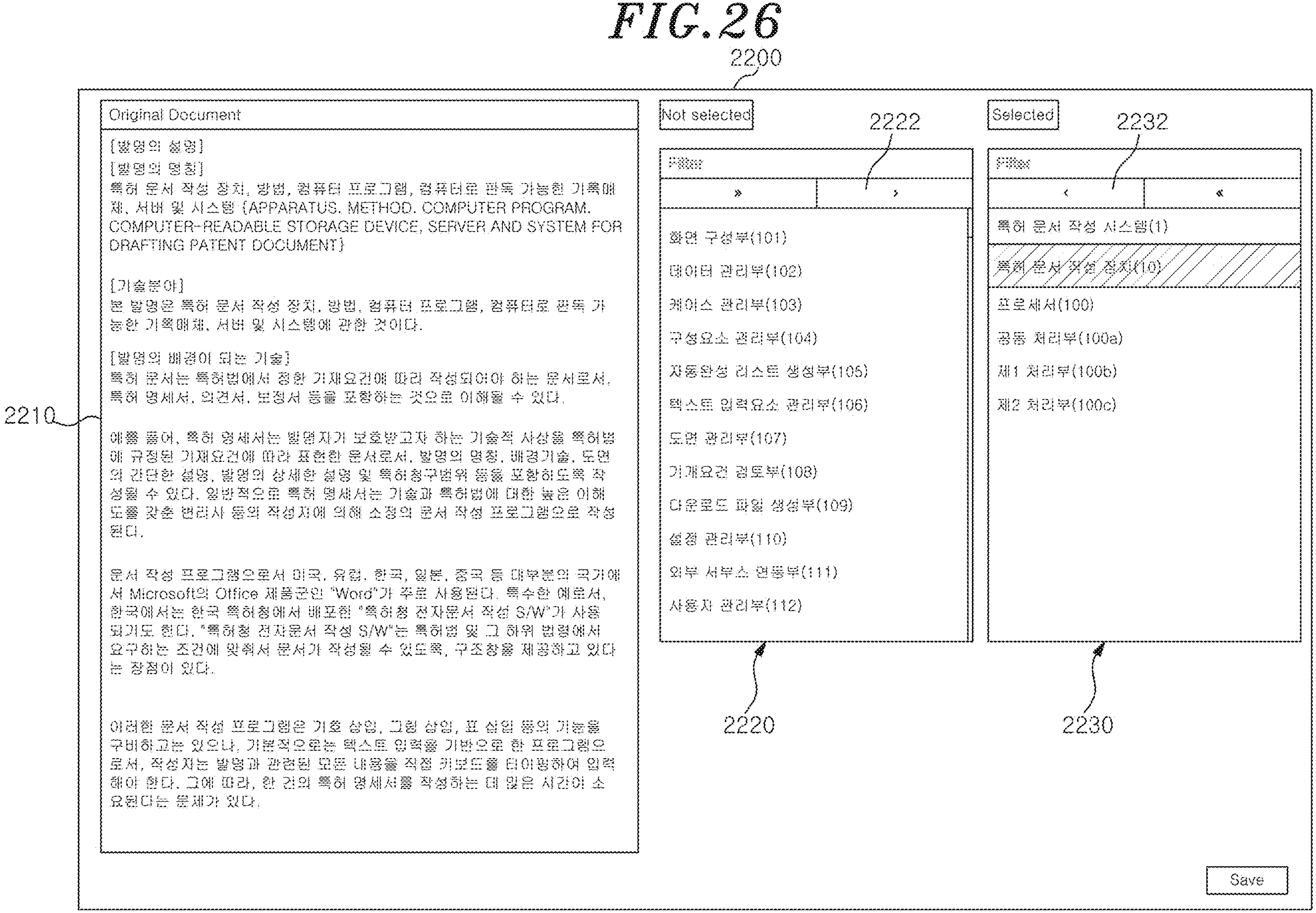
FIG. 26 is a diagram illustrating an example of an element selection screen of the application for drafting a patent document in FIG. 24.

FIG. 26 is a diagram illustrating an example of an element selection screen of the application for drafting a patent document in FIG. 24.

When the editing of original data is completed, an element selection screen 2200 is provided. An original data display UI 2210 in which a user can check a use of an element within original data may be provided on the element selection screen 2200. The original data display UI 2210 may highlight and display an element selected by a user. If corresponding elements are several, they may be provided in a way to be navigated.

A candidate element display region 2220 and a storage element display region 2230 may be provided on the element selection screen 2200. The element extraction unit 132 may extract elements from original data, and may present the extracted elements to a user through the candidate element display region 2220. The user may select, from the elements, elements to be registered and used as elements on the patent document drafting screen, and may move the selected elements to the storage element display region 2230. An element selection UI 2222 and an element selection release UI 2232 for a mutual data change may be provided in the candidate element display region 2220 and the storage element display region 2230, respectively. Each of the element selection UI 2222 and the element selection release UI 2232 may be implemented to move one element or several elements at the same time.

In this case, the number of times that a corresponding element appears in original data, along with an element name and a corresponding identification number, may be displayed in the candidate element display region 2220.

When a user issues a storage instruction after completing the selection of an element on the element selection screen 2200, the element input to the storage element display region 2230 may be stored as an element by the element management unit 104.

Figure 27:
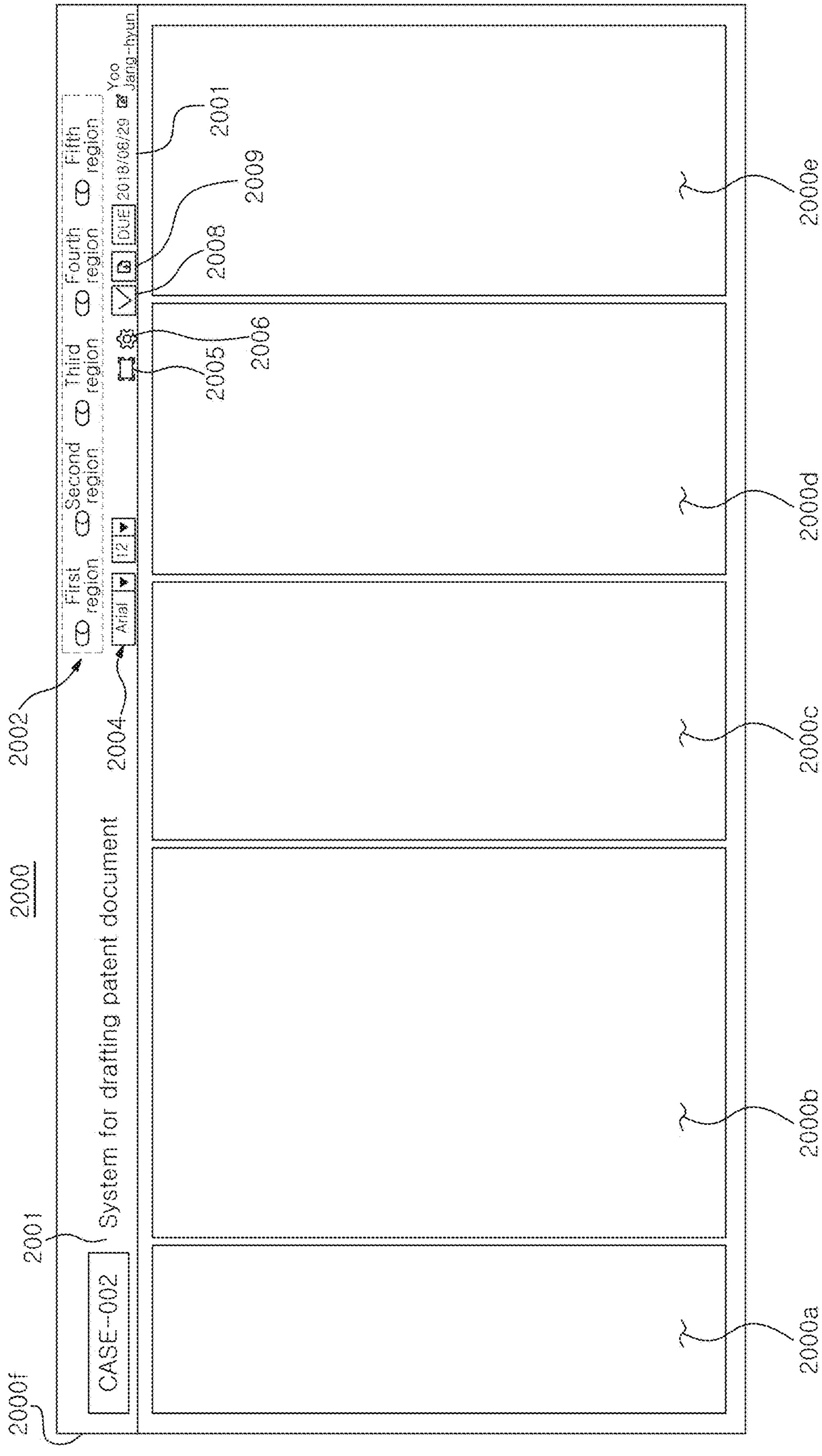
FIG. 27 is a diagram illustrating an example of a patent document drafting screen of the application for drafting a patent document in FIG. 24.

FIG. 27 is a diagram illustrating an example of a patent document drafting screen of the application for drafting a patent document in FIG. 24.

Referring to FIG. 27, like the patent document drafting screen 1000 for the first service, a patent document drafting screen 2000 for the second service output by the application for drafting a patent document may be dividedly configured with a plurality of regions. A screen or preset content for providing the second service for drafting a patent translation may be positioned in each region.

A basic configuration of the patent document drafting screen 2000 for the second service may be substantially the same as that of the patent document drafting screen 1000 for the first service. Specifically, the patent document drafting screen 2000 for the second service includes a plurality of regions 2000*a*, 2000*b*, 2000*c*, 2000*d*, and 2000*e*. A header region 2000*f* may be provided on the upper side of the patent document drafting screen 2000.

In the present embodiment, an example is described in which an element management screen 2300 is positioned in a first region 2000*a*, a translation drafting screen 2500 is positioned in a second region 2000*b*, a translation result screen 2600 is positioned in a third region 2000*c*, a search screen 2700 is positioned in a fourth region 2000*d*, and a drawing management screen is positioned in a fifth region 2000*e*. In this case, the drawing management screen positioned in the fifth region 2000*e* may be provided in the same manner as the drawing management screen 1700, and thus a detailed description thereof is omitted. Detailed contents of the remaining regions and the screens disposed within the remaining regions will be described later with reference to a drawing.

A case information display region 2001, a screen configuration setting UI 2002, a text format setting UI 2004, a screen control UI 2005, a setting management screen invoking UI 2006, a case completion processing UI 2008, and a download file creation UI 2009, which may correspond to the case information display region 1001, the screen configuration setting UI 1002, the text format setting UI 1004, the screen control UI 1005, the setting management screen invoking UI 1006, the case completion processing UI 1008, and the download file creation UI 1009 provided in the header region 1000*f*, respectively, may be provided in the header region 2000*f*. Characteristics of the aforementioned elements provided in the header region 2000*f* are substantially the same as those of the aforementioned corresponding elements of the header region 1000*f*. There is a difference only in that not a patent specification but a patent translation is drafted as a patent document, and thus a detailed description thereof is omitted.

In the structure of the patent document drafting screen 2000 for the second service disclosed in FIG. 27, the number, shapes, sizes and arrangement of the regions are illustratively provided, and the spirit of the present invention is not limited thereto. Furthermore, the type of screen and the type of UI disposed in each region do not limit the spirit of the present invention.

As in the present embodiment, if the patent document drafting screen is dividedly provided as a plurality of regions and a screen necessary to draft a patent translation is positioned in each region, a user can more rapidly and accurately perform patent translation business because he or she can draft a patent translation while referring to several data on one screen.

Figure 28:
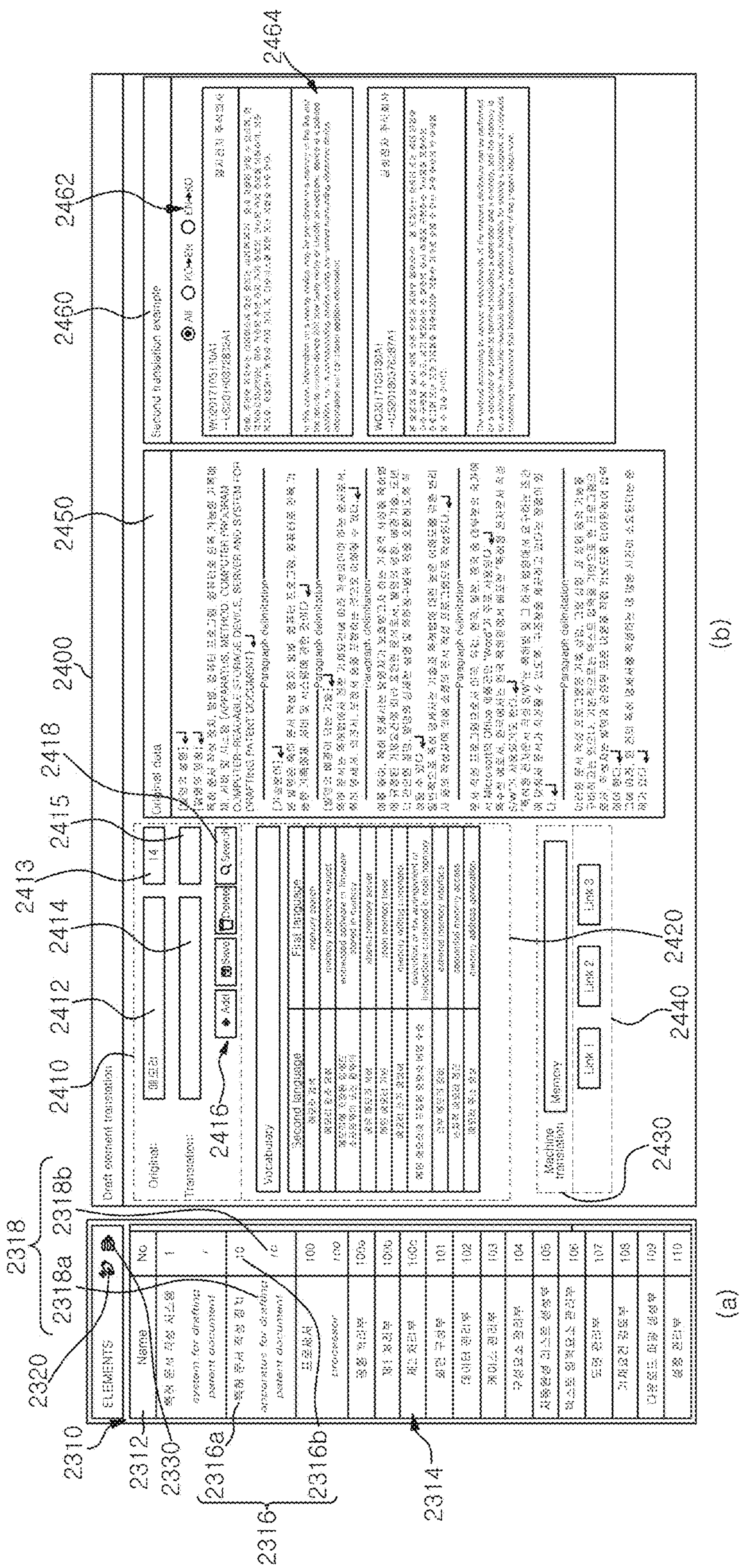
FIG. 28 is a diagram illustrating an example of an element management screen and element translation registration screen of the application for drafting a patent document in FIG. 24.

FIG. 28 is a diagram illustrating an example of an element management screen and element translation registration screen of an application for drafting a patent document in FIG. 24.

FIG. 28(*a*) illustrates the element management screen 2300 provided to manage element information which may be used to draft a patent translation, and FIG. 28(*b*) illustrates an element translation drafting screen 2400 provided for a user to conveniently input a translation of an element as element information.

First, referring to FIG. 28(*a*), the element management screen 2300 may include an element display UI 2310 for displaying input component information, an element translation drafting screen invoking UI 2320 for invoking the element translation drafting screen 2400, and an element selection screen invoking UI 2330 for invoking an element selection screen 2200*a*. Unlike the element management screen 1100 for the first service, the element management screen 2300 may be provided on the element translation drafting screen 2400 or the element selection screen 2200*a* on which a UI for managing an element is separately provided. Accordingly, a user can input a translation of an element while referring to other data more easily. The aforementioned configuration is merely an example. In some embodiments, the element translation drafting screen 2400 or the element selection screen 2200*a* may be provided as part of the element management screen 2300.

If no element has been registered, the element management screen 2300 may include a phrase for inducing the registration of an element and a UI for invoking the element translation drafting screen 2400 as in FIG. 7(*a*).

Like the element display UI 1130, the element display UI 2310 may include a title region 2312 and a content region 2314. The element display UI 2310 is provided to draft a patent translation, and display of the number of times of appearance may be omitted. In the present embodiment, an element in the second service may include original information and translation information of the element. An element original 2316 and an element translation 2318 may be displayed in the content region 2314. In this case, the element translation 2318 may be expressed in a format different from that of the element original 2316, so that a user can easily recognize that the element translation is a translation. The element translation 2318 may be omitted in an element whose translation has not been input.

The element original 2316 may be composed of an element original name 2316*a* and an element original identification code 2316*b*. The element translation 2318 may be composed of an element translation name 2318*a* and an element translation identification code 2318*b*. In the present embodiment, an example is illustrated in which the element original name 2316*a* and the element translation name 2318*a* are disposed up and down in parallel and the element original identification code 2316*b* and the element translation identification code 2318*b* are disposed up and down in parallel next to the element original name 2316*a* and the element translation name 2318*a* so that a user can easily recognize that the element original name and the element translation name correspond to each other and the element original identification code and the element translation identification code correspond to each other. The aforementioned configuration of the element display UI 2310 is merely an example. In some embodiments, the aforementioned configuration may be differently provided.

The element translation drafting screen invoking UI 2320 and the element selection screen invoking UI 2330 may be UIs provided in a button form. When a user clicks on the UI, the element translation drafting screen 2400 or the element selection screen 2200*a* on which an element may be managed may be invoked. The element translation drafting screen 2400 or the element selection screen 2200*a* may be displayed in the form of a pop-up window or a modal window.

FIG. 28(*a*) illustrates an example in which translations of only some elements have been input and translations of other elements have not been input. In this case, a user may invoke the element translation drafting screen 2400 through the element translation drafting screen invoking UI 2320, and may input a translation of each element.

As another embodiment, if several elements are selected on the element selection screen 2200 as described above and the selected elements are input en bloc by the element management unit 104, the element management unit 104 may previously input, as the translations of the elements, data matched with an element original name in the translation vocabulary storage unit 275 or the results of a machine translation by the machine translation provision unit 236. In this case, it is possible to reduce inconvenience of re-inputting translations of many elements one by one.

Referring to FIG. 28(*b*), the element translation drafting screen 2400 may include an element translation management UI 2410 for performing management operations, such as the input, correction, and deletion of an element and a translation thereof, a translation vocabulary display UI 2420 for displaying the results of search of a translation vocabulary, a word machine translation display UI 2430 for referring to a machine translation, an external link provision UI 2440 for referring to the results of search in another website provided by a third party, an original data display region 2450 for checking a use of an element within original data, and a second translation example search screen 2460 for referring to translation results of another patent document.

The element translation management UI 2410 may include an element original name input component 2412 and an element original identification code input component 2413 in which original data of an element may be input, and an element translation name input component 2414 and an element translation identification code input component 2415 in which translation data of a corresponding element may be input. All of the element original name input component 2412, the element original identification code input component 2413, the element translation name input component 2414, and the element translation identification code input component 2415 are illustrated as being text input components, but the spirit of the present invention is not limited thereto.

Furthermore, the element translation management UI 2410 may include an instruction input component 2416 that provides a UI, such as a button for issuing an instruction to initialize, store, correct or delete data input to the element translation management UI 2410, like the instruction input component 1116. The configuration and function of the instruction input component 2416 may be provided in a similar way to the instruction input component 1116, and thus a detailed description thereof is omitted.

Meanwhile, the element translation management UI 2410 may include a search UI 2418, such as a search button for issuing an instruction to invoke the results of search using element original data as a keyword.

When a user issues a search instruction using the search UI 2418, vocabulary search, machine translation search, search within original data, and second translation example search may be performed by using an element original name, input to the element original name input component 2412, as a keyword, and the results of the search may be provided on the element translation drafting screen 2400.

Specifically, the results of vocabulary search based on language information input in the language information selection UI 2014, among data stored in the translation vocabulary storage unit 275, may be provided in the translation vocabulary display UI 2420. In the present embodiment, the second language is Korean, and the first language is English. Accordingly, the results of search of Korean-English vocabulary data may be provided.

Furthermore, a machine translation result value provided by the machine translation provision unit 136 using, as an input value, data input to the element original name input component 2412 may be output to the word machine translation display UI 2430. To this end, a text input component for the output may be provided in the word machine translation display UI 2430. As described above, the machine translation provision unit 136 may use a machine translation service provided by a third party. In order to perform a machine translation, data input to the element original name input component 2412 may be transmitted to the server for drafting a patent document 20. The results of a translation made by a machine translation engine and provided to the server for drafting a patent document 20 may be transmitted to the apparatus for drafting a patent document 10 again.

Furthermore, the external link provision UI 2440 may include a UI, such as a button into which a hyperlink for accessing another website has been inserted so that a user can conveniently check the results of search using, as a keyword, data input to the element original name input component 2412 in another website. In this case, the URL of a search site and the data input to the element original name input component 2412 may be included in the hyperlink, assigned to each button, as search keyword variable values. When a user clicks on the button, the results of search can be immediately output from a corresponding site to the element original name input component 2412. A screen invoked by the external link provision UI 2440 may be output as a pop-up window or a modal window. A linguistic dictionary or a common search site and a Euro patent information database site may be included in a link provided by the external link provision UI 2440.

The original data display region 2450 may display the contents of original data in order to refer to how an element input to the element original name input component 2412 is used within the original data. In the present embodiment, an example is illustrated in which original data edited by the original data-editing text input component 2120 is displayed as the contents of the original data display region 2450, but original data prior to the editing may be displayed without any change. The original data display region 2450 may enable text, matched with data input to the element original name input component 2412, to be recognized differently from another text by applying a preset format to the text. Furthermore, the original data display region 2450 may include a navigation UI for direct movement to each location if there are pieces of text matched with data input to the element original name input component 2412.

Meanwhile, the second translation example search screen 2460 may provide a user with a second translation example, that is, the results of a translation of another patent document. Specifically, under the patent translation practice, there are many cases where dictionary translation may not clearly convey a technical meaning. In this case, translation is performed with reference to the existing translation example of a patent document. In the present embodiment, when a user issues a search instruction through the search UI 2418, the second translation example search unit 235 may search data, stored in the second original storage unit 273 and the second translation storage unit 274, for data corresponding to data input to the element original name input component 2412, and may provide the results of the search to the element translation drafting screen 2400.

In this case, translation based on a first language and a second language may be bi-directionally performed. A translation direction selection UI 2462 for selecting a translation direction between the first language and the second language may be provided to the second translation example search screen 2460*a*.

The results of search by the second translation example search unit 235 may be displayed in the second translation example display region 2464. An original document number, a translation document number, an applicant, original data, translation data, etc. may be displayed as one translation unit.

In some embodiments, a search keyword used in each of the screens may be translation data input to the element translation name input component 2414, in addition to original data input to the element original name input component 2412.

When inputting a translation of an element, a user can refer to all of the translation vocabulary display UI 2420, the word machine translation display UI 2430, the external link provision UI 2440, the original data display region 2450, the second translation example search screen 2460, etc. on one screen. Accordingly, the user can rapidly and accurately determine a translation of an element and input the translation. In particular, use convenience can be greatly improved because all of the aforementioned reference data can be searched by one search instruction through the search UI 2418.

The input of element information through the element translation management UI 2410 may be stored in the element information storage unit 143 by the element management unit 104. In this case, the auto-complete list generation unit 105 may update a data set for auto-completion in response to a change in information of an element by the element management unit 104. To this end, when an event corresponding to an element information change occurs, the element management unit 104 may transmit the element information change to the auto-complete list generation unit 105. The update of the data set may be implemented in a similar way to the element management screen 1100, and thus a detailed description thereof is omitted.

In this case, the auto-complete list generation unit 105 may enable an element item of an auto-complete data set to be composed of an element translation name and an element translation identification code, by considering a unique characteristic of the second service that provides a translation. Furthermore, the auto-complete list generation unit 105 may further add an element item composed of only an element translation name even if an element translation 특허 문서 identification code is present. For example, if "특허 문서작성 시스템", "1", "system for drafting patent document", "1", etc., are input as element information by the element management unit 104, the auto-complete list generation unit 105 may generate "system for drafting patent document 1" and "system for drafting patent document" as element items, and may include the generated element items in a data set.

Furthermore, the text input component management unit 106 may update auto-complete text or an auto-complete block input to a text input component as described above in response to a change in information of an element by the element management unit 104.

Figure 29:
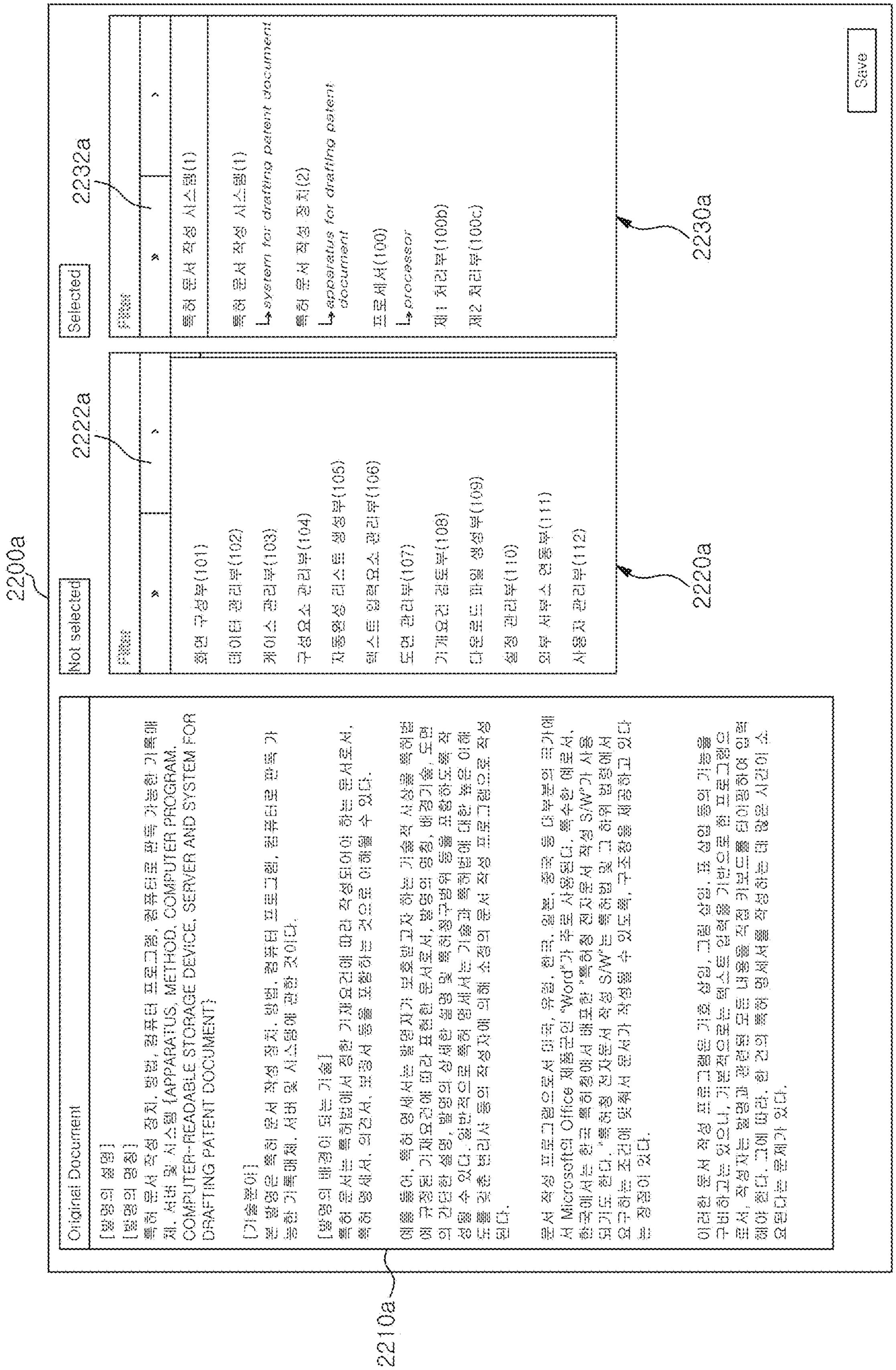
FIG. 29 is a diagram illustrating an example of an element selection screen invoked on the element management screen of the application for drafting a patent document in FIG. 24.

FIG. 29 is a diagram illustrating an example of the element selection screen invoked on the element management screen of the application for drafting a patent document in FIG. 24.

The element selection screen 2200*a* invoked on the element translation drafting screen 2400 may be configured in substantially the same manner as the element selection screen 2200. That is, the element selection screen 2200*a* may include an original data display UI 2210*a*, a candidate element display region 2220*a*, and a storage element display region 2230*a*. The candidate element display region 2220*a* and the storage element display region 2230*a* may include an element selection UI 2222*a* and an element selection release UI 2232*a*, respectively.

In this case, an element list managed by the element management unit 104 may be displayed in the storage element display region 2230*a*. A translation of an element whose translation has been input in the element list may also be displayed. Even in the element selection screen 2200*a*, data may be pulled out from the element list by moving the data from the storage element display region 2230*a* to the candidate element display region 2220*a*. However, a movement of an element whose translation has been input toward the candidate element display region 2220*a* may be limited.

Even in the element selection screen 2200*a*, a user may move, to the storage element display region 2230*a*, an element to be registered as an element and then issue a storage instruction. Accordingly, data included in the storage element display region 2230*a* may be registered as elements by the element management unit 104.

In this case, translations of elements whose translations have not been registered as described above may be registered en block using a machine translation, etc.

Figure 30:
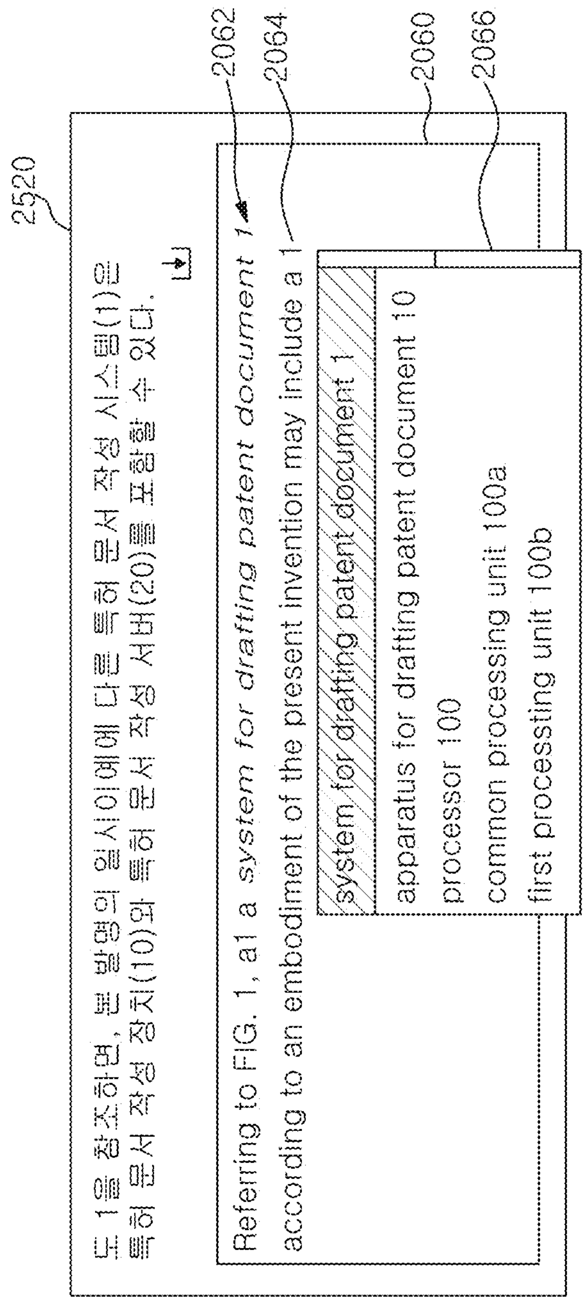
FIG. 30 is a diagram illustrating an example of an auto-complete function implemented by the application for drafting a patent document in FIG. 24.

FIG. 30 is a diagram illustrating an example of the auto-complete function implemented by the application for drafting a patent document in FIG. 24.

Figure 31:
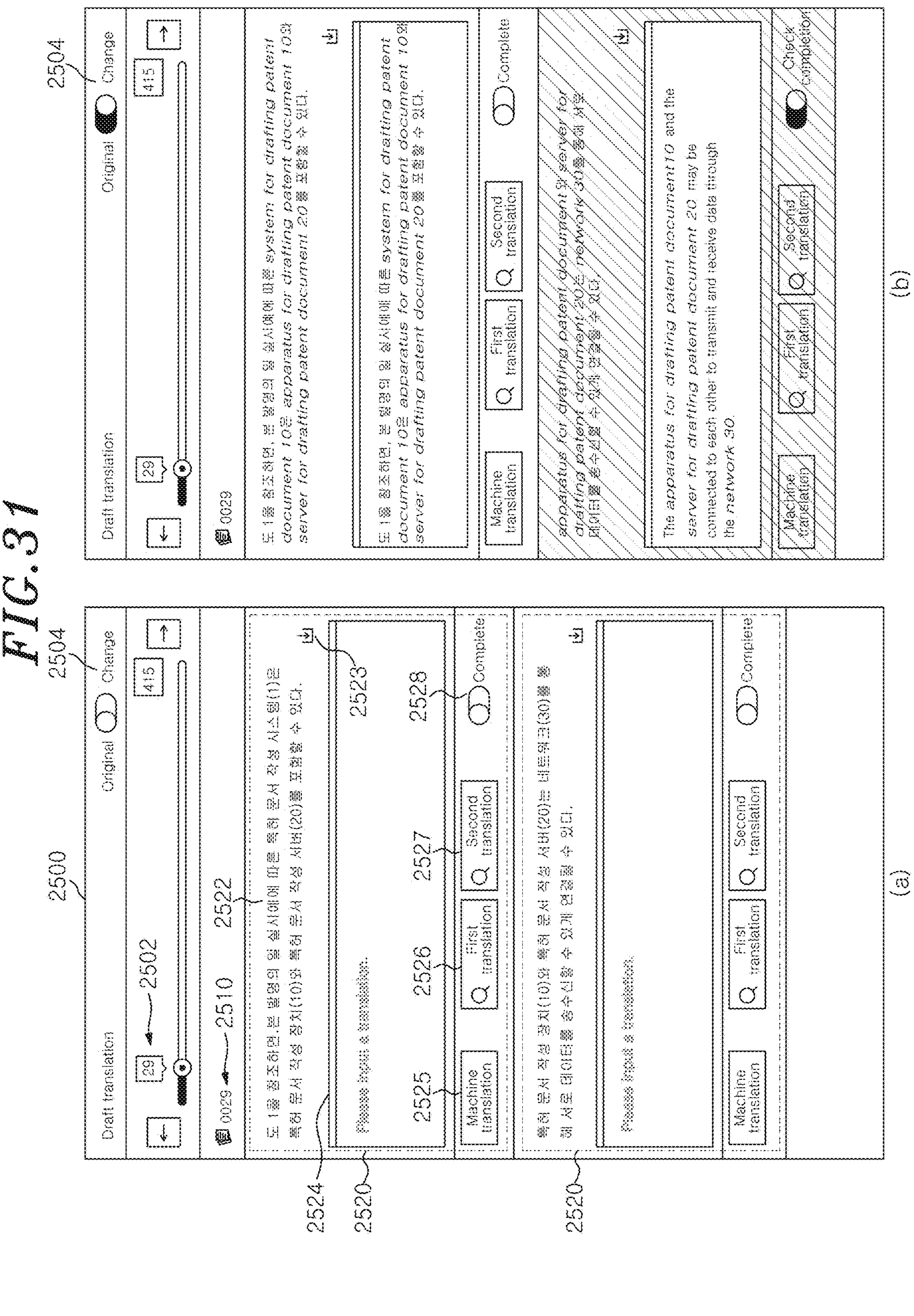
FIG. 31 is a diagram illustrating an example of a translation drafting screen of the application for drafting a patent document in FIG. 24.

FIG. 30 illustratively expresses a translation-unit unit 2520 of FIG. 31. An auto-complete function provided through the text input component 2060 may be provided in substantially the same manner as auto-completion performed through the text input component 1060 and expressed in FIG. 8, FIG. 9, etc. That is, the text input component management unit 106 may display, on a screen, an auto-complete list 2066 generated by the auto-complete list generation unit 105 based on an auto-complete keyword 2064. The auto-complete keyword 2064 may be changed into an auto-complete block 2062 depending on user selection, so auto-completion may be performed.

However, in the second service, an auto-complete data set based on a translation of an element may be generated. In this case, an element whose translation has not been input may not be included in the auto-complete data set.

Furthermore, in the second service, translation is performed on original data having generally insufficient data consistency. Thus, a key input combination for auto-completion can be more variously provided than the first service. For example, the omission of an identification code, a singular/plural conversion, an upper/lower case conversion, etc. can be more variously provided depending on a key input combination.

FIG. 31 is a diagram illustrating an example of a translation drafting screen of the application for drafting a patent document in FIG. 24.

Referring to FIG. 31, the translation drafting screen 2500 may include a page movement UI 2502. One page may correspond to one paragraph.

The page movement UI 2502 is provided to move a paragraph separated in a page unit. When a user scrolls or clicks on a button, paragraph data displayed on a screen on the lower side is changed.

A translation display change UI 2504 is to change the display of original data displayed in the translation-unit unit 2520. A function for the change may be implemented by the element display change unit 133.

A page region 2510 may display an identification code of a paragraph corresponding to a corresponding page. One page may correspond to one paragraph region.

The translation-unit unit 2520 is a configuration for translating one sentence as a translation unit.

The translation-unit unit 2520 may include an original data display region 2522, an original data insertion UI 2523, a translation drafting text input component 2524, a machine translation region invoking UI 2525, a first translation example search UI 2526, a second translation example search UI 2527, and a translation completion processing UI 2528.

Translation display and element display for data of the original data display region 2522 may be mutually changed and displayed by the translation display change UI 2504. Accordingly, a user can perform translation based on a language that the user comfortably uses.

When the original data insertion UT 2523 is clicked on, the state in which data of the original data display region 2522 has been displayed is input to the translation drafting text input component 2524 without any change. Accordingly, a translation input time can be reduced.

The translation drafting text input component 2524 is a text input component, and an auto-complete function therefor may be used by the text input component management unit 106.

Figure 32:
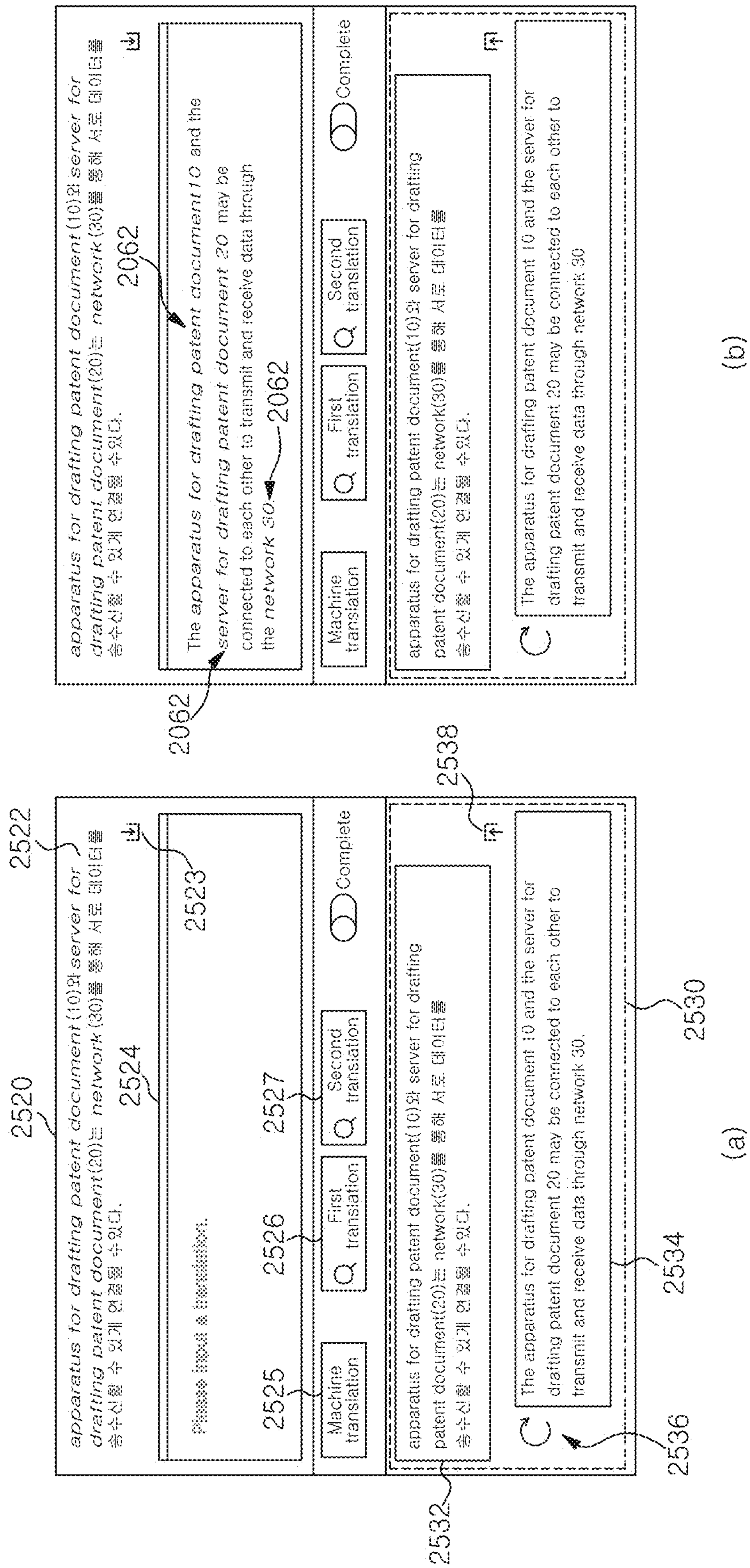
FIG. 32 is a diagram illustrating an example of a screen on which the translation drafting screen of FIG. 31 provides a machine translation service.

When the machine translation region invoking UI 2525 is pressed, a machine translation region 2530 of FIG. 32 is extended within the translation-unit unit 2520 or adjacent to the translation-unit unit 2520. Accordingly, a user can perform translation while referring to machine translation results of a sentence to be translated at a look.

The first translation example search UI 2526 searches for a first translation example based on data of the original data display region 2522, and outputs the first translation example to a first translation example search screen 2600*a*. The second translation example search UI 2527 searches a first translation example based on data of the original data display region 2522, and displays the first translation example on the first translation example search screen 2600*a*. In this case, the results of the search for the first translation example and the second translation example may be the results of a comparison between the similarities of sentences.

When the translation completion processing UI 2528 is clicked on, results input to the translation drafting text input component 2524 may be decided as translation results of a corresponding sentence. When a user releases a completion state by clicking on the translation completion processing UI 2528 again, the translation drafting text input component 2524 may be provided in an editable state again.

In some embodiments, the translation drafting screen 2500 is not composed of a page in a paragraph unit, and may be configured so that all of original data are displayed on one page or a preset page.

FIG. 31(*a*) illustrates that pages of original data are divided for each paragraph, and one or more sentences are provided in one paragraph page as a translation-unit unit.

FIG. 31(*b*) illustrates the state in which original data has changed into the translation display and that the original data in the changed state may be set in the translation drafting text input component 2524. Furthermore, FIG. 31(*b*) also discloses that the translation-unit unit 2520 in a translation completion state is displayed in a form to be distinguished from another region.

FIG. 32 is a diagram illustrating an example of a screen on which the translation drafting screen of FIG. 31 provides a machine translation service.

Referring to FIG. 32, when a user clicks on the machine translation region invoking UI 2525, the machine translation region 2530 may be displayed. When the user clicks on the machine translation region invoking UI 2525 once more, the machine translation region 2530 may be hidden.

The machine translation region 2530 is positioned adjacent to the translation drafting text input component 2524, and thus the user can check machine translation contents at a look.

In this case, the machine translation region 2530 may include a machine translation request text input component 2532 and a machine translation result text input component 2534. Each of the machine translation request text input component 2532 and the machine translation result text input component 2534 may be provided for a user to edit data. The user may refer to machine translation results while changing data. A refresh UI 2536 is a UI for newly invoking machine translation results.

When a user clicks on the machine translation region invoking UI 2525, machine translation is performed based on the original data display region 2522. If a state thereof has changed into the translation display state, the machine translation is performed without any change in the translation display state. A translation display using a machine translation engine is used without any change because a translation has already been performed in a target language. Accordingly, relatively accurate translation can be performed compared to a case where original data is used for machine translation without any change.

In this case, the user may input the results of the machine translation result text input component 2534 to the translation drafting text input component 2524 using the machine translation result insertion UI 2538. In this case, data corresponding to the auto-complete list among data of the machine translation result insertion UI 2538 may be converted into auto-complete text or the auto-complete block 2062, and may be set in the translation drafting text input component 2524. Accordingly, the same results as when auto-complete input processing has been performed may be input to the translation drafting text input component 2524, although the user does not separately input text to the translation drafting text input component 2524. The auto-complete block 2062 generated by inputting the data to the machine translation result text input component 2534 as described above may also have all basic functions as the auto-complete block 2062.

Figure 33:
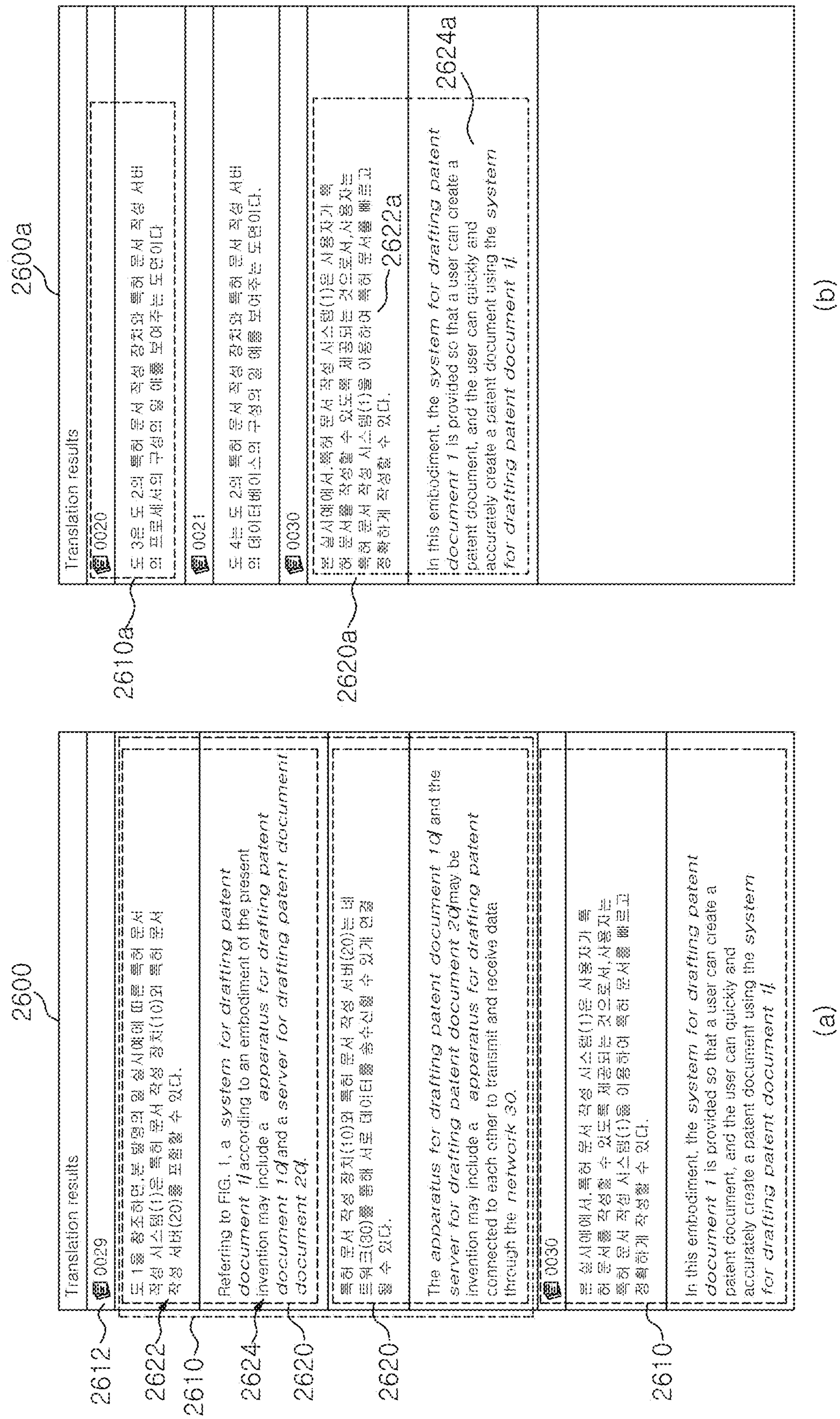
FIG. 33 is a diagram illustrating an example of a translation result screen and first translation example search screen of the application for drafting a patent document in FIG. 24.

FIG. 33 is a diagram illustrating an example of a translation result screen and first translation example search screen of the application for drafting a patent document in FIG. 24.

Referring to FIG. 33, reference numeral 2600 is a translation result screen, reference numeral 2610 is a paragraph display region, reference numeral 2612 is a paragraph identification code display region, reference numeral 2620 is a translation unit display region, reference numeral 2622 is an original display region, reference numeral 2624 is a translation display region, reference numeral 2600*a* is a first translation example search screen, reference numeral 2610*a* is a paragraph display region, reference numeral 2620*a* is a translation unit display region, reference numeral 2622*a* is an original display region, and reference numeral 2624*a* is a translation display region.

A sentence on which translation completion processing has been performed through the translation completion processing UI 2528 may be displayed on the translation result screen 2600 for each translation unit.

The translation result screen 2600 may be changed and provided as the first translation example search screen 2600*a*. A first translation example similar to a corresponding sentence may be searched for and output to the first translation example search screen 2600*a* based on a selection through the first translation example search UI 2526. FIG. 33 illustrates an example of a screen which may appear when a first translation example of "도2는 도 1의 특허 문서 작성 장치와 특허 문서 작성 서버의 구성을 개략적 으로 보여주는 도면이다" is searched for.

Figure 34:
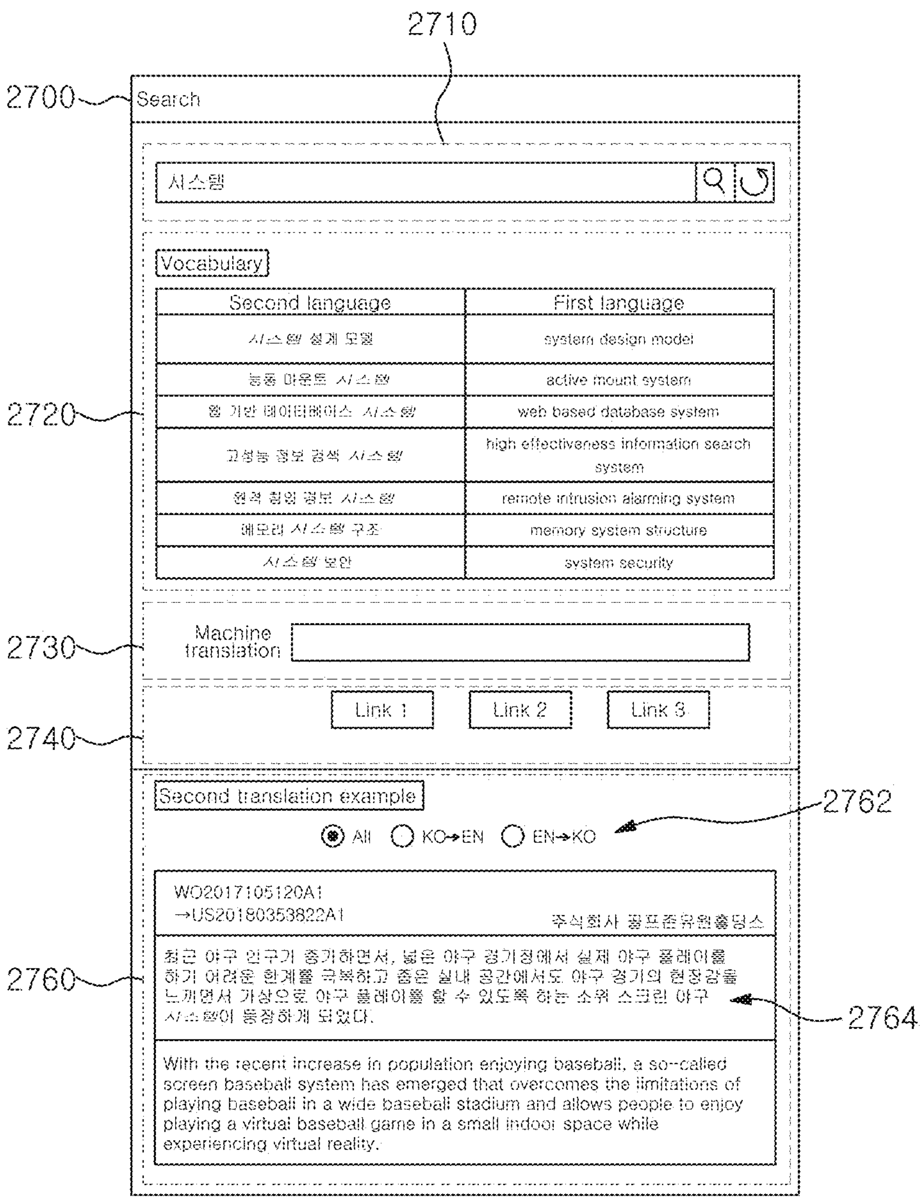
FIG. 34 is a diagram illustrating an example of a search screen of the application for drafting a patent document in FIG. 24.

FIG. 34 is a diagram illustrating an example of a search screen of the application for drafting a patent document in FIG. 24.

Referring to FIG. 34, reference numeral 2700 is a search screen, reference numeral 2710 is a search UI, reference numeral 2720 is a translation vocabulary display region, reference numeral 2730 is a word machine translation display region, reference numeral 2740 is an external link provision UI, reference numeral 2760 is a second translation example search screen, reference numeral 2762 is a translation direction selection UI, and reference numeral 2764 is a second translation example display region.

The elements of the search screen 2700 may operate in substantially the same manner as the translation vocabulary display UI 2420, the word machine translation display UI 2430, the external link provision UI 2440, and the second translation example search screen 2460 of FIG. 28. In this case, the second translation example search screen 2760 may search for a second translation example similar to a corresponding sentence in response to a selection in the second translation example search UI 2527, and may output the second translation example.

Figure 35:
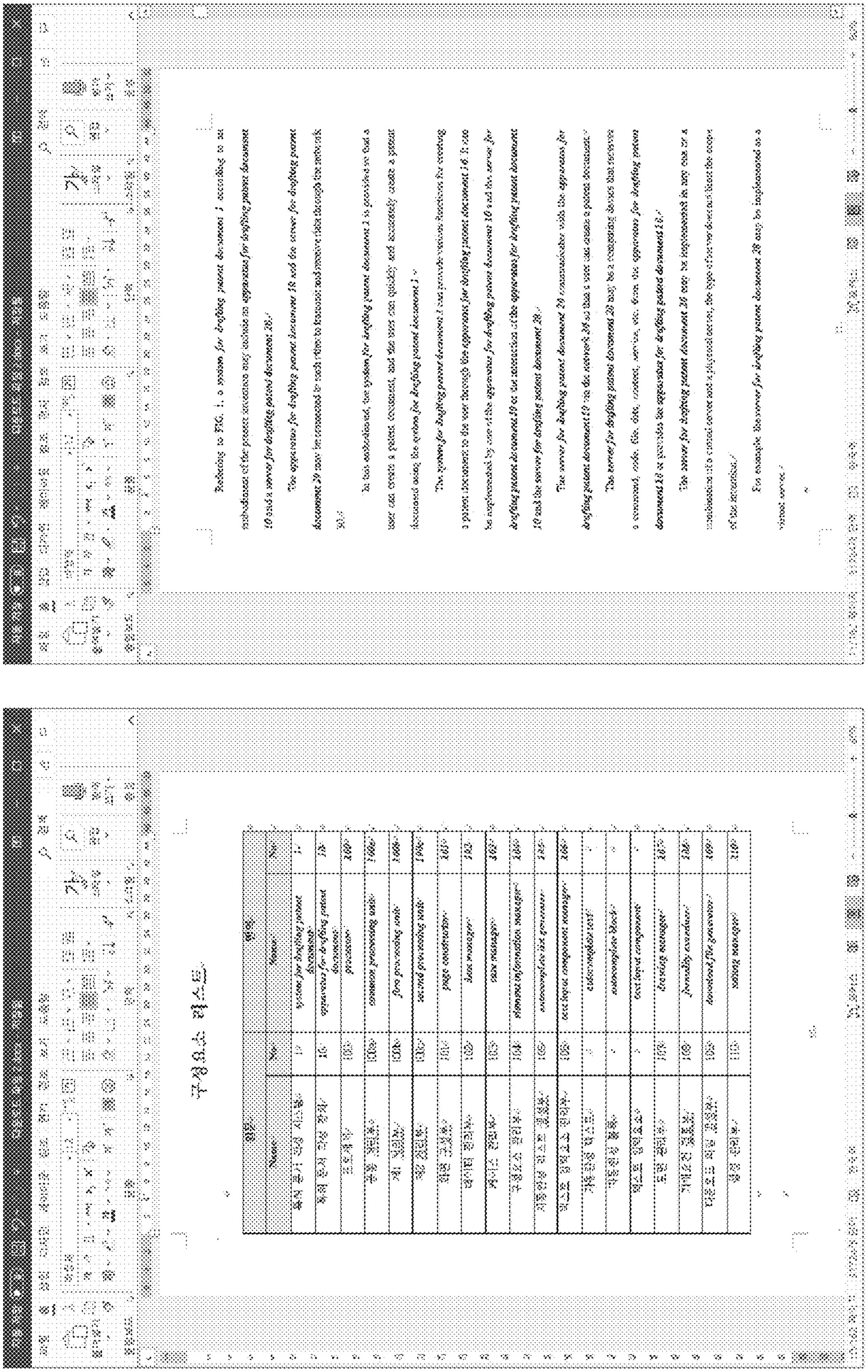
FIG. 35 is a diagram illustrating an example of a download file which may be downloaded after a patent document is drafted through the application for drafting a patent document in FIG. 24.

FIG. 35 is a diagram illustrating an example of a download file which may be downloaded after a patent document is drafted through the application for drafting a patent document in FIG. 24.

Referring to FIG. 35, a patent translation drafted through the application for drafting a patent document may be provided in a form downloadable by the download file generation unit 109. In the present embodiment, a file downloaded in a "Word" file format is illustrated.

A list of element translations illustrated in FIG. 35(*a*) may be provided in the download file, in addition to translation data for original data. In general, due to the nature of patent translation, a client who has requested patent translation from a user who uses the application for drafting a patent document may carefully review translations of elements. To this end, the download file generation unit 109 may include a list of element translations in a download file.

Furthermore, as illustrated in FIG. 35(*b*), translation data included in a download file may be displayed so that auto-complete text or an auto-complete block can be distinguished from other text portions, in the same manner that the translation data is viewed on the patent document drafting screen. Accordingly, a user and client's satisfaction can be improved because the readability of a patent document can be greatly improved.

Meanwhile, although not described with reference to the drawings, a setting screen for the patent document drafting screen 2000 for the second service may be provided similar to the setting management screen 1900 illustrated in FIG. 22. In this case, a UI for selecting whether to configure the translation drafting screen 2500 by using pages separated in a paragraph unit or whether to configure the translation drafting screen 2500 by using one page or a preset number of pages, as illustrated in the present embodiment, may be provided on the setting screen of the patent document drafting screen 2000 for the second service.

As described above, the contents related to FIGS. 5 to 35 have been described by taking, as an example, a case where the application for drafting a patent document is provide as a web application, and the spirit of the present invention is not limited thereto. A detailed characteristic of each of elements may be differently applied depending on a characteristic of the application for drafting a patent document.

The aforementioned embodiments of the present invention may be implemented in the form of a computer program which may be executed in a computer through various elements. Such a computer program may be written in a computer-readable medium.

The computer-readable medium may include a program instruction, a data file, a data structure, etc. solely or in combination. The program instructions written in the medium may be specially designed and configured for the aforementioned embodiments or may be publicly known and available to those having ordinary skill in a computer software field. Examples of the computer-readable recording medium include magnetic media such as a hard disk, a floppy disk and a magnetic tape, optical media such as a CD-ROM and a DVD, magneto-optical media such as a floptical disk, and a hardware device specially configured to store and execute a program instruction, such as a ROM, a RAM, and a flash memory. Examples of the program instruction include a machine code produced by a compiler, and a high-level language code executable by a computer using an interpreter. Furthermore, the hardware device may be configured to operate as one or more software modules in order to perform operations of embodiments, and vice versa.

Furthermore, software according to embodiments of the present invention may include a computer program, a code, an instruction or a combination of one or more thereof, and may configure a processor so that it operates as desired or may instruct processors independently or collectively. Software and/or data may be temporarily or permanently embodied in any type of a machine, a component, a physical device, virtual equipment, or a computer storage medium or a device or a transmitted signal wave so as to be interpreted by the processor or to provide an instruction or data to the processor. The software may be distributed to computer systems connected over a network and may be stored or executed in a distributed manner. The software and the data may be stored in one or more computer-readable recording media.

Furthermore, embodiments of the present invention may be implemented as a hardware component, a software component and/or a combination of hardware and software components. For example, the apparatus and the element described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction.

The apparatus, method, computer program, computer-readable recording medium, server and system for drafting a patent document according to an embodiment of the present invention have been described above as detailed embodiments, but they are merely examples. The present invention is not limited to the embodiments and should be interpreted as having the widest range according to the basic spirit disclosed in this specification. Those skilled in the art may implement a pattern having a shape that has not been described by combining or substituting the disclosed embodiments, which also falls within the range of the present invention. In addition, those skilled in the art may easily change or modify the embodiments disclosed based on this specification. It is evident that such a change or modification also falls within the scope of rights of the present invention.

INDUSTRIAL APPLICABILITY

The present invention is available for the patent industry.

What is claimed is:

1. An apparatus for drafting a patent document, the apparatus comprising:

a case management unit that receives through an input and output interface, and manages information of a case generated in order to draft a translation obtained by translating one patent document drafted in a second language into a first language;

an original data management unit that receives from a user and manages original data of the patent document drafted in the second language;

a screen configuration unit that configures, as a screen for drafting the translation, and provides to a user through the input and output interface a translation drafting screen including a plurality of translation-unit units for translating a sentence, a paragraph, or a minimum translation unit in which a sentence and a paragraph are mixed, wherein the translation-unit unit includes an original data display region to display the original data as the translation unit generated by the original data management unit, and a translation drafting text input component which is a text input component provided therein and capable of inputting a translation for the original display region;

an element management unit that manages information of an element including a name of an element in a second language and a first language translation for the name of the element, the element constituting an invention as a specific object that can be included in the translation for the original data, is dependent on the case, and can be described in a text;

a text input component management unit that manages the translation drafting text input component in the translation-unit unit; and an element display change unit which allows both original data of a second language and translation data of a first language to be displayed in the original data display region in the translation-unit unit by changing element display managed by the element management unit and included in the original data of the original data display region into translation indication corresponding to the element display managed by the element management unit.

2. The apparatus of claim 1, wherein the screen configuration unit provides a translation display change UI for changing a display of original data included in the translation-unit unit, and wherein according to an operation of the translation display change UI, the element display change unit changes the element display into the translation indication, or changes the translation indication into the element display.

3. The apparatus of claim 2, wherein the text input component management unit sets and displays a form of the translation indication differently from another text of the translation drafting text input component.

4. The apparatus of claim 1, wherein the element display change unit outputs so that the element display is changed into original-translation simultaneous indication in which a name of an element and corresponding translation are output together.

5. The apparatus of claim 1, further comprising:

an element extraction unit that extracts an element, which can be managed by the element management unit, from original data inputted through the original data management unit, wherein the element extraction unit transmits a string corresponding to a name of an element extracted from the original data and a corresponding reference numeral string to the element management unit, and wherein the element management unit stores, as information of the element, and manages a name string of a received element and a corresponding reference numeral string.

6. The apparatus of claim 5, further comprising:

a database including at least one of a first translation storage unit for storing translation data inputted as a translation for the original data included in the case being translated, a second translation storage unit for storing translation data of another patent document, and a translation vocabulary storage unit; and a machine translation provision unit that performs and provides machine translation of original data of a second language into a first language, wherein the element extraction unit searches the database for a translation corresponding to the name of the extracted element, or searches through the machine translation provision unit for a translation corresponding to the name of the extracted element, and transmits it to the element management unit, and wherein the element management unit registers and manages the transmitted translation as information of the element.

7. The apparatus of claim 5, wherein the screen configuration unit shows an extraction result obtained through the element extraction unit, and provides an element selection screen through which an element to be delivered to the element management unit is selected.

8. The apparatus of claim 1, wherein the data of the original data display region used in searching for similar translation results is data changed into the translation indication by the element display change unit.

9. The apparatus of claim 1, wherein the search of the similar original data is a result of digitizing similarity between two data, which are comparison targets, and of determining that the two data are similar if the similarity belongs to a preset range, and wherein the similarity is calculated by one or more methods of a number of identical characters or words, an edit distance, a result trained based on a machine learning or deep learning model using natural language processing, and embedding vector.

10. The apparatus of claim 1, wherein the screen configuration unit provides an element translation drafting screen by which the translation of the element can be inputted and managed, and wherein the element translation screen is provided with a translation vocabulary display user interface (UI) for displaying results of search of a translation vocabulary corresponding to an element to which translation is to be inputted, a word machine translation display UI for displaying machine translation results, an original data display region for checking a use of an element within original data, and a second translation example search screen for displaying translation results of another patent document.

11. The apparatus of claim 1, wherein the element translation drafting screen includes a search UI capable of issuing an instruction to invoke search results using as a keyword an element original data to which a translation is to be inputted, and wherein when a search instruction is inputted through the search UI, the search results are outputted in all of the translation vocabulary display UI, the word machine translation display UI, the original data display region, and the second translation example search screen.

12. The apparatus of claim 1, further comprising:

a machine translation provision unit that performs and provides machine translation of original data of a second language into a first language, wherein the machine translation provision unit performs machine translation by using the data in the original data display region in which the element display is changed into the translation indication, and in which the original data of the second language and the translation data of the first language are included, as original data on which machine translation is performed, and displays the machine translation on the translation drafting screen.

13. The apparatus of claim 12, wherein the screen configuration unit provides a machine translation region which displays machine translation results inside the translation-unit unit or adjacent to the translation-unit unit, wherein the machine translation region is provided with a machine translation request text input component in which the original data on which the machine translation is performed can be edited, and a machine translation result text input component in which machine translated result data can be edited, and wherein the machine translation provision unit performs machine translation by using text inputted in the machine translation request text input component as original data.

14. The apparatus of claim 12, wherein the translation drafting screen is provided with a machine translation result text input component to which a machine translation result is inputted, and a machine translation result insertion UI that transmits data of the machine translation result text input component to the translation drafting text input component.

15. The apparatus of claim 14, further comprising:

an auto-complete list generation unit that generates an auto-complete data set including an element item generated based on the information of the element managed by the element management unit, and that generates an auto-complete list by extracting an element item corresponding to a search term from the auto-complete data set, wherein according to operation of the machine translation result insertion UI, the text input component management unit replaces data corresponding to the element item among data of the machine translation result text input component with the element item, and outputs the resultant data to the translation drafting text input component.

16. The apparatus of claim 1, wherein the text input component management unit extracts, as an auto-complete keyword, some of the text inputted to the translation drafting text input component according to a user input through the input and output interface, and then replaces the extracted auto-complete keyword with an element item including a translation generated based on the information of the element managed by the element management unit and corresponding to the auto-complete keyword, and outputs the element item to the translation drafting text input component.

17. The apparatus of claim 1, wherein the translation unit is a sentence, wherein a page including at least one of the translation-unit units corresponding to one paragraph is provided on the translation drafting screen, and wherein the translation drafting screen is provided with a page movement UI for moving a paragraph separated in a page unit.

18. The apparatus of claim 1, further comprising:

a download file generation unit that integrates contents of the plurality of translation drafting text input components provided to the plurality of translation-unit units, and provides a downloadable file to the user.

19. The apparatus of claim 1, further comprising:

a first translation example search unit that searches for original data similar to data in the original data display region of the translation-unit unit from among translation results of the patent document being processed in response to a request from a user, and that provides a user with the similar original data and a translation result of the similar original data.

20. The apparatus of claim 1, further comprising:

a second translation example search unit that searches for original data similar to data in the original data display region of the translation-unit unit from among translation results of another patent document being processed in response to a request from a user, and that provides a user with the similar original data and a translation result of the similar original data.

21. A method for drafting a patent document using an apparatus for drafting a patent document that provides a screen for translating a patent document configured by a screen configuration unit to a user through an input and output interface, the method comprising:

receiving, through the input and output interface by a case management unit, information of a case generated in order to draft a translation obtained by translating one patent document drafted in a second language into a first language;

receiving from a user and managing, by an original data management unit, original data of the patent document drafted in the second language;

receiving, through an element management unit from the user, a registration, deletion, or modification instruction of information of an element including a name of an element in a second language and a first language translation for the name of the element, the name of the element constituting an invention as a specific object that can be included in a translation for the original data, is dependent on the case, and can be described in a text, and storing, deleting, or modifying the element information in an element information storage unit according to the instruction;

configuring, as a screen for preparing the translation, and providing, by the screen configuration unit, to a user through the input and output interface a translation drafting screen including a plurality of translation-unit units for translating a sentence, a paragraph, or a minimum translation unit in which a sentence and a paragraph are mixed;

receiving, by a text input component management unit, translation data through a translation drafting text input component in the translation-unit unit, which is a text input component provided to the translation-unit unit, so that a translation for an original data display region in which an original data as the translation unit generated by the original data management unit is displayed can be inputted; and allowing, by an element display change unit, both original text data of a second language and translation data of a first language to be displayed in the original data display region in the translation-unit unit by changing element display managed by the element management unit included in original data of the original data display region into translation indication corresponding to the element display managed by the element management unit.

22. A non-transitory computer-readable recording medium having a computer program stored thereon, wherein the computer program comprises instructions for causing a processor to perform the method for drafting a patent document according to claim 21.

23. A computer program stored in a non-transitory computer-readable recording medium, the computer program comprising:

instructions for performing the method for drafting a patent document according to claim 21 by being coupled to an apparatus including one or more memory storing command and one or more processor executing the command stored in the memory.

* * * * *